United States Patent [19]

Brenski et al.

[11] 3,818,455

[45] June 18, 1974

[54] CONTROL COMPLEX FOR TSPS TELEPHONE SYSTEM

[75] Inventors: Edwin F. Brenski, Clarendon Hills; Jan Draayer, Wheaton; Nigel J. E. Reynolds, Palatine; Verner K. Rice, Wheaton; Donald L. Schulte, Elmhurst; William R. Wedmore, Glen Ellyn; John A. Wilber, Des Plaines; Rolfe E. Buhrke, La Grange Park, all of Ill.; John G. Van Bosse, Acton, Mass.

[73] Assignee: GTE Automatic Electric Laboratories Incorporated, Northlake, Ill.

[22] Filed: Sept. 15, 1972

[21] Appl. No.: 289,718

[52] U.S. Cl. .......................... 340/172.5, 179/18 ES

[51] Int. Cl. ....................... G05b 15/00, H04m 3/00

[58] Field of Search ............... 340/172.5; 179/18 ES

[56] References Cited

UNITED STATES PATENTS

| | | | |
|---|---|---|---|
| 3,223,785 | 12/1965 | Budlong | 179/18 ES |
| 3,408,628 | 10/1968 | Brass | 340/172.5 |
| 3,483,524 | 12/1969 | De Buck | 340/172.5 |
| 3,533,073 | 10/1970 | Wirsing | 340/172.5 |
| 3,587,060 | 6/1971 | Quinn | 340/172.5 |
| 3,629,851 | 12/1971 | Werner | 340/172.5 |

*Primary Examiner*—Raulfe B. Zache
*Attorney, Agent, or Firm*—K. Mullerheim

[57] ABSTRACT

A Central Processor and its associated Instruction Store and Process Store memories provide a data processing facility for performing control and maintenance functions for the switching and telephony subsystems in a TSPS telephone system. The interface between the Central Processor and the switching and telephony subsystems is provided by a Peripheral Unit Complex which monitors and retrieves data from the various sense points in the TSPS system and routes source information to the various control points in the TSPS system.

11 Claims, 184 Drawing Figures

PATENTED JUN 18 1974

3,818,455

SHEET 02 OF 111

TIMING GENERATOR CIRCUIT

PROCESSOR CONTROL CIRCUIT (PCC)

DPC BLOCK DIAGRAM

I.F.7 INPUT OUTPUT CIRCUIT

ADDRESS DECODE CIRCUIT

ADDRESS REGISTER CIRCUIT

CONTROL DECODER BLOCK DIAGRAM

RETURN BUS CABLE DRIVER CIRCUIT

DATA REGISTER CIRCUIT

TIMING GENERATOR OUTPUT LEVELS

SLO-SL3 EXTENDED OPERATION CODES FIG.53 SUFFIX FIELD CODING

| 14 | 15 | | | | | |
|---|---|---|---|---|---|---|
| 0 | 0 | AND | CPY Y — X | CLS | SHL | CRX. LEFT |
| 0 | 1 | ISP | CPC Ȳ — X | CLR | | CRX. RIGHT |
| 1 | 0 | ORR | CPY SPR - X | CRS | SHR | CRX. LEFT |
| 1 | 1 | EOR | CPY Y — SPR | CRR | | CRX. RIGHT |

H & G HALF GENERAL REGISTER SELECTION FIG.54

| 14 | 15 | H | G |
|---|---|---|---|
| 0 | 0 | GRY LEFT (bit 00-13 | GRX LEFT (bit 00-13 |
| 0 | 1 | GRY LEFT (bit 00-15) | GRX RIGHT (bit 16-31 |
| 1 | 0 | GRY RIGHT (bit 16-31) | GRX LEFT (bit 00-15) |
| 1 | 1 | GRY RIGHT (bit 16-31) | GRX RIGHT (bit 16-31) |

H & P HALF GEN. REG & MEMORY PAGE SELECTION FIG. 55

| 14 | 15 | H | P |
|---|---|---|---|
| 0 | 0 | GRY LEFT | MEMORY PAGE 0 |
| 0 | 1 | | 1 |
| 1 | 0 | GRY RIGHT | 0 |
| 1 | 1 | | 1 |

H & D HALF GEN. REG. SELECTION & DECREMENT FIG. 56

| 14 | 15 | H | D |
|---|---|---|---|
| 0 | 0 | GRY LEFT | DO NOT DECREMENT GRY |
| 0 | 1 | | DO NOT DECREMENT GRY |
| 1 | 0 | GRY RIGHT | DO NOT DECREMENT GRY |
| 1 | 1 | | DO NOT DECREMENT GRY |

SHIFT COUNT FIELD FIG.57

| ICR 00 | B 01 | MNEMONIC | |
|---|---|---|---|
| 0 | 0 | SC 0 | SHIFT 4 BIT POSITIONS |
| 0 | 1 | SC 1 | SHIFT 1 BIT POSITIONS |
| 1 | 0 | SC 2 | SHIFT 2 BIT POSITIONS |
| 1 | 1 | SC 3 | SHIFT 3 BIT POSITIONS |

RELATIVE TYPE CODE DECODING FIG 58

| ICR.B 02 | 03 | 04 | MNEMONIC | INSTRUCTION TYPE | |
|---|---|---|---|---|---|
| 0 | 0 | 0 | RTC 0 | DATA PROCESSING | |
| 0 | 0 | 1 | RTC 1 | | |
| 0 | 1 | 0 | RTC 2 | TRANSFER | CONDITIONAL MATCH |
| 0 | 1 | 1 | RTC 3 | | CONDITIONAL NO MATCH |
| 1 | 0 | 0 | RTC 4 | INSTRUCTION STORE READ/WRITE | |
| 1 | 0 | 1 | RTC 5 | PROCESS STORE READ/WRITE | |
| 1 | 1 | 0 | RTC 6 | PERIPHERAL UNIT READ / WRITE | |
| 1 | 1 | 1 | RTC 7 | MAINTENANCE GROUP READ/WRITE | |

RELATIVE OPERATION CODE DECODING FIG.59

| ICRB Q5 | Q6 | Q7 | MNEMONIC | RTC 0 | RTC 1 | RTC 2 | RTC 3 | RTC 4 | RTC 5 | RTC 6 | RTC 7 |
|---|---|---|---|---|---|---|---|---|---|---|---|
| 0 | 0 | 0 | ROC 0 | | CPH | TRA | | RIST | RPST | RPUT | |
| 0 | 0 | 1 | ROC 1 | ADD | SUB | | | RIS | RPS | RPU | RMSB |
| 0 | 1 | 0 | ROC 2 | HELP | SHL SHR | | TSX | RISN | RYSN | RPUN | |
| 0 | 1 | 1 | ROC 3 | AND ORR EOR ISP | OSL CSR CRL CRR | TNX | TIX | XEC XECN | | | |
| 1 | 0 | 0 | ROC 4 | SBN | SBZ | TXZ TZD | TXN TND | RISA | RPSA | RPUA | WMCP |
| 1 | 0 | 1 | ROC 5 | CPY CPC | SBC | TEQ | TUQ | WIS | WPS | WPU | |
| 1 | 1 | 0 | ROC 6 | ANH | ORH | TBZ | TBN | WISN | WPSN | WPUN | WMCG |
| 1 | 1 | 1 | ROC 7 | ISH | EOH | TEH | TUH | WISD | WPSD | | |

DUAL CYCLE CONTROLLER

READ/WRITE LEVELS

FIG. 65

| RTC 4 INSTRUCTION STORE | R/W | R/W | RTC 5 PROCESS STORE | R/W | R/W | RTC 6 PERIPHERAL UNITS | R/W | R/W | RELATIVE OPERATION CODE ICR | | |
|---|---|---|---|---|---|---|---|---|---|---|---|
| INS | CYCLE I | LAST CYCLE | INS | CYCLE I | INS STORE | INS | CYCLE I | INS STORE | B05 | B06 | B07 |
| RIST | R | R | RPST | R | R | RPUT | R | R | 0 | 0 | 0 |
| RIS | | | RPS | | | RPU | | | 0 | 0 | 1 |
| RISN | | | RPSN | | | PPUN | | | 0 | 1 | 0 |
| XEC XECN | | | | | | | | | 0 | 1 | 1 |
| RISA | W | | RPSA | W | | RPUA | W | | 1 | 0 | 0 |
| WIS | | | WPS | | | WPU | | | 1 | 0 | 1 |
| WISN | | | WPSN | | | WPUN | | | 1 | 1 | 0 |
| WISD | | | WPSD | | | | | | 1 | 1 | 1 |

R = READ W = WRITE

MODE CONTROL

FIG. 66

| RTC 4 INSTRUCTION STORE | MODE | MODE | RTC 5 PROCESS STORE | MODE | | RTC 6 PERIPHERAL UNITS | MODE | | RELATIVE OPERATION CODE ICR | | |
|---|---|---|---|---|---|---|---|---|---|---|---|
| INS | CYCLE I | LAST CYCLE | INS | I CYCLE | INS STORE | INS | I CYCLE | INS STORE | B05 | B06 | B07 |
| RIST | SM | | RPST | NM | NM | RPUT | SM | NM | 0 | 0 | 0 |
| RIS | NM | | RPS | CM | | RPU | NM | | 0 | 0 | 1 |
| RISN | CM | | RPSN | | | RPUN | CM | | 0 | 1 | 0 |
| XEC XECN | NM CM | | | NM | | | NM | | 0 | 1 | 1 |
| PHSA | SM | | RPSA | SM | | RPUA | SM | | 1 | 0 | 0 |
| WIS | NM | | WPS | NM | | WPU | NM | | 1 | 0 | 1 |
| WISN | CM | | WPSN | CM | | UPUN | CM | | 1 | 1 | 0 |
| WISD | NM | | WPSD | NM | | | NM | | 1 | 1 | 1 |

| | ISNML | ISCML | ISSML | | NML | CML | SML |
|---|---|---|---|---|---|---|---|
| NM | 1 | 0 | 0 | | 1 | 0 | 0 |
| CM | 0 | 1 | 0 | | 0 | 1 | 0 |
| SM | 0 | 0 | 1 | | 0 | 0 | 1 |

NM = NORMAL MODE
CM = CONTROL MODE
SM = SPECIAL MODE

FIG. 67

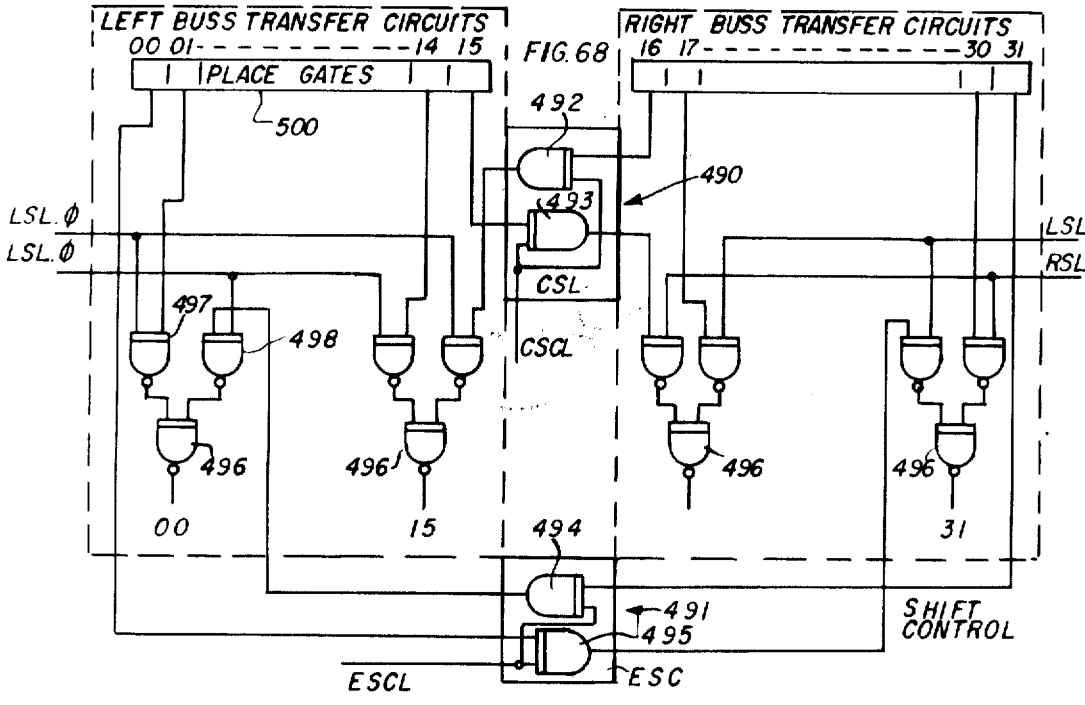

FIG. 68

FIG. 69

ADD Z, YH, XG

| ISR BIT | Ø | 1 | 2 | 3 | 4 | 5 | 6 | 7 | 8 | 9 | 10 | 11 | 12 | 13 | 14 | 15 | 16–31 |
|---|---|---|---|---|---|---|---|---|---|---|---|---|---|---|---|---|---|
| BINARY CODE | | | 0 | 0 | 0 | 0 | 0 | 1 | X | X | X | Y | Y | Y | H | G | Z |

DESCRIPTION: ( 1 ) CYCLE INSTRUCTION (Z + GRY. H) + GRX.G ⟶ GRX.G

COMMENTS:

CYCLE: 1

| | | | | | | | | | |
|---|---|---|---|---|---|---|---|---|---|
| TIMING INTERVAL | PLACE | TØPL | T1PL | T2PL | T3PL | T4PL | T5PL | T6PL | T7PL |
| | ACCEPT | TØAL | T1AL | T2AL | T3AL | T4AL | T5AL | T6AL | T7AL |
| PLACE CONTROL | | ISR | GR(Y) | GR(X) | ADC | DR | PUR | AOR | ADC |
| BUSS TRANSFER CONTROL | H = 1 | | XBTL | | | | | | |
| | H = Ø | | BTL | | | | | | |
| | G = 1 | | | XBTL | | | | | BTL |
| | G = Ø | | | BTL | | | | | XBTL |
| | | BTL | | | BTL | XBTL | | | |
| REGISTER ACCEPT CONTROL | LT. HALF BIT (Ø–15) | SR | AR | DR | | AR | ‡ GR(XSR) | | GRX.G |
| | RT. HALF BIT (16–31) | AR, DR | | DR | DR | AR | ‡ GR(XSR) | | GRX.G |
| AR BIT SELECT | | | | | | | | | |
| LOGIC COMPARE CONTROL | | | | | | | | | |
| TRANSFER TRUE AR( )DR | | | | | | | | | |
| INSTRUCTION ADDRESS COUNTER | AOC → AOR | | | | | | | | |
| | AOR → IAR | | | | | | | | |
| COMPLEX (*) COMMUNICATION | IS {IAR → IS *AB | | | | | | | | |
| | PS {DR → IP *DB | | | | | | | | |
| | PS {ADC → PS/PU *AB | | | | | | | | |
| | PU {DR → PU *DB | | | | | | | | |
| MISC. ACTIONS | | ISR → ICR | | EA ADD | | ISDO | IF (RFP = 1) ‡ | O → RPF X → XSR | LK ADC CARRY |
| MR Ø LOAD | | ISR | | GR(X) | | DR | | AOR | |
| MR 1 LOAD | | | GR(Y) | | ADC | | PUR | | ADC |

INSTRUCTION TIMING DIAGRAM SYMBOLOGY

- ∧ – AND
- ∨ – OR
- \+ – PLUS
- ⊕ – EXCLUSIVE OR (A$\bar{B}$ ∨ $\bar{A}$B)

→ INDICATES MOVE OR TRANSFER IN DIRECTION OF ARROW I.E.
ISR → ICR
CONTENTS OF ISR ARE TRANSFERED TO ICR

FIG. 70

AND Y, X

| ISR BIT | Ø | 1 | 2 | 3 | 4 | 5 | 6 | 7 | 8 | 9 | 10 | 11 | 12 | 13 | 14 | 15 | 16–31 |
|---|---|---|---|---|---|---|---|---|---|---|---|---|---|---|---|---|---|
| BINARY CODE | ▨ | ▨ | 0 | 0 | 0 | 0 | 1 | 1 | X | X | X | Y | Y | Y | 0 | 0 | ▨ (Z) |

DESCRIPTION: (1) CYCLE INSTRUCTION (GRY) ∧ (GRX) ⟶ GRX

COMMENTS:

AC=LCCACL LOGIC CIRCUIT "AND" CONTROL

CYCLE: 1

| | | | | | | | | | |
|---|---|---|---|---|---|---|---|---|---|
| TIMING INTERVAL | PLACE | TØPL ▨ | T1PL | T2PL | T3PL | T4PL | T5PL | T6PL | T7PL |
| | ACCEPT | TØAL ▨ | T1AL | T2AL | T3AL | T4AL | T5AL | T6AL | T7AL |
| PLACE CONTROL | | ISR | GR(Y) | GR(X) | | ◤ DR | PUR | AOR | LCC |
| BUSS TRANSFER CONTROL | H = 1 | | | | | | | | |
| | H = Ø | | | | | | | | |
| | G = 1 | | | | | | | | |
| | G = Ø | | | | | | | | |
| | | BTL | BTL | BTL | ◤ BTL | | | | BTL |
| REGISTER ACCEPT CONTROL | LT. HALF BIT (Ø–15) | SA | AR | DR | | | ‡ GR(XSR) | | GA (X) |
| | RT. HALF BIT (16–31) | AR, DR | AR | DR | | | ‡ GR(XSR) | | GR (X) |
| AR BIT SELECT | | | | | | | | | |
| LOGIC COMPARE CONTROL | | | | | | | | | AC |
| TRANSFER TRUE AR( )DR | | | | | | | | | |
| INSTRUCTION ADDRESS COUNTER | AOC → AOR | | | ▩ | | | | | |
| | AOR → IAR | | | | ▩ | | | | |
| COMPLEX (*) COMMUNICATION | IS {IAR → IS *AB | | | | | ▩ | | | |
| | PS {DR → IP *DB | | | | | | | | |
| | PS {ADC → PS/PU *AB | | | | | | | | |
| | PU {DR → PU *DB | | | | | | | | |
| MISC. ACTIONS | | ISR → ICR | | EA ADD | | ISDO | IF (RFP=1) ‡ | O → RPF X → XSR | LK ADC CARRY |
| MR Ø LOAD | | ISR | ▨ | GR(X) | ▨ | | ▨ | AOR | ▨ |
| MR 1 LOAD | | ▨ | GR(Y) | ▨ | | ▨ | PUR | ▨ | LCC |

◤ INDICATES REDUNDANT OPERATION THAT IS NOT REQUIRED TO PERFORM THIS INSTRUCTION.

▩ INDICATES OPERATION REFERRED TO IN LEFT HAND COLUMN OCCURS IN THIS TIMING INTERVAL.

FIG. 71

ANH Z,YH,XG

ISR BIT Ø 1 2 3 4 5 6 7 8 9 10 11 12 13 14 15 16 30 31

BINARY CODE: [hatched] [hatched] 0 0 0 1 1 0 X X X Y Y Y H G [hatched bits 16–31 = Z]

DESCRIPTION: (1) CYCLE INSTRUCTION (Z + GRY.H) ∧ GRX.G ——→ GRX.G

COMMENTS:
GRX = Ø SPECIFIES THE SPR
AC = LCCAC LOGIC CIRCUIT "AND" CONTROL

CYCLE: 1

| | | TØPL | T1PL | T2PL | T3PL | T4PL | T5PL | T6PL | T7PL |
|---|---|---|---|---|---|---|---|---|---|
| TIMING INTERVAL | ACCEPT | TØAL | T1AL | T2AL | T3AL | T4AL | T5AL | T6AL | T7AL |
| PLACE CONTROL | | ISR | GR (Y) | GR(X) | ADC | DR | PUR | AOR | LCC |
| BUSS TRANSFER CONTROL | H = 1 | | XBTL | | | | | | |
| | H = Ø | | BTL | | | | | | |
| | G = 1 | | | XBTL | | | | | |
| | G = Ø | | | BTL | | | | | |
| | | BTL | | | BTL | XBTL | | | BTL |
| REGISTER ACCEPT CONTROL | LT. HALF BIT (Ø–15) | SR | AR | DR | | AR | ‡ GR(XSR) | | GRX.$\overline{G}$ |
| | RT. HALF BIT (16–31) | AR.DR | | DR | DR | AR | ‡ GR(XSR) | | GRX.G |
| AR BIT SELECT | | | | | | | | | |
| LOGIC COMPARE CONTROL | | | | | | | | | AC |
| TRANSFER TRUE AR( )DR | | | | | | | | | |
| INSTRUCTION ADDRESS COUNTER | AOC → AOR | | | [crosshatched] | | | | | |
| | AOR → IAR | | | | [crosshatched] | | | | |
| COMPLEX (*) COMMUNICATION | IS {IAR → IS *AB | | | | | [crosshatched] | | | |
| | PS {DR → IP *DB | | | | | | | | |
| | PS {ADC → PS/PU *AB | | | | | | | | |
| | PU {DR → PU *DB | | | | | | | | |
| MISC. ACTIONS | | ISR → ICR | | EA ADD | | ISDO | IF (RFP = 1) ‡ | O → RPF X → XSR | LK ADC CARRY |
| MR Ø LOAD | | ISR | [hatched] | GR (X) | [hatched] | DR | [hatched] | AOR | [hatched] |
| MR 1 LOAD | | [hatched] | GR(Y) | [hatched] | ADC | [hatched] | PUR | [hatched] | LCC |

FIG. 72

CPC Y, X

| ISR BIT | Ø | 1 | 2 | 3 | 4 | 5 | 6 | 7 | 8 | 9 | 10 | 11 | 12 | 13 | 14 | 15 | 16 … 30 31 |
|---|---|---|---|---|---|---|---|---|---|---|---|---|---|---|---|---|---|
| BINARY CODE | | | 0 | 0 | 0 | 1 | 0 | 1 | X | X | X | Y | Y | Y | 0 | 1 | Z |

DESCRIPTION: (1) CYCLE INSTRUCTION ($\overline{GRY}$) → GRX

COMMENTS:

Y = Ø LOADS ALL 1 IN GRX

CYCLE: 1

| | | T0 | T1 | T2 | T3 | T4 | T5 | T6 | T7 |
|---|---|---|---|---|---|---|---|---|---|
| TIMING INTERVAL | PLACE | TØPL | T1PL | T2PL | T3PL | T4PL | T5PL | T6PL | T7PL |
| | ACCEPT | TØAL | T1AL | T2AL | T3AL | T4AL | T5AL | T6AL | T7AL |
| PLACE CONTROL | | ISR | GR(Y) | GR(X) | | DR | PUR | AOR | AR |
| BUSS TRANSFER CONTROL | H = 1 | | | | | | | | |
| | H = Ø | | | | | | | | |
| | G = 1 | | | | | | | | |
| | G = Ø | | | | | | | | |
| | | BTL | BTL | BTL | XBTL | CBTL | | | CBTL |
| REGISTER ACCEPT CONTROL | LT. HALF BIT (Ø-15) | SR | AR | | | | ‡ GR(XSR) | | GR(X) |
| | RT. HALF BIT (16-31) | AR, DR | AR | | | | ‡ GR(XSR) | | GR(X) |
| AR BIT SELECT | | | | | | | | | |
| LOGIC COMPARE CONTROL | | | | | | | | | |
| TRANSFER TRUE AR( )DR | | | | | | | | | |
| INSTRUCTION ADDRESS COUNTER | AOC → AOR | | | ▨ | | | | | |
| | AOR → IAR | | | | ▨ | | | | |
| COMPLEX (*) COMMUNICATION | IS {IAR → IS *AB | | | | | ▨ | | | |
| | PS {DR → IP *DB | | | | | | | | |
| | PS {ADC → PS/PU *AB | | | | | | | | |
| | PU {DR → PU *DB | | | | | | | | |
| MISC. ACTIONS | | ISR → ICR | | EA ADD | | ISDO | IF (RFP=1) ‡ | O → RPF<br>X → XSR | LK ADC CARRY |
| MR Ø LOAD | | ISR | ▨ | GR(X) | ▨ | DR | ▨ | AOR | ▨ |
| MR 1 LOAD | | ▨ | GR(Y) | ▨ | OS | ▨ | PUR | ▨ | AR |

FIG. 73

CPH Z, YH, XG

| ISR BIT | Ø | 1 | 2 | 3 | 4 | 5 | 6 | 7 | 8 | 9 | 10 | 11 | 12 | 13 | 14 | 15 | 16–31 |
|---|---|---|---|---|---|---|---|---|---|---|---|---|---|---|---|---|---|
| BINARY CODE | | | 0 | 0 | 1 | 0 | 0 | 0 | X | X | X | Y | Y | Y | H | G | Z |

DESCRIPTION: (1) CYCLE INSTRUCTION

Z + GRY. H ⟶ GRX. G

COMMENTS:

CYCLE: 1

| | | T0PL | T1PL | T2PL | T3PL | T4PL | T5PL | T6PL | T7PL |
|---|---|---|---|---|---|---|---|---|---|
| TIMING INTERVAL | PLACE | TØPL | T1PL | T2PL | T3PL | T4PL | T5PL | T6PL | T7PL |
| | ACCEPT | TØAL | T1AL | T2AL | T3AL | T4AL | T5AL | T6AL | T7AL |
| PLACE CONTROL | | ISR | GR(Y) | GR(X) | | DR | PUR | AOR | ADC |
| BUSS TRANSFER CONTROL | H = 1 | | XBTL | | | | | | |
| | H = Ø | | BTL | | | | | | |
| | G = 1 | | | | | | | | BTL |
| | G = Ø | | | | | | | | XBTL |
| | | BTL | | BTL | BTL | | | | |
| REGISTER ACCEPT CONTROL | LT. HALF BIT (Ø–15) | SR | AR | | | | ‡ GR(XSR) | | GRX.$\bar{G}$ |
| | RT. HALF BIT (16–31) | AR,DR | | | | | ‡ GR(XSR) | | GRX.G |
| AR BIT SELECT | | | | | | | | | |
| LOGIC COMPARE CONTROL | | | | | | | | | |
| TRANSFER TRUE AR( )DR | | | | | | | | | |
| INSTRUCTION ADDRESS COUNTER | AOC → AOR | | | ▨ | | | | | |
| | AOR → IAR | | | | ▨ | | | | |
| COMPLEX (*) COMMUNICATION | IS {IAR → IS *AB | | | | | ▨ | | | |
| | PS {DR → IP *DB | | | | | | | | |
| | PS {ADC → PS/PU *AB | | | | | | | | |
| | PU {DR → PU *DB | | | | | | | | |
| MISC. ACTIONS | | ISR→ICR | | EA ADD | | ISDO | IF (RFP=1) ‡ | O→RPF X→XSR | LK ADC CARRY |
| MR Ø LOAD | | ISR | ▨ | GR(X) | ▨ | DR | ▨ | AOR | ▨ |
| MR 1 LOAD | | ▨ | GR(Y) | ▨ | OS | ▨ | PUR | ▨ | ADC |

FIG. 74

CPY Y, X

| ISR BIT | Ø | 1 | 2 | 3 | 4 | 5 | 6 | 7 | 8 | 9 | 10 | 11 | 12 | 13 | 14 | 15 | 16–31 |
|---|---|---|---|---|---|---|---|---|---|---|---|---|---|---|---|---|---|
| BINARY CODE | | | 0 | 0 | 0 | 1 | 0 | 1 | X | X | X | Y | Y | Y | S | S | Z |

DESCRIPTION: (1) CYCLE INSTRUCTION

S = Ø — GRY → GRX

S = 2 — GR(SPR) → GRX   Y MUST = Ø

S = 3 — GRY → GR(SPR)   X MUST = Ø

COMMENTS:

IF X OR Y ARE NOT = TO Ø AS SPECIFIED ABOVE A DUAL PLACE OR ACCEPT WILL RESULT.

CYCLE: 1

| TIMING INTERVAL | | T0 | T1 | T2 | T3 | T4 | T5 | T6 | T7 |
|---|---|---|---|---|---|---|---|---|---|
| | PLACE | TØPL | T1PL | T2PL | T3PL | T4PL | T5PL | T6PL | T7PL |
| | ACCEPT | TØAL | T1AL | T2AL | T3AL | T4AL | T5AL | T6AL | T7AL |
| PLACE CONTROL | | ISR | GR(Y) | GR(X) | | DR | PUR | AOR | AR |
| BUSS TRANSFER CONTROL | H = 1 | | | | | | | | |
| | H = Ø | | | | | | | | |
| | G = 1 | | | | | | | | |
| | G = Ø | | | | | | | | |
| | | BTL | BTL | BTL | XBTL | CBTL | | | BTL |
| REGISTER ACCEPT CONTROL | LT. HALF BIT (Ø–15) | SR | AR | | | | ‡ GR(XSR) | | GR(X) |
| | RT. HALF BIT (16–31) | AR, DR | AR | | | | ‡ GR(XSR) | | GR(X) |
| AR BIT SELECT | | | | | | | | | |
| LOGIC COMPARE CONTROL | | | | | | | | | |
| TRANSFER TRUE AR( )DR | | | | | | | | | |
| INSTRUCTION ADDRESS COUNTER | AOC → AOR | | | | | | | | |
| | AOR → IAR | | | | | | | | |
| COMPLEX (*) COMMUNICATION | IS {IAR → IS *AB | | | | | | | | |
| | PS {DR → IP *DB | | | | | | | | |
| | PS {ADC → PS/PU *AB | | | | | | | | |
| | PU {DR → PU *DB | | | | | | | | |
| MISC. ACTIONS | | ISR → ICR | | EA ADD | | ISDO | IF (RFP = 1) ‡ | 0 → RPF X → XSR | LK ADC CARRY |
| MR Ø LOAD | | ISR | | GR(X) | | DR | | AOR | |
| MR 1 LOAD | | | GR(Y) | | 0'S | | PUR | | AR |

FIG. 75

CRR Z,Y,X

| ISR BIT | Ø | 1 | 2 | 3 | 4 | 5 | 6 | 7 | 8 | 9 | 10 | 11 | 12 | 13 | 14 | 15 | 16 … 30 31 |
|---|---|---|---|---|---|---|---|---|---|---|---|---|---|---|---|---|---|
| BINARY CODE | ▨ | ▨ | 0 | 0 | 1 | 0 | 1 | 1 | X | X | X | Y | Y | Y | 1 | 1 | ▨ (Z) |

DESCRIPTION: (1) CYCLE INSTRUCTION

GRY → AR
AR.Bi → AR.B(i+1) } n TIMES
AR.B31 → AR.BØØ }
AR → GRX n = Z MOD 4
= 1 = 1 SHIFT
= 2 = 2 SHIFTS
= 3 = 3 SHIFTS
= 0 = 4 SHIFTS

COMMENTS:
* SC = SHIFT CONTROL = RSL CSCL ESCL: SEE MISC. ACTIONS
RSL RIGHT SHIFT LEVEL
CSCL CENTER SHIFT CIRCUIT LEVEL
ESCL END SHIFT CIRCUIT LEVEL

CYCLE: 1

| | | T0 | T1 | T2 | T3 | T4 | T5 | T6 | T7 |
|---|---|---|---|---|---|---|---|---|---|
| TIMING INTERVAL | PLACE | TØPL | T1PL | T2PL | T3PL | T4PL | T5PL | T6PL | T7PL |
| | ACCEPT | TØAL | T1AL | T2AL | T3AL | T4AL | T5AL | T6AL | T7AL |
| PLACE CONTROL | | ISR | GR(Y) | GR(X) | AR | DR | PUR | AOR | AR |
| BUSS TRANSFER CONTROL | H = 1 | | | | | | | | |
| | H = Ø | | | | | | | | |
| | G = 1 | | | | | | | | |
| | G = Ø | | | | | | | | |
| | | BTL | SC * | BTL | BTL/SC | BTL/SC | | | BTL/SC |
| REGISTER ACCEPT CONTROL | LT. HALF BIT (Ø-15) | SR | AR | | DR | AR | ‡ GR(XSR) | | GR(X) |
| | RT. HALF BIT (16-31) | AR, DR | AR | | DR | AR | ‡ GR(XSR) | | GR(X) |
| AR BIT SELECT | | | | | | | | | |
| LOGIC COMPARE CONTROL | | | | | | | | | |
| TRANSFER TRUE AR( )DR | | | | | | | | | |
| INSTRUCTION ADDRESS COUNTER | AOC → AOR | | | ▩ | | | | | |
| | AOR → IAR | | | | ▩ | | | | |
| COMPLEX (*) COMMUNICATION | IS { IAR → IS *AB | | | | | ▩ | | | |
| | PS { DR → IP *DB | | | | | | | | |
| | PS { ADC → PS/PU *AB | | | | | | | | |
| | PU { DR → PU *DB | | | | | | | | |
| MISC. ACTIONS | | ISR → ICR | SC; n: 1 2 3 Ø | EA ADD | BTL / SC; n: 1 2 3 Ø | ISDO; BL / SC; n: 1 2 3 Ø | IF (RFP=1) ‡ | O → RPF X → XSR | LK ADC CARRY; BTL / SC; n: 1 2 3 Ø |
| MR Ø LOAD | | ISR | ▨ | GR(X) | ▨ | DR | ▨ | AOR | ▨ |
| MR 1 LOAD | | ▨ | GR(Y) | ▨ | AR | ▨ | PUR | ▨ | AR |

FIG. 76

CRL Z, Y, X

ISR BIT: Ø 1 2 3 4 5 6 7 8 9 10 11 12 13 14 15 16 … 30 31

BINARY CODE: (hatched) (hatched) 0 0 1 0 1 1 X X X Y Y Y 0 1 (hatched bits 16–31: Z)

DESCRIPTION: (1) CYCLE INSTRUCTION

GRY → AR

AR → GRX

AR.Bi → AR.B(i-1) } n TIMES
AR.B00 → AR.B31 } n = Z MOD 4
= 1 = 1 SHIFT
= 2 = 2 SHIFT
= 3 = 3 SHIFT
= Ø = 4 SHIFT

COMMENTS:
* SC = SHIFT CONTROL = LSL ∧ CSCL ∧ ESCL : SEE MISC. ACTION
LSL LEFT SHIFT LEVEL
CSCL CENTER SHIFT CIRCUIT LEVEL
ESCL END SHIFT CIRCUIT LEVEL

CYCLE: 1

| TIMING INTERVAL | PLACE / ACCEPT | TØPL / TØAL | T1PL / T1AL | T2PL / T2AL | T3PL / T3AL | T4PL / T4AL | T5PL / T5AL | T6PL / T6AL | T7PL / T7AL |
|---|---|---|---|---|---|---|---|---|---|
| PLACE CONTROL | | ISR | GR(Y) | GR(X) | AR | DR | PUR | AOR | AR |
| BUSS TRANSFER CONTROL | H = 1 | | | | | | | | |
| | H = Ø | | | | | | | | |
| | G = 1 | | | | | | | | |
| | G = Ø | | | | | | | | |
| | | BTL | SC * | BTL | BTL/SC | BTL/SC | | | BTL/SC |
| REGISTER ACCEPT CONTROL | LT. HALF BIT (Ø–15) | SR | AR | | DR | AR | ‡ GR(XSR) | | GR (X) |
| | RT. HALF BIT (16–31) | AR, DR | AR | | DR | AR | ‡ GR(XSR) | | GR (X) |
| AR BIT SELECT | | | | | | | | | |
| LOGIC COMPARE CONTROL | | | | | | | | | |
| TRANSFER TRUE AR( )DR | | | | | | | | | |
| INSTRUCTION ADDRESS COUNTER | AOC → AOR | | | (hatched) | | | | | |
| | AOR → IAR | | | | (hatched) | | | | |
| COMPLEX (*) COMMUNICATION | IS { IAR → IS *AB | | | | | (hatched) | | | |
| | PS { DR → IP *DB | | | | | | | | |
| | PS { ADC → PS/PU *AB | | | | | | | | |
| | PU { DR → PU *DB | | | | | | | | |
| MISC. ACTIONS | | ISR → ICR | SC (n: 1, 2, 3, Ø) | EA ADD | BTL (n: 1); SC (n: 2, 3, Ø) | ISDO; BTL (n: 1, 2); SC (n: 3, Ø) | IF (RFP = 1) ‡ | O → RPF; X → XSR | LK ADC CARRY; BTL (n: 1, 2, 3); SC (n: Ø) |
| MR Ø LOAD | | ISR | (hatched) | GR (X) | (hatched) | DR | (hatched) | AOR | (hatched) |
| MR 1 LOAD | | (hatched) | GR(Y) | (hatched) | AR | (hatched) | PUR | (hatched) | AR |

FIG. 77

CSL Z,Y,X

| ISR BIT | Ø | 1 | 2 | 3 | 4 | 5 | 6 | 7 | 8 | 9 | 10 | 11 | 12 | 13 | 14 | 15 | 16 … 30 31 |
|---|---|---|---|---|---|---|---|---|---|---|---|---|---|---|---|---|---|
| BINARY CODE | (hatched) | (hatched) | 0 | 0 | 1 | 0 | 1 | 1 | X | X | X | Y | Y | Y | 0 | 0 | (hatched) Z |

DESCRIPTION: (1) CYCLE INSTRUCTION

GRY → AR
AR.Bi → AR.B(i+1) } n TIMES
Ø → AR.B31 }
AR → GRX n = Z MOD 4
= 1 = 1 SHIFT
= 2 = 2 SHIFT
= 3 = 3 SHIFT
= Ø = 4 SHIFT

COMMENTS:
* SC = SHIFT CONTROL = LSL ∧ CSCL : SEE MISC. ACTION
LSL LEFT SHIFT LEVEL
CSCL CENTER SHIFT CIRCUIT LEVEL

CYCLE: 1

| TIMING INTERVAL | | T0 | T1 | T2 | T3 | T4 | T5 | T6 | T7 |
|---|---|---|---|---|---|---|---|---|---|
| | PLACE | TØPL | T1PL | T2PL | T3PL | T4PL | T5PL | T6PL | T7PL |
| | ACCEPT | TØAL | T1AL | T2AL | T3AL | T4AL | T5AL | T6AL | T7AL |
| PLACE CONTROL | | ISR | GR (Y) | GR (X) | AR | DR | PUR | AOR | AR |
| BUSS TRANSFER CONTROL | H = 1 | | | | | | | | |
| | H = Ø | | | | | | | | |
| | G = 1 | | | | | | | | |
| | G = Ø | | | | | | | | |
| | | BTL | SC * | BTL | BTL/SC | BTL/SC | | | BTL/SC |
| REGISTER ACCEPT CONTROL | LT. HALF BIT (Ø-15) | SR | AR | | DR | AR | ‡ GR(XSR) | | GR(X) |
| | RT. HALF BIT (16-31) | AR,DR | AR | | DR | AR | ‡ GR(XSR) | | GR (X) |
| AR BIT SELECT | | | | | | | | | |
| LOGIC COMPARE CONTROL | | | | | | | | | |
| TRANSFER TRUE AR( )DR | | | | | | | | | |
| INSTRUCTION ADDRESS COUNTER | AOC → AOR | | | (crosshatched) | | | | | |
| | AOR → IAR | | | | (crosshatched) | | | | |
| COMPLEX (*) COMMUNICATION | IS { IAR → IS *AB | | | | | (crosshatched) | | | |
| | PS { DR → IP *DB | | | | | | | | |
| | PS { ADC → PS/PU *AB | | | | | | | | |
| | PU { DR → PU *DB | | | | | | | | |
| MISC. ACTIONS | | ISR → ICR | SC; n: 1, 2, 3, Ø | EA ADD | BTL; SC; n: 1, 2, 3, Ø | ISDO; BTL; SC; n: 1, 2, 3, Ø | IF (RFP=1) ‡ | O → RPF; X → XSR | LK ADC CARRY; BTL; SC; n: 1, 2, 3, Ø |
| MR Ø LOAD | | ISR | (hatched) | GR(X) | (hatched) | DR | (hatched) | AOR | (hatched) |
| MR 1 LOAD | | (hatched) | GR(Y) | (hatched) | AR | (hatched) | PUR | (hatched) | AR |

FIG. 78

CSR Z,Y,X

| ISR BIT | Ø | 1 | 2 | 3 | 4 | 5 | 6 | 7 | 8 | 9 | 10 | 11 | 12 | 13 | 14 | 15 | 16 … 30 31 |
|---|---|---|---|---|---|---|---|---|---|---|---|---|---|---|---|---|---|
| BINARY CODE | | | 0 | 0 | 1 | 0 | 1 | 1 | X | X | X | Y | Y | Y | 1 | 0 | Z |

DESCRIPTION: (1) CYCLE INSTRUCTION

GRY → AR

AR.Bi → AR.B(i-1) } n TIMES

Ø → AR. BØØ }

AR → GRX n = Z MOD 4
= 1 = 1 SHIFT
= 2 = 2 SHIFT
= 3 = 3 SHIFT
= 0 = 4 SHIFT

COMMENTS:

* SC = SWIFT CONTROL = RSL ∧ CSCL : SEE MISC. ACTIONS
RSL RIGHT SHIFT LEVEL
CSCL CENTER SHIFT CIRCUIT LEVEL

CYCLE: 1

| | | | | | | | | | |
|---|---|---|---|---|---|---|---|---|---|
| TIMING INTERVAL | PLACE | TØPL | T1PL | T2PL | T3PL | T4PL | T5PL | T6PL | T7PL |
| | ACCEPT | TØAL | T1AL | T2AL | T3AL | T4AL | T5AL | T6AL | T7AL |
| PLACE CONTROL | | ISR | GR(Y) | GR (X) | AA | DR | PUR | AOR | AR |
| BUSS TRANSFER CONTROL | H = 1 | | | | | | | | |
| | H = Ø | | | | | | | | |
| | G = 1 | | | | | | | | |
| | G = Ø | | | | | | | | |
| | | BTL | SC * | BTL | BTL/SC | BTL/SC | | | BTL/SC |
| REGISTER ACCEPT CONTROL | LT. HALF BIT (Ø-15) | SR | AR | | DR | AR | ‡ GR(XSR) | | GR (X) |
| | RT. HALF BIT (16-31) | AR, DR | AR | | DR | AR | ‡ GR(XSR) | | GR (X) |
| AR BIT SELECT | | | | | | | | | |
| LOGIC COMPARE CONTROL | | | | | | | | | |
| TRANSFER TRUE AR( )DR | | | | | | | | | |
| INSTRUCTION ADDRESS COUNTER | AOC → AOR | | | | | | | | |
| | AOR → IAR | | | | | | | | |
| COMPLEX (*) COMMUNICATION | IS {IAR → IS *AB | | | | | | | | |
| | PS {DR → IP *DB | | | | | | | | |
| | PS {ADC → PS/PU *AB | | | | | | | | |
| | PU {DR → PU *DB | | | | | | | | |
| MISC. ACTIONS | | ISR → ICR | SC; n: 1, 2, 3, Ø | EA ADD | SC; n: 1, 2, 3, Ø | ISDO; SC; n: 1, 2, 3, Ø | IF (RFP=1) ‡ | 0 → RPF X → XSR | LK ADC CARRY; SC; n: 1, 2, 3, Ø |
| MR Ø LOAD | | ISR | | GR(X) | | DR | | AOR | |
| MR 1 LOAD | | | GR(Y) | | AR | | PUR | | AR |

FIG. 79

EOH Z, YH, XG

| ISR BIT | Ø | 1 | 2 | 3 | 4 | 5 | 6 | 7 | 8 | 9 | 10 | 11 | 12 | 13 | 14 | 15 | 16–31 |
|---|---|---|---|---|---|---|---|---|---|---|---|---|---|---|---|---|---|
| BINARY CODE | | | 0 | 0 | 1 | 1 | 1 | 1 | X | X | X | Y | Y | Y | H | G | Z |

DESCRIPTION: (1) CYCLE INSTRUCTION (Z + GRY.H) ⊕ GRX.G → GRX.G

COMMENTS:

GRX = Ø SPECIFICS SPR
AC = LCCAC LOGIC CIRCUIT "AND" CONTROL
NC = LCCNC LOGIC CIRCUIT "NOR" CONTROL

CYCLE: 1

| TIMING INTERVAL | | TØPL | T1PL | T2PL | T3PL | T4PL | T5PL | T6PL | T7PL |
|---|---|---|---|---|---|---|---|---|---|
| | ACCEPT | TØAL | T1AL | T2AL | T3AL | T4AL | T5AL | T6AL | T7AL |
| PLACE CONTROL | | ISR | GR(Y) | GR(X) | ADC | DR | PUR | AOR | LCC |
| BUSS TRANSFER CONTROL | H = 1 | | XBTL | | | | | | |
| | H = Ø | | BTL | | | | | | |
| | G = 1 | | | XBTL | | | | | |
| | G = Ø | | | BTL | | | | | |
| | | BTL | | | BTL | XBTL | | | CBTL |
| REGISTER ACCEPT CONTROL | LT. HALF BIT (Ø–15) | SR | AR | DR | | AR | ‡ GR(XSR) | | GRX.Ḡ |
| | RT. HALF BIT (16–31) | AR, DR | | DR | DR | AR | ‡ GR(XSR) | | GRX.G |
| AR BIT SELECT | | | | | | | | | |
| LOGIC COMPARE CONTROL | | | | | | | | | NC, AC |
| TRANSFER TRUE AR( )DR | | | | | | | | | |
| INSTRUCTION ADDRESS COUNTER | AOC → AOR | | | | | | | | |
| | AOR → IAR | | | | | | | | |
| COMPLEX (*) COMMUNICATION | IS {IAR → IS *AB | | | | | | | | |
| | PS {DR → IP *DB | | | | | | | | |
| | PS {ADC → PS/PU *AB | | | | | | | | |
| | PU {DR → PU *DB | | | | | | | | |
| MISC. ACTIONS | | ISR → ICR | | EA ADD | | ISDO | IF (RFP=1) ‡ | O → RPF X → XSR | LK ADC CARRY |
| MR Ø LOAD | | ISR | | GR(X) | | DR | | AOR | |
| MR 1 LOAD | | | GR(Y) | | ADC | | PUR | | LCC |

FIG. 80

EOR Y, X

ISR BIT: Ø 1 2 3 4 5 6 7 8 9 10 11 12 13 14 15 16 30 31

BINARY CODE: 0 0 0 0 1 1 X X X Y Y Y 1 1 (bits 16–31: Z)

DESCRIPTION: ( I ) CYCLE INSTRUCTION

GRY ⊕ GRX ⟶ GRX

COMMENTS:

AC = LCCAC LOGIC CIRCUIT "AND" CONTROL

NC = LCCNC LOGIC CIRCUIT "NOR" CONTROL

CYCLE:

| | | | | | | | | | |
|---|---|---|---|---|---|---|---|---|---|
| TIMING INTERVAL | PLACE | TØPL | T1PL | T2PL | T3PL | T4PL | T5PL | T6PL | T7PL |
| | ACCEPT | TØAL | T1AL | T2AL | T3AL | T4AL | T5AL | T6AL | T7AL |
| PLACE CONTROL | | ISR | GR(Y) | GR(X) | | DR | PUR | AOC | LCC |
| BUSS TRANSFER CONTROL | H = 1 | | | | | | | | |
| | H = Ø | | | | | | | | |
| | G = 1 | | | | | | | | |
| | G = Ø | | | | | | | | |
| | | BTL | BTL | BTL | BTL | | | | CBTL |
| REGISTER ACCEPT CONTROL | LT. HALF BIT (Ø–15) | SR | AR | DA | | | ‡ GR(XSR) | | GR(X) |
| | RT. HALF BIT (16–31) | AR, DR | AR | DR | | | ‡ GR(XSR) | | GR(X) |
| AR BIT SELECT | | | | | | | | | |
| LOGIC COMPARE CONTROL | | | | | | | | | NC, AC |
| TRANSFER TRUE AR( )DR | | | | | | | | | |
| INSTRUCTION ADDRESS COUNTER | AOC→AOR | | | | | | | | |
| | AOR→IAR | | | | | | | | |
| COMPLEX (*) COMMUNICATION | IS {IAR→IS *AB | | | | | | | | |
| | PS {DR→IP *DB | | | | | | | | |
| | PS {ADC→PS/PU *AB | | | | | | | | |
| | PU {DR→PU *DB | | | | | | | | |
| MISC. ACTIONS | | ISR→ICR | | EA ADD | | ISDO | IF (RFP=1) ‡ | O→RPF X→XSR | LK ADC CARRY |
| MR Ø LOAD | | ISR | | GR(X) | | DR | | AOR | |
| MR 1 LOAD | | | GR(Y) | | OS | | PUR | | LCC |

FIG. 81

HELP

ISR BIT ∅ 1 2 3 4 5 6 7 8 9 10 11 12 13 14 15 16 30 31

BINARY CODE: ▨ ▨ 0 0 0 0 1 0 - - - - - - - - ▨ ▨ ▨ ▨ ▨ ▨ (bits 16–31: Z)

DESCRIPTION: (1) CYCLE INSTRUCTION
GENERATES PRIMARY ERROR INPUT TO RCC

COMMENTS:
NO GR ACCEPTANCE ALLOWED

CYCLE: 1

| | | | | | | | | | |
|---|---|---|---|---|---|---|---|---|---|
| TIMING INTERVAL | PLACE | T∅PL | T1PL | T2PL | T3PL | T4PL | T5PL | T6PL | T7PL |
| | ACCEPT | T∅AL | T1AL | T2AL | T3AL | T4AL | T5AL | T6AL | T7AL |
| PLACE CONTROL | | ISR | GR(Y) | GR(X) | | DR | PUR | AOR | |
| BUSS TRANSFER CONTROL | H = 1 | | | | | | | | |
| | H = ∅ | | | | | | | | |
| | G = 1 | | | | | | | | |
| | G = ∅ | | | | | | | | |
| | | PTL | | BTL | BTL | | | | |
| REGISTER ACCEPT CONTROL | LT. HALF BIT (∅-15) | SR | AR | | | | ‡ GR(XSR) | | |
| | RT. HALF BIT (16-31) | AR, DR | | | | | ‡ GR(XSR) | | |
| AR BIT SELECT | | | | | | | | | |
| LOGIC COMPARE CONTROL | | | | | | | | | |
| TRANSFER TRUE AR( )DR | | | | | | | | | |
| INSTRUCTION ADDRESS COUNTER | AOC → AOR | | | ▨ | | | | | |
| | AOR → IAR | | | | ▨ | | | | |
| COMPLEX (*) COMMUNICATION | IS {IAR → IS * AB | | | | | ▨ | | | |
| | PS {DR → IP * DB | | | | | | | | |
| | PS {ADC → PS/PU * AB | | | | | | | | |
| | PU {DR → PU * DB | | | | | | | | |
| MISC. ACTIONS | | ISR → ICR | | EA ADD | | ISDO | IF (RFP=1) ‡ | O → RPF X → XSR | LK ADC CARRY |
| MR ∅ LOAD | | ISR | ▨ | GR (X) | ▨ | DR | ▨ | AOR | ▨ |
| MR 1 LOAD | | ▨ | GR(Y) | ▨ | AOC | ▨ | PUR | ▨ | 1'S |

FIG. 82

ISH Z, YH, XG

| ISR BIT | Ø | 1 | 2 | 3 | 4 | 5 | 6 | 7 | 8 | 9 | 10 | 11 | 12 | 13 | 14 | 15 | 16–31 |
|---|---|---|---|---|---|---|---|---|---|---|---|---|---|---|---|---|---|
| BINARY CODE | ▨ | ▨ | 0 | 0 | 0 | 1 | 1 | 1 | X | X | X | Y | Y | Y | H | G | ▨ (Z) |

DESCRIPTION: (1) CYCLE INSTRUCTION $(\overline{Z + GRY.H}) \wedge GRX.G \longrightarrow GRX.G$

COMMENTS:

GRX = Ø SPECIFIES THE SPR

AC = LCCAC LOGIC CIRCUIT "AND" CONTROL

CYCLE: 1

| | | T0PL | T1PL | T2PL | T3PL | T4PL | T5PL | T6PL | T7PL |
|---|---|---|---|---|---|---|---|---|---|
| TIMING INTERVAL | ACCEPT | T0AL | T1AL | T2AL | T3AL | T4AL | T5AL | T6AL | T7AL |
| PLACE CONTROL | | ISR | GR (Y) | GR (X) | ADC | DR | PUR | AOR | LCC |
| BUSS TRANSFER CONTROL | H = 1 | | XBTL | | | | | | |
| | H = Ø | | BTL | | | | | | |
| | G = 1 | | | XBTL | | | | | |
| | G = Ø | | | BTL | | | | | |
| | | BTL | | | CBTL | XBTL | | | BTL |
| REGISTER ACCEPT CONTROL | LT. HALF BIT (Ø–15) | SR | AR | DR | | AR | ‡ GR(XSR) | | $GRX.\overline{G}$ |
| | RT. HALF BIT (16–31) | AR, DR | | DR | DR | AR | ‡ GR(XSR) | | GRX.G |
| AR BIT SELECT | | | | | | | | | |
| LOGIC COMPARE CONTROL | | | | | | | | | AC |
| TRANSFER TRUE AR( )DR | | | | | | | | | |
| INSTRUCTION ADDRESS COUNTER | AOC → AOR | | | ▩ | | | | | |
| | AOR → IAR | | | | ▩ | | | | |
| COMPLEX (*) COMMUNICATION | IS {IAR → IS *AB | | | | | ▩ | | | |
| | PS {DR → IP *DB | | | | | | | | |
| | PS {ADC → PS/PU *AB | | | | | | | | |
| | PU {DR → PU *DB | | | | | | | | |
| MISC. ACTIONS | | ISR → ICR | | EA ADD | | ISDO | IF (RFP = 1) ‡ | O → RPF X → XSR | LK ADC CARRY |
| MR Ø LOAD | | ISR | ▨ | GR (X) | ▨ | DR | ▨ | AOR | ▨ |
| MR 1 LOAD | | ▨ | GR(Y) | ▨ | ADC | ▨ | PUR | ▨ | LCC |

FIG. 83

ISP Y, X

| ISR BIT | Ø | 1 | 2 | 3 | 4 | 5 | 6 | 7 | 8 | 9 | 10 | 11 | 12 | 13 | 14 | 15 | 16 … 30 31 |
|---|---|---|---|---|---|---|---|---|---|---|---|---|---|---|---|---|---|
| BINARY CODE | ▨ | ▨ | 0 | 0 | 0 | 0 | 1 | 1 | X | X | X | Y | Y | Y | 0 | 1 | ▨ (Z) |

DESCRIPTION: (1) CYCLE INSTRUCTION $(\overline{GRY}) \wedge (GRX) \longrightarrow GRX$

COMMENTS:

AC = LCCAC LOGIC CIRCUIT "AND" CONTROL

CYCLE: 1

| | | TØ | T1 | T2 | T3 | T4 | T5 | T6 | T7 |
|---|---|---|---|---|---|---|---|---|---|
| TIMING INTERVAL | PLACE | TØPL | T1PL | T2PL | T3PL | T4PL | T5PL | T6PL | T7PL |
| | ACCEPT | TØAL | T1AL | T2AL | T3AL | T4AL | T5AL | T6AL | T7AL |
| PLACE CONTROL | | ISR | GR(Y) | GR(X) | | DR | PUR | AOR | LCC |
| BUSS TRANSFER CONTROL | H = 1 | | | | | | | | |
| | H = Ø | | | | | | | | |
| | G = 1 | | | | | | | | |
| | G = Ø | | | | | | | | |
| | | BTL | CBTL | BTL | BTL | | | | BTL |
| REGISTER ACCEPT CONTROL | LT. HALF BIT (Ø-15) | SR | AR | DR | | | ‡ GR(XSR) | | GR(X) |
| | RT. HALF BIT (16-31) | AR,DR | AR | DR | | | ‡ GR(XSR) | | BR(X) |
| AR BIT SELECT | | | | | | | | | |
| LOGIC COMPARE CONTROL | | | | | | | | | AC |
| TRANSFER TRUE AR( )DR | | | | | | | | | |
| INSTRUCTION ADDRESS COUNTER | AOC → AOR | | | ▩ | | | | | |
| | AOR → IAR | | | | ▩ | | | | |
| COMPLEX (*) COMMUNICATION | IS {IAR → IS *AB | | | | | ▩ | | | |
| | PS {DR → IP *DB | | | | | | | | |
| | PS {ADC → PS/PU *AB | | | | | | | | |
| | PU {DR → PU *DB | | | | | | | | |
| MISC. ACTIONS | | ISR → ICR | | EA ADD | | ISDO | IF (RFP=1) ‡ | O → RPF X → XSR | LK ADC CARRY |
| MR Ø LOAD | | ISR | ▨ | GR(X) | ▨ | DR | ▨ | AOR | ▨ |
| MR 1 LOAD | | ▨ | GR(Y) | ▨ | O'S | ▨ | PUR | ▨ | LCC |

FIG. 84

ORH Z, YH, XG

| ISR BIT | Ø | 1 | 2 | 3 | 4 | 5 | 6 | 7 | 8 | 9 | 10 | 11 | 12 | 13 | 14 | 15 | 16 … 30 31 |
|---|---|---|---|---|---|---|---|---|---|---|---|---|---|---|---|---|---|
| BINARY CODE | | | 0 | 0 | 1 | 1 | 1 | 0 | X | X | X | Y | Y | Y | H | G | Z |

DESCRIPTION: ( 1 ) CYCLE INSTRUCTION ( Z + GRY.H ) v GRX.G ⟶ GRX.G

COMMENTS:

GRX = Ø SPECIFIES SPR

NC = LCCNC LOGIC CIRCUIT "NOR" CONTROL

CYCLE: 1

| TIMING INTERVAL | | T0PL / T0AL | T1PL / T1AL | T2PL / T2AL | T3PL / T3AL | T4PL / T4AL | T5PL / T5AL | T6PL / T6AL | T7PL / T7AL |
|---|---|---|---|---|---|---|---|---|---|
| PLACE CONTROL | | ISR | GR (Y) | GR (X) | ADC | DR | PUR | AOR | LCC |
| BUSS TRANSFER CONTROL | H = 1 | | XBTL | | | | | | |
| | H = Ø | | BTL | | | | | | |
| | G = 1 | | | XBTL | | | | | |
| | G = Ø | | | BTL | | | | | |
| | | BTL | | | BTL | XBTL | | | CBTL |
| REGISTER ACCEPT CONTROL | LT. HALF BIT (Ø–15) | SR | AR | DR | | AR | ‡ GR(XSR) | | GRX.$\overline{G}$ |
| | RT. HALF BIT (16–31) | AR, DR | | DR | DR | AR | ‡ GR(XSR) | | GRX.G |
| AR BIT SELECT | | | | | | | | | |
| LOGIC COMPARE CONTROL | | | | | | | | | NC |
| TRANSFER TRUE AR( )DR | | | | | | | | | |
| INSTRUCTION ADDRESS COUNTER | AOC → AOR | | | | | | | | |
| | AOR → IAR | | | | | | | | |
| COMPLEX (*) COMMUNICATION | IS {IAR → IS *AB | | | | | | | | |
| | PS {DR → IP *DB | | | | | | | | |
| | PS {ADC → PS/PU *AB | | | | | | | | |
| | PU {DR → PU *DB | | | | | | | | |
| MISC. ACTIONS | | ISR → ICR | | EA ADD | | ISDO | IF (RFP = 1) ‡ | O → RPF X → XSR | LK ADC CARRY |
| MR Ø LOAD | | ISR | | GR (X) | | DR | | AOR | |
| MR 1 LOAD | | | GR(Y) | | ADC | | PUR | | LCC |

FIG. 85

ORR Y, X

| ISR BIT | Ø | 1 | 2 | 3 | 4 | 5 | 6 | 7 | 8 | 9 | 10 | 11 | 12 | 13 | 14 | 15 | 16 | | | | | 30 | 31 |
|---|---|---|---|---|---|---|---|---|---|---|---|---|---|---|---|---|---|---|---|---|---|---|---|
| BINARY CODE | | | 0 | 0 | 0 | 0 | 1 | 1 | X | X | X | Y | Y | Y | 1 | 0 | | | | | | | |

Bits 16–31: Z

DESCRIPTION: ( 1 ) CYCLE INSTRUCTION (GRY) V (GRX) ⟶ GRX

COMMENTS:

NC = LCCNC LOGIC CIRCUIT "NOR" CONTROL

CYCLE:

| | | | | | | | | |
|---|---|---|---|---|---|---|---|---|
| TIMING INTERVAL — PLACE | TØPL | T1PL | T2PL | T3PL | T4PL | T5PL | T6PL | T7PL |
| TIMING INTERVAL — ACCEPT | TØAL | T1AL | T2AL | T3AL | T4AL | T5AL | T6AL | T7AL |
| PLACE CONTROL | ISR | GR(Y) | GR(X) | | DR | PUR | AOR | LCC |
| BUSS TRANSFER CONTROL — H = 1 | | | | | | | | |
| BUSS TRANSFER CONTROL — H = Ø | | | | | | | | |
| BUSS TRANSFER CONTROL — G = 1 | | | | | | | | |
| BUSS TRANSFER CONTROL — G = Ø | | | | | | | | |
| | BTL | BTL | BTL | BTL | | | | CBTL |
| REGISTER ACCEPT CONTROL — LT. HALF BIT (Ø-15) | SR | AR | DR | | | ‡ GR(XSR) | | GR(X) |
| REGISTER ACCEPT CONTROL — RT. HALF BIT (16-31) | AR, DR | AR | DR | | | ‡ GR(XSR) | | GR(X) |
| AR BIT SELECT | | | | | | | | |
| LOGIC COMPARE CONTROL | | | | | | | | NC |
| TRANSFER TRUE AR( )DR | | | | | | | | |
| INSTRUCTION ADDRESS COUNTER — AOC → AOR | | | | | | | | |
| INSTRUCTION ADDRESS COUNTER — AOR → IAR | | | | | | | | |
| COMPLEX (*) COMMUNICATION — IS: IAR → IS *AB | | | | | | | | |
| PS: DR → IP *DB | | | | | | | | |
| PS: ADC → PS/PU *AB | | | | | | | | |
| PU: DR → PU *DB | | | | | | | | |
| MISC. ACTIONS | ISR → ICR | | EA ADD | | ISDO | IF (RFP=1) ‡ | O → RPF X → XSR | LK ADC CARRY |
| MR Ø LOAD | ISR | | GR(X) | | DR | | AOR | |
| MR 1 LOAD | | GR(Y) | | O'S | | PUR | | LCC |

FIG. 86

RIS PZ, YH, X

| ISR BIT | 0 | 1 | 2 | 3 | 4 | 5 | 6 | 7 | 8 | 9 | 10 | 11 | 12 | 13 | 14 | 15 | 16 … 30 31 |
|---|---|---|---|---|---|---|---|---|---|---|---|---|---|---|---|---|---|
| BINARY CODE | [hatched] | [hatched] | 1 | 0 | 0 | 0 | 0 | 1 | X | X | X | Y | Y | Y | H | P | [hatched] Z |

DESCRIPTION: (2) CYCLE INSTRUCTION

IS AT P ^ (Z + GRY.H) ⟶ GRX

COMMENTS:

MEMORY CONTROL

| R (sm) | W (cm) | MODE (nm) |
|---|---|---|
| 1 | 0 | 001 |

CYCLE: 1

| | | T0PL | T1PL | T2PL | T3PL | T4PL | T5PL | T6PL | T7PL |
|---|---|---|---|---|---|---|---|---|---|
| TIMING INTERVAL | ACCEPT | T0AL | T1AL | T2AL | T3AL | T4AL | T5AL | T6AL | T7AL |
| PLACE CONTROL | | ISR | GR(Y) | GR(X) | ADC | DR | PUR | AOR | AOC |
| BUSS TRANSFER CONTROL | H = 1 | | XBTL | | | | | | |
| | H = 0 | | BTL | | | | | | |
| | G = 1 | | | | | | | | |
| | G = 0 | | | | | | | | |
| | | BTL | | BTL | BTL | | | | XBTL |
| REGISTER ACCEPT CONTROL | LT. HALF BIT (0–15) | SR | AR | DR | | | ‡ GR(XSR) | | |
| | RT. HALF BIT (16–31) | AR, DR | | DR | IAR | | ‡ GR(XSR) | | DR |
| AR BIT SELECT | | | | | | | | | |
| LOGIC COMPARE CONTROL | | | | | | | | | |
| TRANSFER TRUE AR( )DR | | | | | | | | | |
| INSTRUCTION ADDRESS COUNTER | AOC → AOR | | | [cross-hatched] | | | | | |
| | AOR → IAR | | | | | | | | |
| COMPLEX (*) COMMUNICATION | IS {IAR → IS *AB | | | | | [cross-hatched] | | | |
| | PS {DR → IP *DB | | | | | | | | |
| | PS {ADC → PS/PU *AB | | | | | | | | |
| | PU {DR → PU *DB | | | | | | | | |
| MISC. ACTIONS | | ISR → ICR | | EA ADD SET DCCAF | ICR B15 → IAR. B15 | ISDO | IF (RFP=1) ‡ | 0 → RPF X → XSR | LK ADC CARRY SET: DCCDF MCF |
| MR 0 LOAD | | ISR | [hatched] | GR(X) | [hatched] | | [hatched] | AOR | [hatched] |
| MR 1 LOAD | | [hatched] | GR(Y) | [hatched] | ADC | [hatched] | PUR | [hatched] | ADC |

FIG. 87

RIS

ISR BIT BINARY CODE: Ø 1 2 3 4 5 6 7 8 9 10 11 12 13 14 15 16 30 31 (bits 16–31: Z)

DESCRIPTION: (2) CYCLE INSTRUCTION

COMMENTS:

MEMORY CONTROL: R = 1, W = 0, MODE (sm cm nm) = 001

CYCLE: 2

| | | T0 | T1 | T2 | T3 | T4 | T5 | T6 | T7 |
|---|---|---|---|---|---|---|---|---|---|
| TIMING INTERVAL | PLACE | TØPL | T1PL | T2PL | T3PL | T4PL | T5PL | T6PL | T7PL |
| | ACCEPT | TØAL | T1AL | T2AL | T3AL | T4AL | T5AL | T6AL | T7AL |
| PLACE CONTROL | | ISR | ISR | | ADC | DR | AR | AOR | ADC |
| BUSS TRANSFER CONTROL | H = 1 | | | | | | | | |
| | H = Ø | | | | | | | | |
| | G = 1 | | | | | | | | |
| | G = Ø | | | | | | | | |
| | | BTL | BTL | BTL | BTL | | BTL | | XBTL |
| REGISTER ACCEPT CONTROL | LT. HALF BIT (Ø-15) | SR | AR | | | | ‡ GR(XSR) | | |
| | RT. HALF BIT (16-31) | AR, DR | | | | | ‡ GR(XSR) | | |
| AR BIT SELECT | | | | | | | | | |
| LOGIC COMPARE CONTROL | | | | | | | | | |
| TRANSFER TRUE AR( )DR | | | | | | | | | |
| INSTRUCTION ADDRESS COUNTER | AOC → AOR | | | | | | | | |
| | AOR → IAR | | | | (crosshatched) | | | | |
| COMPLEX (*) COMMUNICATION | IS: IAR → IS *AB | | | | | (crosshatched) | | | |
| | PS: DR → IP *DB | | | | | | | | |
| | PS: ADC → PS/PU *AB | | | | | | | | |
| | PU: DR → PU *DB | | | | | | | | |
| MISC. ACTIONS | | | RESET DCCAF | | | ISDO | IF (RFP=1) ‡ | O → RPF<br>X → XSR<br>RESET DCCBF MCF | |
| MR Ø LOAD | | ISR | | O's | | DR | | AOR | |
| MR 1 LOAD | | | ISP | | ADC | | AR | | ADC |

FIG. 88

RISA PZ, YH, X

| ISR BIT | 0 | 1 | 2 | 3 | 4 | 5 | 6 | 7 | 8 | 9 | 10 | 11 | 12 | 13 | 14 | 15 | 16 ... 30 31 |
|---|---|---|---|---|---|---|---|---|---|---|---|---|---|---|---|---|---|
| BINARY CODE | | | 1 | 0 | 0 | 1 | 0 | 0 | X | X | X | Y | Y | Y | H | P | Z |

DESCRIPTION: (2) CYCLE INSTRUCTION

IS AT NON MEMORY LOCATION P∧(Z + GRY.H) → GRX

COMMENTS:

GRX IS OUTPULSED AS DATA

MEMORY CONTROL: 0 (R) | 1 (W) | 100 (MODE)

CYCLE: 1

| | | T0 | T1 | T2 | T3 | T4 | T5 | T6 | T7 |
|---|---|---|---|---|---|---|---|---|---|
| TIMING INTERVAL | PLACE | T0PL | T1PL | T2PL | T3PL | T4PL | T5PL | T6PL | T7PL |
| | ACCEPT | T0AL | T1AL | T2AL | T3AL | T4AL | T5AL | T6AL | T7AL |
| PLACE CONTROL | | ISR | GR(Y) | GR(X) | ADC | DR | PUR | AOR | ADC |
| BUSS TRANSFER CONTROL | H = 1 | | XBTL | | | | | | |
| | H = 0 | | BTL | | | | | | |
| | G = 1 | | | | | | | | |
| | G = 0 | | | | | | | | |
| | | BTL | | BTL | BTL | | | | XBTL |
| REGISTER ACCEPT CONTROL | LT. HALF BIT (0–15) | SR | AR | DR | | | ‡ GR(XSR) | | DR |
| | RT. HALF BIT (16–31) | AR, DR | | DR | IAR | | ‡ GR(XSR) | | DR |
| AR BIT SELECT | | | | | | | | | |
| LOGIC COMPARE CONTROL | | | | | | | | | |
| TRANSFER TRUE AR( )DR | | | | | | | | | |
| INSTRUCTION ADDRESS COUNTER | AOC → AOR | | | | | | | | |
| | AOR → IAR | | | | | | | | |
| COMPLEX (*) COMMUNICATION | IS {IAR → IS *AB | | | | | | | | |
| | PS {DR → IP *DB | | | | | | | | |
| | PS {ADC → PS/PU *AB | | | | | | | | |
| | PU {DR → PU *DB | | | | | | | | |
| MISC. ACTIONS | | ISR → ICR | | EA ADD SET DCCAF | ICR.B15 ↓ IAR.B15 | ISDO | IF (RFP=1) ‡ | O → RPF X → XSR | LK ADC CARRY SET: DCCBF MCF |
| MR 0 LOAD | | ISR | | GR(X) | | DR | | AOR | |
| MR 1 LOAD | | | GR(Y) | | ADC | | PUR | | ADC |

PATENTED JUN 18 1974 3,818,455

SHEET 45 OF 111

FIG. 89

RISA

ISR BIT BINARY CODE: bits Ø, 1 and 16–31 hatched (bits 0 1 2 3 4 5 6 7 8 9 10 11 12 13 14 15 16 … 30 31); bits 16–31 = Z

DESCRIPTION: (2) CYCLE INSTRUCTION

COMMENTS: ECHO OF ADDRESS SENT TO IS IN CYCLE 1 COMPARED TO ADDRESS IN T2L
AC = LCCAC LOGIC CIRCUIT "AND" CONTROL
NC = LCCNC LOGIC CIRCUIT "NOR" CONTROL
CYCLE: 2

MEMORY CONTROL: 1 0 0 0 1 (R W MODE)

| TIMING INTERVAL | | T1PL | T2PL | T3PL | T4PL | T5PL | T6PL | T7PL |
|---|---|---|---|---|---|---|---|---|
| PLACE | TØPL | T1PL | T2PL | T3PL | T4PL | T5PL | T6PL | T7PL |
| ACCEPT | TØAL | T1AL | T2AL | T3AL | T4AL | T5AL | T6AL | T7AL |
| PLACE CONTROL | ISR | ISR | | ADC | DR | AR | AOR | ADC |
| BUSS TRANSFER CONTROL H = 1 | | | | | | | | |
| H = Ø | | | | | | | | |
| G = 1 | | | | | | | | |
| G = Ø | | | | | | | | |
| | BTL | BTL | BTL | BTL | | BTL | | XBTL |
| REGISTER ACCEPT CONTROL LT. HALF BIT (Ø–15) | SR | AR | | | | ‡ GR(XSR) | | DR |
| RT. HALF BIT (16–31) | AR, DR | | | | | ‡ GR(XSR) | | DR |
| AR BIT SELECT | | | | | | | | |
| LOGIC COMPARE CONTROL | | | NC, AC | | | | | |
| TRANSFER TRUE AR( )DR | | | | | | | | |
| INSTRUCTION ADDRESS COUNTER AOC → AOR | | | | | | | | |
| AOR → IAR | | | | ▩ | | | | |
| COMPLEX (*) COMMUNICATION IS {IAR → IS *AB | | | | | ▩ | | | |
| PS {DR → IP *DB | | | | | | | | |
| ADC → PS/PU *AB | | | | | | | | |
| PU {DR → PU *DB | | | | | | | | |
| MISC. ACTIONS | | RESET DCCAF | | | ISDO | IF (RFP=1) ‡ | O → RPF X → XSR RESET DCCBF MCF | |
| MR Ø LOAD | ISR | ▨ | O'S | ▨ | DR | ▨ | AOR | ▨ |
| MR 1 LOAD | ▨ | ISR | ▨ | ADC | ▨ | AR | ▨ | ADC |

FIG. 90

RISN PZ, YH, X

| ISR BIT | 0 | 1 | 2 | 3 | 4 | 5 | 6 | 7 | 8 | 9 | 10 | 11 | 12 | 13 | 14 | 15 | 16–31 |
|---|---|---|---|---|---|---|---|---|---|---|---|---|---|---|---|---|---|
| BINARY CODE | [shaded] | [shaded] | 1 | 0 | 0 | 0 | 1 | 0 | X | X | X | Y | Y | Y | H | P | [shaded] Z |

DESCRIPTION: (2) CYCLE INSTRUCTION

IS AT P∧(Z+GRY.H) → GRX — NON MEMORY LOCATION

COMMENTS:

MEMORY CONTROL: R = 1, W = 0, MODE (sm cm nm) = 010

CYCLE: 1

| | | T0 | T1 | T2 | T3 | T4 | T5 | T6 | T7 |
|---|---|---|---|---|---|---|---|---|---|
| TIMING INTERVAL | PLACE | T0PL [shaded] | T1PL | T2PL | T3PL | T4PL | T5PL | T6PL | T7PL |
| | ACCEPT | T0AL [shaded] | T1AL | T2AL | T3AL | T4AL | T5AL | T6AL | T7AL |
| PLACE CONTROL | | ISR | GR(Y) | GR(X) | ADC | DR | PUR | AOR | ADC |
| BUSS TRANSFER CONTROL | H = 1 | | XBTL | | | | | | |
| | H = 0 | | BTL | | | | | | |
| | G = 1 | | | | | | | | |
| | G = 0 | | | | | | | | |
| | | BTL | | BTL | BTL | | | | XBTL |
| REGISTER ACCEPT CONTROL | LT. HALF BIT (0–15) | SR | AR | DR | | | ‡ GR(XSR) | | DR |
| | RT. HALF BIT (16–31) | AR, DR | | DR | IAR | | ‡ GR(XSR) | | DR |
| AR BIT SELECT | | | | | | | | | |
| LOGIC COMPARE CONTROL | | | | | | | | | |
| TRANSFER TRUE AR( )DR | | | | | | | | | |
| INSTRUCTION ADDRESS COUNTER | AOC → AOR | | | [cross-hatched] | | | | | |
| | AOR → IAR | | | | | | | | |
| COMPLEX (*) COMMUNICATION | IS: IAR → IS *AB | | | | | [cross-hatched] | | | |
| | PS: DR → IP *DB | | | | | | | | |
| | PS: ADC → PS/PU *AB | | | | | | | | |
| | PU: DR → PU *DB | | | | | | | | |
| MISC. ACTIONS | | ISR → ICR | | EA ADD SET: DCCAF | ICR B15 → IAR.B15 | ISDO | IF (RFP=1) ‡ | O → RPF X → XSR | LK ADC CARRY SET: DCCBF MCF |
| MR 0 LOAD | | ISR | [hatched] | GR(X) | [hatched] | DR | [hatched] | AOR | [hatched] |
| MR 1 LOAD | | [hatched] | GR(Y) | [hatched] | ADC | [hatched] | PUR | [hatched] | ADC |

FIG. 91

RISN

ISR BIT Ø 1 2 3 4 5 6 7 8 9 10 11 12 13 14 15 16 30 31
BINARY CODE (bits Ø, 1 and 16–31 hatched; bits 16–31 marked z)

DESCRIPTION: (2) CYCLE INSTRUCTION

COMMENTS:

MEMORY CONTROL

| R | W | MODE (sm cm nm) |
|---|---|---|
| 1 | 0 | 0 0 1 |

CYCLE: 2

| | | TØ | T1 | T2 | T3 | T4 | T5 | T6 | T7 |
|---|---|---|---|---|---|---|---|---|---|
| TIMING INTERVAL | PLACE | TØPL | T1PL | T2PL | T3PL | T4PL | T5PL | T6PL | T7PL |
| | ACCEPT | TØAL | T1AL | T2AL | T3AL | T4AL | T5AL | T6AL | T7AL |
| PLACE CONTROL | | ISR | ISR | | ADC | DR | AR | AOR | ADC |
| BUSS TRANSFER CONTROL | H = 1 | | | | | | | | |
| | H = Ø | | | | | | | | |
| | G = 1 | | | | | | | | |
| | G = Ø | | | | | | | | |
| | | BTL | BTL | BTL | BTL | | BTL | | XBTL |
| REGISTER ACCEPT CONTROL | LT. HALF BIT (Ø-15) | SR | AR | | | | ‡ GR(XSR) | | DR |
| | RT. HALF BIT (16-31) | AR, DR | | | | | ‡ GR(XSR) | | DR |
| AR BIT SELECT | | | | | | | | | |
| LOGIC COMPARE CONTROL | | | | | | | | | |
| TRANSFER TRUE AR( )DR | | | | | | | | | |
| INSTRUCTION ADDRESS COUNTER | AOC→AOR | | | | | | | | |
| | AOR→IAR | | | | (crosshatched) | | | | |
| COMPLEX (*) COMMUNICATION | IS {IAR→IS *AB | | | | | (crosshatched) | | | |
| | PS {DR→IP *DB | | | | | | | | |
| | PS {ADC→PS/PU *AB | | | | | | | | |
| | PU {DR→PU *DB | | | | | | | | |
| MISC. ACTIONS | | | RESET DCCAF | | | ISDO | IF (RFP=1) ‡ | O→RPF X→XSR RESET DCCBF MCF | |
| MR Ø LOAD | | ISR | (hatched) | O'S | (hatched) | DR | (hatched) | AOR | (hatched) |
| MR 1 LOAD | | (hatched) | ISR | (hatched) | HDC | (hatched) | AR | (hatched) | ADC |

FIG. 92

RIST PZ, YH, X

| ISR BIT | Ø | 1 | 2 | 3 | 4 | 5 | 6 | 7 | 8 | 9 | 10 | 11 | 12 | 13 | 14 | 15 | 16 … 30 31 |
|---|---|---|---|---|---|---|---|---|---|---|---|---|---|---|---|---|---|
| BINARY CODE | ▨ | ▨ | 1 | 0 | 0 | 0 | 0 | X | X | X | Y | Y | Y | Y | H | P | ▨ (Z) |

DESCRIPTION: (2) CYCLE INSTRUCTION
IS AT NON MEMORY LOCATION P∧(Z + GRY. H)→GRX

COMMENTS:

CYCLE: 1

MEMORY CONTROL

| R | W | MODE sm | MODE cm | MODE nm |
|---|---|---|---|---|
| 1 | 0 | 1 | 0 | 0 |

| | | | | | | | | | |
|---|---|---|---|---|---|---|---|---|---|
| TIMING INTERVAL | PLACE | TØPL | T1PL | T2PL | T3PL | T4PL | T5PL | T6PL | T7PL |
| | ACCEPT | TØAL | T1AL | T2AL | T3AL | T4AL | T5AL | T6AL | T7AL |
| PLACE CONTROL | | ISR | GR(Y) | GR(X) | ADC | DR | PUR | AOR | ADC |
| BUSS TRANSFER CONTROL | H = 1 | | XBTL | | | | | | |
| | H = Ø | | BTL | | | | | | |
| | G = 1 | | | | | | | | |
| | G = Ø | | | | | | | | |
| | | BTL | | BTL | BTL | | | | XBTL |
| REGISTER ACCEPT CONTROL | LT. HALF BIT (Ø–15) | SR | AR | DR | | | ‡ GR(XSR) | | DR |
| | RT. HALF BIT (16–31) | AR, DR | | DR | IAR | | ‡ GR(XSR) | | DR |
| AR BIT SELECT | | | | | | | | | |
| LOGIC COMPARE CONTROL | | | | | | | | | |
| TRANSFER TRUE AR( )DR | | | | | | | | | |
| INSTRUCTION ADDRESS COUNTER | AOC→AOR | | | ▩ | | | | | |
| | AOR→IAR | | | | | | | | |
| COMPLEX (*) COMMUNICATION | IS {IAR→IS *AB | | | | | ▩ | | | |
| | PS {DR→IP *DB | | | | | | | | |
| | PS {ADC→PS/PU *AB | | | | | | | | |
| | PU {DR→PU *DB | | | | | | | | |
| MISC. ACTIONS | | ISR→ICR | | EA ADD SET DC CAF | ICR.B15 ↓ IAR.B15 | ISDO | IF (RFP=1) ‡ | O→RPF X→XSR | LK ADC CARRY SET: DCCBF MCF |
| MR Ø LOAD | | ISR | ▨ | GR(X) | ▨ | DR | ▨ | AOR | ▨ |
| MR 1 LOAD | | ▨ | GR(Y) | ▨ | ADC | ▨ | PUR | ▨ | ADC |

FIG. 93

RIST

ISR BIT Ø 1 2 3 4 5 6 7 8 9 10 11 12 13 14 15 16 30 31
BINARY CODE (bits Ø, 1 and 16–31 hatched; bits 16–31 marked z)

DESCRIPTION: (2 ) CYCLE INSTRUCTION

COMMENTS:

CYCLE: 2

| | | | | | | | | |
|---|---|---|---|---|---|---|---|---|
| TIMING INTERVAL | PLACE | TØPL | T1PL | T2PL | T3PL | T4PL | T5PL | T6PL | T7PL |
| | ACCEPT | TØAL | T1AL | T2AL | T3AL | T4AL | T5AL | T6AL | T7AL |
| PLACE CONTROL | | ISR | ISR | | ADC | DR | AR | AOR | ADC |
| BUSS TRANSFER CONTROL | H = 1 | | | | | | | | |
| | H = Ø | | | | | | | | |
| | G = 1 | | | | | | | | |
| | G = Ø | | | | | | | | |
| | | BTL | BTL | BTL | BTL | | BTL | | XPTL |
| REGISTER ACCEPT CONTROL | LT. HALF BIT (Ø-15) | SR | AR | | | | ‡ GR(XSR) | | |
| | RT. HALF BIT (16-31) | AR, DR | | | | | ‡ GR(XSR) | | |
| AR BIT SELECT | | | | | | | | | |
| LOGIC COMPARE CONTROL | | | | | | | | | |
| TRANSFER TRUE AR( )DR | | | | | | | | | |
| INSTRUCTION ADDRESS COUNTER | AOC → AOR | | | | | | | | |
| | AOR → IAR | | | | (hatched) | | | | |
| COMPLEX (*) COMMUNICATION IS | IAR → IS *AB | | | | | (hatched) | | | |
| PS | DR → IP *DB | | | | | | | | |
| | ADC → PS/PU *AB | | | | | | | | |
| PU | DR → PU *DB | | | | | | | | |
| MISC. ACTIONS | | | RESET DCCAF | | | ISDO | IF (RFP=1) ‡ | O → RPF X → XSR RESET DCCBF MCF | |
| MR Ø LOAD | | ISR | (hatched) | "0" | (hatched) | DR | (hatched) | AOR | (hatched) |
| MR 1 LOAD | | (hatched) | ISR | (hatched) | ADC | (hatched) | AR | (hatched) | ADC |

FIG. 94

RMSG Z, X

| ISR BIT | Ø | 1 | 2 | 3 | 4 | 5 | 6 | 7 | 8 | 9 | 10 | 11 | 12 | 13 | 14 | 15 | 16–31 |
|---|---|---|---|---|---|---|---|---|---|---|---|---|---|---|---|---|---|
| BINARY CODE | | | 1 | 1 | 1 | 0 | 0 | 1 | X | X | X | 0 | 0 | 0 | 0 | 0 | Z |

DESCRIPTION: (1) CYCLE INSTRUCTION
MSG AT Z → GRX

COMMENTS:
ADDRESS OF MSG IS TAKEN DIRECTLY FROM ISR

CYCLE: 1

| | | | | | | | | | |
|---|---|---|---|---|---|---|---|---|---|
| TIMING INTERVAL | PLACE | TØPL | T1PL | T2PL | T3PL | T4PL | T5PL | T6PL | T7PL |
| | ACCEPT | TØAL | T1AL | T2AL | T3AL | T4AL | T5AL | T6AL | T7AL |
| PLACE CONTROL | | ISR | GR(Y) | GR(X) | ADC | DR | PUR | AOR | MDR |
| BUSS TRANSFER CONTROL | H = 1 | | XBTL | | | | | | |
| | H = Ø | | BTL | | | | | | |
| | G = 1 | | | | | | | | |
| | G = Ø | | | | | | | | |
| | | BTL | | CBTL | BTL | | | | |
| REGISTER ACCEPT CONTROL | LT. HALF BIT (Ø–15) | SR | AR | | | | ‡ GR(XSR) | | GRX |
| | RT. HALF BIT (16–31) | AR, DR | | | | | ‡ GR(XSR) | | GRX |
| AR BIT SELECT | | | | | | | | | |
| LOGIC COMPARE CONTROL | | | | | | | | | |
| TRANSFER TRUE AR( )DR | | | | | | | | | |
| INSTRUCTION ADDRESS COUNTER | ADC → AOR | | | | | | | | |
| | AOR → IAR | | | | | | | | |
| COMPLEX (*) COMMUNICATION | IS {IAR → IS *AB | | | | | | | | |
| | PS {DR → IP *DB | | | | | | | | |
| | PS {ADC → PS/PU *AB | | | | | | | | |
| | PU {DR → PU *DB | | | | | | | | |
| MISC. ACTIONS | | ISR → ICR | | EA ADD | SEE COMMENTS MARL | ISDO | IF (RFP = 1) ‡ | 0 → RPF X → XSR | LK ADC CARRY |
| MR Ø LOAD | | ISR | | GR(X) | | DR | | AOR | |
| MR 1 LOAD | | | GR(Y) | | ADC | | PUR | | MDR |

FIG. 95

RPS PZ, YH, X

| ISR BIT | 0 | 1 | 2 | 3 | 4 | 5 | 6 | 7 | 8 | 9 | 10 | 11 | 12 | 13 | 14 | 15 | 16 … 30 31 |
|---|---|---|---|---|---|---|---|---|---|---|---|---|---|---|---|---|---|
| BINARY CODE | /// | /// | 1 | 0 | 1 | 0 | 0 | 1 | X | X | X | Y | Y | Y | H | P | /// (Z) |

DESCRIPTION: (1) CYCLE INSTRUCTION

PS AT P ∧ (Z+GRY.H) ⟶ GRX

COMMENTS:

MEMORY CONTROL

| R (sm) | W (cm) | MODE (nm) |
|---|---|---|
| 1 | 0 | 001 |

CYCLE: 1

| | | T0 | T1 | T2 | T3 | T4 | T5 | T6 | T7 |
|---|---|---|---|---|---|---|---|---|---|
| TIMING INTERVAL | PLACE | T0PL | T1PL | T2PL | T3PL | T4PL | T5PL | T6PL | T7PL |
| | ACCEPT | T0AL | T1AL | T2AL | T3AL | T4AL | T5AL | T6AL | T7AL |
| PLACE CONTROL | | ISR | GR(Y) | GR(X) | ADC | DR | PUR | AOR | PSR |
| BUSS TRANSFER CONTROL | H = 1 | | XBTL | | | | | | |
| | H = 0 | | BTL | | | | | | |
| | G = 1 | | | | | | | | |
| | G = 0 | | | | | | | | |
| | | BTL | | BTL | BTL | | | | BTL |
| REGISTER ACCEPT CONTROL | LT. HALF BIT (0–15) | SR | AR | DR | | | ‡ GR(XSR) | | HR / GRX |
| | RT. HALF BIT (16–31) | AR, DR | | DR | | | ‡ GR(XSR) | | GRX |
| AR BIT SELECT | | | | | | | | | |
| LOGIC COMPARE CONTROL | | | | | | | | | |
| TRANSFER TRUE AR( )DR | | | | | | | | | |
| INSTRUCTION ADDRESS COUNTER | AOC → AOR | | | /// | | | | | |
| | AOR → IAR | | | | /// | | | | |
| COMPLEX (*) COMMUNICATION | IS {IAR → IS *AB | | | | | /// | | | |
| | PS {DR → IP *DB | | | | | | | | |
| | PS {ADC → PS/PU *AB | | | | /// | | | | |
| | PU {DR → PU *DB | | | | | | | | |
| MISC. ACTIONS | | ISR→ICR | | EA ADD | PSDO, MODE ICR.B15→PSABB15 | ISDO | IF (RFP=1) ‡ | O→RPF X→XSR | LK ADC CARRY |
| MR 0 LOAD | | ISR | /// | GR(X) | /// | DR | /// | AOR | /// |
| MR 1 LOAD | | /// | GR(Y) | /// | ADC | /// | PUR | /// | PSR |

FIG. 96

RPSA PZ, YH, X

| ISR BIT | Ø | 1 | 2 | 3 | 4 | 5 | 6 | 7 | 8 | 9 | 10 | 11 | 12 | 13 | 14 | 15 | 16 … 30 31 |
|---|---|---|---|---|---|---|---|---|---|---|---|---|---|---|---|---|---|
| BINARY CODE | | | 1 | 0 | 1 | 1 | 0 | 0 | X | X | X | Y | Y | Y | H | R | Z |

DESCRIPTION: (1) CYCLE INSTRUCTION
PS AT P∧(Z + GRY.H) → GRX
NON MEMORY ADDRESS

COMMENTS:
TEST OF PS ADDRESS REGISTER

MEMORY CONTROL: R 0, W 1, MODE (sm cm nm) 100

CYCLE: 1

| | | T0 | T1 | T2 | T3 | T4 | T5 | T6 | T7 |
|---|---|---|---|---|---|---|---|---|---|
| TIMING INTERVAL | PLACE | TØPL | T1PL | T2PL | T3PL | T4PL | T5PL | T6PL | T7PL |
| | ACCEPT | TØAL | T1AL | T2AL | T3AL | T4AL | T5AL | T6AL | T7AL |
| PLACE CONTROL | | ISR | GR(Y) | GR(X) | ADC | DR | ADC | AOR | PSR |
| BUSS TRANSFER CONTROL | H = 1 | | XBTL | | | | | | |
| | H = Ø | | BTL | | | | | | |
| | G = 1 | | | | | | | | |
| | G = Ø | | | | | | | | |
| | | BTL | | BTL | BTL | | XBTL | | BTL |
| REGISTER ACCEPT CONTROL | LT. HALF BIT (Ø-15) | SR | AR | DR | | | DR | | AR, GRX |
| | RT. HALF BIT (16-31) | AR, DR | | DR | | | | | GRX |
| AR BIT SELECT | | | | | | | | | |
| LOGIC COMPARE CONTROL | | | | | | | | | |
| TRANSFER TRUE AR( )DR | | | | | | | | | |
| INSTRUCTION ADDRESS COUNTER | AOC → AOR | | | | | | | | |
| | AOR → IAR | | | | | | | | |
| COMPLEX (*) COMMUNICATION | IS: IAR → IS *AB | | | | | | | | |
| | PS: DR → IP *DB | | | | | | | | |
| | PS: ADC → PS/PU *AB | | | | | | | | |
| | PU: DR → PU *DB | | | | | | | | |
| MISC. ACTIONS | | ISR → ICR | | EA ADD | PSDO, MODE ICR.BI5 → PSAB.BI5 | ISDO | | O → RPF X → XSR | LK ADC CARRY |
| MR Ø LOAD | | ISR | | GR(X) | | DR | | AOR | |
| MR 1 LOAD | | | GR(Y) | | ADC | | ADC | | PSR |

FIG. 97

RPSN PZ, YH, X

ISR BIT / BINARY CODE

| ISR BIT | Ø | 1 | 2 | 3 | 4 | 5 | 6 | 7 | 8 | 9 | 10 | 11 | 12 | 13 | 14 | 15 | 16–31 |
|---|---|---|---|---|---|---|---|---|---|---|---|---|---|---|---|---|---|
| BINARY CODE | | | 1 | 0 | 1 | 0 | 1 | 0 | X | X | X | Y | Y | Y | H | P | Z |

DESCRIPTION: (1) CYCLE INSTRUCTION

PS AT P∧(Z + GRY.H) → GRX NON MEMORY ADDRESS

COMMENTS:

CYCLE: 1

MEMORY CONTROL: R 1, W 0, MODE (sm cm nm) 0 1 0

| | | | | | | | | | |
|---|---|---|---|---|---|---|---|---|---|
| TIMING INTERVAL | PLACE | TØPL | T1PL | T2PL | T3PL | T4PL | T5PL | T6PL | T7PL |
| | ACCEPT | TØAL | T1AL | T2AL | T3AL | T4AL | T5AL | T6AL | T7AL |
| PLACE CONTROL | | ISR | GR(Y) | GR(X) | ADC | DR | PUR | AOR | PSR |
| BUSS TRANSFER CONTROL | H = 1 | | XBTL | | | | | | |
| | H = Ø | | BTL | | | | | | |
| | G = 1 | | | | | | | | |
| | G = Ø | | | | | | | | |
| | | BTL | | BTL | BTL | | | | BTL |
| REGISTER ACCEPT CONTROL | LT. HALF BIT (Ø–15) | SR | AR | DR | | | ‡ GR(XSR) | | AR / GRX |
| | RT. HALF BIT (16–31) | AR, DR | | DR | | | ‡ GR(XSR) | | GRX |
| AR BIT SELECT | | | | | | | | | |
| LOGIC COMPARE CONTROL | | | | | | | | | |
| TRANSFER TRUE AR( )DR | | | | | | | | | |
| INSTRUCTION ADDRESS COUNTER | AOC → AOR | | | ▩ | | | | | |
| | AOR → IAR | | | | ▩ | | | | |
| COMPLEX (*) COMMUNICATION | IS {IAR → IS *AB | | | | | ▩ | | | |
| | PS {DR → IP *DB | | | | | | | | |
| | PS {ADC → PS/PU *AB | | | | ▩ | | | | |
| | PU {DR → PU *DB | | | | | | | | |
| MISC. ACTIONS | | ISR → ICR | | EA ADD | PSDO, MODE ICA.B15 → PSAB | ISDO | IF (RFP = 1) ‡ | O → RPF X → XSR | LK ADC CARRY |
| MR Ø LOAD | | ISR | ▨ | GR(X) | ▨ | DR | ▨ | AOR | ▨ |
| MR 1 LOAD | | ▨ | GR(Y) | ▨ | ADC | ▨ | PUR | ▨ | PSR |

FIG. 98

RPST PZ, YH, X

| ISR BIT | Ø | 1 | 2 | 3 | 4 | 5 | 6 | 7 | 8 | 9 | 10 | 11 | 12 | 13 | 14 | 15 | 16 … 30 31 |
|---|---|---|---|---|---|---|---|---|---|---|---|---|---|---|---|---|---|
| BINARY CODE | | | 1 | 0 | 1 | 0 | 0 | 0 | X | X | X | Y | Y | Y | H | P | Z |

DESCRIPTION: ( 1 ) CYCLE INSTRUCTION

PS AT P ∧ (Z + GRY. H) ⟶ GRX

COMMENTS:

MEMORY CONTROL

| R (sm) | W (cm) | MODE (nm) |
|---|---|---|
| 1 | 0 | 100 |

CYCLE: 1

| | | T0 | T1 | T2 | T3 | T4 | T5 | T6 | T7 |
|---|---|---|---|---|---|---|---|---|---|
| TIMING INTERVAL | PLACE | TØPL | T1PL | T2PL | T3PL | T4PL | T5PL | T6PL | T7PL |
| | ACCEPT | TØAL | T1AL | T2AL | T3AL | T4AL | T5AL | T6AL | T7AL |
| PLACE CONTROL | | ISR | GR(Y) | GR (X) | ADC | DR | PUR | AOR | PSR |
| BUSS TRANSFER CONTROL | H = 1 | | XBTL | | | | | | |
| | H = Ø | | BTL | | | | | | |
| | G = 1 | | | | | | | | |
| | G = Ø | | | | | | | | |
| | | BTL | | BTL | BTL | | | | BTL |
| REGISTER ACCEPT CONTROL | LT. HALF BIT (Ø–15) | SR | AR | DR | | | ‡ GR(XSR) | | AR / GRX |
| | RT. HALF BIT (16–31) | AR, DR | | DR | | | ‡ GR(XSR) | | |
| AR BIT SELECT | | | | | | | | | |
| LOGIC COMPARE CONTROL | | | | | | | | | |
| TRANSFER TRUE AR( )DR | | | | | | | | | |
| INSTRUCTION ADDRESS COUNTER | AOC → AOR | | | | | | | | |
| | AOR → IAR | | | | | | | | |
| COMPLEX (✱) COMMUNICATION — IS | IAR → IS ✱AB | | | | | | | | |
| PS | DR → IP ✱DB | | | | | | | | |
| | ADC → PS/PU ✱AB | | | | | | | | |
| PU | DR → PU ✱DB | | | | | | | | |
| MISC. ACTIONS | | ISR → ICR | | EA ADD | PSDO, MODE ICA.B15 → PSAB. B15 | ISDO | IF (RFP=1) ‡ | 0 → RPF X → XSR | LK ADC CARRY |
| MR Ø LOAD | | ISR | | GR(X) | | DR | | AOR | |
| MR 1 LOAD | | | GR(Y) | | ADC | | PUR | | PSR |

FIG. 99

RPU Z,YH,X

| ISR BIT | Ø | 1 | 2 | 3 | 4 | 5 | 6 | 7 | 8 | 9 | 10 | 11 | 12 | 13 | 14 | 15 | 16 … 30 31 |
|---|---|---|---|---|---|---|---|---|---|---|---|---|---|---|---|---|---|
| BINARY CODE | | | 1 | 1 | 0 | 0 | 0 | 1 | X | X | X | Y | Y | Y | H | 0 | Z |

DESCRIPTION: (1) CYCLE INSTRUCTION
PU AT (Z+GRY.H) ⟶ GRX

PU CONTROL

| R | W | sm | cm | nm |
|---|---|---|---|---|
| 1 | 0 | 0 | 0 | 1 |
| | | MODE | | |

COMMENTS:
DATA RETURNS IN NEXT CYCLE LOADED UNDER CONTROL OF XSR AND RPF.
ADDRESS ECHO COMPARISON IN TØL OF NEXT INSTRUCTION.
CYCLE: 1

| TIMING INTERVAL | | TØPL | T1PL | T2PL | T3PL | T4PL | T5PL | T6PL | T7PL |
|---|---|---|---|---|---|---|---|---|---|
| | ACCEPT | TØAL | T1AL | T2AL | T3AL | T4AL | T5AL | T6AL | T7AL |
| PLACE CONTROL | | ISR | GR(Y) | GR(X) | ADC | DR | ADC | AOR | PUR |
| BUSS TRANSFER CONTROL | H = 1 | | XBTL | | | | | | |
| | H = Ø | | BTL | | | | | | |
| | G = 1 | | | | | | | | |
| | G = Ø | | | | | | | | |
| | | BTL | | BTL | BTL | | XBTL | | |
| REGISTER ACCEPT CONTROL | LT. HALF BIT (Ø–15) | SR | AR | DR | | | DR | | AR |
| | RT. HALF BIT (16–31) | AR,DR | | DA | | | | | |
| AR BIT SELECT | | | | | | | | | |
| LOGIC COMPARE CONTROL | | | | | | | | | |
| TRANSFER TRUE AR( )DR | | | | | | | | | |
| INSTRUCTION ADDRESS COUNTER | AOC → AOR | | | | | | | | |
| | AOR → IAR | | | | | | | | |
| COMPLEX (*) COMMUNICATION | IS {IAR → IS *AB | | | | | | | | |
| | PS {DR → IP *DB | | | | | | | | |
| | PS {ADC → PS/PU *AB | | | | | | | | |
| | PU {DR → PU *DB | | | | | | | | |
| MISC. ACTIONS | | ISR→ICR | | EA ADD | PUDO, MODE | ISDO | IF (RFP=1) ‡ | 0→RPF X→XSR | LK ADC CARRY SET RPF |
| MR Ø LOAD | | ISR | | GR(X) | | DR | | AOR | |
| MR 1 LOAD | | | GR(Y) | | ADC | | ADC | | PUR |

FIG. 100

RPUA Z, YH, X

| ISR BIT | Ø | 1 | 2 | 3 | 4 | 5 | 6 | 7 | 8 | 9 | 10 | 11 | 12 | 13 | 14 | 15 | 16–31 |
|---|---|---|---|---|---|---|---|---|---|---|---|---|---|---|---|---|---|
| BINARY CODE | ▨ | ▨ | 1 | 1 | 0 | 1 | 0 | 0 | X | X | X | Y | Y | Y | H | P | ▨ (Z) |

DESCRIPTION: (1) CYCLE INSTRUCTION

PU AT (Z + GRY. H) ⟶ GRX

COMMENTS:
DATA RETURNED TO GRX IN NEXT CYCLE
ADDRESS ECHO COMPARISON IN TØL OF NEXT CYCLE.

CYCLE: 1

PU CONTROL: R = 0, W = 1, MODE (sm cm nm) = 1 0 0

| | | TØPL | T1PL | T2PL | T3PL | T4PL | T5PL | T6PL | T7PL |
|---|---|---|---|---|---|---|---|---|---|
| TIMING INTERVAL | PLACE | TØPL | T1PL | T2PL | T3PL | T4PL | T5PL | T6PL | T7PL |
| | ACCEPT | TØAL | T1AL | T2AL | T3AL | T4AL | T5AL | T6AL | T7AL |
| PLACE CONTROL | | ISR | GR(Y) | GR(X) | ADC | DR | ADC | AOR | PUR |
| BUSS TRANSFER CONTROL | H = 1 | | X BTL | | | | | | |
| | H = Ø | | BTL | | | | | | |
| | G = 1 | | | | | | | | |
| | G = Ø | | | | | | | | |
| | | BTL | | BTL | BTL | | X BTL | | |
| REGISTER ACCEPT CONTROL | LT. HALF BIT (Ø–15) | SR | AR | DR | | | DR | | AR GRX |
| | RT. HALF BIT (16–31) | AR, DR | | DR | | | | | GRX |
| AR BIT SELECT | | | | | | | | | |
| LOGIC COMPARE CONTROL | | | | | | | | | |
| TRANSFER TRUE AR( )DR | | | | | | | | | |
| INSTRUCTION ADDRESS COUNTER | AOC → AOR | | | ▨ | | | | | |
| | AOR → IAR | | | | ▨ | | | | |
| COMPLEX (*) COMMUNICATION | IS: IAR → IS *AB | | | | | ▨ | | | |
| | PS: DR → IP *DB | | | | | | | | |
| | PS: ADC → PS/PU *AB | | | | ▨ | | | | |
| | PU: DR → PU *DB | | | | | ▨ | | | |
| MISC. ACTIONS | | ISR → ICR | | EA ADD | PUDO MODE | ISDO | | O → RPF X → XSR | LK ADC CARRY |
| MR Ø LOAD | | ISR | ▨ | GR (X) | ▨ | DP | ▨ | AOR | ▨ |
| MR 1 LOAD | | ▨ | GR(Y) | ▨ | ADC | ▨ | ADC | ▨ | PUR |

FIG. 101

RPUN Z, YH, X

| ISR BIT | Ø | 1 | 2 | 3 | 4 | 5 | 6 | 7 | 8 | 9 | 10 | 11 | 12 | 13 | 14 | 15 | 16 … 30 31 |
|---|---|---|---|---|---|---|---|---|---|---|---|---|---|---|---|---|---|
| BINARY CODE | | | 1 | 1 | 0 | 0 | 1 | 0 | X | X | X | Y | Y | Y | H | 0 | Z |

DESCRIPTION: (1) CYCLE INSTRUCTION
PU AT NON MEMORY LOCATION (Z+ GRY.H)→GRX

COMMENTS:
DATA RETURNED TO GRX IN NEXT CYCLE UNDER CONTROL OF XSR + RPF.
ADDRESS ECHO COMPARED IN TØL OF NEXT INSTRUCTION

PU CONTROL: R 1, W 0; MODE sm 0, cm 1, nm 0

CYCLE: 1

| | | TØPL | T1PL | T2PL | T3PL | T4PL | T5PL | T6PL | T7PL |
|---|---|---|---|---|---|---|---|---|---|
| TIMING INTERVAL | PLACE | TØPL | T1PL | T2PL | T3PL | T4PL | T5PL | T6PL | T7PL |
| | ACCEPT | TØAL | T1AL | T2AL | T3AL | T4AL | T5AL | T6AL | T7AL |
| PLACE CONTROL | | ISR | GR(Y) | GR (X) | ADC | DR | ADC | AOR | PUR |
| BUSS TRANSFER CONTROL | H = 1 | | XBTL | | | | | | |
| | H = Ø | | BTL | | | | | | |
| | G = 1 | | | | | | | | |
| | G = Ø | | | | | | | | |
| | | BTL | | BTL | BTL | | XBTL | | |
| REGISTER ACCEPT CONTROL | LT. HALF BIT (Ø-15) | SR | AR | DR | | | DR | | AR |
| | RT. HALF BIT (16-31) | AR, DR | | DR | | | | | |
| AR BIT SELECT | | | | | | | | | |
| LOGIC COMPARE CONTROL | | | | | | | | | |
| TRANSFER TRUE AR( )DR | | | | | | | | | |
| INSTRUCTION ADDRESS COUNTER | AOC→AOR | | | | | | | | |
| | AOR→IAR | | | | | | | | |
| COMPLEX (*) COMMUNICATION | IS {IAR→IS *AB | | | | | | | | |
| | PS {DR→IP *DB | | | | | | | | |
| | PS {ADC→PS/PU *AB | | | | | | | | |
| | PU {DR→PU *DB | | | | | | | | |
| MISC. ACTIONS | | ISR→ICR | | EA ADD | PUDO | ISDO | | 0→RPF X→XSR | LK ADC CARRY SET: RPF |
| MR Ø LOAD | | ISR | | GR (X) | | DR | | AOR | |
| MR 1 LOAD | | | GR(Y) | | ADC | | ADC | | PUR |

FIG. 102

RPUT Z, YH, X

| ISR BIT | 0 | 1 | 2 | 3 | 4 | 5 | 6 | 7 | 8 | 9 | 10 | 11 | 12 | 13 | 14 | 15 | 16–31 |
|---|---|---|---|---|---|---|---|---|---|---|---|---|---|---|---|---|---|
| BINARY CODE | | | 1 | 1 | 0 | 0 | 0 | 0 | X | X | X | Y | Y | Y | H | 0 | Z |

DESCRIPTION: (1) CYCLE INSTRUCTION
PU AT NON MEMORY LOCATION (Z + GRY.H) ⟶ GRX

COMMENTS: DATA RETURNED TO GRX IN NEXT CYCLE UNDER CONTROL OF XSR AND RPF.
ADDRESS ECHO COMPARISON IN TØL NEXT CYCLE

CYCLE: 1

PU CONTROL

| R | W | MODE sm | MODE cm | MODE nm |
|---|---|---|---|---|
| 1 | 0 | 1 | 0 | 0 |

| | | | | | | | | | |
|---|---|---|---|---|---|---|---|---|---|
| TIMING INTERVAL | PLACE | TØPL | T1PL | T2PL | T3PL | T4PL | T5PL | T6PL | T7PL |
| | ACCEPT | TØAL | T1AL | T2AL | T3AL | T4AL | T5AL | T6AL | T7AL |
| PLACE CONTROL | | ISR | GR(Y) | GR(X) | ADC | DR | ADC | AOR | PUR |
| BUSS TRANSFER CONTROL | H = 1 | | XBTL | | | | | | |
| | H = Ø | | BTL | | | | | | |
| | G = 1 | | | | | | | | |
| | G = Ø | | | | | | | | |
| | | BTL | | BTL | BTL | | XBTL | | |
| REGISTER ACCEPT CONTROL | LT. HALF BIT (Ø–15) | SR | AR | DR | | | DR | | AR |
| | RT. HALF BIT (16–31) | AR, DR | | DR | | | | | |
| AR BIT SELECT | | | | | | | | | |
| LOGIC COMPARE CONTROL | | | | | | | | | |
| TRANSFER TRUE AR( )DR | | | | | | | | | |
| INSTRUCTION ADDRESS COUNTER | AOC → AOR | | | | | | | | |
| | AOR → IAR | | | | | | | | |
| COMPLEX (*) COMMUNICATION | IS: IAR → IS *AB | | | | | | | | |
| | PS: DR → IP *DB | | | | | | | | |
| | PS: ADC → PS/PU *AB | | | | | | | | |
| | PU: DR → PU *DB | | | | | | | | |
| MISC. ACTIONS | | ISR → ICR | | EA ADD | PUDO, MODE' | ISDO | | O → RPF X → XSR | LK ADC CARRY SET RPF |
| MR Ø LOAD | | ISR | | GR(X) | | DR | | AOR | |
| MR 1 LOAD | | | GR(Y) | | ADC | | ADC | | PUR |

FIG. 103

SBC Z, YH, X

| ISR BIT | Ø | 1 | 2 | 3 | 4 | 5 | 6 | 7 | 8 | 9 | 10 | 11 | 12 | 13 | 14 | 15 | 16–31 |
|---|---|---|---|---|---|---|---|---|---|---|---|---|---|---|---|---|---|
| BINARY CODE | | | 0 | 0 | 1 | 1 | 0 | 1 | X | X | X | Y | Y | Y | H | 0 | Z |

DESCRIPTION: (1) CYCLE INSTRUCTION

GRX. B ⟶ GRX.B    B = (Z + GRY.H) MOD 32

COMMENTS:
GRX = Ø SPECIFIES THE SPR
AC = LCCAC LOGIC CIRCUIT "AND" CONTROL
NC = LCCNC LOGIC CIRCUIT "NOR" CONTROL

CYCLE: 1

| | | T0 | T1 | T2 | T3 | T4 | T5 | T6 | T7 |
|---|---|---|---|---|---|---|---|---|---|
| TIMING INTERVAL | PLACE | TØPL | T1PL | T2PL | T3PL | T4PL | T5PL | T6PL | T7PL |
| | ACCEPT | TØAL | T1AL | T2AL | T3AL | T4AL | T5AL | T6AL | T7AL |
| PLACE CONTROL | | ISR | GR(Y) | GR(X) | ADC | DR | PUR | AOR | LCC |
| BUSS TRANSFER CONTROL | H = 1 | | XBTL | | | NO | | | |
| | H = Ø | | BTL | | | XF R | | | |
| | G = 1 | | | | | ALLOWED | | | |
| | G = Ø | | | | | | | | |
| | | BTL | | BTL | XBTL | | | | BTL |
| REGISTER ACCEPT CONTROL | LT. HALF BIT (Ø–15) | SR | AR | DR | SR | AR | ‡ GR(XSR) | | GR(X) |
| | RT. HALF BIT (16–31) | AR, DR | | DR | | AR | ‡ GR(XSR) | | GR(X) |
| AR BIT SELECT | | | | | | | | | |
| LOGIC COMPARE CONTROL | | | | | | | | | AC, NC |
| TRANSFER TRUE AR( )DR | | | | | | | | | |
| INSTRUCTION ADDRESS COUNTER | AOC ⟶ AOR | | | | | | | | |
| | AOR ⟶ IAR | | | | | | | | |
| COMPLEX (*) COMMUNICATION | IS {IAR ⟶ IS *AB | | | | | | | | |
| | PS {DR ⟶ IP *DB | | | | | | | | |
| | PS {ADC ⟶ PS/PU *AB | | | | | | | | |
| | PU {DR ⟶ PU *DB | | | | | | | | |
| MISC. ACTIONS | | ISR⟶ICR | | EA ADD | | ISDO 1'S⟶AR 0⟶AR SEL BIT | IF (RFP=1) ‡ | 0⟶RPF X⟶XSR | LK ADC CARRY |
| MR Ø LOAD | | ISR | | GR(X) | | DR | | AOR | |
| MR 1 LOAD | | | GR(Y) | | ADC | | PUR | | LCC |

FIG. 104

SBN Z,YH,X

| ISR BIT | Ø | 1 | 2 | 3 | 4 | 5 | 6 | 7 | 8 | 9 | 10 | 11 | 12 | 13 | 14 | 15 | 16 … 30 31 |
|---|---|---|---|---|---|---|---|---|---|---|---|---|---|---|---|---|---|
| BINARY CODE | | | 0 | 0 | 0 | 1 | 0 | 0 | X | X | X | Y | Y | Y | H | 0 | Z |

DESCRIPTION: (1) CYCLE INSTRUCTION

1 ⟶ GRX.B  B = (Z + GRY. H) MOD 32

COMMENTS:

GRX = Ø SPECIFIES SPR

CYCLE:

| | | TØPL | T1PL | T2PL | T3PL | T4PL | T5PL | T6PL | T7PL |
|---|---|---|---|---|---|---|---|---|---|
| TIMING INTERVAL | PLACE | TØPL | T1PL | T2PL | T3PL | T4PL | T5PL | T6PL | T7PL |
| | ACCEPT | TØAL | T1AL | T2AL | T3AL | T4AL | T5AL | T6AL | T7AL |
| PLACE CONTROL | | ISR | GR(Y) | GR(X) | ADC | DA | PUR | AOR | AR |
| BUSS TRANSFER CONTROL | H = 1 | | XBTL | | | | | | |
| | H = Ø | | BTL | | | | | | |
| | G = 1 | | | | | | | | |
| | G = Ø | | | | | | | | |
| | | BTL | | BTL | XBTL | CBTL | | | CBTL |
| REGISTER ACCEPT CONTROL | LT. HALF BIT (Ø–15) | SR | AR | DR | SR | AR | ‡ GR(XSR) | | GR(X) |
| | RT. HALF BIT (16–31) | AR, DR | | DR | | AR | ‡ GR(XSR) | | GR(X) |
| AR BIT SELECT | | | | | | | | | |
| LOGIC COMPARE CONTROL | | | | | | | | | |
| TRANSFER TRUE AR( )DR | | | | | | | | | |
| INSTRUCTION ADDRESS COUNTER | AOC → AOR | | | | | | | | |
| | AOR → IAR | | | | | | | | |
| COMPLEX (*) COMMUNICATION | IS {IAR → IS *AB | | | | | | | | |
| | PS {DR → IP *DB | | | | | | | | |
| | PS {ADC → PS/PU *AB | | | | | | | | |
| | PU {DR → PU *DB | | | | | | | | |
| MISC. ACTIONS | | ISR → ICR | | EA ADD | | ISDO | IF (RFP = 1) ‡ | O → RPF X → XSR | LK ADC CARRY |
| MR Ø LOAD | | ISR | | GR(X) | | DR | | AOR | |
| MR 1 LOAD | | | GR(Y) | | ADC | | PUR | | AR |

FIG. 105

SBZ Z, YH, X

| ISR BIT | ∅ | 1 | 2 | 3 | 4 | 5 | 6 | 7 | 8 | 9 | 10 | 11 | 12 | 13 | 14 | 15 | 16–31 |
|---|---|---|---|---|---|---|---|---|---|---|---|---|---|---|---|---|---|
| BINARY CODE | (hatched) | (hatched) | 0 | 0 | 1 | 1 | 0 | 0 | X | X | X | Y | Y | Y | H | 0 | (hatched) Z |

DESCRIPTION: (1) CYCLE INSTRUCTION

∅ ⟶ GRX.B  B = (Z + GRY.H) MOD 32

COMMENTS:

GRX = ∅ SELECTS SPR

CYCLE: 1

| | | T0 | T1 | T2 | T3 | T4 | T5 | T6 | T7 |
|---|---|---|---|---|---|---|---|---|---|
| TIMING INTERVAL | PLACE | T∅PL (hatched) | T1PL | T2PL | T3PL | T4PL | T5PL | T6PL | T7PL |
| | ACCEPT | T∅AL (hatched) | T1AL | T2AL | T3AL | T4AL | T5AL | T6AL | T7AL |
| PLACE CONTROL | | ISR | GR(Y) | GR(X) | ADC | DR | PUR | AOR | AR |
| BUSS TRANSFER CONTROL | H = 1 | | XBTL | | | | | | |
| | H = ∅ | | BTL | | | | | | |
| | G = 1 | | | | | | | | |
| | G = ∅ | | | | | | | | |
| | | BTL | | BTL | XBTL | BTL | | | BTL |
| REGISTER ACCEPT CONTROL | LT. HALF BIT (∅–15) | SR | AR | DR | SA | AR | ‡ GR(XSR) | | GRX |
| | RT. HALF BIT (16–31) | AR, DR | | DR | | AR | ‡ GR(XSR) | | GRX |
| AR BIT SELECT | | | | | | (crosshatched) | | | |
| LOGIC COMPARE CONTROL | | | | | | | | | |
| TRANSFER TRUE AR( )DR | | | | | | | | | |
| INSTRUCTION ADDRESS COUNTER | AOC → AOR | | | (crosshatched) | | | | | |
| | AOR → IAR | | | | (crosshatched) | | | | |
| COMPLEX (*) COMMUNICATION | IS [IAR → IS *AB | | | | | (crosshatched) | | | |
| | PS [DR → IP *DB | | | | | | | | |
| | PS [ADC → PS/PU *AB | | | | | | | | |
| | PU [DR → PU *DB | | | | | | | | |
| MISC. ACTIONS | | ISR → ICR | | EA ADD | | ISDO | IF (RFP=1) ‡ | O → RPF X → XSR | LK ADC CARRY |
| MR ∅ LOAD | | ISR | (hatched) | GR(X) | (hatched) | DR | (hatched) | AOR | (hatched) |
| MR 1 LOAD | | (hatched) | GR(Y) | (hatched) | ADC | (hatched) | PUR | (hatched) | AR |

FIG. 106

SHR Z, YG, XG

| ISR BIT | Ø | 1 | 2 | 3 | 4 | 5 | 6 | 7 | 8 | 9 | 10 | 11 | 12 | 13 | 14 | 15 | 16 … 30 31 |
|---|---|---|---|---|---|---|---|---|---|---|---|---|---|---|---|---|---|
| BINARY CODE | | | 0 | 0 | 1 | 0 | 1 | 0 | X | X | X | Y | Y | Y | 1 | G | Z |

DESCRIPTION: (1) CYCLE INSTRUCTION
GR(Y) → AR
AR.Bi → AR.B(i+1) } n TIMES
Ø → AR.B[15 & 31] }
AR → GRX.G n = Z MOD 4
= 1 = 1 SHIFT
= 2 = 2 SHIFTS
= 3 = 3 SHIFTS
= Ø = 4 SHIFTS

COMMENTS:
HALF GR THAT WILL BE SHIFTED IS SPECIFIED BY G FIELD
LEFT AND RIGHT BUS ARE SEPARATED WITH NO SHIFT ACRESS
* SC = SHIFT CONTROL = RSL (RIGHT SHIFT LEVEL); SEE MISC. ACTIONS
CYCLE: 1

| | | | | | | | | | |
|---|---|---|---|---|---|---|---|---|---|
| TIMING INTERVAL | PLACE | TØPL | T1PL | T2PL | T3PL | T4PL | T5PL | T6PL | T7PL |
| | ACCEPT | TØAL | T1AL | T2AL | T3AL | T4AL | T5AL | T6AL | T7AL |
| PLACE CONTROL | | ISR | GR(Y) | GR(X) | AR | DR | PUR | AOR | AR |
| BUSS TRANSFER CONTROL | H = 1 | | | | | | | | |
| | H = Ø | | | | | | | | |
| | G = 1 | | | | | | | | |
| | G = Ø | | | | | | | | |
| | | BTL | SC * | BTL | BTL/SC | BTL/SC | | | BTL/SC |
| REGISTER ACCEPT CONTROL | LT. HALF BIT (Ø-15) | SR | AR | | DR | AR | ‡ GR(XSR) | | GRX.$\bar{G}$ |
| | RT. HALF BIT (16-31) | AR, DR | AR | | DR | AR | ‡ GR(XSR) | | GRX.G |
| AR BIT SELECT | | | | | | | | | |
| LOGIC COMPARE CONTROL | | | | | | | | | |
| TRANSFER TRUE AR( )DR | | | | | | | | | |
| INSTRUCTION ADDRESS COUNTER | AOC → AOR | | | | | | | | |
| | AOR → IAR | | | | | | | | |
| COMPLEX (*) COMMUNICATION | IS {IAR → IS *AB | | | | | | | | |
| | PS {DR → IP *DB | | | | | | | | |
| | PS {ADC → PS/PU *AB | | | | | | | | |
| | PU {DR → PU *DB | | | | | | | | |
| MISC. ACTIONS | | ISR → ICR | SC: n = 1, 2, 3, Ø | EA ADD | BTL: n = 1; SC: n = 2, 3, Ø | ISDO; BTL: n = 1, 2; n = 3, Ø | IF (RFP = 1) ‡ | O → RPF; X → XSR | LK ADC CARRY; BTL: n = 1, 2, 3; SC: n = Ø |
| MR Ø LOAD | | ISR | | GR(X) | | DR | | AOR | |
| MR 1 LOAD | | | GR(Y) | | AR | | PUR | | AR |

FIG. 107

SHL Z, YG, XG

| ISR BIT | Ø | 1 | 2 | 3 | 4 | 5 | 6 | 7 | 8 | 9 | 10 | 11 | 12 | 13 | 14 | 15 | 16 … 29 | 30 | 31 |
|---|---|---|---|---|---|---|---|---|---|---|---|---|---|---|---|---|---|---|---|
| BINARY CODE | (hatched) | (hatched) | 0 | 0 | 1 | 0 | 1 | 0 | X | X | X | Y | Y | Y | 1 | G | (hatched) Z | n | n |

DESCRIPTION: (1) CYCLE INSTRUCTION

GR(Y)→AR

AR. Bi→AR.B(i-1) } n TIMES
Ø → AR. B [15 & 31] }

AR→GRX.G n = Z MOD 4
= 1 = 1 SHIFT
= 2 = 2 SHIFT
= 3 = 3 SHIFT
= Ø = 4 SHIFT

COMMENTS:
HALF GR THAT WILL BE SHIFTED IS SPECIFIED BY THE G FIELD
LEFT AND RIGHT BUS ARE SEPARATED WITH NO SHIFT ACROSS
* SC = LSL (LEFT SHIFT LEVEL); SEE MISC. ACTIONS
CYCLE: 1

| TIMING INTERVAL | | T0 | T1 | T2 | T3 | T4 | T5 | T6 | T7 |
|---|---|---|---|---|---|---|---|---|---|
| | PLACE | TØPL (hatched) | T1PL | T2PL | T3PL | T4PL | T5PL | T6PL | T7PL |
| | ACCEPT | TØAL (hatched) | T1AL | T2AL | T3AL | T4AL | T5AL | T6AL | T7AL |
| PLACE CONTROL | | ISR | GR Y | GR X | AR | DR | PUR | AOR | AR |
| BUSS TRANSFER CONTROL | H = 1 | | | | | | | | |
| | H = Ø | | | | | | | | |
| | G = 1 | | | | | | | | |
| | G = Ø | | | | | | | | |
| | | BTL | SC * | BTL | BTl/SC | BTL/SC | | | BTL/SC |
| REGISTER ACCEPT CONTROL | LT. HALF BIT (Ø-15) | SR | AR | | DR | AR | ‡ GR(XSR) | | GRX.$\overline{G}$ |
| | RT. HALF BIT (16-31) | AR, DR | AR | | DR | AR | ‡ GR(XSR) | | GRX.G |
| AR BIT SELECT | | | | | | | | | |
| LOGIC COMPARE CONTROL | | | | | | | | | |
| TRANSFER TRUE AR( )DR | | | | | | | | | |
| INSTRUCTION ADDRESS COUNTER | AOC→AOR | | | (cross-hatched) | | | | | |
| | AOR→IAR | | | | (cross-hatched) | | | | |
| COMPLEX (*) COMMUNICATION | IS {IAR→IS *AB | | | | | (cross-hatched) | | | |
| | PS {DR→IP *DB | | | | | | | | |
| | PS {ADC→PS/PU *AB | | | | | | | | |
| | PU {DR→PU *DB | | | | | | | | |
| MISC. ACTIONS | | ISR→ICR | SC; n: 1, 2, 3, Ø | EA ADD | BTL / SC; n: 1, 2, 3, Ø | ISDO; BTL / SC; n: 1, 2, 3, Ø | IF (RFP=1) ‡ | O→RPF X→XSR | LK ADC CARRY; BTL / SC; n: 1, 2, 3, Ø |
| MR Ø LOAD | | ISR | (hatched) | GR(X) | (hatched) | DR | (hatched) | AOR | (hatched) |
| MR 1 LOAD | | (hatched) | GR(Y) | (hatched) | AR | (hatched) | PUR | (hatched) | AR |

FIG. 108

SUB Z, YH, XG

| ISR BIT | Ø | 1 | 2 | 3 | 4 | 5 | 6 | 7 | 8 | 9 | 10 | 11 | 12 | 13 | 14 | 15 | 16–31 |
|---|---|---|---|---|---|---|---|---|---|---|---|---|---|---|---|---|---|
| BINARY CODE | | | 0 | 0 | 1 | 0 | 0 | 1 | X | X | X | Y | Y | Y | H | G | Z |

DESCRIPTION: (1) CYCLE INSTRUCTION

GRX. G —(Z+ GRY. H) ——→ GRX.G

COMMENTS:

A — B = 1's COMPLIMENT (1's COMPLIMENT A + B)

CYCLE: 1

| TIMING INTERVAL | | T0PL | T1PL | T2PL | T3PL | T4PL | T5PL | T6PL | T7PL |
|---|---|---|---|---|---|---|---|---|---|
| | ACCEPT | T0AL | T1AL | T2AL | T3AL | T4AL | T5AL | T6AL | T7AL |
| PLACE CONTROL | | ISR | GR(Y) | GR (X) | ADC | DR | PUR | AOR | ADC |
| BUSS TRANSFER CONTROL | H = 1 | | XBTL | | | | | | |
| | H = Ø | | BTL | | | | | | |
| | G = 1 | | | XCBTL | | | | | CBTL |
| | G = Ø | | | CBTL | | | | | XCBTL |
| | | BTL | | | BTL | XBTL | | | |
| REGISTER ACCEPT CONTROL | LT. HALF BIT (Ø–15) | SR | AR | DR | | AR | ‡ GR(XSR) | | GRX. $\bar{G}$ |
| | RT. HALF BIT (16–31) | AR, DR | | DR | DR | AR | ‡ GR(XSR) | | GRX.G |
| AR BIT SELECT | | | | | | | | | |
| LOGIC COMPARE CONTROL | | | | | | | | | |
| TRANSFER TRUE AR( )DR | | | | | | | | | |
| INSTRUCTION ADDRESS COUNTER | AOC → AOR | | | | | | | | |
| | AOR → IAR | | | | | | | | |
| COMPLEX (*) COMMUNICATION | IS {IAR → IS *AB | | | | | | | | |
| | PS {DR → IP *DB | | | | | | | | |
| | PS {ADC → PS/PU *AB | | | | | | | | |
| | PU {DR → PU *DB | | | | | | | | |
| MISC. ACTIONS | | ISR → ICR | | EA ADD | | ISDO | IF (RFP = 1) ‡ | O → RPF X → XSR | LK ADC CARRY |
| MR Ø LOAD | | ISR | | GR (X) | | DR | | AOR | |
| MR 1 LOAD | | | GR(Y) | | ADC | | PUR | | ADC |

FIG. 109

TBN Z,N,X

| ISR BIT | Ø | 1 | 2 | 3 | 4 | 5 | 6 | 7 | 8 | 9 | 10 | 11 | 12 | 13 | 14 | 15 | 16 … 30 31 |
|---|---|---|---|---|---|---|---|---|---|---|---|---|---|---|---|---|---|
| BINARY CODE | | | 0 | 1 | 1 | 1 | 1 | 0 | X | X | X | N | N | N | N | N | Z |

DESCRIPTION: ( I ) CYCLE INSTRUCTION

IF GRX.N = 1 : Z ⟶ IAR.R : ELSE IAR.R + 1 ⟶ IAR.R

COMMENTS:
* CONDITIONAL ACCEPT IF XFR TRUE IS SATISFIED ELSE AOR→IAR.R
GRX = Ø SPECIFIES SPR.
AC = LCCAC LOGIC CIRCUIT "AND" CONTROL
NC = LCCNC LOGIC CIRCUIT "NOR" CONTROL

CYCLE: I

| | | | | | | | | | |
|---|---|---|---|---|---|---|---|---|---|
| TIMING INTERVAL | PLACE | TØPL | T1PL | T2PL | T3PL | T4PL | T5PL | T6PL | T7PL |
| | ACCEPT | TØAL | T1AL | T2AL | T3AL | T4AL | T5AL | T6AL | T7AL |
| PLACE CONTROL | | ISR | GR(Y) | GR(X) | ISA | DR | PUR | AOR | |
| BUSS TRANSFER CONTROL | H = 1 | | | | | | | | |
| | H = Ø | | | | | | | | |
| | G = 1 | | | | | | | | |
| | G = Ø | | | | | | | | |
| | | BTL | | BTL | BTL | | | | |
| REGISTER ACCEPT CONTROL | LT. HALF BIT (Ø–15) | SR | AR | AR,DR | | | ‡ GR(XSR) | | |
| | RT. HALF BIT (16–31) | AR,DR | | AR,DR | IAA * | | ‡ GR(XSR) | | |
| AR BIT SELECT | | | | | | | | | |
| LOGIC COMPARE CONTROL | | | | NC, AC ⟶ | ⟶ | | | | |
| TRANSFER TRUE AR( )DR | | | | | | | | | |
| INSTRUCTION ADDRESS COUNTER | AOC→AOR | | | | | | | | |
| | AOR→IAR | | | | * | | | | |
| COMPLEX (*) COMMUNICATION | IS {IAR→IS *AB | | | | | | | | |
| | PS {DR→IP *DB | | | | | | | | |
| | PS {ADC→PS/PU *AB | | | | | | | | |
| | PU {DR→PU *DB | | | | | | | | |
| MISC. ACTIONS | | ISR→ICR | | EA ADD | | ISDO | IF (RFP=1) ‡ | O→RPF X→XSR | LK ADC CARRY |
| MR Ø LOAD | | ISR | | GR(X) | | DR | | AOR | |
| MR 1 LOAD | | | GR(Y) | | ISR | | PUR | | IS |

FIG. 110

TBZ Z, N, X

| ISR BIT | 0 | 1 | 2 | 3 | 4 | 5 | 6 | 7 | 8 | 9 | 10 | 11 | 12 | 13 | 14 | 15 | 16–31 |
|---|---|---|---|---|---|---|---|---|---|---|---|---|---|---|---|---|---|
| BINARY CODE | | | 0 | 1 | 0 | 1 | 1 | 0 | X | X | X | N | N | N | N | N | Z |

DESCRIPTION: ( I ) CYCLE INSTRUCTION

IF GRX.N = 0 Z → IAR.R ELSE IAR.R+1 → IAR.R

COMMENTS:

* CONDITIONAL ACCEPT IF XFR TRUE IS SATISFIED: ELSE AOR → IAR.R

GRX = 0 SPECIFIES THE SPR

AC = LCCAC LOGIC CIRCUIT "AND" CONTROL

CYCLE: I NC = LCCNC LOGIC CIRCUIT "NOR" CONTROL

| | | | | | | | | | |
|---|---|---|---|---|---|---|---|---|---|
| TIMING INTERVAL | PLACE | T0PL | T1PL | T2PL | T3PL | T4PL | T5PL | T6PL | T7PL |
| | ACCEPT | T0AL | T1AL | T2AL | T3AL | T4AL | T5AL | T6AL | T7AL |
| PLACE CONTROL | | ISR | GR(Y) | GR(X) | ISA | DR | PUR | AOR | |
| BUSS TRANSFER CONTROL | H = 1 | | | | | | | | |
| | H = 0 | | | | | | | | |
| | G = 1 | | | | | | | | |
| | G = 0 | | | | | | | | |
| | | BTL | | BTL | BTL | | | | |
| REGISTER ACCEPT CONTROL | LT. HALF BIT (0–15) | SR | AR | AR, DR | | | ‡ GR(XSR) | | |
| | RT. HALF BIT (16–31) | AR, DR | | AR, DR | IAR * | | ‡ GR(XSR) | | |
| AR BIT SELECT | | | | | | | | | |
| LOGIC COMPARE CONTROL | | | | NC, AC → | → | | | | |
| TRANSFER TRUE AR( )DR | | | | | | | | | |
| INSTRUCTION ADDRESS COUNTER | AOC → AOR | | | | | | | | |
| | AOR → IAR | | | | * | | | | |
| COMPLEX (*) COMMUNICATION | IS {IAR → IS *AB | | | | | | | | |
| | PS {DR → IP *DB | | | | | | | | |
| | PS {ADC → PS/PU *AB | | | | | | | | |
| | PU {DR → PU *DB | | | | | | | | |
| MISC. ACTIONS | | ISR → ICR | | EA ADD | | ISDO | IF (RFP = 1) ‡ | 0 → RPF X → XSR | LK ADC CARRY |
| MR 0 LOAD | | ISR | | GR(X) | | DR | | AOR | |
| MR 1 LOAD | | | GR(Y) | | ISA | | PUR | | 1'S |

FIG. 111

TEH Z, YH, XG

| ISR BIT | Ø | 1 | 2 | 3 | 4 | 5 | 6 | 7 | 8 | 9 | 10 | 11 | 12 | 13 | 14 | 15 | 16 … 30 31 |
|---|---|---|---|---|---|---|---|---|---|---|---|---|---|---|---|---|---|
| BINARY CODE | | | 0 | 1 | 0 | 1 | 1 | 1 | X | X | X | Y | Y | Y | H | G | Z |

DESCRIPTION: ( I ) CYCLE INSTRUCTION
IF GRY. H = GRX.G : Z → IAR. R ELSE IAR.R + 1 → IAR. R
ADC CARRY TRUE IF GRX < GRY

COMMENTS:
* CONDITIONAL ACCEPT IF XFR TRUE IS SATISFIED ELSE AOR → IAR.R
AC = LCCAC LOGIC CIRCUIT "AND" CONTROL
NC = LCCNC LOGIC CIRCUIT "NOR" CONTROL

CYCLE: I

| | | | | | | | | | |
|---|---|---|---|---|---|---|---|---|---|
| TIMING INTERVAL | PLACE | TØPL | T1PL | T2PL | T3PL | T4PL | T5PL | T6PL | T7PL |
| | ACCEPT | TØAL | T1AL | T2AL | T3AL | T4AL | T5AL | T6AL | T7AL |
| PLACE CONTROL | | ISR | GR(Y) | GR(X) | ISR | DA | PUR | AOR | |
| BUSS TRANSFER CONTROL | H = 1 | | XBTL | | | | | | |
| | H = Ø | | BTL | | | | | | |
| | G = 1 | | | XBTL | | | | | |
| | G = Ø | | | BTL | | | | | |
| | | BTL | | | BTL | XCBTL | | | |
| REGISTER ACCEPT CONTROL | LT. HALF BIT (Ø-15) | SR | AR | DR | | | ‡ GR(XSR) | | |
| | RT. HALF BIT (16-31) | AR, DR | | | IAR * | AR | ‡ GR(XSR) | | |
| AR BIT SELECT | | | | | | | | | |
| LOGIC COMPARE CONTROL | | | | NC, AC → | → | | | | |
| TRANSFER TRUE AR( )DR | | | | | ▨ | | | | |
| INSTRUCTION ADDRESS COUNTER | AOC → AOR | | | ▨ | | | | | |
| | AOR → IAR | | | | * | | | | |
| COMPLEX (*) COMMUNICATION | IS { IAR → IS *AB | | | | | ▨ | | | |
| | PS { DR → IP *DB | | | | | | | | |
| | PS { ADC → PS/PU *AB | | | | | | | | |
| | PU { DR → PU *DB | | | | | | | | |
| MISC. ACTIONS | | ISR → ICR | | EA ADD | | ISDO | IF (RFP = 1) ‡ | O → RPF X → XSR | LK ADC CARRY |
| MR Ø LOAD | | ISR | ▨ | GR(X) | ▨ | DA | ▨ | AOR | ▨ |
| MR 1 LOAD | | ▨ | GR(Y) | ▨ | ISR | ▨ | PUR | ▨ | |

FIG. 112

TEQ Z, Y, X

| ISR BIT | 0 | 1 | 2 | 3 | 4 | 5 | 6 | 7 | 8 | 9 | 10 | 11 | 12 | 13 | 14 | 15 | 16–31 |
|---|---|---|---|---|---|---|---|---|---|---|---|---|---|---|---|---|---|
| BINARY CODE | (hatched) | (hatched) | 0 | 1 | 0 | 1 | 0 | 1 | X | X | X | Y | Y | Y | 0 | 0 | (hatched) Z |

DESCRIPTION: ( I ) CYCLE INSTRUCTION

IF GRY = GRX : Z → IAR.R ELSE IAR.R + 1 → IAR.R

COMMENTS:
* CONDITIONAL ACCEPT IF XFR TRUE IS SATISFIED
ELSE AOR → IAR.R
AC = LCCAC LOGIC CIRCUIT "AND" CONTROL
NC = LCCNC LOGIC CIRCUIT "NOR" CONTROL

CYCLE: 2

| | | T0PL | T1PL | T2PL | T3PL | T4PL | T5PL | T6PL | T7PL |
|---|---|---|---|---|---|---|---|---|---|
| TIMING INTERVAL | PLACE | T0PL | T1PL | T2PL | T3PL | T4PL | T5PL | T6PL | T7PL |
| | ACCEPT | T0AL | T1AL | T2AL | T3AL | T4AL | T5AL | T6AL | T7AL |
| PLACE CONTROL | | ISR | GR (Y) | GR (X) | ISR | DR | PUR | AOR | |
| BUSS TRANSFER CONTROL | H = 1 | | XBTL | | | | | | |
| | H = 0 | | BTL | | | | | | |
| | G = 1 | | | | | | | | |
| | G = 0 | | | | | | | | |
| | | BTL | | BTL | BTL | | | | |
| REGISTER ACCEPT CONTROL | LT. HALF BIT (0–15) | SR | AR | DR | | | ‡ GR(XSR) | | |
| | RT. HALF BIT (16–31) | AR, DR | AR | DR | IAR * | | ‡ GR(XSR) | | |
| AR BIT SELECT | | | | | | | | | |
| LOGIC COMPARE CONTROL | | | | NC, AC → | → | | | | |
| TRANSFER TRUE AR( )DR | | | | | (hatched) | | | | |
| INSTRUCTION ADDRESS COUNTER | AOC → AOR | | | (hatched) | | | | | |
| | AOR → IAR | | | | * | | | | |
| COMPLEX (*) COMMUNICATION | IS { IAR → IS *AB | | | | | (hatched) | | | |
| | PS { DR → IP *DB | | | | | | | | |
| | PS { ADC → PS/PU *AB | | | | | | | | |
| | PU { DR → PU *DB | | | | | | | | |
| MISC. ACTIONS | | ISR → ICR | SEE ISR.B 14 & 15 | EA ADD | | ISDO | IF (RFP=1) ‡ | O → RPF X → XSR | LK ADC CARRY |
| MR 0 LOAD | | ISR | (hatched) | GR (X) | (hatched) | DR | (hatched) | AOR | (hatched) |
| MR 1 LOAD | | (hatched) | GR (Y) | (hatched) | ISR | (hatched) | PUR | (hatched) | |

FIG. 113

TIX Z, YH

| ISR BIT | 0 | 1 | 2 | 3 | 4 | 5 | 6 | 7 | 8 | 9 | 10 | 11 | 12 | 13 | 14 | 15 | 16 … 30 31 |
|---|---|---|---|---|---|---|---|---|---|---|---|---|---|---|---|---|---|
| BINARY CODE | | | 0 | 1 | 1 | 0 | 1 | 1 | 0 | 0 | 0 | Y | Y | Y | H | 0 | Z |

DESCRIPTION: (I) CYCLE INSTRUCTION
IF (GRY.H ≠ 0) Z→IAR.R : ELSE IAR.R+1→IAR.R
ALWAYS GRY.H−1 → GRY.H

COMMENTS:
* CONDITIONAL ACCEPT IF XFR TRUE IS SATISFIED:
ELSE AOR → IAR.R
AC = LCCAC LOGIC CIRCUIT "AND" CONTROL
CYCLE: 1 NC = LCCNC LOGIC CIRCUIT "NOR" CONTROL

| TIMING INTERVAL | | | | | | | | |
|---|---|---|---|---|---|---|---|---|
| PLACE | T0PL | T1PL | T2PL | T3PL | T4PL | T5PL | T6PL | T7PL |
| ACCEPT | T0AL | T1AL | T2AL | T3AL | T4AL | T5AL | T6AL | T7AL |
| PLACE CONTROL | ISR | GR(Y) | GR(X) | ISA | DR | PUR | AOR | ADC |
| BUSS TRANSFER CONTROL H = 1 | | XBTL | | | | | | BTL |
| BUSS TRANSFER CONTROL H = 0 | | BTL | | | | | | X BTL |
| BUSS TRANSFER CONTROL G = 1 | | | | | | | | |
| BUSS TRANSFER CONTROL G = 0 | | | | | | | | |
| | BTL | | BTL | BTL | NO XFER ALLOWED | | | |
| REGISTER ACCEPT CONTROL LT. HALF BIT (0-15) | SR | AR | DR | | | ‡ GR(XSR) | | GRY.H̄ |
| REGISTER ACCEPT CONTROL RT. HALF BIT (16-31) | AR, DR | | | IAR * | AR | ‡ GR(XSR) | | GRY.H |
| AR BIT SELECT | | | | | | | | |
| LOGIC COMPARE CONTROL | | | NC, AC → | → | | | | |
| TRANSFER TRUE AR( )DR | | | | ▨ | | | | |
| INSTRUCTION ADDRESS COUNTER AOC→AOR | | | ▨ | | | | | |
| INSTRUCTION ADDRESS COUNTER AOR→IAR | | | | * | | | | |
| COMPLEX (*) COMMUNICATION IS: IAR→IS *AB | | | | | ▨ | | | |
| PS: DR→IP *DB | | | | | | | | |
| PS: ADC→PS/PU *AB | | | | | | | | |
| PU: DR→PU *DB | | | | | | | | |
| MISC. ACTIONS | ISR→ICR | | EA ADD | | ISDO ALL "1's"→ AR.R | IF (RFP=1) ‡ | 0→RPF X→XSR | LK ADC CARRY |
| MR 0 LOAD | ISR | ▨ | GR(X) | ▨ | DR | ▨ | AOR | ▨ |
| MR 1 LOAD | ▨ | GR(Y) | ▨ | ISR | ▨ | PUR | ▨ | ADC |

FIG. 114

TND Z,YH,X

ISR BIT: Ø 1 2 3 4 5 6 7 8 9 10 11 12 13 14 15 16 … 30 31

BINARY CODE: [hatched] [hatched] 0 1 1 1 0 0 X X X Y Y Y H 1 [hatched 16–31: Z]

DESCRIPTION: (1) CYCLE INSTRUCTION
IF (GRX.B ≠ Ø) Z → IAR.R ELSE IAR.R + 1 → IAR.R
(B = GRY.H) MOD 32
ALWAYS (GRY.H − 1) → GRY.H

COMMENTS:
* CONDITIONAL ACCEPT IF XFR TRUE IS SATISFIED: ELSE AOR — IAR.R
(1) GRX = 0 SPECIFIES SPR
AC = LCCAC LOGIC CIRCUIT "AND" CONTROL
NC = LCCNC LOGIC CIRCUIT "NOR" CONTROL

CYCLE: 1

| | | T0 | T1 | T2 | T3 | T4 | T5 | T6 | T7 |
|---|---|---|---|---|---|---|---|---|---|
| TIMING INTERVAL | PLACE | TØPL | T1PL | T2PL | T3PL | T4PL | T5PL | T6PL | T7PL |
| | ACCEPT | TØAL | T1AL | T2AL | T3AL | T4AL | T5AL | T6AL | T7AL |
| PLACE CONTROL | | ISR | GR(Y) | GR(X) | ISR | GR(Y) | PUR | AOR | ADC |
| BUSS TRANSFER CONTROL | H = 1 | | XBTL | | | INHIBIT BTL TO AR.L | | | BTL |
| | H = Ø | | BTL | | | INHIBIT BTL TO AR.R | | | XBTL |
| | G = 1 | | | | | | | | |
| | G = Ø | | | | | | | | |
| | | BTL | | BTL | BTL | BTL | | | |
| REGISTER ACCEPT CONTROL | LT. HALF BIT (Ø–15) | SR | SR, AR | AR, DA | | AR | ‡ GR(XSR) | | GRV.H̄ |
| | RT. HALF BIT (16–31) | AR, DR | | AR, DR | IAR * | AR | ‡ GR(XSR) | | GRV.H |
| AR BIT SELECT | | | | [hatched] | | | | | |
| LOGIC COMPARE CONTROL | | | | NC, AC → | → | | | | |
| TRANSFER TRUE AR( )DR | | | | | [hatched] | | | | |
| INSTRUCTION ADDRESS COUNTER | AOC → AOR | | | [hatched] | | | | | |
| | AOR → IAR | | | | * | | | | |
| COMPLEX (*) COMMUNICATION | IS { IAR → IS *AB | | | | | [hatched] | | | |
| | PS { DR → TP *DB | | | | | | | | |
| | PS { ADC → PS/PU *AB | | | | | | | | |
| | PU { DR → PU *DB | | | | | | | | |
| MISC. ACTIONS | | ISR → ICR | | EA ADD NOTE 1 | | ISDO ALL "1" → ARH | IF (RFP = 1) ‡ | O → RPF X → XSR | LK ADC CARRY |
| MR Ø LOAD | | ISR | [hatched] | GR(X) | [hatched] | GRY.H | [hatched] | AOR | [hatched] |
| MR 1 LOAD | | [hatched] | GR(Y) | [hatched] | ISR | [hatched] | PUR | [hatched] | ADC |

FIG. 115

TNX Z,YH

| ISR BIT | Ø | 1 | 2 | 3 | 4 | 5 | 6 | 7 | 8 | 9 | 10 | 11 | 12 | 13 | 14 | 15 | 16–31 |
|---|---|---|---|---|---|---|---|---|---|---|---|---|---|---|---|---|---|
| BINARY CODE | | | 0 | 1 | 0 | 0 | 1 | 1 | 0 | 0 | 0 | Y | Y | Y | H | 0 | Z |

DESCRIPTION: ( 1 ) CYCLE INSTRUCTION
IF (GRY.H = Ø) : Z ⟶ IAR.R ELSE IAR.R + 1 ⟶ IAR.R
ALWAYS GRY.H − 1 ⟶ GRY.H

COMMENTS:
* CONDITIONAL ACCEPT IF XFR TRUE CONDITION IS SATISFIED
ELSE: AOR ⟶ IAR.R

CYCLE: 1
AC = LCCAC LOGIC CIRCUIT "AND" CONTROL
NC = LCCNC LOGIC CIRCUIT "NOR" CONTROL

| TIMING INTERVAL | | T0 | T1 | T2 | T3 | T4 | T5 | T6 | T7 |
|---|---|---|---|---|---|---|---|---|---|
| | PLACE | TØPL | T1PL | T2PL | T3PL | T4PL | T5PL | T6PL | T7PL |
| | ACCEPT | TØAL | T1AL | T2AL | T3AL | T4AL | T5AL | T6AL | T7AL |
| PLACE CONTROL | | ISR | GR(Y) | GR(X) | ISR | DR | PUR | AOR | ADC |
| BUSS TRANSFER CONTROL | H = 1 | | XBTL | | | | | | BTL |
| | H = Ø | | BTL | | | | | | XBTL |
| | G = 1 | | | | | | | | |
| | G = Ø | | | | | | | | |
| | | BTL | | BTL | BTL | NO XFR ALLOWED | | | |
| REGISTER ACCEPT CONTROL | LT. HALF BIT (Ø−15) | SR | AR | DR | | | ‡ GR(XSR) | | GRY.H̄ |
| | RT. HALF BIT (16−31) | AR, DR | | | IAR * | AR | ‡ GR(XSR) | | GRY.H |
| AR BIT SELECT | | | | | | | | | |
| LOGIC COMPARE CONTROL | | | | NC, AC ⟶ | ⟶ | | | | |
| TRANSFER TRUE AR( )DR | | | | | (hatched) | | | | |
| INSTRUCTION ADDRESS COUNTER | AOC → AOR | | | (hatched) | | | | | |
| | AOR → IAR | | | | * | | | | |
| COMPLEX (*) COMMUNICATION | IS {IAR → IS *AB | | | | | (hatched) | | | |
| | PS {DR → IP *DB | | | | | | | | |
| | PS {ADC → PS/PU *AB | | | | | | | | |
| | PU {DR → PU *DB | | | | | | | | |
| MISC. ACTIONS | | ISR→ICR | | EA ADD GRX = REG.0 | | ISDO "ALL 1'S"-AR.R | IF (RFP=1) ‡ | O→RPF X→XSR | LK ADC CARRY |
| MR Ø LOAD | | ISR | (hatched) | GR(X) | (hatched) | DR | (hatched) | AOR | (hatched) |
| MR 1 LOAD | | (hatched) | GR(Y) | (hatched) | ISR | (hatched) | PUR | (hatched) | ADC |

FIG. 116

TRA PZ

ISR BIT Ø 1 2 3 4 5 6 7 8 9 10 11 12 13 14 15 16 30 31
BINARY CODE [hatched] [hatched] 0 1 0 0 0 0 - - - - - - - P [hatched 16–31: Z]

DESCRIPTION: ( I ) CYCLE INSTRUCTION

P → IAR.L Z → IAR.R

COMMENTS:

CYCLE: 1

| | | T0 | T1 | T2 | T3 | T4 | T5 | T6 | T7 |
|---|---|---|---|---|---|---|---|---|---|
| TIMING INTERVAL | PLACE | TØPL | T1PL | T2PL | T3PL | T4PL | T5PL | T6PL | T7PL |
| | ACCEPT | TØAL | T1AL | T2AL | T3AL | T4AL | T5AL | T6AL | T7AL |
| PLACE CONTROL | | ISR | GR(Y) | GR(X) | ISR | DR | PUR | AOR | |
| BUSS TRANSFER CONTROL | H = 1 | | XBTL | | | | | | |
| | H = Ø | | BTL | | | | | | |
| | G = 1 | | | | | | | | |
| | G = Ø | | | | | | | | |
| | | BTL | | BTL | BTL | | | | |
| REGISTER ACCEPT CONTROL | LT. HALF BIT (Ø-15) | SR | AR | | | | ‡ GR(XSR) | | |
| | RT. HALF BIT (16-31) | AR, DR | | | IAR | | ‡ GR(XSR) | | |
| AR BIT SELECT | | | | | | | | | |
| LOGIC COMPARE CONTROL | | | | | | | | | |
| TRANSFER TRUE AR( )DR | | | | | | | | | |
| INSTRUCTION ADDRESS COUNTER | AOC → AOR | | | [cross-hatched] | | | | | |
| | AOR → IAR | | | | | | | | |
| COMPLEX (*) COMMUNICATION | IS {IAR → IS *AB | | | | | [cross-hatched] | | | |
| | PS {DR → IP *DB | | | | | | | | |
| | PS {ADC → PS/PU *AB | | | | | | | | |
| | PU {DR → PU *DB | | | | | | | | |
| MISC. ACTIONS | | ISR → ICR | | EA ADD | ICR. B15 → IAR. B15 | ISDO | IF (RFP = 1) ‡ | O → RPF X → XSR | LK ADC CARRY |
| MR Ø LOAD | | ISR | [hatched] | GR(X) | [hatched] | DR | [hatched] | AOR | [hatched] |
| MR 1 LOAD | | [hatched] | GR(Y) | [hatched] | ISR | [hatched] | PUR | [hatched] | 1'S |

FIG. 117

TSX Z,YH,XG

| ISR BIT | Ø | 1 | 2 | 3 | 4 | 5 | 6 | 7 | 8 | 9 | 10 | 11 | 12 | 13 | 14 | 15 | 16–31 |
|---|---|---|---|---|---|---|---|---|---|---|---|---|---|---|---|---|---|
| BINARY CODE | ▨ | ▨ | 0 | 1 | 1 | 0 | 0 | X | X | X | Y | Y | Y | Y | H | G | ▨ (Z) |

DESCRIPTION: ( I ) CYCLE INSTRUCTION

I AR.R+1 ⟶ GRX.G : (Z+GRY.H) ⟶ IAR.R

COMMENTS:

CYCLE: 1

| TIMING INTERVAL | | T0 | T1 | T2 | T3 | T4 | T5 | T6 | T7 |
|---|---|---|---|---|---|---|---|---|---|
| TIMING INTERVAL | PLACE | TØPL | T1PL | T2PL | T3PL | T4PL | T5PL | T6PL | T7PL |
| | ACCEPT | TØAL | T1AL | T2AL | T3AL | T4AL | T5AL | T6AL | T7AL |
| PLACE CONTROL | | ISR | GR(Y) | GR(X) | ADC | DR | PUR | AOR | DR |
| BUSS TRANSFER CONTROL | H = 1 | | XBTL | | | | | | |
| | H = Ø | | BTL | | | | | | |
| | G = 1 | | | | | | | | BTL |
| | G = Ø | | | | | | | | XBTL |
| | | BTL | | BTL | BTL | | | BTL | |
| REGISTER ACCEPT CONTROL | LT. HALF BIT (Ø–15) | SR | AR | | | | ‡ GR(XSR) | | GRX.$\bar{G}$ |
| | RT. HALF BIT (16–31) | AR, DR | | | IAR | | ‡ GR(XSR) | DR | GRX.G |
| AR BIT SELECT | | | | | | | | | |
| LOGIC COMPARE CONTROL | | | | | | | | | |
| TRANSFER TRUE AR( )DR | | | | | | | | | |
| INSTRUCTION ADDRESS COUNTER | AOC → AOR | | | ▩ | | | | | |
| | AOR → IAR | | | | | | | | |
| COMPLEX (*) COMMUNICATION | IS {IAR → IS *AB | | | | | ▩ | | | |
| | PS {DR → IP *DB | | | | | | | | |
| | PS {ADC → PS/PU *AB | | | | | | | | |
| | PU {DR → PU *DB | | | | | | | | |
| MISC. ACTIONS | | ISR → ICR | | EA ADD | | ISDO | IF (RFP=1) ‡ | O → RPF X → XSR | LK ADC CARRY |
| MR Ø LOAD | | ISR | ▨ | GR(X) | ▨ | DR | ▨ | AOR | ▨ |
| MR 1 LOAD | | ▨ | GR(Y) | ▨ | ADC | ▨ | PUR | ▨ | DR |

FIG. 118

TUH Z, YH, XG

| ISR BIT | Ø | 1 | 2 | 3 | 4 | 5 | 6 | 7 | 8 | 9 | 10 | 11 | 12 | 13 | 14 | 15 | 16 … 30 31 |
|---|---|---|---|---|---|---|---|---|---|---|---|---|---|---|---|---|---|
| BINARY CODE | | | 0 | 1 | 1 | 1 | 1 | 1 | X | X | X | Y | Y | Y | H | G | Z |

DESCRIPTION: (1) CYCLE INSTRUCTION
IF (GRY.H ≠ GRX.G); Z → IAR.R : ELSE IAR.R+1 → IAR.R
ADC CARRY TRUE IF GRX < GRY

COMMENTS:
* CONDITIONAL ACCEPT IF XFR TRUE IS SATISFIED
ELSE AOR → IAR.R
AC = LCCAC LOGIC CIRCUIT "AND" CONTROL
NC = LCCNC LOGIC CIRCUIT "NOR" CONTROL

CYCLE: 1

| | | | | | | | | | |
|---|---|---|---|---|---|---|---|---|---|
| TIMING INTERVAL | PLACE | TØPL | T1PL | T2PL | T3PL | T4PL | T5PL | T6PL | T7PL |
| | ACCEPT | TØAL | T1AL | T2AL | T3AL | T4AL | T5AL | T6AL | T7AL |
| PLACE CONTROL | | ISR | GR(Y) | GR(X) | ISA | DR | PUR | AOR | |
| BUSS TRANSFER CONTROL | H = 1 | | XBTL | | | | | | |
| | H = Ø | | BTL | | | | | | |
| | G = 1 | | | XBTL | | | | | |
| | G = Ø | | | BTL | | | | | |
| | | BTL | | | BTL | XCBTL | | | |
| REGISTER ACCEPT CONTROL | LT. HALF BIT (Ø-15) | SR | AR | DR | | | ‡ GR(XSR) | | |
| | RT. HALF BIT (16-31) | AR, DR | | | IAR * | AR | ‡ GR(XSR) | | |
| AR BIT SELECT | | | | | | | | | |
| LOGIC COMPARE CONTROL | | | | NC, AC → | → | | | | |
| TRANSFER TRUE AR( )DR | | | | | | | | | |
| INSTRUCTION ADDRESS COUNTER | AOC → AOR | | | | | | | | |
| | AOR → IAR | | | | | | | | |
| COMPLEX (*) COMMUNICATION | IS { IAR → IS *AB | | | | | | | | |
| | PS { DR → IP *DB | | | | | | | | |
| | PS { ADC → PS/PU *AB | | | | | | | | |
| | PU { DR → PU *DB | | | | | | | | |
| MISC. ACTIONS | | ISR → ICR | | EA ADD | | ISDO | IF (RFP = 1) ‡ | O → RPF X → XSR | LK ADC CARRY |
| MR Ø LOAD | | ISR | | GR(X) | | DR | | AOR | |
| MR 1 LOAD | | | GR(Y) | | ISA | | PUR | | |

FIG. 119

TUQ Z, Y, X

| ISR BIT | Ø | 1 | 2 | 3 | 4 | 5 | 6 | 7 | 8 | 9 | 10 | 11 | 12 | 13 | 14 | 15 | 16–31 |
|---|---|---|---|---|---|---|---|---|---|---|---|---|---|---|---|---|---|
| BINARY CODE | | | 0 | 1 | 1 | 1 | 0 | 1 | X | X | X | Y | Y | Y | 0 | 0 | Z |

DESCRIPTION: ( | ) CYCLE INSTRUCTION

IF GRY ≠ GRX Z → IAR.R ELSE IAR.R + 1 → IAR.R

COMMENTS:
* CONDITIONAL ACCEPT IF XFR TRUE IS SATISFIED
ELSE AOR → IAR.R

CYCLE: AC = LCCAC LOGIC CIRCUIT "AND" CONTROL
NC = LCCNC LOGIC CIRCUIT "NOR" CONTROL

| TIMING INTERVAL | | T0PL | T1PL | T2PL | T3PL | T4PL | T5PL | T6PL | T7PL |
|---|---|---|---|---|---|---|---|---|---|
| | ACCEPT | TØAL | T1AL | T2AL | T3AL | T4AL | T5AL | T6AL | T7AL |
| PLACE CONTROL | | ISR | GR(Y) | GR(X) | ISA | DR | PUR | AOR | |
| BUSS TRANSFER CONTROL | H = 1 | | | | | | | | |
| | H = Ø | | | | | | | | |
| | G = 1 | | | | | | | | |
| | G = Ø | | | | | | | | |
| | | BTL | BTL | BTL | BTL | | | | |
| REGISTER ACCEPT CONTROL | LT. HALF BIT (Ø–15) | SR | AR | DR | | | ‡ GR(XSR) | | |
| | RT. HALF BIT (16–31) | AR, DR | AR | DR | IAR * | | ‡ GR(XSR) | | |
| AR BIT SELECT | | | | | | | | | |
| LOGIC COMPARE CONTROL | | | | NC, AC → | → | | | | |
| TRANSFER TRUE AR( )DR | | | | | | | | | |
| INSTRUCTION ADDRESS COUNTER | AOC → AOR | | | | | | | | |
| | AOR → IAR | | | | * | | | | |
| COMPLEX (*) COMMUNICATION | IS: IAR → IS *AB | | | | | | | | |
| | PS: DR → IP *DB | | | | | | | | |
| | PS: ADC → PS/PU *AB | | | | | | | | |
| | PU: DR → PU *DB | | | | | | | | |
| MISC. ACTIONS | | ISR → ICR | SEE ISR. B 14 & 15 | EA ADD | | ISDO | IF (RFP=1) ‡ | O → RPF X → XSR | LK ADC CARRY |
| MR Ø LOAD | | ISR | | GR(X) | | DR | | AOR | |
| MR 1 LOAD | | | GR(Y) | | ISA | | PUR | | 1'S |

FIG. 120

TXN Z,YH,X

| ISR BIT | Ø | 1 | 2 | 3 | 4 | 5 | 6 | 7 | 8 | 9 | 10 | 11 | 12 | 13 | 14 | 15 | 16 … 30 31 |
|---|---|---|---|---|---|---|---|---|---|---|---|---|---|---|---|---|---|
| BINARY CODE | | | 0 | 1 | 1 | 1 | 0 | 0 | X | X | X | Y | Y | Y | H | C | Z |

DESCRIPTION: ( I ) CYCLE INSTRUCTION

IF ( GRX. B ≠ Ø) Z → IAR.R B = (GRY.H) MOD 32

ELSE IAR.R + 1 → IAR.R

COMMENTS:

* CONDITIONAL ACCEPT IF XFR TRUE IS SATISFIED

GRX = Ø SPECIFIES SPR.

AC = LCCAC LOGIC CIRCUIT "AND" CONTROL

CYCLE: 1 NC = LCCNC LOGIC CIRCUIT "NOR" CONTROL

| | | T0 | T1 | T2 | T3 | T4 | T5 | T6 | T7 |
|---|---|---|---|---|---|---|---|---|---|
| TIMING INTERVAL | PLACE | TØPL | T1PL | T2PL | T3PL | T4PL | T5PL | T6PL | T7PL |
| | ACCEPT | TØAL | T1AL | T2AL | T3AL | T4AL | T5AL | T6AL | T7AL |
| PLACE CONTROL | | ISR | GR(Y) | GR (X) | ISR | | PUR | A OR | |
| BUSS TRANSFER CONTROL | H = 1 | | XBTL | | | | | | |
| | H = Ø | | BTL | | | | | | |
| | G = 1 | | | | | | | | |
| | G = Ø | | | | | | | | |
| | | BTL | | BTL | BTL | | | | |
| REGISTER ACCEPT CONTROL | LT. HALF BIT (Ø–15) | SR | SR AR | AR, DR | IAR * | | ‡ GR(XSR) | | |
| | RT. HALF BIT (16–31) | AR, DR | | AR, DR | | | ‡ GR(XSR) | | |
| AR BIT SELECT | | | | | | | | | |
| LOGIC COMPARE CONTROL | | | | AC AC → | → | | | | |
| TRANSFER TRUE AR( )DR | | | | | | | | | |
| INSTRUCTION ADDRESS COUNTER | AOC → AOR | | | | | | | | |
| | AOR → IAR | | | | * | | | | |
| COMPLEX (*) COMMUNICATION | IS { IAR → IS *AB | | | | | | | | |
| | PS { DR → IP *DB | | | | | | | | |
| | PS { ADC → PS/PU *AB | | | | | | | | |
| | PU { DR → PU *DB | | | | | | | | |
| MISC. ACTIONS | | ISR → ICR | | EA ADD | | ISDO | IF (RFP = 1) ‡ | O → RPF X → XSR | LK ADC CARRY |
| MR Ø LOAD | | ISR | | GR (X) | | I'S | | A OR | |
| MR 1 LOAD | | | GR(Y) | | ISR | | PUR | | I'S |

FIG. 121

TXZ Z, YH, X

| ISR BIT | Ø | 1 | 2 | 3 | 4 | 5 | 6 | 7 | 8 | 9 | 10 | 11 | 12 | 13 | 14 | 15 | 16–31 |
|---|---|---|---|---|---|---|---|---|---|---|---|---|---|---|---|---|---|
| BINARY CODE | ▨ | ▨ | 0 | 1 | 0 | 1 | 0 | 0 | X | X | X | Y | Y | Y | H | 0 | Z |

DESCRIPTION: ( I ) CYCLE INSTRUCTION
IF GRX.B = Ø : Z → IAR.R ELSE : IAR.R → IAR.R
B = (GRY.H) MOD 32

COMMENTS:
* CONDITIONAL ACCEPT IF XFR TRUE CONDITION IS SATISFIED ELSE AOR → IAR
AC = LCCAC LOGIC CIRCUIT "AND" CONTROL
NC = LCCNC LOGIC CIRCUIT "NOR" CONTROL
CYCLE: I

| | | T0 | T1 | T2 | T3 | T4 | T5 | T6 | T7 |
|---|---|---|---|---|---|---|---|---|---|
| TIMING INTERVAL | PLACE | TØPL | T1PL | T2PL | T3PL | T4PL | T5PL | T6PL | T7PL |
| | ACCEPT | TØAL | T1AL | T2AL | T3AL | T4AL | T5AL | T6AL | T7AL |
| PLACE CONTROL | | ISR | GR(Y) | GR(X) | ISR | | PUR | AOR | |
| BUSS TRANSFER CONTROL | H = 1 | | XBTL | | | | | | |
| | H = Ø | | BTL | | | | | | |
| | G = 1 | | | | | | | | |
| | G = Ø | | | | | | | | |
| | | BTL | | BTL | BTL | | | | |
| REGISTER ACCEPT CONTROL | LT. HALF BIT (Ø–15) | SR | SR AR | AR, DR | | | ‡ GR(XSR) | | |
| | RT. HALF BIT (16–31) | AR, DR | | AR, DR | IAR * | | ‡ GR(XSR) | | |
| AR BIT SELECT | | | | ▩ | | | | | |
| LOGIC COMPARE CONTROL | | | | NC, AC → | → | | | | |
| TRANSFER TRUE AR( )DR | | | | | ▩ | | | | |
| INSTRUCTION ADDRESS COUNTER | AOC → AOR | | | ▩ | | | | | |
| | AOR → IAR | | | | * | | | | |
| COMPLEX (*) COMMUNICATION | IS { IAR → IS *AB | | | | | ▩ | | | |
| | PS { DR → IP *DB | | | | | | | | |
| | PS { ADC → PS/PU *AB | | | | | | | | |
| | PU { DR → PU *DB | | | | | | | | |
| MISC. ACTIONS | | ISR → ICR | | EA ADD | | ISDO | IF (RFP = 1) ‡ | O → RPF X → XSR | LK ADC CARRY |
| MR Ø LOAD | | ISR | ▨ | GR (X) | ▨ | I'S | ▨ | AOR | ▨ |
| MR 1 LOAD | | ▨ | GR(Y) | ▨ | ISR | ▨ | PUR | ▨ | I'S |

FIG.122

TZD Z,YH,X

| ISR BIT | 0 | 1 | 2 | 3 | 4 | 5 | 6 | 7 | 8 | 9 | 10 | 11 | 12 | 13 | 14 | 15 | 16 … 30 31 |
|---|---|---|---|---|---|---|---|---|---|---|---|---|---|---|---|---|---|
| BINARY CODE | | | 0 | 1 | 0 | 1 | 0 | 0 | X | X | X | Y | Y | Y | H | 1 | |

DESCRIPTION: ( I ) CYCLE INSTRUCTION
IF GRX.B = Ø : Z → IAR. R    B = (GRY.H) MOD 32 (Z)
ELSE: IAR.R + 1 → IAR.R
ALWAYS GRY. H − 1 → GRY. H
COMMENTS:
* CONDITIONAL ACCEPT IF XFR TRUE IS SATISFIED: ELSE AOR → IAR.R
GRX = Ø SPECIFIES SPR
AC = LCCAC LOGIC CIRCUIT "AND" CONTROL
CYCLE: I NC = LCCNC LOGIC CIRCUIT "NOR" CONTROL

| | | TØPL | T1PL | T2PL | T3PL | T4PL | T5PL | T6PL | T7PL |
|---|---|---|---|---|---|---|---|---|---|
| TIMING INTERVAL | PLACE | TØPL | T1PL | T2PL | T3PL | T4PL | T5PL | T6PL | T7PL |
| | ACCEPT | TØAL | T1AL | T2AL | T3AL | T4AL | T5AL | T6AL | T7AL |
| PLACE CONTROL | | ISR | GR(Y) | GR(X) | ISR | GR(Y) | PUR | AOR | ADC |
| BUSS TRANSFER CONTROL | H = 1 | | XBTL | | | INHIBIT BTL TO ABL | | | BTL |
| | H = Ø | | BTL | | | INHIBIT BTL TO ABR | | | XBTL |
| | G = 1 | | | | | | | | |
| | G = Ø | | | | | | | | |
| | | BTL | | BTL | BTL | BTL | | | |
| REGISTER ACCEPT CONTROL | LT. HALF BIT (Ø−15) | SR | SR AR | AR,DR | | AR | ‡ GR(XSR) | | GRY. $\overline{H}$ |
| | RT. HALF BIT (16−31) | AR, DR | | AR, DR | IAR * | AR | ‡ GR(XSR) | | GRY. H |
| AR BIT SELECT | | | | | | | | | |
| LOGIC COMPARE CONTROL | | | | NC,AC → | → | | | | |
| TRANSFER TRUE AR( )DR | | | | | | | | | |
| INSTRUCTION ADDRESS COUNTER | AOC → AOR | | | | | | | | |
| | AOR → IAR | | | | * | | | | |
| COMPLEX (*) COMMUNICATION | IS {IAR → IS *AB | | | | | | | | |
| | PS {DR → IP *DB | | | | | | | | |
| | PS {ADC → PS/PU *AB | | | | | | | | |
| | PU {DR → PU *DB | | | | | | | | |
| MISC. ACTIONS | | ISR → ICR | | EA ADD | | ISDO | IF (RFP=1) ‡ | O → RPF X → XSR | LK ADC CARRY |
| MR Ø LOAD | | ISR | | GR(X) | | GR(Y) | | AOR | |
| MR 1 LOAD | | | GR(Y) | | ISR | | PUR | | ADC |

FIG. 123

WI S PZ, YH, X

| ISR BIT | 0 | 1 | 2 | 3 | 4 | 5 | 6 | 7 | 8 | 9 | 10 | 11 | 12 | 13 | 14 | 15 | 16 … 30 31 |
|---|---|---|---|---|---|---|---|---|---|---|---|---|---|---|---|---|---|
| BINARY CODE | ▨ | ▨ | 1 | 0 | 0 | 1 | 0 | 1 | X | X | X | Y | Y | Y | H | P | ▨ (Z) |

DESCRIPTION: (2) CYCLE INSTRUCTION

GRX → IS AT P^(Z+GRY.H)

COMMENTS:

MEMORY CONTROL: R = 0, W = 1, MODE: sm = 0, cm = 0, nm = 1

CYCLE: 1

| | | T0 | T1 | T2 | T3 | T4 | T5 | T6 | T7 |
|---|---|---|---|---|---|---|---|---|---|
| TIMING INTERVAL | PLACE | T0PL | T1PL | T2PL | T3PL | T4PL | T5PL | T6PL | T7PL |
| | ACCEPT | T0AL | T1AL | T2AL | T3AL | T4AL | T5AL | T6AL | T7AL |
| PLACE CONTROL | | ISR | GR(Y) | GR(X) | ADC | DR | PUR | AOR | ADC |
| BUSS TRANSFER CONTROL | H = 1 | | X BTL | | | | | | |
| | H = 0 | | BTL | | | | | | |
| | G = 1 | | | | | | | | |
| | G = 0 | | | | | | | | |
| | | BTL | | BTL | BTL | | | | XBTL |
| REGISTER ACCEPT CONTROL | LT. HALF BIT (0–15) | SR | AR | DR | | | ‡ GR(XSR) | | DR |
| | RT. HALF BIT (16–31) | AR, DR | | DR | 1 AR | | ‡ GR(XSR) | | DR |
| AR BIT SELECT | | | | | | | | | |
| LOGIC COMPARE CONTROL | | | | | | | | | |
| TRANSFER TRUE AR( )DR | | | | | | | | | |
| INSTRUCTION ADDRESS COUNTER | AOC → AOR | | | ▩ | | | | | |
| | AOR → IAR | | | | | | | | |
| COMPLEX (*) COMMUNICATION | IS {IAR → IS *AB | | | | | ▩ | | | |
| | PS {DR → IP *DB | | | | | | ▩ | | |
| | PS {ADC → PS/PU *AB | | | | | | | | |
| | PU {DR → PU *DB | | | | | | | | |
| MISC. ACTIONS | | ISR → ICR | | EA ADD SET: DCCAF | ICR. B15 ↓ ISR. B15 | ISDO | IF (RFP=1) ‡ | 0 → RPF X → XSR | LK ADC CARRY SET: DCCBA MCF |
| MR 0 LOAD | | ISR | ▨ | GR(X) | ▨ | | ▨ | AOR | ▨ |
| MR 1 LOAD | | ▨ | GR(Y) | ▨ | ADC | ▨ | PUR | ▨ | ADC |

FIG. 124

WIS

ISR BIT: Ø 1 2 3 4 5 6 7 8 9 10 11 12 13 14 15 16 30 31
BINARY CODE (bits 16–31: Z)

DESCRIPTION: (2) CYCLE INSTRUCTION

COMMENTS: ECHO OF ADDRESS SENT TO IS IN CYCLE 1 COMPARED TO ADDRESS IN T2L

AC = LCCAC LOGIC CIRCUIT "AND" CONTROL:
NC = LCCNC LOGIC CIRCUIT "NOR" CONTROL:

MEMORY CONTROL: 1 (R) 0 (W) 0 0 1 (MODE: sm cm nm)

CYCLE: 2

| | | T0 | T1 | T2 | T3 | T4 | T5 | T6 | T7 |
|---|---|---|---|---|---|---|---|---|---|
| TIMING INTERVAL | PLACE | TØPL | T1PL | T2PL | T3PL | T4PL | T5PL | T6PL | T7PL |
| | ACCEPT | TØAL | T1AL | T2AL | T3AL | T4AL | T5AL | T6AL | T7AL |
| PLACE CONTROL | | ISR | ISR | GR(X) | ADC | DR | AR | AOR | ADC |
| BUSS TRANSFER CONTROL | H = 1 | | | | | | | | |
| | H = Ø | | | | | | | | |
| | G = 1 | | | | | | | | |
| | G = Ø | | | | | | | | |
| | | BTL | BTL | BTL | BTL | | BTL | | XBTL |
| REGISTER ACCEPT CONTROL | LT. HALF BIT (Ø–15) | SR | AR | | | | | | DR |
| | RT. HALF BIT (16–31) | AR, DR | | | | | | | DR |
| AR BIT SELECT | | | | | | | | | |
| LOGIC COMPARE CONTROL | | | | NC, AC | | | | | |
| TRANSFER TRUE AR( )DR | | | | | | | | | |
| INSTRUCTION ADDRESS COUNTER | AOC → AOR | | | | | | | | |
| | AOR → IAR | | | | | | | | |
| COMPLEX (*) COMMUNICATION | IS {IAR → IS *AB | | | | | | | | |
| | PS {DR → IP *DB | | | | | | | | |
| | PS {ADC → PS/PU *AB | | | | | | | | |
| | PU {DR → PU *DB | | | | | | | | |
| MISC. ACTIONS | | | RESET DCCAF | | | ISDO | | O → RPF X → XSR RESET; DCCBF MCF | LK ADC CARRY |
| MR Ø LOAD | | ISR | | GR(X) | | DR | | AOR | |
| MR 1 LOAD | | | ISR | | ADC | | AR | | ADC |

FIG. 125

WI S D PZ, YH, X

| ISR BIT | Ø | 1 | 2 | 3 | 4 | 5 | 6 | 7 | 8 | 9 | 10 | 11 | 12 | 13 | 14 | 15 | 16 ... 30 31 |
|---|---|---|---|---|---|---|---|---|---|---|---|---|---|---|---|---|---|
| BINARY CODE | | | 1 | 0 | 0 | 1 | 1 | 1 | X | X | X | Y | Y | Y | H | P | Z |

DESCRIPTION: (2 ) CYCLE INSTRUCTION

GRX ⟶ IS AT P∧(Z + GRY.H) WITH INVERTED DATA PARITY

COMMENTS:

CYCLE: 1

MEMORY CONTROL

| R | W | MODE (sm) | MODE (cm) | MODE (nm) |
|---|---|---|---|---|
| 0 | 1 | 0 | 0 | 1 |

| TIMING INTERVAL | | | | | | | | |
|---|---|---|---|---|---|---|---|---|
| PLACE | TØPL | T1PL | T2PL | T3PL | T4PL | T5PL | T6PL | T7PL |
| ACCEPT | TØAL | T1AL | T2AL | T3AL | T4AL | T5AL | T6AL | T7AL |
| PLACE CONTROL | ISR | GR(Y) | GR(X) | ADC | DR | PUR | AQR | ADC |
| BUSS TRANSFER CONTROL H = 1 | | XBTL | | | | | | |
| BUSS TRANSFER CONTROL H = Ø | | BTL | | | | | | |
| BUSS TRANSFER CONTROL G = 1 | | | | | | | | |
| BUSS TRANSFER CONTROL G = Ø | | | | | | | | |
| BUSS TRANSFER CONTROL | BTL | | BTL | BTL | | | | XBTL |
| REGISTER ACCEPT CONTROL LT. HALF BIT (Ø–15) | SR | AR | DR | | | ‡ GR(XSR) | | DR |
| REGISTER ACCEPT CONTROL RT. HALF BIT (16–31) | AR, DR | | DR | IAR | | ‡ GR(XSR) | | DR |
| AR BIT SELECT | | | | | | | | |
| LOGIC COMPARE CONTROL | | | | | | | | |
| TRANSFER TRUE AR( )DR | | | | | | | | |
| INSTRUCTION ADDRESS COUNTER AOC → AOR | | | | | | | | |
| INSTRUCTION ADDRESS COUNTER AOR → IAR | | | | | | | | |
| COMPLEX (✳) COMMUNICATION IS {IAR → IS ✳AB | | | | | | | | |
| PS {DR → IP ✳DB | | | | | | | | |
| PS {ADC → PS/PU ✳AB | | | | | | | | |
| PU {DR → PU ✳DB | | | | | | | | |
| MISC. ACTIONS | ISR→ICR | | EA ADD SET DCCAF | ICR. B15 → IAR. B15 | ISDO | IF (RFP=1) ‡ | O→RPF X→XSR | LK ADC CARRY SET DCCBF MCF |
| MR Ø LOAD | | | | | | | | |
| MR 1 LOAD | | | | | | | | |

FIG. 126

WISD

ISR BIT Ø 1 2 3 4 5 6 7 8 9 10 11 12 13 14 15 16 30 31
BINARY CODE

Z

DESCRIPTION: (2 ) CYCLE INSTRUCTION

COMMENTS: ECHO OF ADDRESS SENT TO IS IN CYCLE 1 COMPARED TO ADDRESS IN T2L
AC = LCC AC LOGIC CIRCUIT "AND" CONTROL
NC = LCC NC LOGIC CIRCUIT "NOR" CONTROL
CYCLE: 2

MEMORY CONTROL: sm cm nm — R 1, W 0, MODE 0 0 1

| | | | | | | | | | |
|---|---|---|---|---|---|---|---|---|---|
| TIMING INTERVAL | PLACE | TØPL | T1PL | T2PL | T3PL | T4PL | T5PL | T6PL | T7PL |
| | ACCEPT | TØAL | T1AL | T2AL | T3AL | T4AL | T5AL | T6AL | T7AL |
| PLACE CONTROL | | ISR | ISR | GR(X) | ADC | DR | AR | AOR | ADC |
| BUSS TRANSFER CONTROL | H = 1 | | | | | | | | |
| | H = Ø | | | | | | | | |
| | G = 1 | | | | | | | | |
| | G = Ø | | | | | | | | |
| | | BTL | BTL | BTL | BTL | | BTL | | XBTL |
| REGISTER ACCEPT CONTROL | LT. HALF BIT (Ø-15) | SR | AR | | | | | | DR |
| | RT. HALF BIT (16-31) | AR, DR | | | | | | | DR |
| AR BIT SELECT | | | | | | | | | |
| LOGIC COMPARE CONTROL | | | | NC, AC | | | | | |
| TRANSFER TRUE AR( )DR | | | | | | | | | |
| INSTRUCTION ADDRESS COUNTER | AOC → AOR | | | | | | | | |
| | AOR → IAR | | | | | | | | |
| COMPLEX (*) COMMUNICATION IS | IAR → IS *AB | | | | | | | | |
| PS | DR → IP *DB | | | | | | | | |
| | ADC → PS/PU *AB | | | | | | | | |
| PU | DR → PU *DB | | | | | | | | |
| MISC. ACTIONS | | | RESET DCCAF | | | ISDO | | O → RPF X → XSR RESET DCCBF MCF | LK ADC CARRY |
| MR Ø LOAD | | ISR | | GR(X) | | DP | | AOR | |
| MR 1 LOAD | | | ISR | | ADC | | AR | | ADC |

FIG. 127

WISN PZ,YH,X

| ISR BIT | 0 | 1 | 2 | 3 | 4 | 5 | 6 | 7 | 8 | 9 | 10 | 11 | 12 | 13 | 14 | 15 | 16–31 |
|---|---|---|---|---|---|---|---|---|---|---|---|---|---|---|---|---|---|
| BINARY CODE | | | 1 | 0 | 0 | 1 | 1 | 0 | X | X | X | Y | Y | Y | H | P | Z |

DESCRIPTION: (2) CYCLE INSTRUCTION

GRX ⟶ IS AT NON MEMORY LOCATION $P \wedge (Z + GRY.H)$

COMMENTS:

MEMORY CONTROL: R 0, W 1, MODE (sm cm nm) 0 1 0

CYCLE: 1

| | | T0PL | T1PL | T2PL | T3PL | T4PL | T5PL | T6PL | T7PL |
|---|---|---|---|---|---|---|---|---|---|
| TIMING INTERVAL | PLACE | T0PL | T1PL | T2PL | T3PL | T4PL | T5PL | T6PL | T7PL |
| | ACCEPT | T0AL | T1AL | T2AL | T3AL | T4AL | T5AL | T6AL | T7AL |
| PLACE CONTROL | | ISR | GR(Y) | GR(X) | ADC | DR | PUR | AOR | ADC |
| BUSS TRANSFER CONTROL | H = 1 | | XBTL | | | | | | |
| | H = 0 | | BTL | | | | | | |
| | G = 1 | | | | | | | | |
| | G = 0 | | | | | | | | |
| | | BTL | | BTL | BTL | | | | XBTL |
| REGISTER ACCEPT CONTROL | LT. HALF BIT (0–15) | SR | AR | DR | | | ‡ GR(XSR) | | DR |
| | RT. HALF BIT (16–31) | AR, DR | | DR | IAR | | ‡ GR(XSR) | | DR |
| AR BIT SELECT | | | | | | | | | |
| LOGIC COMPARE CONTROL | | | | | | | | | |
| TRANSFER TRUE AR( )DR | | | | | | | | | |
| INSTRUCTION ADDRESS COUNTER | AOC → AOR | | | | | | | | |
| | AOR → IAR | | | | | | | | |
| COMPLEX (*) COMMUNICATION | IS: IAR → IS *AB | | | | | | | | |
| | PS: DR → IP *DB | | | | | | | | |
| | PS: ADC → PS/PU *AB | | | | | | | | |
| | PU: DR → PU *DB | | | | | | | | |
| MISC. ACTIONS | | ISR → ICR | | EA ADD SET: DCCAF | ICR.B15 → IAR.B15 | ISDO | IF (RFP=1) ‡ | O → RPF X → XSR | LK ADC CARRY SET: DCCBF MCF |
| MR 0 LOAD | | ISR | | GR(X) | | DR | | AOR | |
| MR 1 LOAD | | | GR(Y) | | ADC | | PUR | | ADC |

FIG. 128

WISN

ISR BIT Ø 1 2 3 4 5 6 7 8 9 10 11 12 13 14 15 16 30 31
BINARY CODE

DESCRIPTION: (2) CYCLE INSTRUCTION Z

COMMENTS: ECHO OF ADDRESS SENT TO IS IN CYCLE 1 COMPARED TO ADDRESS IN T2L

AC=LCCAC LOGIC CIRCUIT "AND" CONTROL
NC=LCCNC LOGIC CIRCUIT "NOR" CONTROL

MEMORY CONTROL: 1 0 0 0 1 (R W MODE; sm cm nm)

CYCLE: 2

| | | | | | | | | |
|---|---|---|---|---|---|---|---|---|
| TIMING INTERVAL — PLACE | TØPL | T1PL | T2PL | T3PL | T4PL | T5PL | T6PL | T7PL |
| TIMING INTERVAL — ACCEPT | TØAL | T1AL | T2AL | T3AL | T4AL | T5AL | T6AL | T7AL |
| PLACE CONTROL | ISR | ISR | GR(X) | ADC | DR | AR | AOR | ADC |
| BUSS TRANSFER CONTROL — H = 1 | | | | | | | | |
| BUSS TRANSFER CONTROL — H = Ø | | | | | | | | |
| BUSS TRANSFER CONTROL — G = 1 | | | | | | | | |
| BUSS TRANSFER CONTROL — G = Ø | | | | | | | | |
| BUSS TRANSFER CONTROL | BTL | BTL | BTL | BTL | | BTL | | XBTL |
| REGISTER ACCEPT CONTROL — LT. HALF BIT (Ø-15) | SR | AR | | | | | | DR |
| REGISTER ACCEPT CONTROL — RT. HALF BIT (16-31) | AR, DR | | | | | | | DR |
| AR BIT SELECT | | | | | | | | |
| LOGIC COMPARE CONTROL | | | NC, AC | | | | | |
| TRANSFER TRUE AR( )DR | | | | | | | | |
| INSTRUCTION ADDRESS COUNTER — AOC→AOR | | | | | | | | |
| INSTRUCTION ADDRESS COUNTER — AOR→IAR | | | | (hatched) | | | | |
| COMPLEX (*) COMMUNICATION — IS: IAR→IS *AB | | | | | (hatched) | | | |
| COMPLEX (*) COMMUNICATION — PS: DR→IP *DB | | | | | | | | |
| COMPLEX (*) COMMUNICATION — PS: ADC→PS/PU *AB | | | | | | | | |
| COMPLEX (*) COMMUNICATION — PU: DR→PU *DB | | | | | | | | |
| MISC. ACTIONS | | RESET DCCAF | | | ISDO | | O→RPF X→XSR RESET: DCCBF MCF | LK ADC CARRY |
| MR Ø LOAD | ISR | (hatched) | GR(X) | (hatched) | DR | (hatched) | AOR | (hatched) |
| MR 1 LOAD | (hatched) | ISR | (hatched) | ADC | (hatched) | AR | (hatched) | ADC |

FIG. 129

WMCG ZO

| ISR BIT | Ø | 1 | 2 | 3 | 4 | 5 | 6 | 7 | 8 | 9 | 10 | 11 | 12 | 13 | 14 | 15 | 16–31 |
|---|---|---|---|---|---|---|---|---|---|---|---|---|---|---|---|---|---|
| BINARY CODE | ▨ | ▨ | 1 | 1 | 1 | 1 | 1 | 0 | X | X | X | 0 | 0 | 0 | 0 | 0 | ▨ (Z) |

DESCRIPTION: ( 1 ) CYCLE INSTRUCTION

GR X → MCG AT Z

COMMENTS:
ADDRESS OF MCG; Z IS TAKEN DIRECTLY FROM THE ISR DATA; i.e. GRX. TAKEN FROM AR COMPLEMENTED TO MADR

CYCLE: 1

| | | TØ | T1 | T2 | T3 | T4 | T5 | T6 | T7 |
|---|---|---|---|---|---|---|---|---|---|
| TIMING INTERVAL | PLACE | TØPL | T1PL | T2PL | T3PL | T4PL | T5PL | T6PL | T7PL |
| | ACCEPT | TØAL | T1AL | T2AL | T3AL | T4AL | T5AL | T6AL | T7AL |
| PLACE CONTROL | | ISR | GR(Y) | GR(X) | ADC | DR | PUR | AOR | |
| BUSS TRANSFER CONTROL | H = 1 | | XBTL | | | | | | |
| | H = Ø | | BTL | | | | | | |
| | G = 1 | | | | | | | | |
| | G = Ø | | | | | | | | |
| | | BTL | | CBTL | BTL | | | | |
| REGISTER ACCEPT CONTROL | LT. HALF BIT (Ø–15) | SR | AR | AR | | | ‡ GR(XSR) | | |
| | RT. HALF BIT (16–31) | AR, DR | | AA | | | ‡ GR(XSR) | | |
| AR BIT SELECT | | | | | | | | | |
| LOGIC COMPARE CONTROL | | | | | | | | | |
| TRANSFER TRUE AR( )DR | | | | | | | | | |
| INSTRUCTION ADDRESS COUNTER | AOC → AOR | | | ▩ | | | | | |
| | AOR → IAR | | | | ▩ | | | | |
| COMPLEX (*) COMMUNICATION | IS: IAR → IS *AB | | | | | ▩ | | | |
| | PS: DR → IP *DB | | | | | | | | |
| | PS: ADC → PS/PU *AB | | | | | | | | |
| | PU: DR → PU *DB | | | | | | | | |
| MISC. ACTIONS | | ISR → ICR | | EA ADD | SEE COMM-ENTS MAWL | ISDO | IF (RFP=1) ‡ | O → RPF X → XSR | LK ADC CARRY |
| MR Ø LOAD | | ISR | ▨ | GR (X) | ▨ | DR | ▨ | AO R | ▨ |
| MR 1 LOAD | | ▨ | GR(Y) | ▨ | ADC | ▨ | PUR | ▨ | 1'S |

WMCP Z, N

| ISR BIT | Ø | 1 | 2 | 3 | 4 | 5 | 6 | 7 | 8 | 9 | 10 | 11 | 12 | 13 | 14 | 15 | 16 … 30 31 |
|---|---|---|---|---|---|---|---|---|---|---|---|---|---|---|---|---|---|
| BINARY CODE | | | 1 | 1 | 1 | 1 | 0 | 0 | 0 | 0 | 0 | N | N | N | N | N | Z |

DESCRIPTION: (1) CYCLE INSTRUCTION
"1" ⟶ MCP.N AT Z

COMMENTS:
ADDRESS OF MCG CONTAINING THE POINT; IS TAKEN DIRECTLY FROM THE ISR DATA; i.e. "1" TAKEN FROM AR COMPLEMENTED TO MADB

CYCLE: 1

| | | T0PL / T0AL | T1PL / T1AL | T2PL / T2AL | T3PL / T3AL | T4PL / T4AL | T5PL / T5AL | T6PL / T6AL | T7PL / T7AL |
|---|---|---|---|---|---|---|---|---|---|
| TIMING INTERVAL | PLACE | T0PL | T1PL | T2PL | T3PL | T4PL | T5PL | T6PL | T7PL |
| | ACCEPT | T0AL | T1AL | T2AL | T3AL | T4AL | T5AL | T6AL | T7AL |
| PLACE CONTROL | | ISR | GR(Y) | GR(X) | ADC | DR | PUR | AOR | |
| BUSS TRANSFER CONTROL | H = 1 | | XBTL | | | | | | |
| | H = Ø | | BTL | | | | | | |
| | G = 1 | | | | | | | | |
| | G = Ø | | | | | | | | |
| | | BTL | | CBTL | BTL | | | | |
| REGISTER ACCEPT CONTROL | LT. HALF BIT (Ø-15) | SR | AR | AR | | | ‡ GR(XSR) | | |
| | RT. HALF BIT (16-31) | AR, DR | | AR | | | ‡ GR(XSR) | | |
| AR BIT SELECT | | | | | | | | | |
| LOGIC COMPARE CONTROL | | | | | | | | | |
| TRANSFER TRUE AR( )DR | | | | | | | | | |
| INSTRUCTION ADDRESS COUNTER | AOC → AOR | | | | | | | | |
| | AOR → IAR | | | | | | | | |
| COMPLEX (*) COMMUNICATION | IS {IAR → IS *AB | | | | | | | | |
| | PS {DR → IP *DB | | | | | | | | |
| | PS {ADC → PS/PU *AB | | | | | | | | |
| | PU {DR → PU *DB | | | | | | | | |
| MISC. ACTIONS | | ISR → ICR | | EA ADD | SEE COMMENTS MAWL | ISDO | IF (RFP=1) ‡ | O → RPF X → XSR | LK ADC CARRY |
| MR Ø LOAD | | ISR | | GR(X) | | DR | | AOR | |
| MR 1 LOAD | | | GR(Y) | | ADC | | PUR | | 1'S |

FIG. 129A

FIG. 129B

WPS PZ, YH, X

| ISR BIT | Ø | 1 | 2 | 3 | 4 | 5 | 6 | 7 | 8 | 9 | 10 | 11 | 12 | 13 | 14 | 15 | 16–31 |
|---|---|---|---|---|---|---|---|---|---|---|---|---|---|---|---|---|---|
| BINARY CODE | ▨ | ▨ | 1 | 0 | 1 | 1 | 0 | 1 | X | X | X | Y | Y | Y | H | P | ▨ (Z) |

DESCRIPTION: (1) CYCLE INSTRUCTION

GRX → PS AT P∧(Z+GRY.H)

COMMENTS:
ADDRESS ECHO RETURNED FROM SELECTED UNIT FOR COMPARISON IN TØL OF NEXT INSTRUCTION

MEMORY CONTROL: R 0, W 1, MODE 0 0 1 (sm cm mn)

CYCLE: 1

| | | TØ | T1 | T2 | T3 | T4 | T5 | T6 | T7 |
|---|---|---|---|---|---|---|---|---|---|
| TIMING INTERVAL | PLACE | TØPL | T1PL | T2PL | T3PL | T4PL | T5PL | T6PL | T7PL |
| | ACCEPT | TØAL | T1AL | T2AL | T3AL | T4AL | T5AL | T6AL | T7AL |
| PLACE CONTROL | | ISR | GR(Y) | GR(X) | ◤ ADC | ◤ DR | ADC | AOR | PSA |
| BUSS TRANSFER CONTROL | H = 1 | | XBTL | | | | | | |
| | H = Ø | | BTL | | | | | | |
| | G = 1 | | | | | | | | |
| | G = Ø | | | | | | | | |
| | | BTL | | BTL | ◤ BTL | | XBTL | | BTL |
| REGISTER ACCEPT CONTROL | LT. HALF BIT (Ø–15) | SA | AR | DR | | | DR | | AR |
| | RT. HALF BIT (16–31) | AR, DR | | DR | | | | | |
| AR BIT SELECT | | | | | | | | | |
| LOGIC COMPARE CONTROL | | | | | | | | | |
| TRANSFER TRUE AR( )DR | | | | | | | | | |
| INSTRUCTION ADDRESS COUNTER | AOC → AOR | | | ▨ | | | | | |
| | AOR → IAR | | | | ▨ | | | | |
| COMPLEX (*) COMMUNICATION | IS {IAR → IS *AB | | | | | ▨ | | | |
| | PS {DR → IP *DB | | | | | ▨ | | | |
| | PS {ADC → PS/PU *AB | | | | ▨ | | | | |
| | PU {DR → PU *DB | | | | | | | | |
| MISC. ACTIONS | | ISR → ICR | | EA ADD | PSDO MODE ICR B15 → PSAB. B15 | ISDO | | O → RPF X → XSR | LK ADC CARRY |
| MR Ø LOAD | | ISR | ▨ | GR(X) | ▨ | DR | ▨ | AOR | ▨ |
| MR 1 LOAD | | ▨ | GR(Y) | ▨ | ADC | ▨ | ADC | ▨ | PSA |

FIG. 129C

WRSD PZ, YH, X

| ISR BIT | 0 | 1 | 2 | 3 | 4 | 5 | 6 | 7 | 8 | 9 | 10 | 11 | 12 | 13 | 14 | 15 | 16–31 |
|---|---|---|---|---|---|---|---|---|---|---|---|---|---|---|---|---|---|
| BINARY CODE | ▨ | ▨ | 1 | 0 | 1 | 1 | 1 | 1 | X | X | X | Y | Y | Y | H | P | ▨ (Z) |

DESCRIPTION: ( 1 ) CYCLE INSTRUCTION

GRX ⟶ PS AT ( Z + GRY.H ) ∧ P WITH INVERTED DATA PARTY

COMMENTS:
ADDRESS ECHO RETURNED FROM SELECTED UNIT FOR COMPARISION IN TØL OF NEXT INSTRUCTION

MEMORY CONTROL (sm cm mn): R 0 | W 1 | MODE 0 0 1

CYCLE:

| | | TØPL / TØAL | T1PL / T1AL | T2PL / T2AL | T3PL / T3AL | T4PL / T4AL | T5PL / T5AL | T6PL / T6AL | T7PL / T7AL |
|---|---|---|---|---|---|---|---|---|---|
| PLACE CONTROL | | ISR | GR(Y) | GR(X) | ADC | DR | ADC | AOR | PSR |
| BUSS TRANSFER CONTROL | H = 1 | | XBTL | | | | | | |
| | H = Ø | | BTL | | | | | | |
| | G = 1 | | | | | | | | |
| | G = Ø | | | | | | | | |
| | | BTL | | BTL | BTL | | X BTL | | BTL |
| REGISTER ACCEPT CONTROL | LT. HALF BIT (Ø–15) | SR | AR | DR | | | DR | | AR |
| | RT. HALF BIT (16–31) | AR,DR | | DR | | | | | |
| AR BIT SELECT | | | | | | | | | |
| LOGIC COMPARE CONTROL | | | | | | | | | |
| TRANSFER TRUE AR( )DR | | | | | | | | | |
| INSTRUCTION ADDRESS COUNTER | AOC ⟶ AOR | | | ▩ | | | | | |
| | AOR ⟶ IAR | | | | ▩ | | | | |
| COMPLEX (✱) COMMUNICATION | IS { IAR ⟶ IS ✱AB | | | | | ▩ | | | |
| | PS { DR ⟶ IP ✱DB | | | | | ▩ | | | |
| | PS { ADC ⟶ PS/PU ✱AB | | | | ▩ | | | | |
| | PU { DR ⟶ PU ✱DB | | | | | | | | |
| MISC. ACTIONS | | ISR→ICR | | EA ADD | PSDO MODE ICR.B15→ PSAB. B15 | ISDO | | O→RPF X→XSR | LK ADC CARRY |
| MR Ø LOAD | | ISR | ▨ | GR(X) | ▨ | DP | ▨ | AOR | ▨ |
| MR 1 LOAD | | ▨ | GR(Y) | ▨ | ADC | ▨ | ADC | ▨ | PSR |

WPSN PZ,YH,X

| ISR BIT | 0 | 1 | 2 | 3 | 4 | 5 | 6 | 7 | 8 | 9 | 10 | 11 | 12 | 13 | 14 | 15 | 16 … 30 31 |
|---|---|---|---|---|---|---|---|---|---|---|---|---|---|---|---|---|---|
| BINARY CODE | | | 1 | 0 | 1 | 1 | 1 | 0 | X | X | X | Y | Y | Y | | | Z |

DESCRIPTION: (1) CYCLE INSTRUCTION

GRX → PS AT P ∧ (GRY.H + Z) WRITE NON MEMORY LOCATION

COMMENTS:
ADDRESS ECHO RETURNED FROM SELECTED UNIT FOR COMPARISON IN TØL OF NEXT INSTRUCTION

MEMORY CONTROL: sm cm mn — 0 (R) | 1 (W) | 0 1 0 (MODE)

CYCLE: 1

| TIMING INTERVAL | | PLACE: TØPL / ACCEPT: TØAL | T1PL / T1AL | T2PL / T2AL | T3PL / T3AL | T4PL / T4AL | T5PL / T5AL | T6PL / T6AL | T7PL / T7AL |
|---|---|---|---|---|---|---|---|---|---|
| PLACE CONTROL | | ISR | GR(Y) | GR(X) | ADC | DR | ADC | AOR | PSR |
| BUSS TRANSFER CONTROL | H = 1 | | XBTL | | | | | | |
| | H = Ø | | BTL | | | | | | |
| | G = 1 | | | | | | | | |
| | G = Ø | | | | | | | | |
| | | BTL | | BTL | BTL | | XBTL | | BTL |
| REGISTER ACCEPT CONTROL | LT. HALF BIT (Ø–15) | SR | AR | DR | | | DR | | AR |
| | RT. HALF BIT (16–31) | AR, DR | | DR | | | | | |
| AR BIT SELECT | | | | | | | | | |
| LOGIC COMPARE CONTROL | | | | | | | | | |
| TRANSFER TRUE AR( )DR | | | | | | | | | |
| INSTRUCTION ADDRESS COUNTER | AOC → AOR | | | | | | | | |
| | AOR → IAR | | | | | | | | |
| COMPLEX (*) COMMUNICATION | IS {IAR → IS *AB | | | | | | | | |
| | PS {DR → IP *DB | | | | | | | | |
| | PS {ADC → PS/PU *AB | | | | | | | | |
| | PU {DR → PU *DB | | | | | | | | |
| MISC. ACTIONS | | ISR→ICR | | EA ADD | PSDO MODE ICRB15→PSAB. B15 | ISDO | | 0→RPF X→XSR | LK ADC CARRY |
| MR Ø LOAD | | ISR | | GR(X) | | DR | | AOR | |
| MR 1 LOAD | | | GR(Y) | | ADC | | ADC | | PSR |

FIG. 129C'

FIG. 129D

WPU Z, YH, X

| ISR BIT | 0 | 1 | 2 | 3 | 4 | 5 | 6 | 7 | 8 | 9 | 10 | 11 | 12 | 13 | 14 | 15 | 16–31 |
|---|---|---|---|---|---|---|---|---|---|---|---|---|---|---|---|---|---|
| BINARY CODE | | | 1 | 1 | 0 | 1 | 0 | 1 | X | X | X | X | Y | Y | H | 0 | Z |

DESCRIPTION: (1) CYCLE INSTRUCTION

GRX ⟶ PU AT (Z+GRY.H)

COMMENTS:
ADDRESS ECHO COMPARISON IN TOL OF NEXT CYCLE

PU CONTROL: R = 0, W = 1, MODE (sm cm mn) = 0 0 1

CYCLE: 1

| | | T0 | T1 | T2 | T3 | T4 | T5 | T6 | T7 |
|---|---|---|---|---|---|---|---|---|---|
| TIMING INTERVAL | PLACE | T0PL | T1PL | T2PL | T3PL | T4PL | T5PL | T6PL | T7PL |
| | ACCEPT | T0AL | T1AL | T2AL | T3AL | T4AL | T5AL | T6AL | T7AL |
| PLACE CONTROL | | ISR | GR(Y) | GR(X) | | DR | ADC | AOR | PUR |
| BUSS TRANSFER CONTROL | H = 1 | | | | | | | | |
| | H = 0 | | | | | | | | |
| | G = 1 | | | | | | | | |
| | G = 0 | | | | | | | | |
| | | BTL | | BTL | BTL | | XBTL | | |
| REGISTER ACCEPT CONTROL | LT. HALF BIT (0–15) | SR | AR | DR | | | DR | | AR |
| | RT. HALF BIT (16–31) | AR, DR | | DR | | | | | |
| AR BIT SELECT | | | | | | | | | |
| LOGIC COMPARE CONTROL | | | | | | | | | |
| TRANSFER TRUE AR( )DR | | | | | | | | | |
| INSTRUCTION ADDRESS COUNTER | AOC → AOR | | | | | | | | |
| | AOR → IAR | | | | | | | | |
| COMPLEX (*) COMMUNICATION | IS: IAR → IS *AB | | | | | | | | |
| | PS: DR → IP *DB | | | | | | | | |
| | PS: ADC → PS/PU *AB | | | | | | | | |
| | PU: DR → PU *DB | | | | | | | | |
| MISC. ACTIONS | | ISR → ICR | | EA ADD | | ISDO | | O → RPF<br>X → XSR | LK ADC CARRY |
| MR 0 LOAD | | ISR | | GR(X) | | DR | | AOR | |
| MR 1 LOAD | | | GR(Y) | | ADC | | ADC | | PUR |

FIG. 129E

WPUN Z,YH,X

| ISR BIT | Ø | 1 | 2 | 3 | 4 | 5 | 6 | 7 | 8 | 9 | 10 | 11 | 12 | 13 | 14 | 15 | 16 … 30 31 |
|---|---|---|---|---|---|---|---|---|---|---|---|---|---|---|---|---|---|
| BINARY CODE | | | 1 | 1 | 0 | 1 | 1 | 0 | X | X | X | Y | Y | Y | H | 0 | |

(bits 16–31: Z)

DESCRIPTION: ( 1 ) CYCLE INSTRUCTION

GRX → PU AT NON MEMORY LOCATION (Z + GRY. H)

COMMENTS:

ADDRESS ECHO COMPARISON IN TØL OF NEXT CYCLE

PU CONTROL: R = 0, W = 1, MODE (sm cm mn) = 0 1 0

CYCLE: 1

| | | | | | | | | | |
|---|---|---|---|---|---|---|---|---|---|
| TIMING INTERVAL | PLACE | TØPL | T1PL | T2PL | T3PL | T4PL | T5PL | T6PL | T7PL |
| | ACCEPT | TØAL | T1AL | T2AL | T3AL | T4AL | T5AL | T6AL | T7AL |
| PLACE CONTROL | | ISR | GR(Y) | GR(X) | ADC | DR | ADC | AOR | PUR |
| BUSS TRANSFER CONTROL | H = 1 | | XBTL | | | | | | |
| | H = Ø | | BTL | | | | | | |
| | G = 1 | | | | | | | | |
| | G = Ø | | | | | | | | |
| | | BTL | | BTL | BTL | | XBTL | | |
| REGISTER ACCEPT CONTROL | LT. HALF BIT (Ø–15) | SR | AR | DR | | | DR | | AR |
| | RT. HALF BIT (16–31) | AR,DR | | DR | | | | | |
| AR BIT SELECT | | | | | | | | | |
| LOGIC COMPARE CONTROL | | | | | | | | | |
| TRANSFER TRUE AR( )DR | | | | | | | | | |
| INSTRUCTION ADDRESS COUNTER | AOC → AOR | | | | | | | | |
| | AOR → IAR | | | | | | | | |
| COMPLEX (*) COMMUNICATION | IS {IAR → IS *AB | | | | | | | | |
| | PS {DR → IP *DB | | | | | | | | |
| | PS {ADC → PS/PU *AB | | | | | | | | |
| | PU {DR → PU *DB | | | | | | | | |
| MISC. ACTIONS | | ISR → ICR | | EA ADD | | ISDO | | O → RPF<br>X → XSR | LK ADC<br>CARRY |
| MR Ø LOAD | | ISR | | GR (X) | | DR | | AOR | |
| MR 1 LOAD | | | GR(Y) | | ADC | | ADC | | PUR |

FIG. 129F

XEC PC,Y,H

| ISR BIT | Ø | 1 | 2 | 3 | 4 | 5 | 6 | 7 | 8 | 9 | 10 | 11 | 12 | 13 | 14 | 15 | 16 … 30 31 |
|---|---|---|---|---|---|---|---|---|---|---|---|---|---|---|---|---|---|
| BINARY CODE | | | 1 | 0 | 0 | 0 | 1 | 1 | 0 | 0 | 0 | Y | Y | Y | H | P | Z |

DESCRIPTION: (2) CYCLE INSTRUCTION
CYCLE IS AT P∧(Z+GRY.H) ⟶ ICR
CYCLE EXECUTE CONTENTS OF ICR AS INSTRUCTION

COMMENTS: (1) IF INSTRUCTION AT P∧(Z+YH) IS ANY TRANSER INSTRUCTION THE MOST INSTRUCTION EXECUTED WILL BE AT TRANSFER ADDRESS IF TRANSFER OCCURS. OTHERWISE NEXT INSTRUCTION IS AT XEC+1
(2) IF INSTRUCTION AT PAC(Z+YH) IS XEC, ADDRESS RETURNED TO AFTER XEC WILL BE 1ST XEC +1 UNLESS COMMENT 1 APPLIES

CYCLE: 1

| TIMING INTERVAL | | | | | | | | | |
|---|---|---|---|---|---|---|---|---|---|
| | PLACE | TØPL | T1PL | T2PL | T3PL | T4PL | T5PL | T6PL | T7PL |
| | ACCEPT | TØAL | T1AL | T2AL | T3AL | T4AL | T5AL | T6AL | T7AL |
| PLACE CONTROL | | ISR | GR(Y) | GR(X) | ADC | DR | PUR | AOR | |
| BUSS TRANSFER CONTROL | H = 1 | | XBTL | | | | | | |
| | H = Ø | | BTL | | | | | | |
| | G = 1 | | | | | | | | |
| | G = Ø | | | | | | | | |
| | | BTL | | BTL | BTL | | | | |
| REGISTER ACCEPT CONTROL | LT. HALF BIT (Ø-15) | SR | AR | | | | ‡ GR(XSR) | | |
| | RT. HALF BIT (16-31) | | | | IAR | | ‡ GR(XSR) | | |
| AR BIT SELECT | | | | | | | | | |
| LOGIC COMPARE CONTROL | | | | | | | | | |
| TRANSFER TRUE AR( )DR | | | | | | | | | |
| INSTRUCTION ADDRESS COUNTER | AOC → AOR | | | | | | | | |
| | AOR → IAR | | | | | | | | |
| COMPLEX (*) COMMUNICATION | IS { IAR → IS *AB | | | | | | | | |
| | PS { DR → IP *DB | | | | | | | | |
| | PS { ADC → PS/PU *AB | | | | | | | | |
| | PU { DR → PU *DB | | | | | | | | |
| MISC. ACTIONS | | ISR → ICR | | EA ADD SET DCCAF | ICA.B15 ↓ IAR.B15 | ISDO | IF (RFP=1) ‡ | O → RPF X → XSR | LK ADC CARRY |
| MR Ø LOAD | | ISR | | GR(X) | | DR | | AOR | |
| MR 1 LOAD | | | GR(Y) | | ADC | | PUR | | 1'S |

FIG. 129G

XEC

ISR BIT Ø 1 2 3 4 5 6 7 8 9 10 11 12 13 14 15 16 30 31
BINARY CODE

DESCRIPTION: (2) CYCLE INSTRUCTION Z

ACTION FOLLOWS TØL DEPENDS ON INSTRUCTION BEING EXECUTED

COMMENTS:

*SEE NOTE 2 CYCLE 1; AOR CONTAINS XEC+1
ACCEPT IS CONDITIONAL ON INSTRUCTION BEING EXECUTED

CYCLE:

| | | | | | | | | |
|---|---|---|---|---|---|---|---|---|
| TIMING INTERVAL PLACE | TØPL | T1PL | T2PL | T3PL | T4PL | T5PL | T6PL | T7PL |
| TIMING INTERVAL ACCEPT | TØAL | T1AL | T2AL | T3AL | T4AL | T5AL | T6AL | T7AL |
| PLACE CONTROL | ISR | | | | | | AOR | |
| BUSS TRANSFER CONTROL H = 1 | | | | | | | | |
| BUSS TRANSFER CONTROL H = Ø | | | | | | | | |
| BUSS TRANSFER CONTROL G = 1 | | | | | | | | |
| BUSS TRANSFER CONTROL G = Ø | | | | | | | | |
| BUSS TRANSFER CONTROL | BTL | | | | | | | |
| REGISTER ACCEPT CONTROL LT. HALF BIT (Ø-15) | SR | | | | | | | |
| REGISTER ACCEPT CONTROL RT. HALF BIT (16-31) | AR, DR | | | | | | | |
| AR BIT SELECT | | | | | | | | |
| LOGIC COMPARE CONTROL | | | | | | | | |
| TRANSFER TRUE AR( )DR | | | | | | | | |
| INSTRUCTION ADDRESS COUNTER AOC→AOR | | | | | | | | |
| INSTRUCTION ADDRESS COUNTER AOR→IAR | | | | * | | | | |
| COMPLEX (*) COMMUNICATION IS {IAR→IS *AB | | | | | | | | |
| PS {DR→IP *DB | | | | | | | | |
| PS {ADC→PS/PU *AB | | | | | | | | |
| PU {DR→PU *DB | | | | | | | | |
| MISC. ACTIONS | ISR→ICR | RESET DCCAF | EA ADD | | ISDO | | O→RPF X→XSR RESET MCF | LK ADC CARRY |
| MR Ø LOAD | ISR | | | | | | AOR | |
| MR 1 LOAD | | | | | | | | |

FIG. 129H

XECN PZ, YH

ISR BIT Ø 1 2 3 4 5 6 7 8 9 10 11 12 13 14 15 16 30 31
BINARY CODE: 1 0 0 0 1 1 0 0 1 Y Y Y H P

DESCRIPTION: (2) CYCLE INSTRUCTION
CYCLE 1 IS AT NON MEMORY LOCATION P (Z + GRY. H) → ICR
GR GH + Z SPECIFIES DATA REG. OF UNIT ADDRESSED
CYCLE 2 EXECUTE CONTENTS OF ICR AS INSTRUCTION
COMMENTS: (1) INSTRUCTION STORE DATA REG. IS LOADED WITH PATTERN DESIRED USING A WISN IMMEDIATELY PRIOR TO THE XECN
(2) XECN AND ADDRESS SPECIFIED BY XECN CANNOT BE IN SAME IS UNIT
CYCLE:

MEMORY CONTROL: sm cm mn — 1 0 0 1 0 — R W MODE

| | | T0 | T1 | T2 | T3 | T4 | T5 | T6 | T7 |
|---|---|---|---|---|---|---|---|---|---|
| TIMING INTERVAL | PLACE | TØPL | T1PL | T2PL | T3PL | T4PL | T5PL | T6PL | T7PL |
| | ACCEPT | TØAL | T1AL | T2AL | T3AL | T4AL | T5AL | T6AL | T7AL |
| PLACE CONTROL | | ISR | GR(Y) | GR(X) | ADC | DR | PUR | AOR | |
| BUSS TRANSFER CONTROL | H = 1 | | XBTL | | | | | | |
| | H = Ø | | BTL | | | | | | |
| | G = 1 | | | | | | | | |
| | G = Ø | | | BTL | BTL | | | | |
| | | BTL | | | | | | | |
| REGISTER ACCEPT CONTROL | LT. HALF BIT (Ø-15) | SR | AR | | | | ‡ GR(XSR) | | |
| | RT. HALF BIT (16-31) | AR, DR | | | IAR | | ‡ GR(XSR) | | |
| AR BIT SELECT | | | | | | | | | |
| LOGIC COMPARE CONTROL | | | | | | | | | |
| TRANSFER TRUE AR( )DR | | | | | | | | | |
| INSTRUCTION ADDRESS COUNTER | AOC → AOR | | | | | | | | |
| | AOR → IAR | | | | | | | | |
| COMPLEX (*) COMMUNICATION | IS (IAR → IS *AB) | | | | | | | | |
| | PS (DR → IP *DB) | | | | | | | | |
| | PS (ADC → PS/PU *AB) | | | | | | | | |
| | PU (DR → PU *DB) | | | | | | | | |
| MISC. ACTIONS | | ISR → ICR | | EA ADD SET DCCAF | ICA.B15 ↓ IAR.B15 | ISDO | IF (RFP=1) ‡ | 0 → RPF X → XSR | LK ADC CARRY SET MCF |
| MR Ø LOAD | | ISR | | GR(X) | | DR | | AOR | |
| MR 1 LOAD | | | GR(Y) | | ADC | | PUR | | |

XECN

FIG. 129 I

ISR BIT BINARY CODE: Ø 1 2 3 4 5 6 7 8 9 10 11 12 13 14 15 16 ... 30 31 (bits 16–31: Z)

DESCRIPTION: (2) CYCLE INSTRUCTION

ACTIONS FOLLOWS TØL DEPEND ON INSTRUCTION EXECUTED

COMMENTS:

* AOR CONTAINS XECN + 1 ACCEPT IS CONDITIONAL ON INSTRUCTION BEING EXECUTED

CYCLE:

| | | TØ | T1 | T2 | T3 | T4 | T5 | T6 | T7 |
|---|---|---|---|---|---|---|---|---|---|
| TIMING INTERVAL | PLACE | TØPL | T1PL | T2PL | T3PL | T4PL | T5PL | T6PL | T7PL |
| | ACCEPT | TØAL | T1AL | T2AL | T3AL | T4AL | T5AL | T6AL | T7AL |
| PLACE CONTROL | | ISR | | | | | | | |
| BUSS TRANSFER CONTROL | H = 1 | | | | | | | | |
| | H = Ø | | | | | | | | |
| | G = 1 | | | | | | | | |
| | G = Ø | | | | | | | | |
| | | BTL | | | | | | | |
| REGISTER ACCEPT CONTROL | LT. HALF BIT (Ø-15) | SR | | | | | | | |
| | RT. HALF BIT (16-31) | AR, DR | | | | | | | |
| AR BIT SELECT | | | | | | | | | |
| LOGIC COMPARE CONTROL | | | | | | | | | |
| TRANSFER TRUE AR( )DR | | | | | | | | | |
| INSTRUCTION ADDRESS COUNTER | AOC → AOR | | | | | | | | |
| | AOR → IAR | | | | * | | | | |
| COMPLEX (*) COMMUNICATION | IS {IAR → IS *AB | | | | | | | | |
| | PS {DR → IP *DB | | | | | | | | |
| | PS {ADC → PS/PU *AB | | | | | | | | |
| | PU {DR → PU *DB | | | | | | | | |
| MISC. ACTIONS | | ISR → ICR | RESET DCCAF | EA ADD | | ISDO | | O → RPF X → XSR | LK ADC CARRY |
| MR Ø LOAD | | ISR | | | | | | AOR | |
| MR 1 LOAD | | | | | | | | | |

BUS TRANSFER CIRCUIT LEFT (BTC.L)

BUS TRANSFER CIRCUIT RIGHT (BTC.R)

EXTERNAL BUS SYSTEM WORD FORMATS

CONTROL COMPLEX FOR TSPS TELEPHONE SYSTEM

BACKGROUND AND SUMMARY

The present invention relates to a control complex for a switching system; and it has particular utility in the performance of control and maintenance functions in a TSPS telephone system. A TSPS (Traffic Service Position System) is designed to provide various operator functions for servicing toll calls, including customer-dialed toll calls and other special calls with as much of the service as possible being provided by machine, leaving only those functions which require the exercise of discretion to an operator. The center of the control system is a high-speed, programmable digital computer, and one such system is described in *The Bell System Technical Journal* of December, 1970, Vol. 49, No. 10.

The present invention contemplates operation with a TSPS telephone system which performs the same general functions as disclosed in the above-identified publication, but it incorporates certain improvements, as are disclosed more completely in the Detailed Description, particularly in the Central Processor itself, the Peripheral Unit Complex which interfaces the switching and telephony circuitry with the Central Processor, and in the combination of these two subsystems which provides a Control and Maintenance Complex for performing the various control and switching functions and for performing maintenance functions both in the TSPS system and in the Control and Maintenance Complex itself.

The various features and advantages of the present system will become apparent to those skilled in the art from the following detailed description of a preferred embodiment accompanied by the attached drawing.

THE DRAWING

Figure 29:
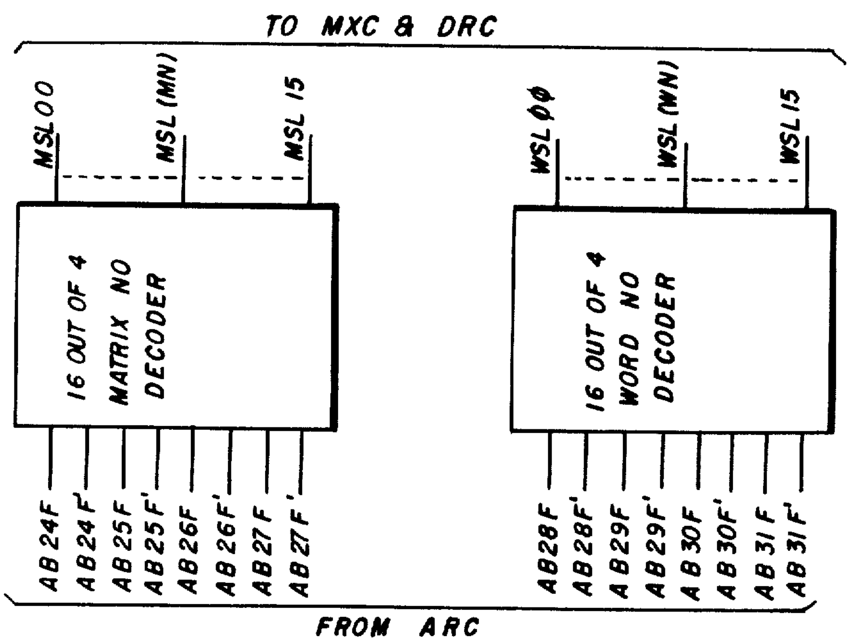
Figure 28:
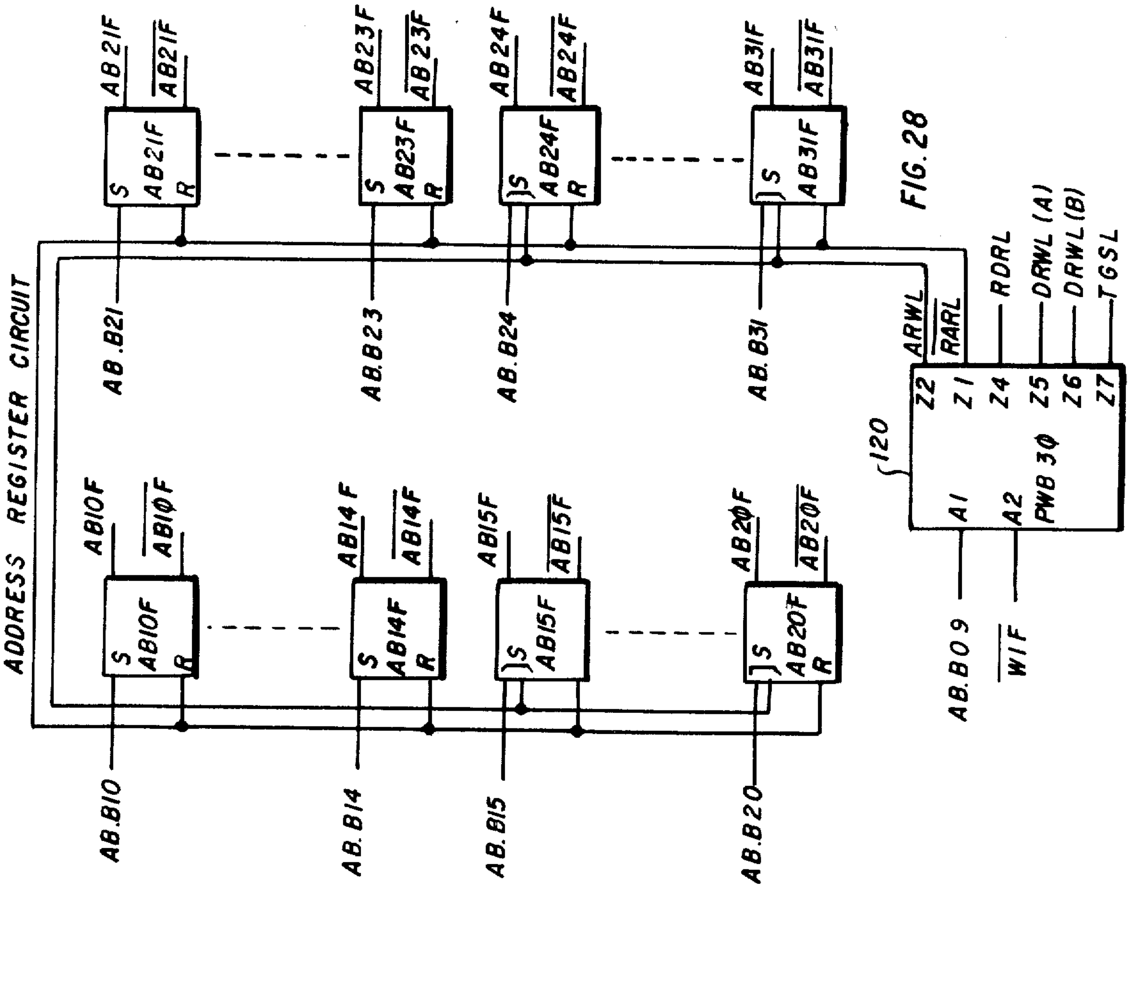
Figures 30, 31, 32:
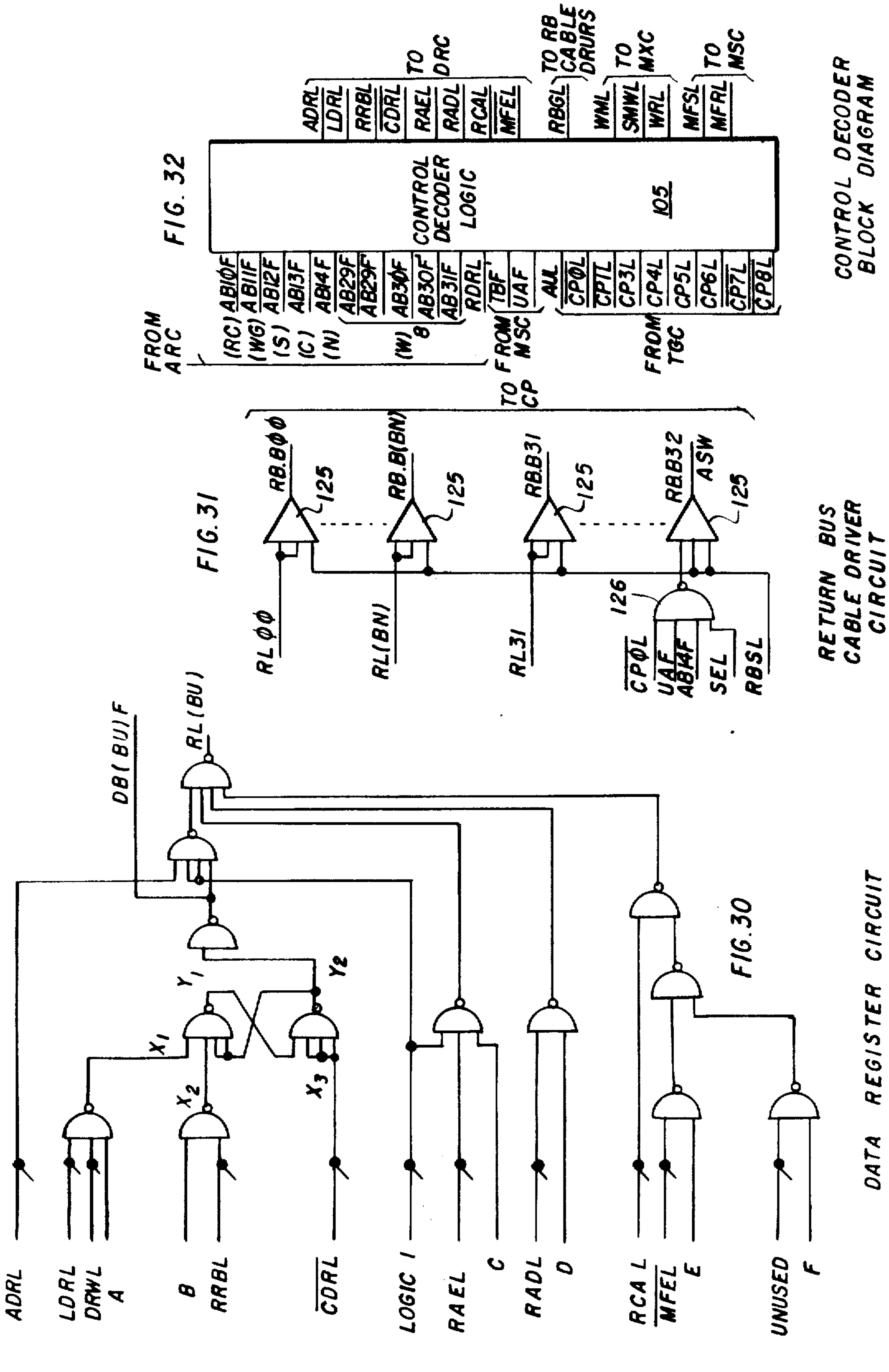
Figure 41:
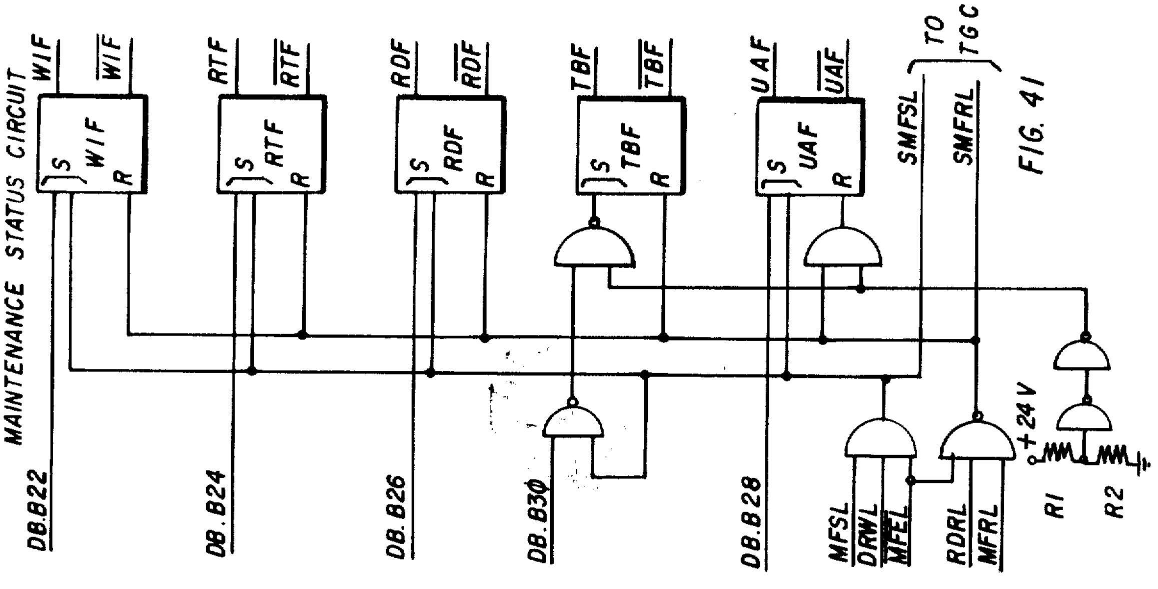
Figure 46:
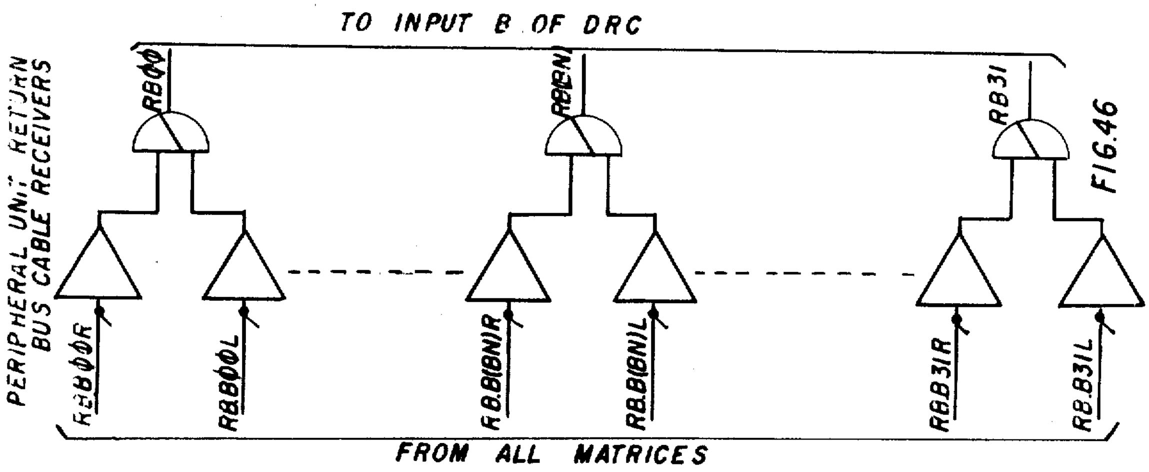
Figure 45:
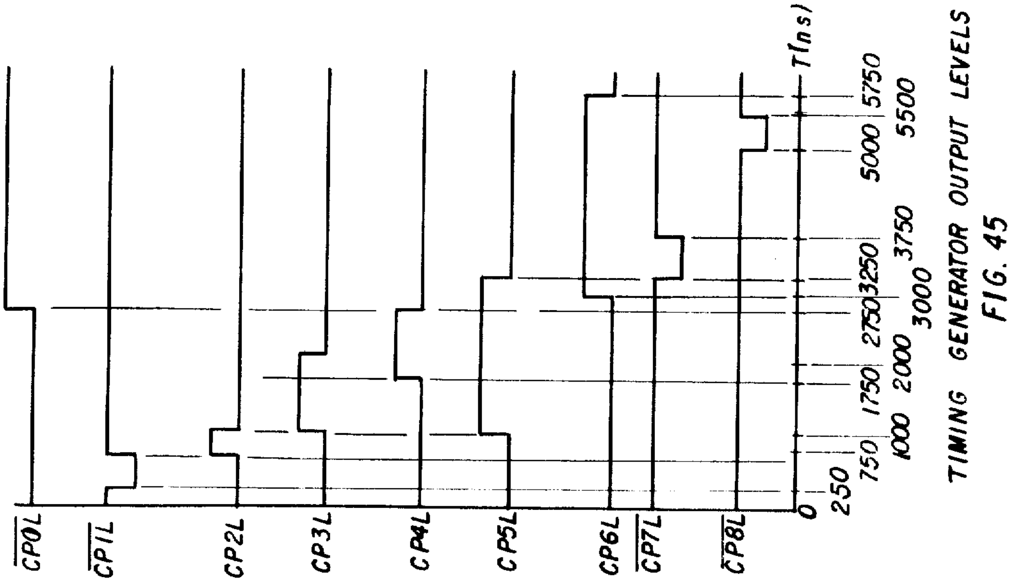
Figure 47:
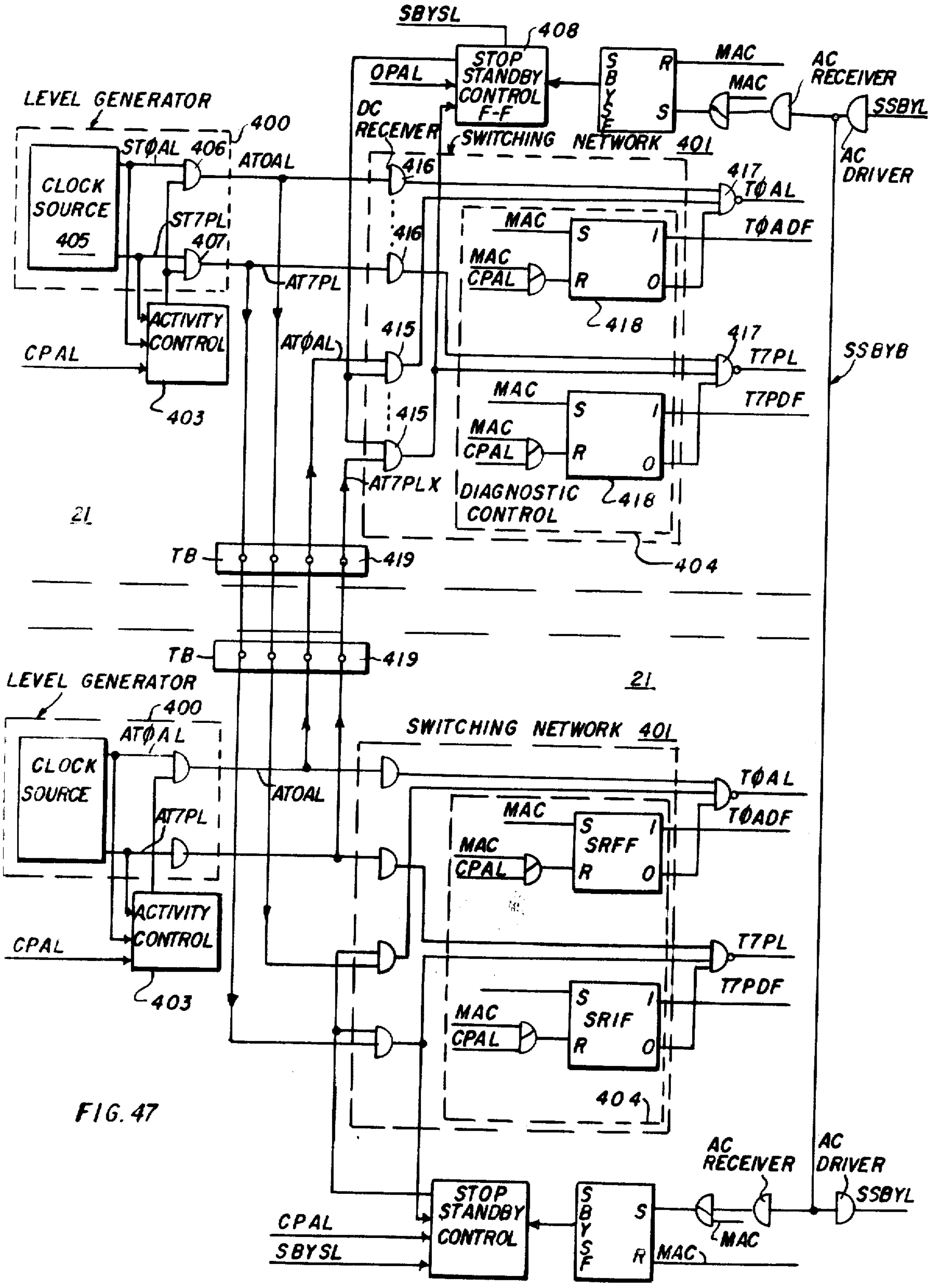
Figure 48:
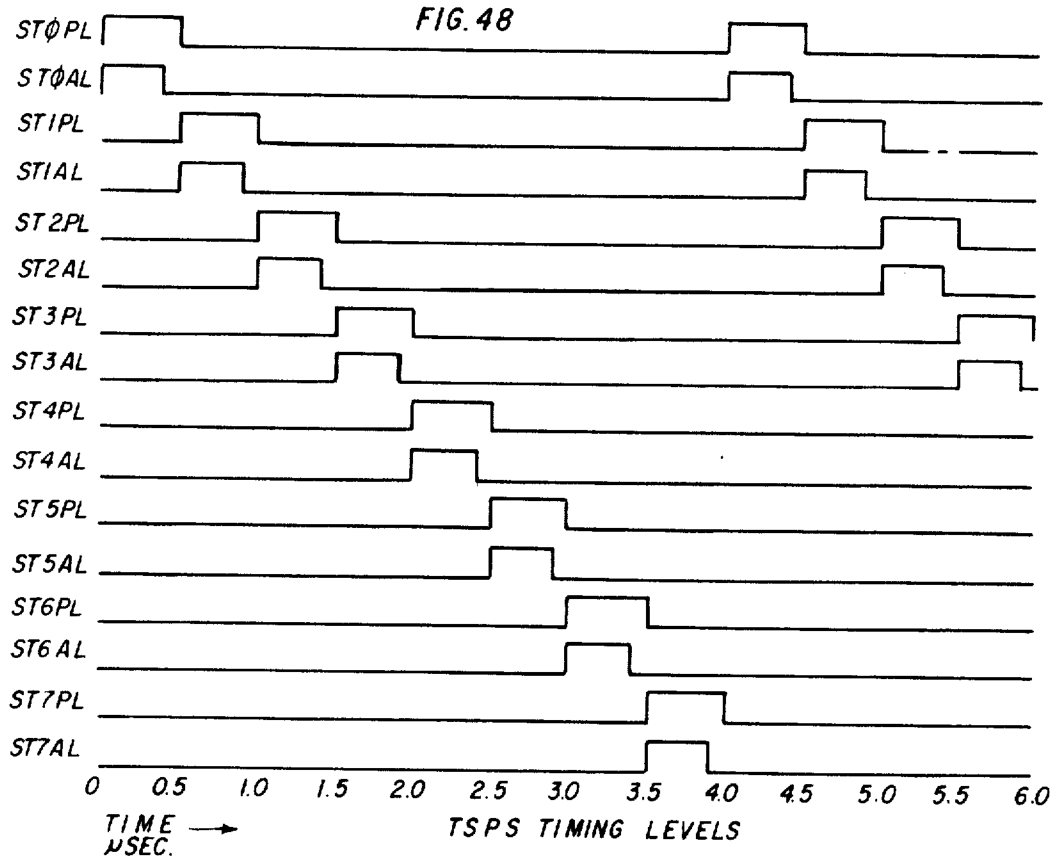
Figure 49:
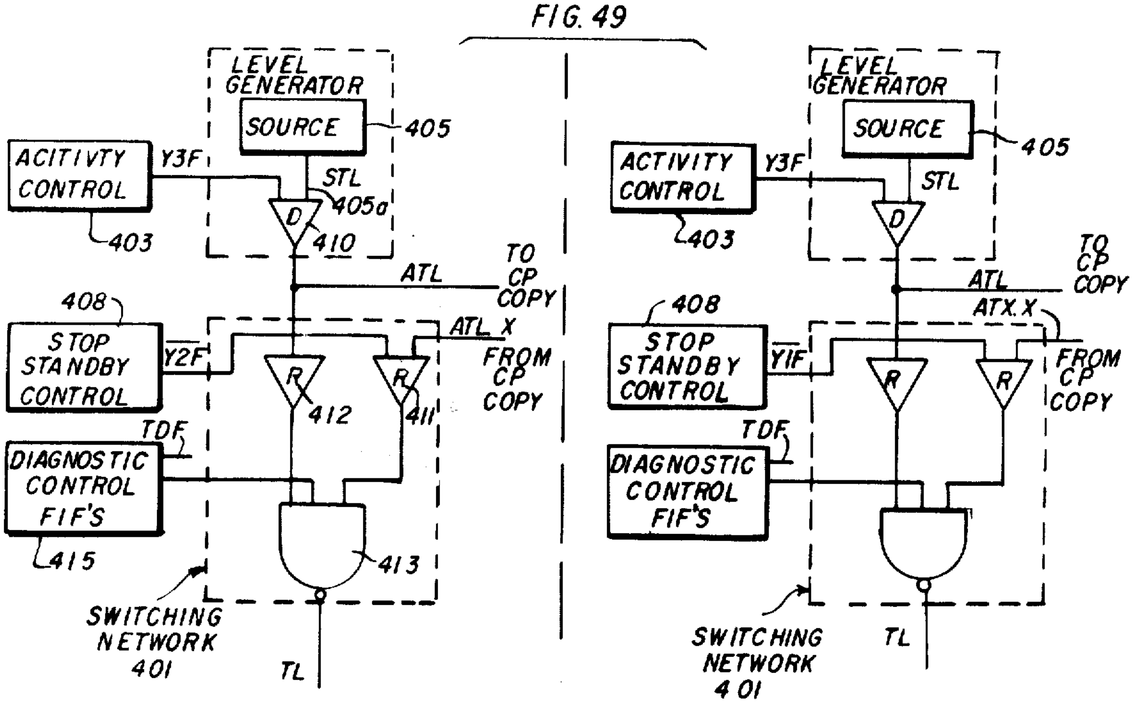
Figure 50:
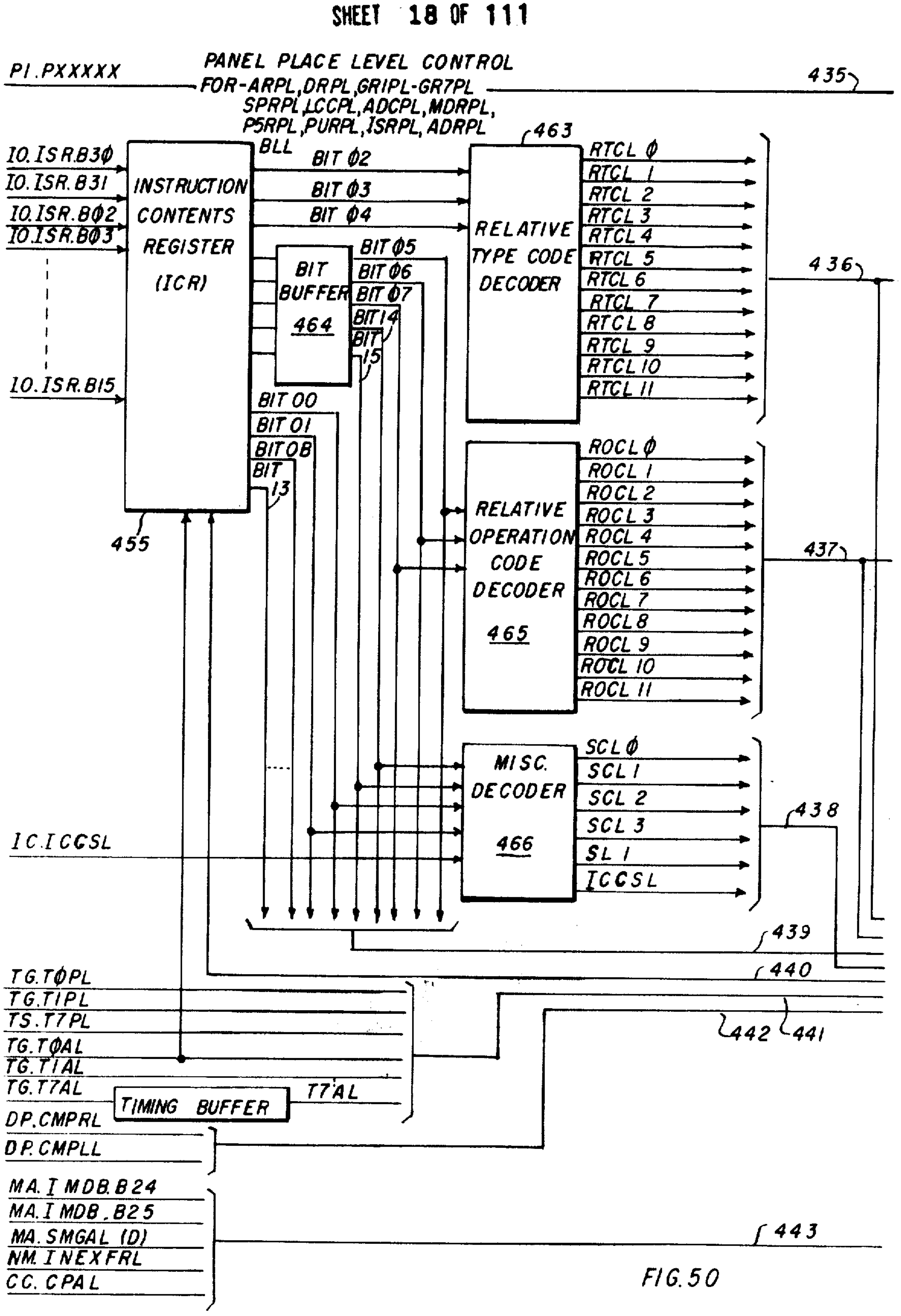
Figure 50A:
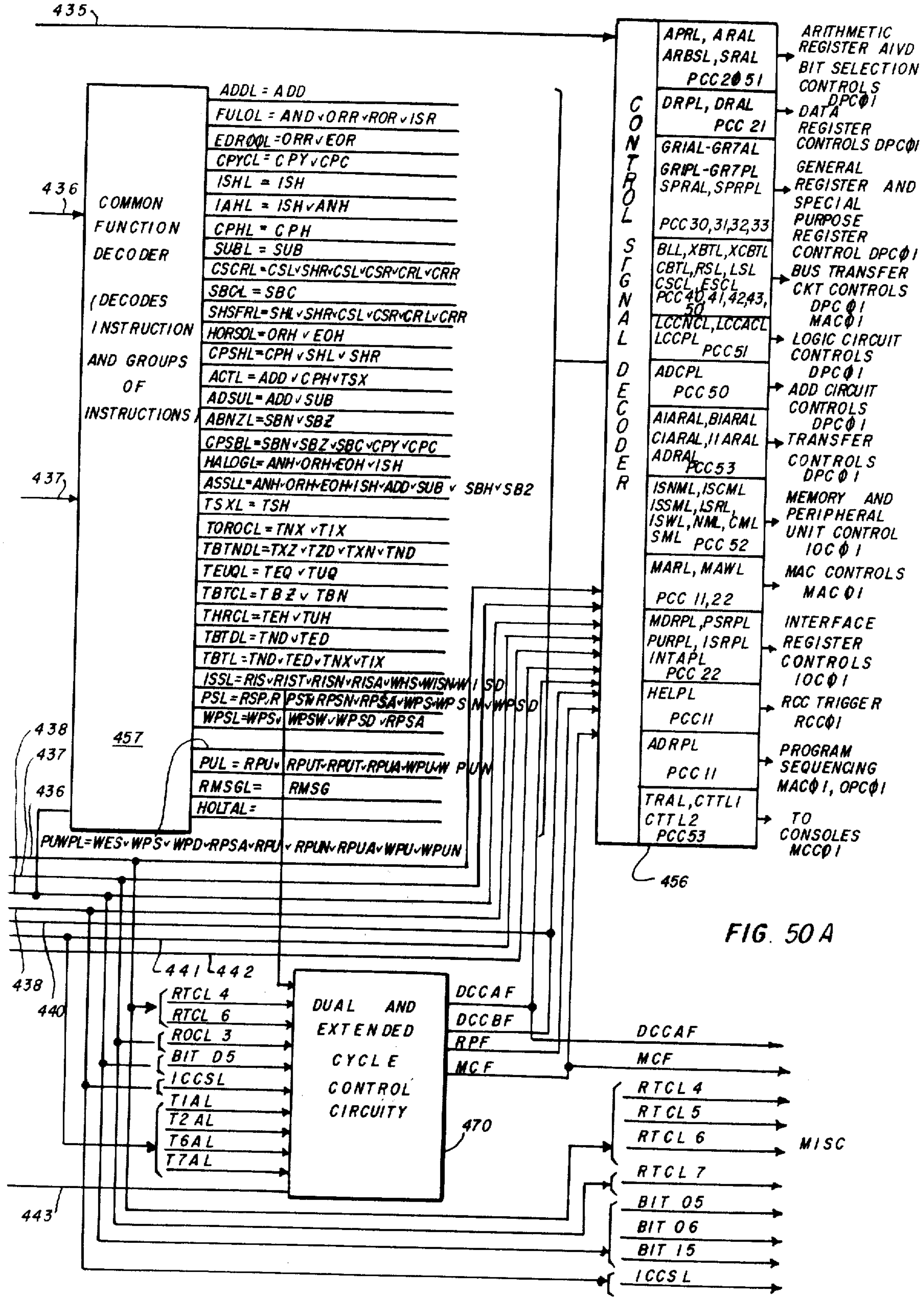
Figure 51:
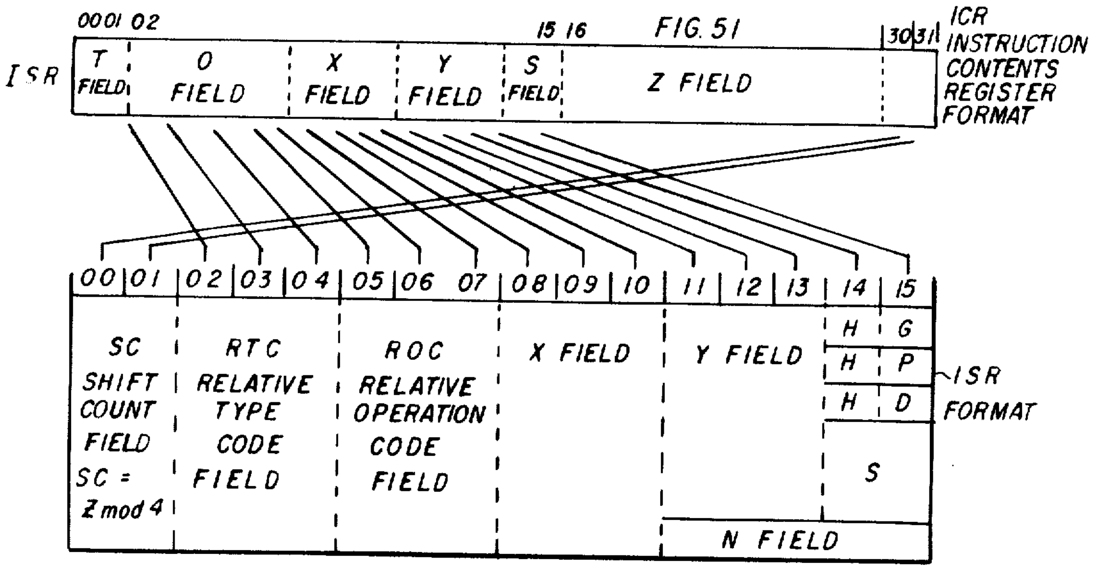
Figure 52:
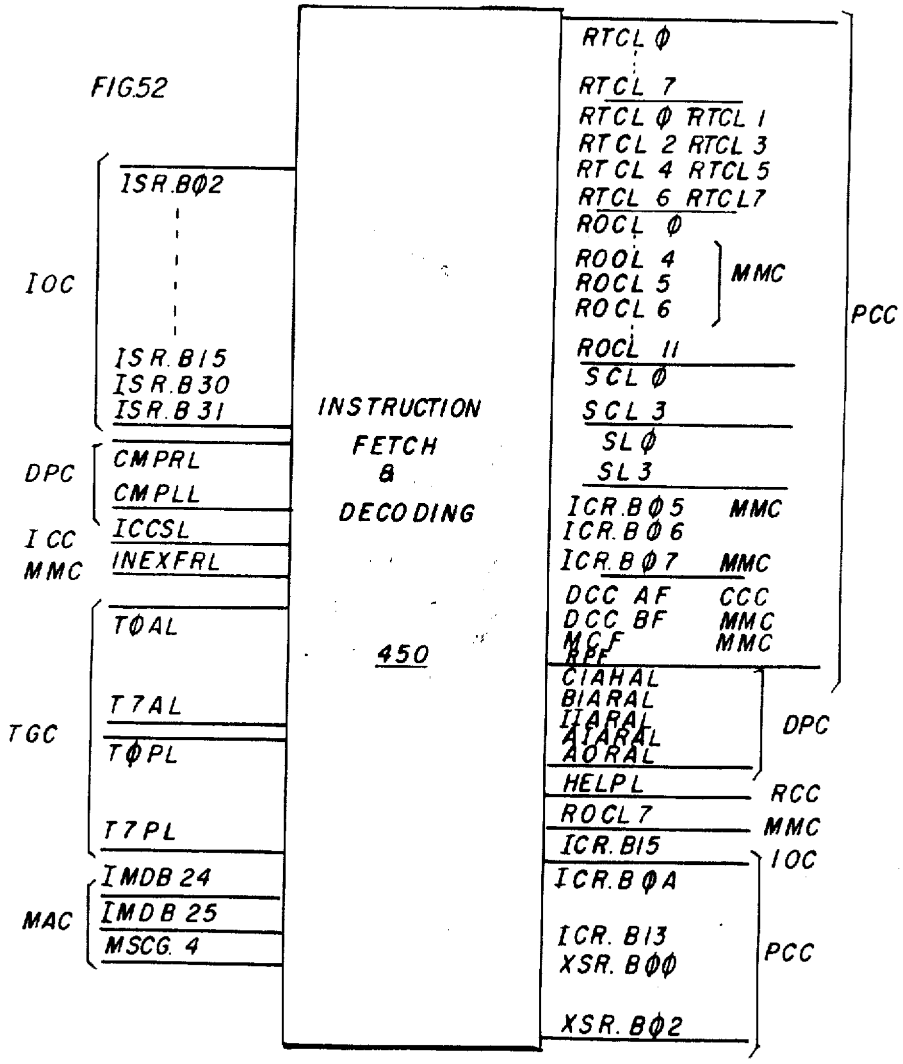
Figure 60:
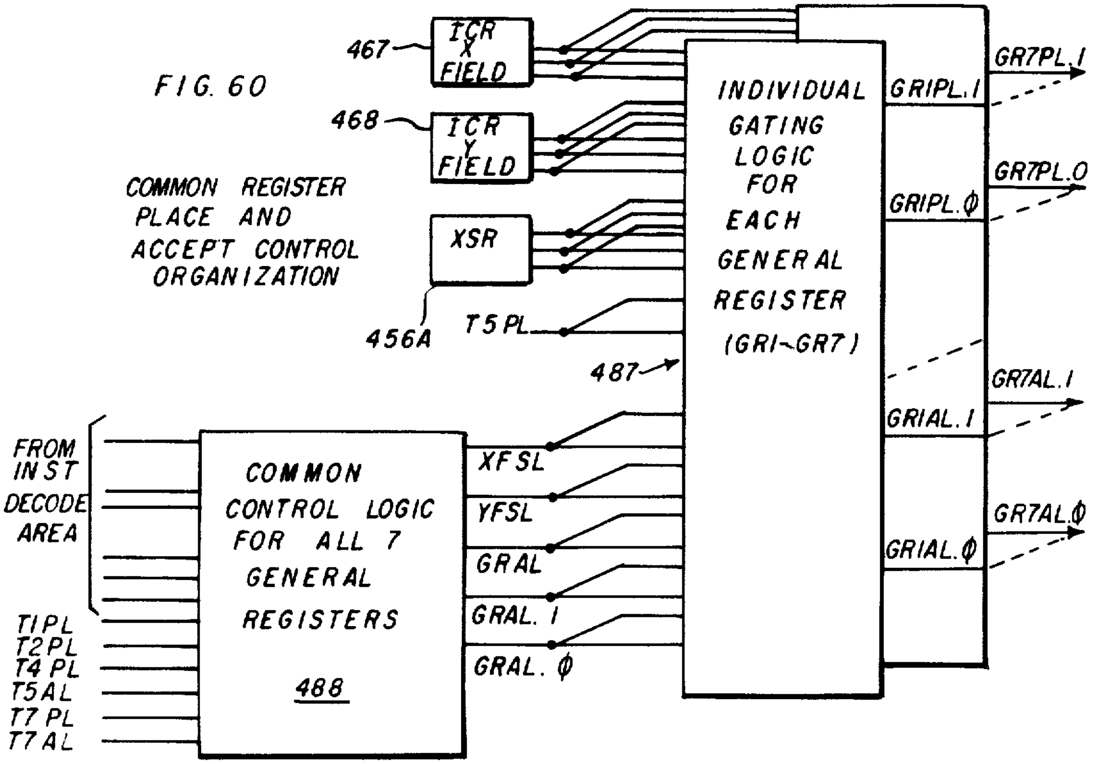
Figure 61:
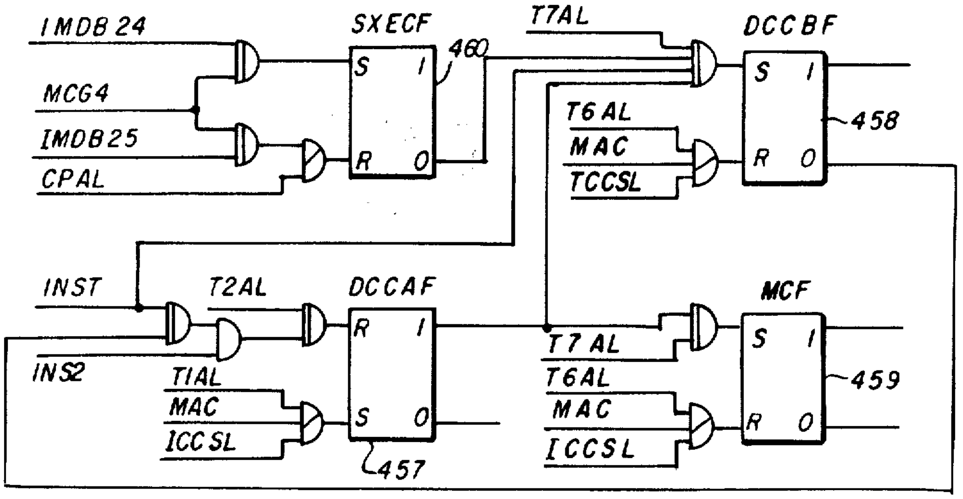
Figure 62:
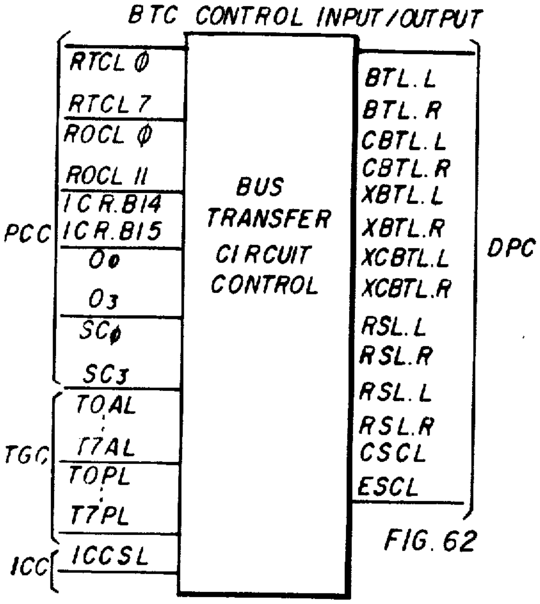
Figure 63:
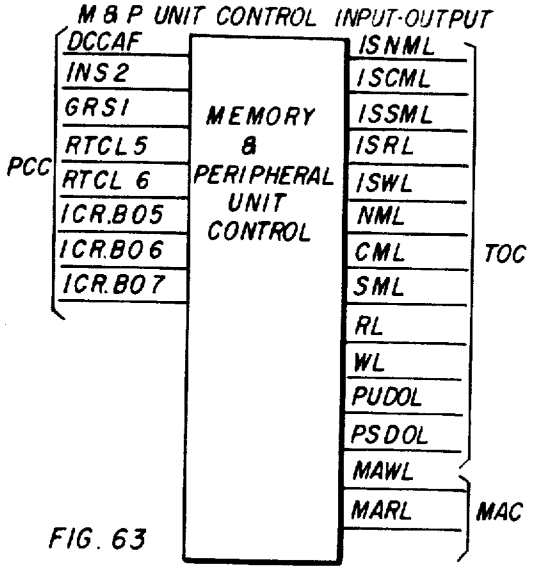
Figure 64:
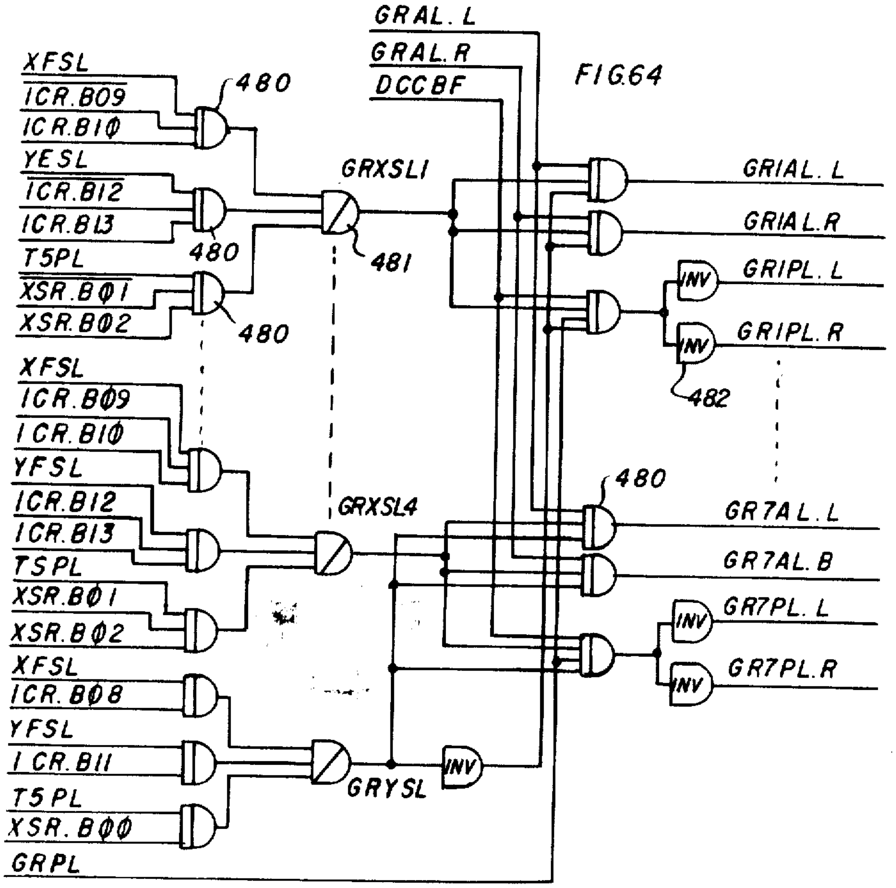
Figure 130:
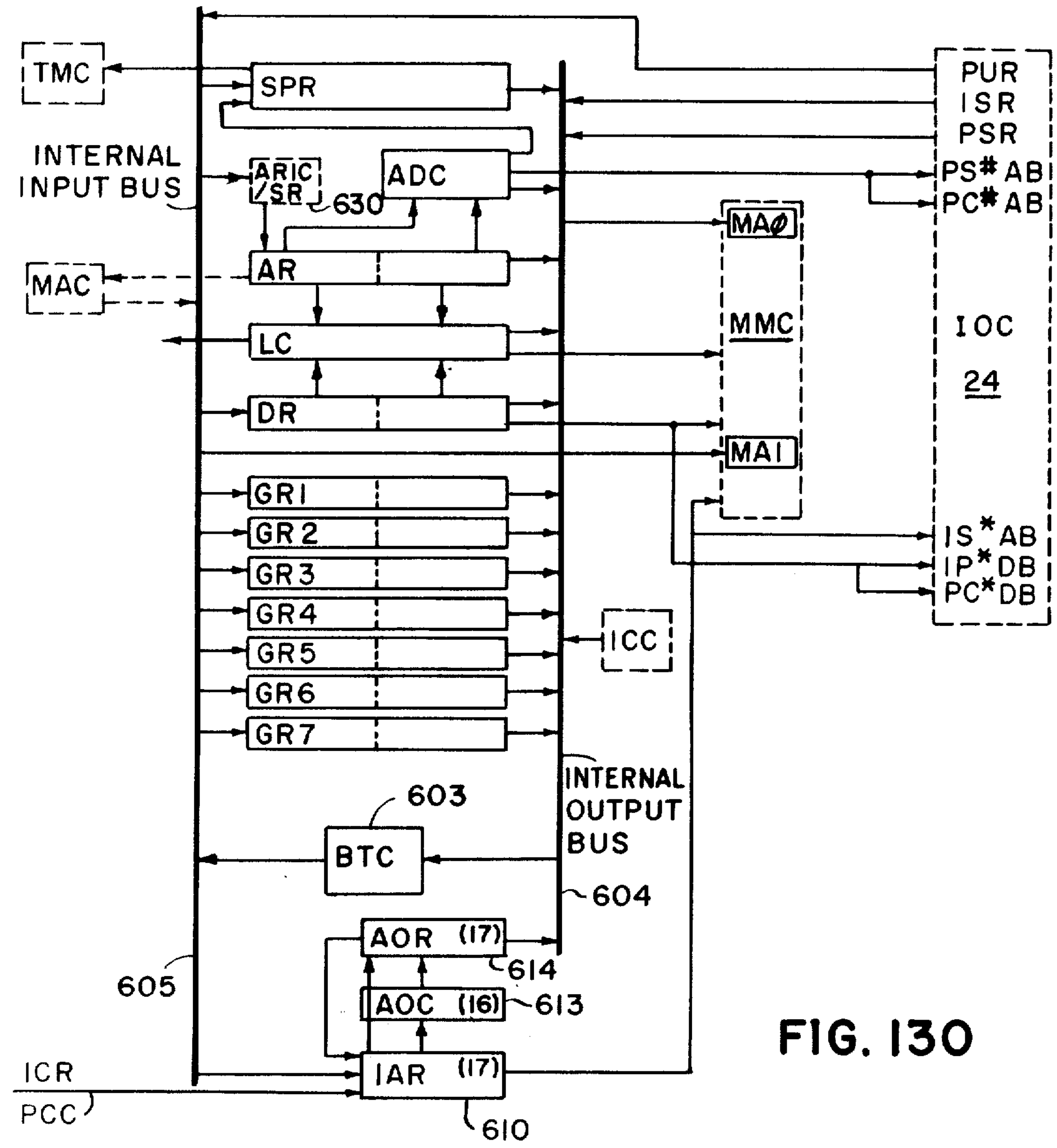
Figure 131:
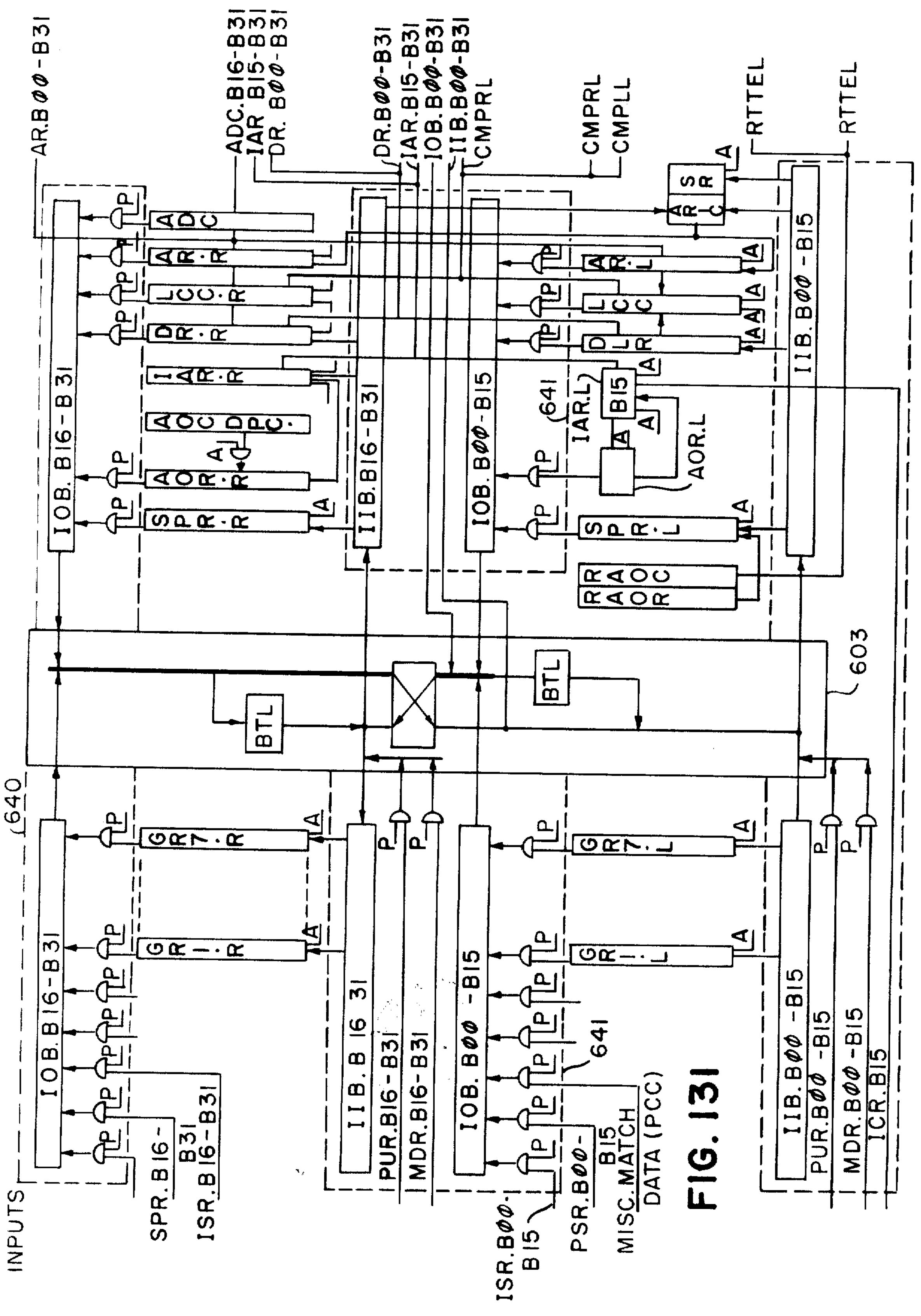
Figure 132:
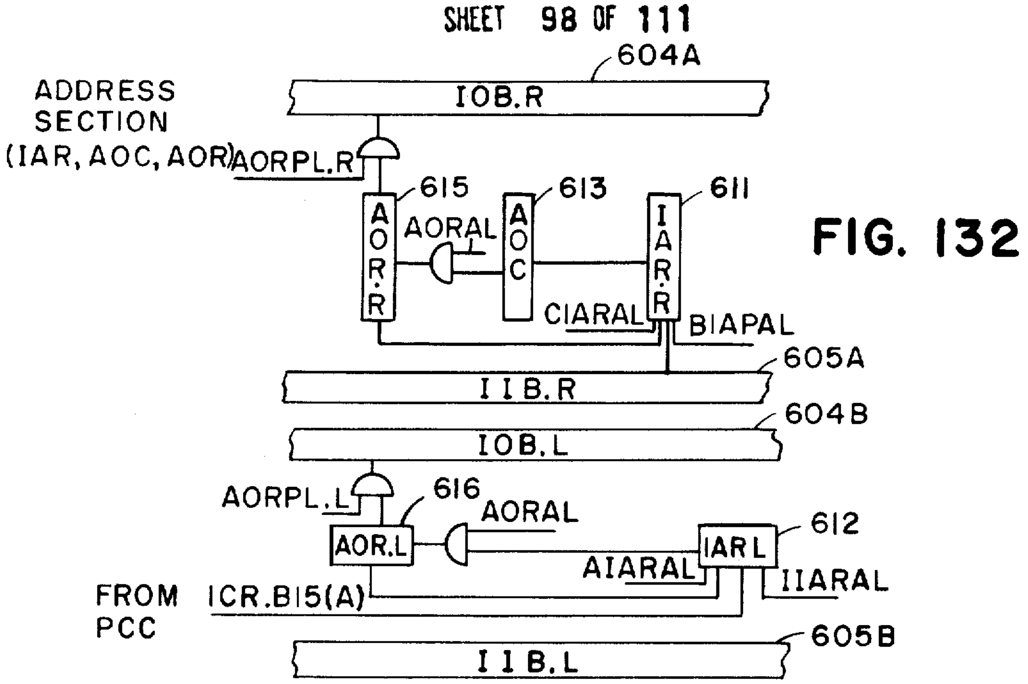
Figures 139, 140, 140A, 141, 142:
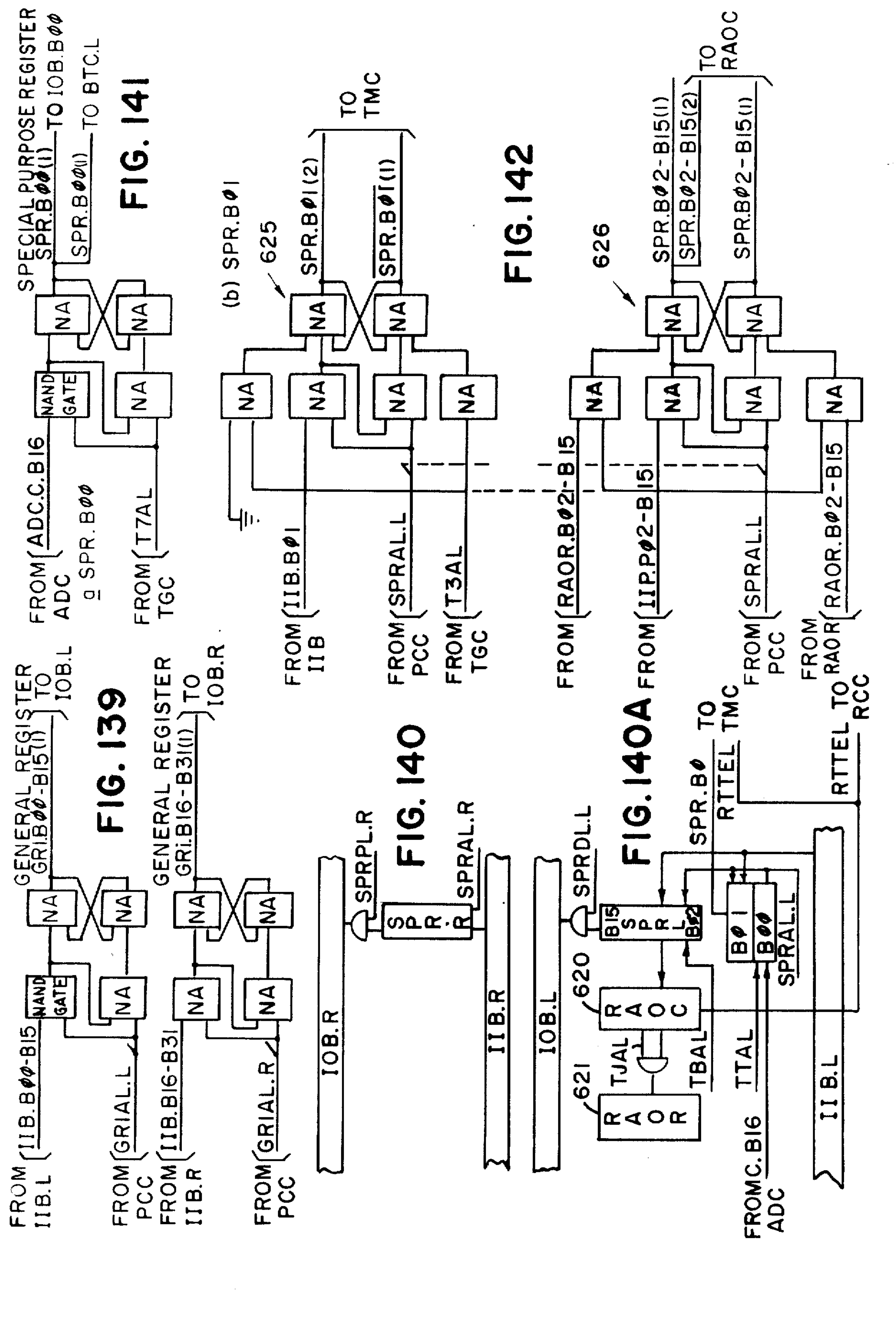
Figure 143:
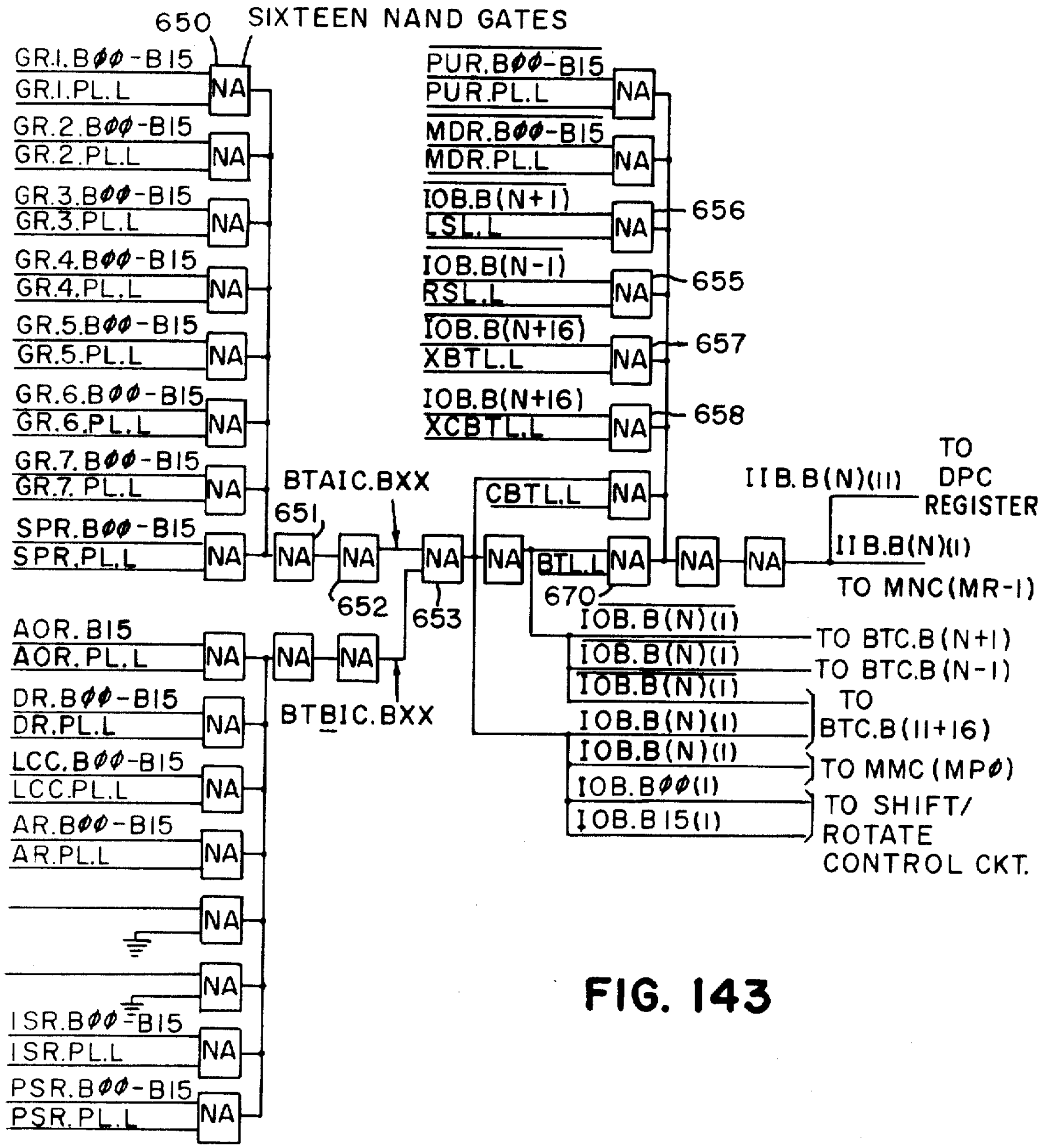
Figure 144:
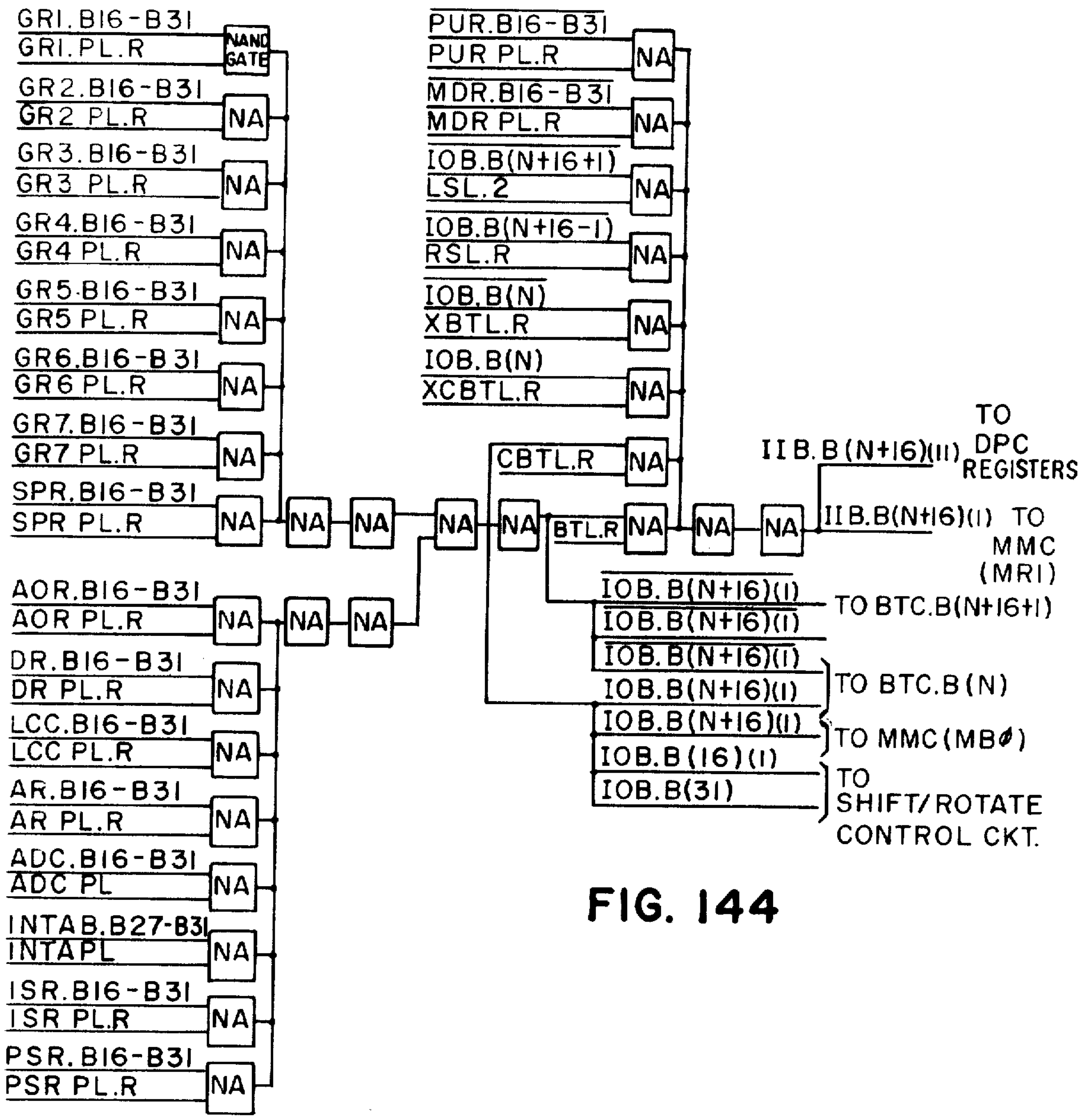
Figure 145:
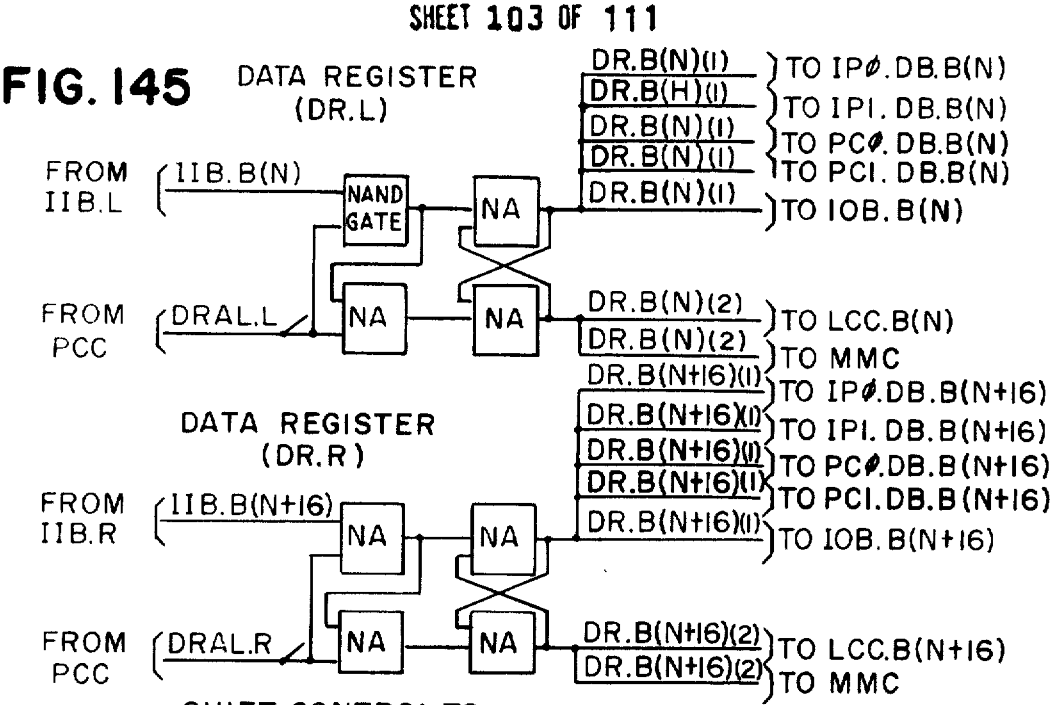
Figures 146, 147, 148:
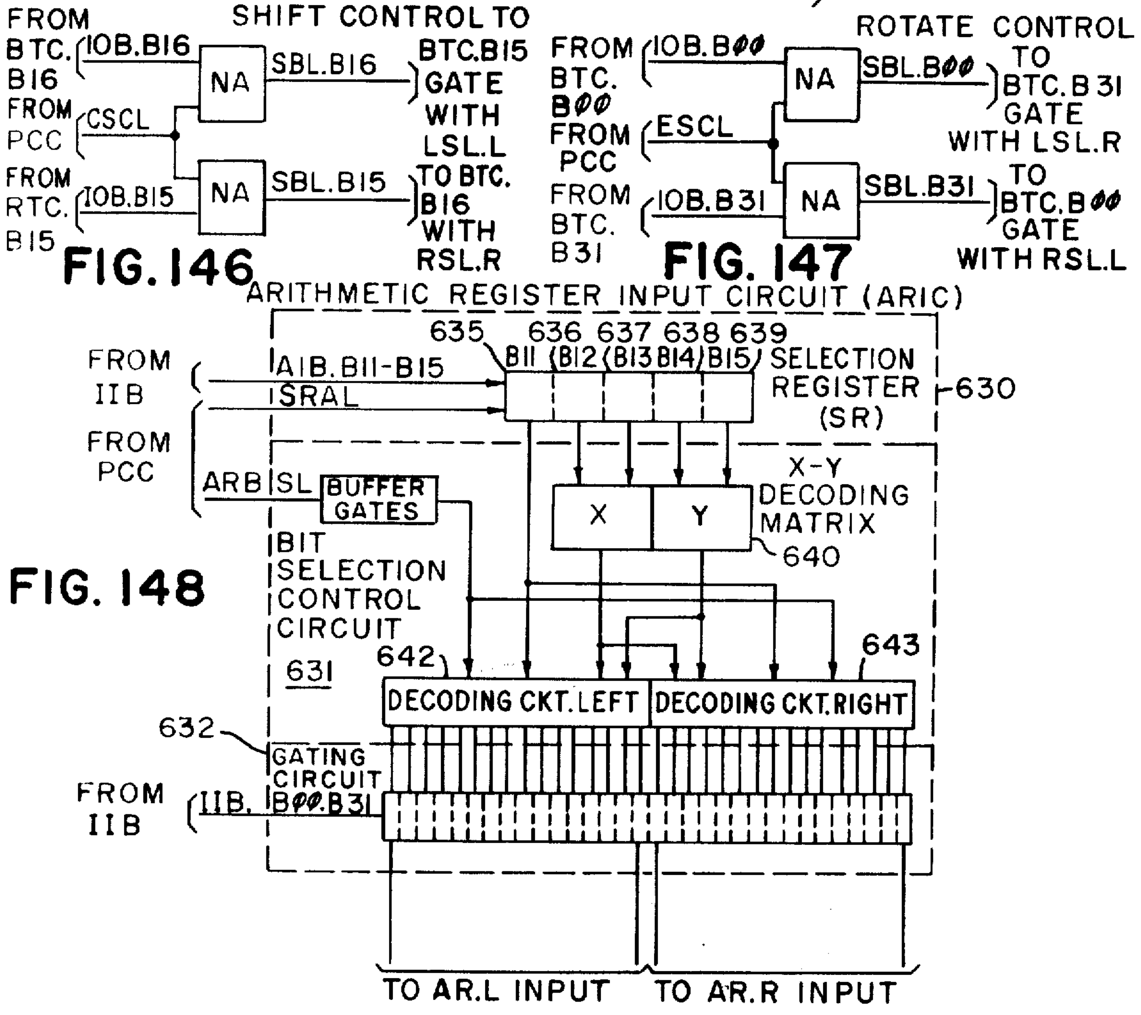
Figures 149, 150, 151, 152, 153:
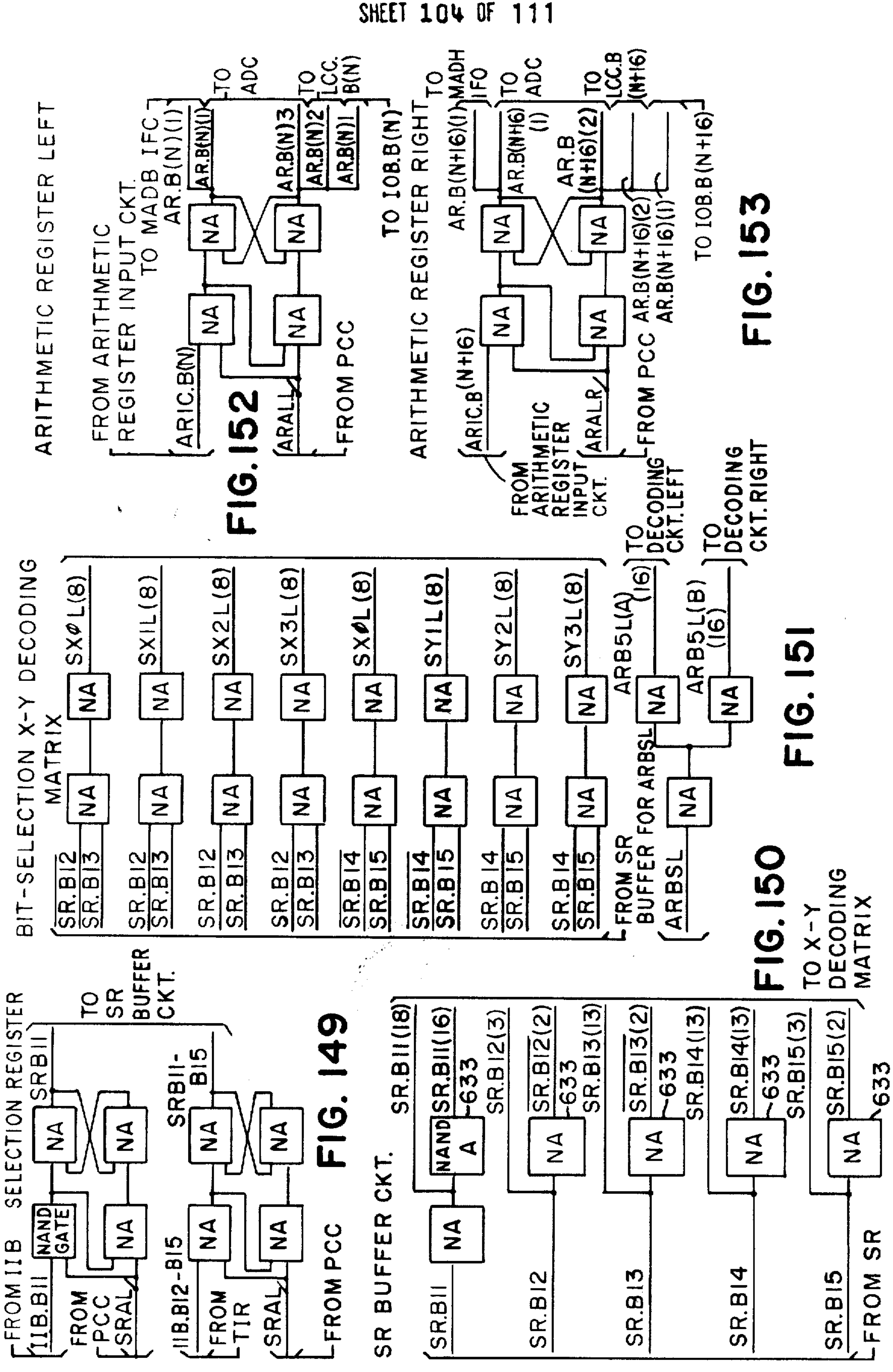
Figures 154, 155:
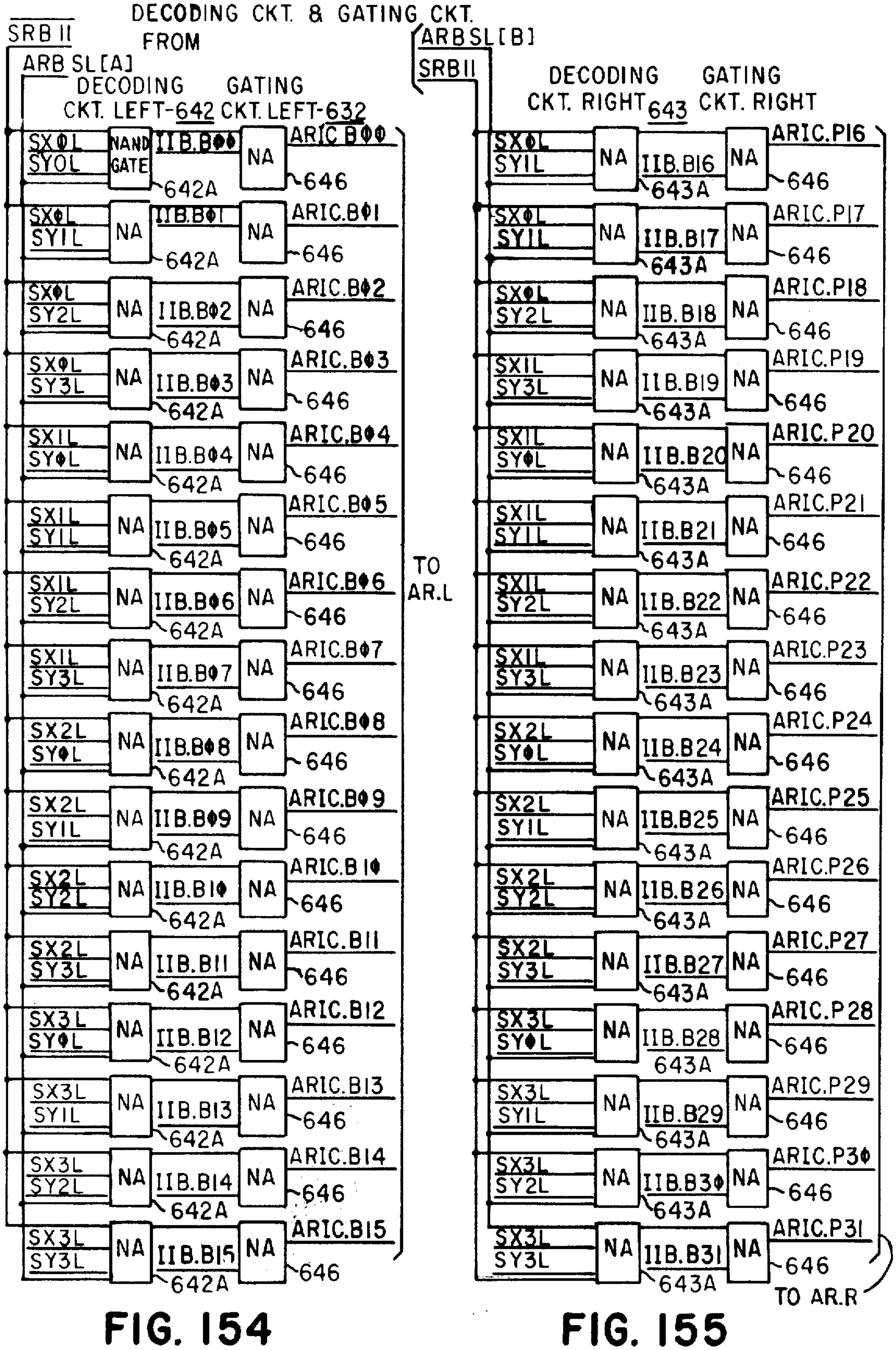
Figures 156, 157, 158:
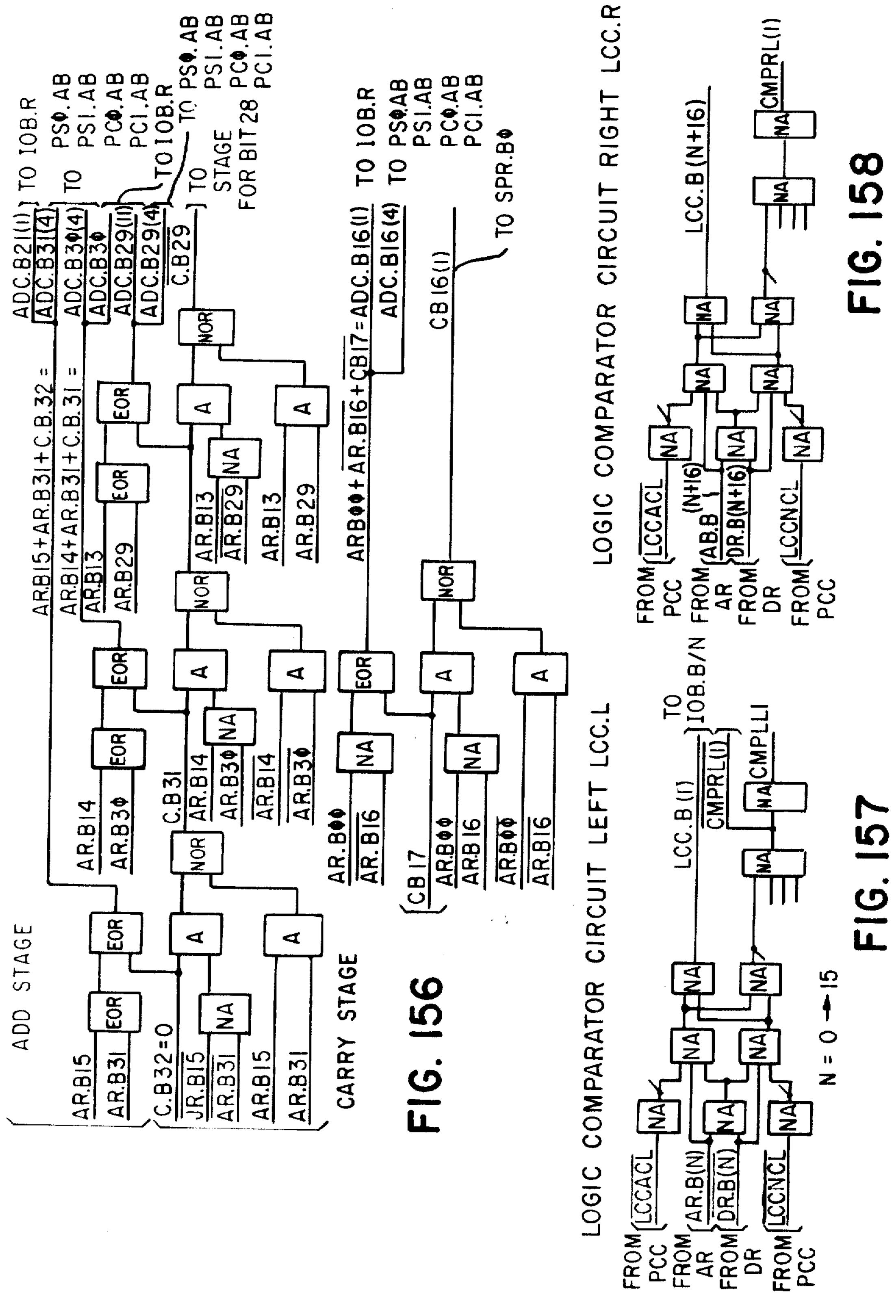
Figure 159:
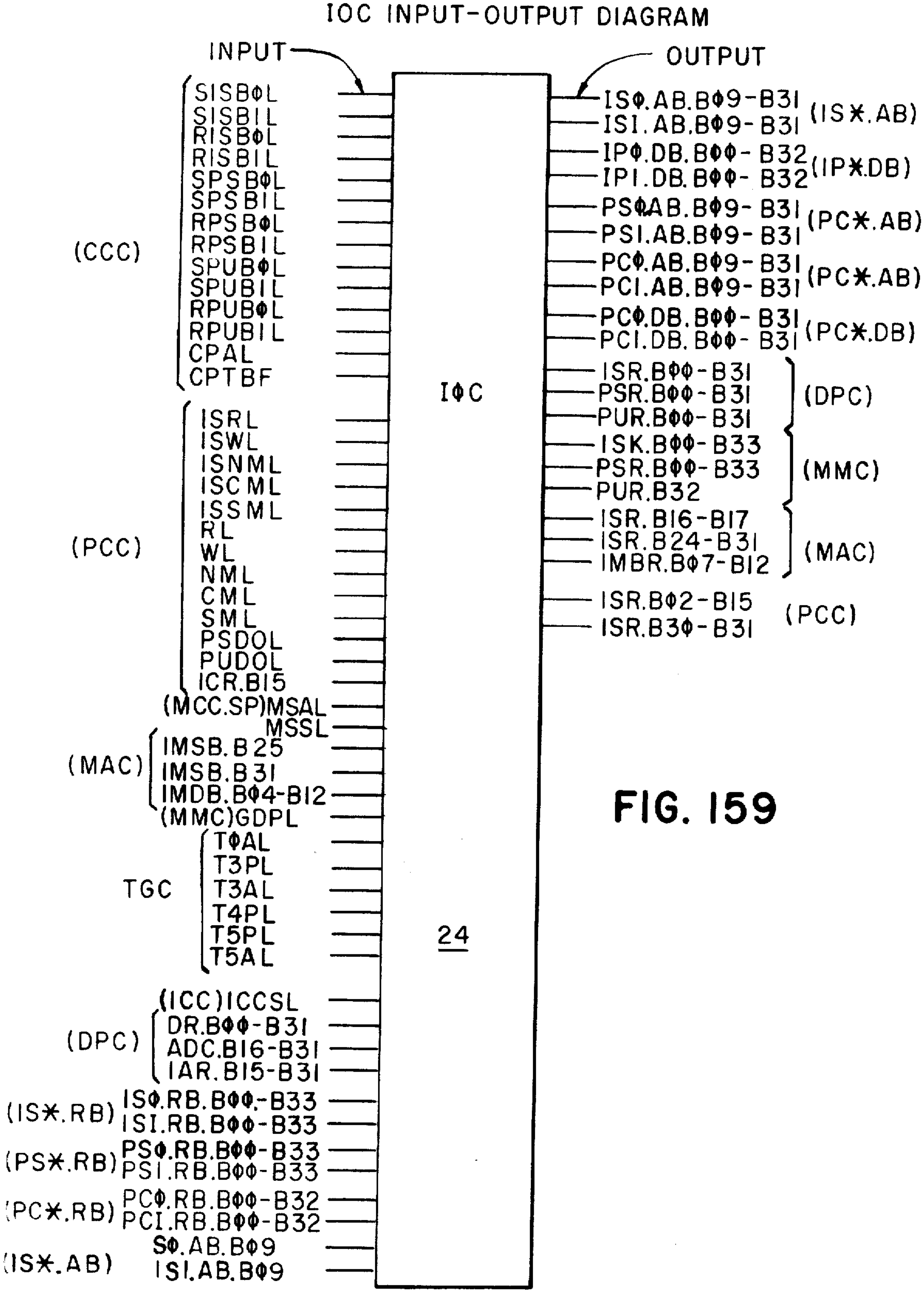
Figure 160:
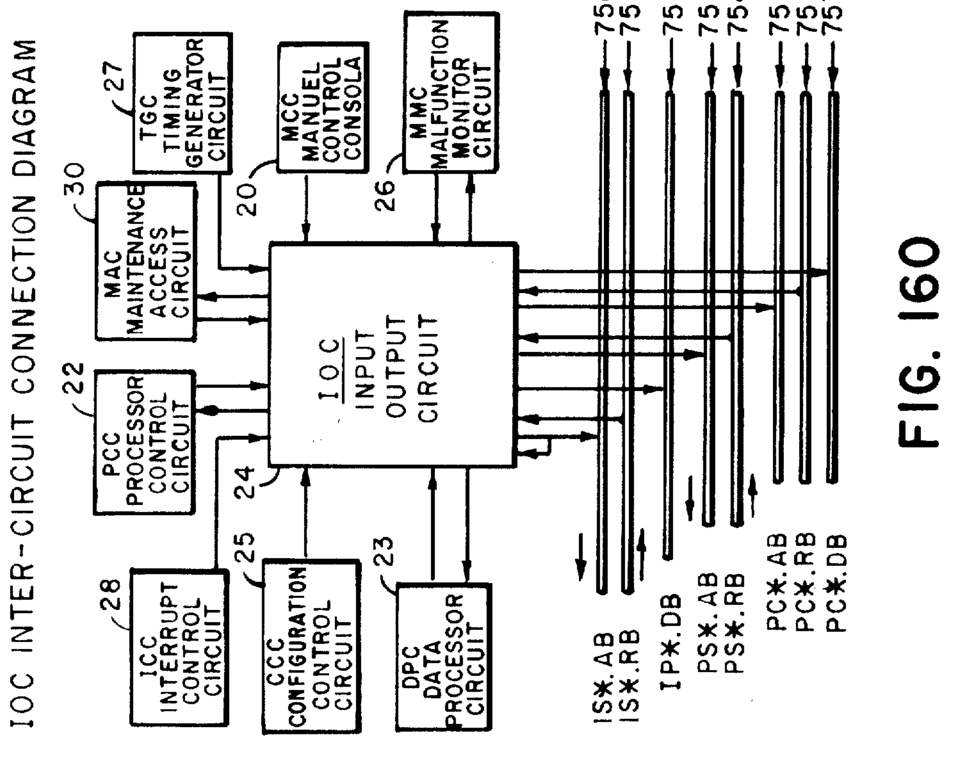
Figure 169:
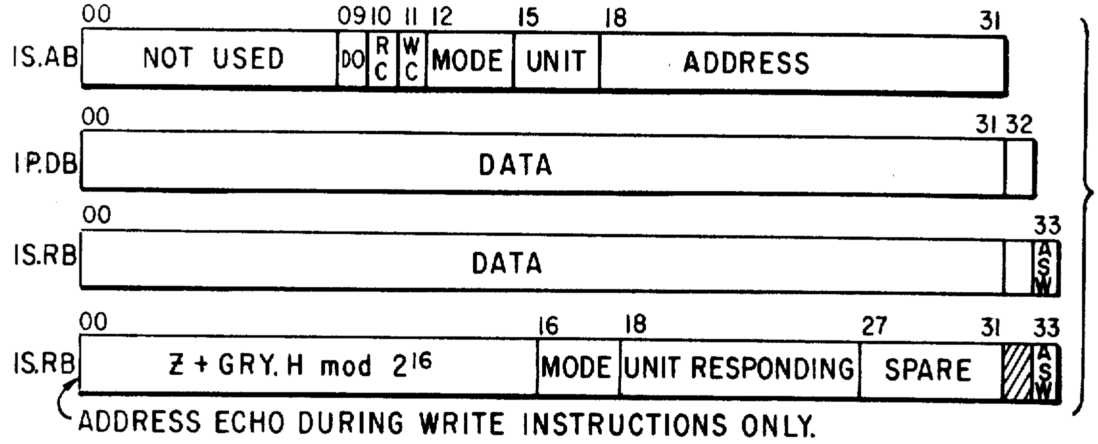
Figure 170:
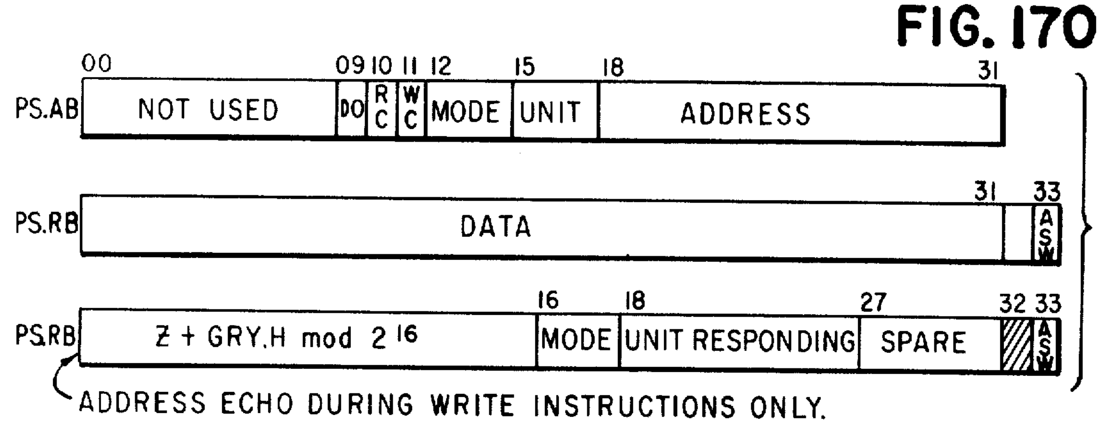
Figure 171:
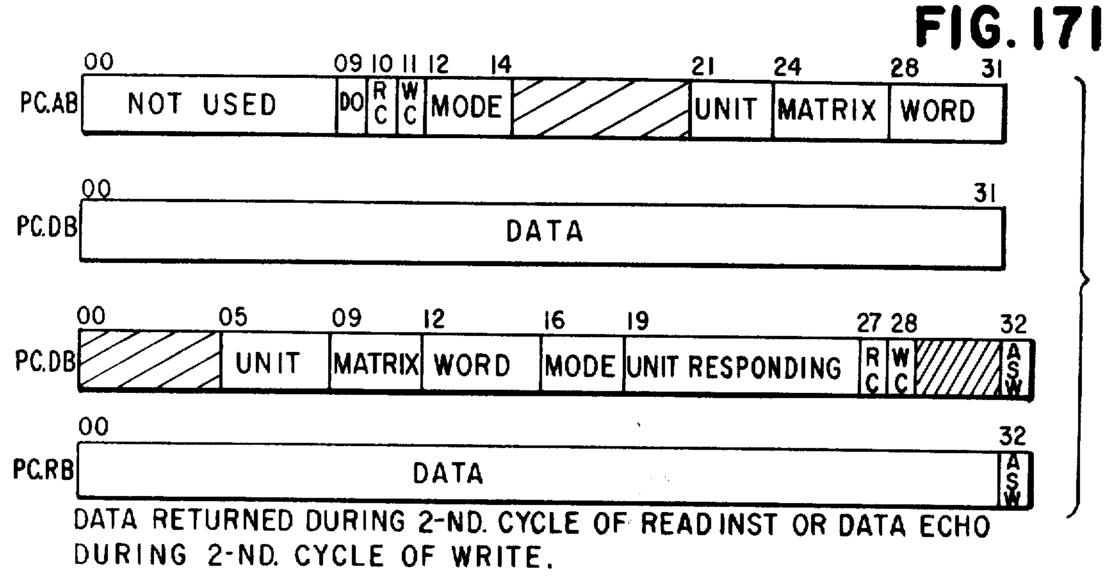

FIGS. 28–30 respectively are functional block diagrams for the Address Register Circuit, Address Decoder Circuit, and Data Register Circuit in the Peripheral Controller;

FIG. 31 shows the return bus cable driver circuit for the Peripheral Controller;

FIG. 32 is a functional block diagram for the Control Decoder in the Peripheral Unit;

FIGS. 33–40 are functional block diagrams of the Matrix Access Circuit in the Peripheral Controller;

FIG. 41 is a functional block diagram of the Maintenance Status Circuit of the Peripheral Controller;

FIGS. 42–45 illustrate the Timing Generator Circuit for the Peripheral Controller;

FIG. 46 is a functional block diagram showing the Return Bus Cable Receivers for the Peripheral Unit;

FIG. 47 is a logic diagram, partially in functional block form, of the Timing Generator Circuit of the Central Processor;

FIG. 48 is a timing diagram for the various timing levels in the TSPS System;

FIG. 49 is a logic diagram showing timing control circuitry within the Timing Generator Circuit;

FIGS. 50 and 50A comprise a functional block diagram for the Processor Control Circuit in the Central Processor, with the various input and output signals being labelled;

FIG. 51 diagrammatically illustrates the instruction formal in an instruction word and its relation to the instruction contents of the Instruction Content Register of the Processor Control Circuit;

FIG. 52 is a functional block diagram of the Instruction Fetch and Decoding Circuit of the Processor Control Circuit;

FIGS. 53–59 illustrate the various decoding procedures in the Processor Control Circuit;

FIG. 60 is a functional block diagram of the gating within the Processor Control Circuit for the General Register of the Data Processor Circuit;

FIG. 61 is a logic diagram for the Dual Cycle Controller of the Processor Control Circuit;

FIGS. 62–64 are functional and logic diagrams for level generators within the Processor Control Circuit;

FIGS. 65–67 are decoding charts for instructions in the Processor Control Circuit;

FIG. 68 is a logic diagram illustrating the circuitry for accomplishing the various shifts of data in the CP;

FIGS. 69–129 and FIGS. 129A–129I are timing diagrams illustrating the timing for the transfer of data between circuits in the Central Processor for each Instruction Word in the Central Processor;

FIG. 130 is a functional block diagram of the Data Processor Circuit;

FIG. 131 is another functional block diagram of the Data Processor Circuit showing in more detail the gating of the various registers by the Bus Transfer Circuit;

FIG. 132 is a logic diagram showing the address section of the Data Processor Circuit;

FIGS. 133–139 are logic diagrams showing various circuit details within the Address Section of the Data Processor Circuit;

FIGS. 140 and 140A are logic diagrams showing the Special Purpose Register of the Data Processor Circuit;

FIGS. 141 and 142 are detailed logic diagrams of the circuitry within the Special Register Section;

FIGS. 143 and 144 are detailed logic diagrams of the left and right sections respectively of the Bus Transfer Circuit within the Data Processor Circuit;

FIG. 145 is a logic diagram of the Data Register in the Data Processor Circuit;

FIGS. 146 and 147 are circuit diagrams for the Shift Control and Rotate Control in the Bus Transfer Circuit;

FIG. 148 is a functional block diagram of the Arithmetic Register Input Circuit;

FIGS. 149–151 are detailed logic diagrams of circuits within the Arithmetic Register Input Circuit;

FIGS. 152 and 153 illustrate the left and right halves of the Arithmetic Register respectively;

FIGS. 154 and 155 are logic circuit diagrams of the left and right half decoding and gating circuitry respectively in the Arithmetic Register Input Circuit;

FIG. 156 is a logic diagram of the Add Circuit in the Data Processor Circuit;

FIGS. 157 and 158 are logic diagrams of the left and right half sections respectively of the Logic Comparator Circuit in the Data Processor Circuit;

FIG. 159 is a functional block diagram of the Input/Output Circuit showing the various input and output signals thereof;

FIG. 160 is a functional block diagram showing communication links between the Input/Output Circuit and other circuits in the Central Processor;

FIGS. 161–168 are detailed logic diagrams respectively illustrating Input/Output Circuit Gating for the IS Address Bus, IP Data Bus; PS Address Bus, PC Address Bus, PC Data Bus, IS Return Bus, PS Return Bus, and PC Return Bus; and FIGS. 169–171 diagrammatically illustrate the word formats on the external bus system communicating with the Input/Output Circuit.

TABLE OF CONTENTS

I. Introduction — TSPS
II. Peripheral Unit Complex
III. Central Processor
A. Introduction
B. Timing Generator Circuit (TGC)
C. Processor Control Circuit (PCC)
D. Data Processing Circuit (DPC)
E. Input-Output Circuit (IOC)

DETAILED DESCRIPTION

I. Introduction—TSPS

As already mentioned, the primary function of the TSPS System is to provide data processor control of the various functions in toll calls which in the past have been performed by operators but have not required the exercise of discretion on the part of the operator. At the same time, the system must permit operator intervention, as required. Thus, various trunks from an end office to a toll center pass through the TSPS System, and these are commonly referred to as Access Trunks, functionally illustrated in FIG. 1 by the block 10. The access trunks are connected to and pass through access trunk circuits in a network complex 11 which is physically located at the same location as the TSPS base unit, and the network complex 11 permits the system to access each individual trunk line to open it or control it, or to signal in either direction. There is no switching or re-routing of trunks or calls at this location. Each trunk originating at a particular end office is permanently wired to a single termination in a remote toll office while passing through a TSPS network complex or trunk circuit en route.

The various access trunks may originate at different end offices, but regardless of origin, they are served in common by the TSPS System and the operators and traffic office facilities associated with that system. Hence, the equipment interfaces with various auxiliary equipment incidental to gaining access to the throughput access trunks, including remote operator positions, equipment trunks, magnetic tape equipment for recording charges, and various other equipment diagrammatically illustrated by the block 12. Additional details regarding the network complex 11 and the auxiliary equipment and communication lines 12 for a TSPS System may be obtained from the above-identified publication of December, 1970, in the Bell System Technical Journal.

The present invention is more particularly directed to the data processor which controls the telephony and to the interfacing of the data processor with the tlelphony circuits and equipment. It will be observed that the telephony equipment is about three orders of magnitude in time slower, on the average, than is necessary to execute individual instructions in modern high-speed digital computers. For example, for the present system a clock increment for the Central Processor is 4 microseconds whereas the trunk circuits are sampled every 10 milliseconds. Hence many functions can be performed in the data processor, including internal and external maintenance, table look-ups, computations, monitoring of different access trunks, etc. between the expected changes in a given trunk.

The TSPS System uses a stored program control as a means of attaining reliability and flexibility for varied operating conditions. A stored program control system consists of memories for instructions and data and a processing unit which performs operations, dictated by the stored instructions, to monitor and control peripheral equipment.

A control and Maintenance Complex (CMC) contains the Instruction Store Complex (IS*), Process Store Complex (PS*), Peripheral Unit Complex (PC*), and the Central Processor Complex (CP*). The asterisk designates all of the circuitry associated with a complex, including the duplicate copy, if applicable. However, it will be understood that the present invention relates to the simplex system. Disclosure relating to the duplex system which is not specifically claimed is reserved for subsequent patent applications.

The interface between the telephony equipment and the data processor is the Peripheral Unit Complex which includes a number of sense matrices 13 and control matrices 14 together with a Peripheral Controller diagrammatically indicated by the chain block 15.

The principal elements of the data processor include a Central Processor (CP) having subsystems enclosed within the chain block 17, a Process Store (PS) enclosed within the chain block 18, and an Instruction Store (IS) enclosed within the chain block 19. A computer operator may gain manual access into the Central Processor 17 by means of a manual control console 20, if desired or necessary.

The IS 19 which consists of two copies, contains the stored programs. Each copy has up to eight units as shown in block 19 and includes two types of memory:

1. A read-only unit 19*a* containing a maximum of 16,384 33-bit words.
2. Core Memory in remaining units containing a maximum of seven units of 16,384 33-bit words per unit. Individual words are read from or written into IS by CP 17, as will be more fully described below.

Each IS unit 19 of the eight possible is similar; and they are of conventional design including an Address Register 19*b* receiving digital signals representative of a particular word desired to be accessed (for reading or writing as the case may be). This data is decoded in the Decode Logic circuit 19*c*; and the recovered data is sensed by sense amplifiers 19*d* and buffered in a Memory Data Register 19*e* which also communicates with the Central Processor 17.

The Process Store (PS) 18 contains call processing data generated by the program. The PS (also in duplicate copies) comprises Core Memory units 18*a* containing a maximum of eight units of 16,384 33-bit words for each copy. Individual words are read from or written into PS by CP in a manner similar to the accessing of the Instruction Store 19, just described. That is, an Address Register 18*b* receives the signals representative of a particular location desired to be accessed; and this information is decoded in a conventional Decode Logic circuit 18*c*. The recovered information is sensed by sense amplifiers 18*d* and buffered in Memory Data Register 18*e*.

The CMC communicates with the telephony and switching equipment through matrices 13, 14 of sense and control devices. Any number of known design elements will work insofar as the instant invention is concerned. The sense and control matrices 13, 14 are each organized into 32-bit sense words and 32-bit control words. On command of CP, PC samples a sense word and returns the values of the 32 sense points to CP. Each control point is a bistable switch or device. To control telephone and input/output equipment, CP sets a word of control points through PC. PC together with the sense and control matrices comprise the Peripheral Unit Complex (PU).

CP sequentially reads and executes instructions which comprise the program, from IS. The CP reads and executes most instructions in 4 microseconds (one machine cycle time). Those instructions that access IS require 8 microseconds (two machine cycles) to be executed and are referred to as "dual cycle" instuctions.

The instructions obtained from the IS can be considered "Directives" to the CP specifying that it is to perform one of the following operations:

a. Change and/or transfer information inside the CP in accordance with some fixed rule.
b. Communicate with the IS or PS by requesting the IS/PS to either;
   1. Read a 33-bit word from a specified location, or
   2. Write a 33-bit word into a specified location.
c. Communicate with the PC by requesting PC to either;
   1. Read a specified 32-bit from sense point word, or
   2. Write into a specified 32-bit control point word.
d. Perform maintenance operations internal to CP by either;
   1. Reading from a maintenance sense group, or
   2. Writing into a maintenance control group.

The Control and Maintenance Complex may be viewed from two levels: a processing level and a maintenance level. At the processing level (which includes the control and maintenance of the telephone equipment) the CMC appears to be an unduplicated, single processor system as in FIG. 1. At the maintenance level (which here refers only to CMC maintenance) the CMC consists of duplicated copies of the units in each complex, as seen in FIG. 2.

The duplication within the CMC is provided for three purposes:

1. In the event that a failed unit is placed out-of-service, its copy provides continued operation of the CMC.
2. Matching between copies provides the primary means of detecting failures.
3. In-service units can be used to diagnose an out-of-service unit and report the diagnostic results.

Each complex within the CMC may be reconfigured (with respect to in-service and out-of-service units) independently of the other complexes to provide higher overall CMC reliability.

The CMC operation is monitored by internal checking hardware. In the event of a malfunction (misbehavior due either to noise or to failure), the CP is forced into the execution of a recovery program by a maintenance interrupt.

When the malfunction is due to failure, the recovery program will find the failed copy and place it out-of-service. When at least one complete set of units in each complex can be placed in-service, the fault recovery program will terminate after reconfiguring the CMC to an operational system. If a good set of units in each complex cannot be found, the fault recovery program continues until manual intervention occurs.

To facilitate the recovery operation, a hierarchy of in-service copies are defined.

1. One Central Processor must always be in the active state, only the active CP can change the configuration of the CMC,
2. If the other CP is in-service, that CP is the standby CP, and
3. The in-service copies of Instruction Store, Process Store, and Peripheral Control Units are designated as primary and secondary where the primary copies are associated with the active CP.

Each Peripheral Control Unit may also be designated as active or standby; only the active Peripheral Control Unit controls telephone equipment through the sense and control points.

The CP circuits provide two specific functions: processing and maintenance. The processing circuits provide a general purpose computer without the ability to recover from hardware failures. The maintenance circuits together with the processing circuits provide the CMC with recovery capability.

The Central Processor is divided into 10 circuits. The first four provide the processing function.

1. Timing Generator Circuit (TGC), designated 21,
2. Processor Control Circuit (PCC), 22,
3. Data Processing Circuit (DPC), 23, and
4. Input/Output Circuit (IOC), 24.

The remaining circuits provide the maintenance function and are not set forth in greater detail herein than is necessary to understand the processing circuitry. These circuits are:

5. Configuration Control Circuit (CCC) 25,
6. Malfunction Monitor Circuit (MMC) 26,
7. Timing Monitor Circuit (TMC) 27,
8. Interrupt Control Circuit (ICC) 28,
9. Recovery Control Circuit (RCC) 29, and
10. Maintenance Access Circuit (MAC) 30.

In FIG. 2, there is shown duplicate copies of each of the above circuits in the Central Processor, with like circuits having identical reference numerals.

A pair of Peripheral Controllers is associated with each Peripheral Control Unit (PCU). Each Peripheral Controller 15 includes the following circuits which are described in more detail in Section II:

1. A Matrix Access Circuit 33,
2. An Address Register Circuit 34,
3. A Data Register Circuit 35,
4. A Timing Generator Circuit 36,
5. A Maintenance Status Circuit 37,
6. An Address Decode Circuit 38, and
7. A Control Decode Circuit 39.

II. The Peripheral Unit Complex

The Peripheral Unit Complex is the interface between the Central Processor (CP) and the telephone and switching equipment. It has the functions of allowing the CP to sense the status of external inputs to the TSPS by means of the sense matrices 13, and it allows the CP to control the telephony and switching equipment by means of the control matrices 14 which are included in the Peripheral Unit Complex. The Peripheral Unit Complex consists of up to eight Peripheral Units, PU0–PU7 (PU0 being designated 50 in FIG. 7 and PU7 in 51) and their associated Peripheral Controllers, blocks 52 and 53 for Peripheral Unit 50, and blocks 54 and 55 for Peripheral Unit 51.

Each Peripheral Unit contains up to 16 matrices, M00–M15, as illustrated. When it is necessary to identify a particular Matrix with respect to the entire PU Complex, the designation is prefixed by PU(PUN), where PUN is a number ranging from 0 through 7 which identifies a particular PU for example, PU0.M03 designated Matrix 3 of PU0.

Figure 7:
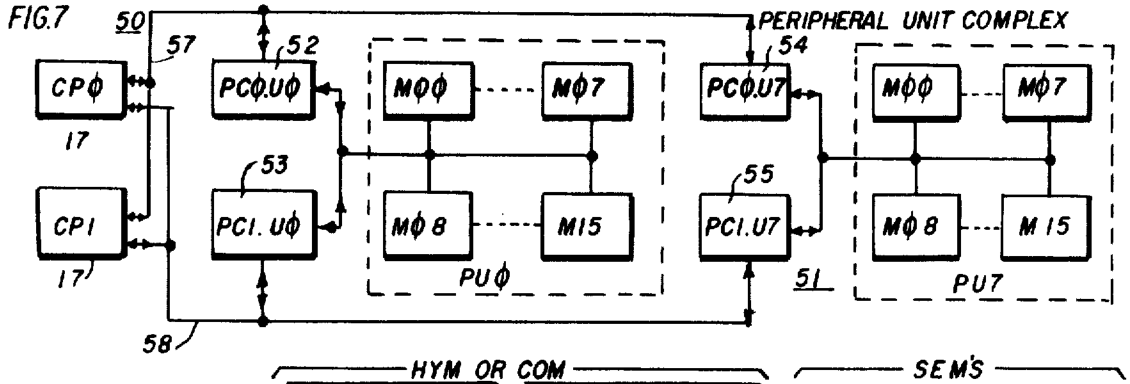
FIG. 7 is a functional block diagram of redundant copies of the Peripheral Unit Complex.

Each Peripheral Unit is controlled by a pair of Peripheral Controllers, see blocks 52 and 53 for PU0 in FIG. 7, because each Peripheral Unit has duplex sets of sense and control matrices. At any time, only one Peripheral Controller of a pair is "Active"—i.e., it is in control of the associated matrices.

Peripheral Controllers in a pair are designated as: PC0.U(PUN) and PCl.U(PUN); for example, PC0.U3 and PCl.U3 control the matrices associated with PU3. Where such duplex pairs exist, and it is desired to designate the active one, the designation of the unit with an asterisk (*) is used. For example, PC*.U3 indicates the active Peripheral Controller having control over the matrices in Peripheral Unit No. 3.

All "copy 0" Peripheral Controllers communicate with CP* on bus system PC0.BS diagrammatically shown at 56 in FIG. 7; and all "copy 1" Peripheral Controllers use bus system PCl.BS designated 58.

The Matrices in a Peripheral Unit

These matrices are arrays of 16 (or fewer) words of 32 points each. Three types of points are defined:

a. Sense Matrix Points SMP: Points that monitor the switching and telephony equipment exclusive of the Control and Maintenance Complex. These points can be interrogated (read) by CP* but cannot be controlled (write) by it. A SMP can monitor relay contact states, SUHL logic levels, or HTL logic levels. It includes an ac coupled gate that inhibits or transmits a pulse strobe signal depending on the condition of the binary element being sensed. Conventional designs are known for performing this function.

b. Control Matrix Points CMP: Points that are controlled exclusively by CP*. They can also be interrogated (read) by CP*. These elements may simply be a reed relay, normally controlled by a flip-flop circuit.

c. Dual Access Matrix Points DAMP: Points that can be controlled from two sources, one source being CP*, the other source being a non-CP hardware device. Can be read by CP*. Again, these elements may be conventional telephone relays having their coils energized by a flip-flop circuit.

With this in mind, the following Matrix types are defined:

a. Sense Matrix SEM. Consists of 16 (or fewer) words, each word having 32 SMP's and are used to monitor relay contacts.

b. Control Matrix COM. Consists of 16 (or fewer) words, each word having 32 CMP's.

c. Hybrid Matrix HYM. Contains a mixture of SMP's, CMP's and/or DAMP's, arranged in 16 or fewer words. A given Matrix may contain different types of matrix points on a word basis.

So far, the following types of HYM's have been defined:

c1. Traffic Office Access Matrix TOM.
Accesses data links to Traffic Offices and Services Offices.

c2. Input/Output Access Matrix IOM.
Accesses Magnetic Tapes and TTY's.

c3. Network Access Matrix NAM.
Accesses Network switching equipment and Hold-Relay groups.

It is possible to not fully equip Matrices in a given installation.

A PU includes Matrices belonging to one or more of the classifications defined above. For example, PU3 in a given installation may be arranged as follows:

PU3.M00 – 03 are SEM's
.M04 – 07 are COM's
.M08 – 10 are IOM's
.M11 – 12 are NAM's
.M13 – 15 are not equipped.

However, this may vary according to requirements. Assignments of Matrices to a pair of PC's are likely to be made differently in each installation.

A PU Complex has a maximum capacity of:
8 PU's and therefore of
8 × 16 = 128 matrices total, regardless of distribution of Matrix types.

Communications Within a Peripheral Unit

Communication Facilities

Communications between the pair of PC's and the various Matrices in a PU are on an A.C. cable driver/-receiver basis, using pulses of one microsecond duration.

Since SEM's can only be "read out" by CP*, they do not need all the facilities required by COM's and HYM's, which can both be read out and "written in".

Figure 8:
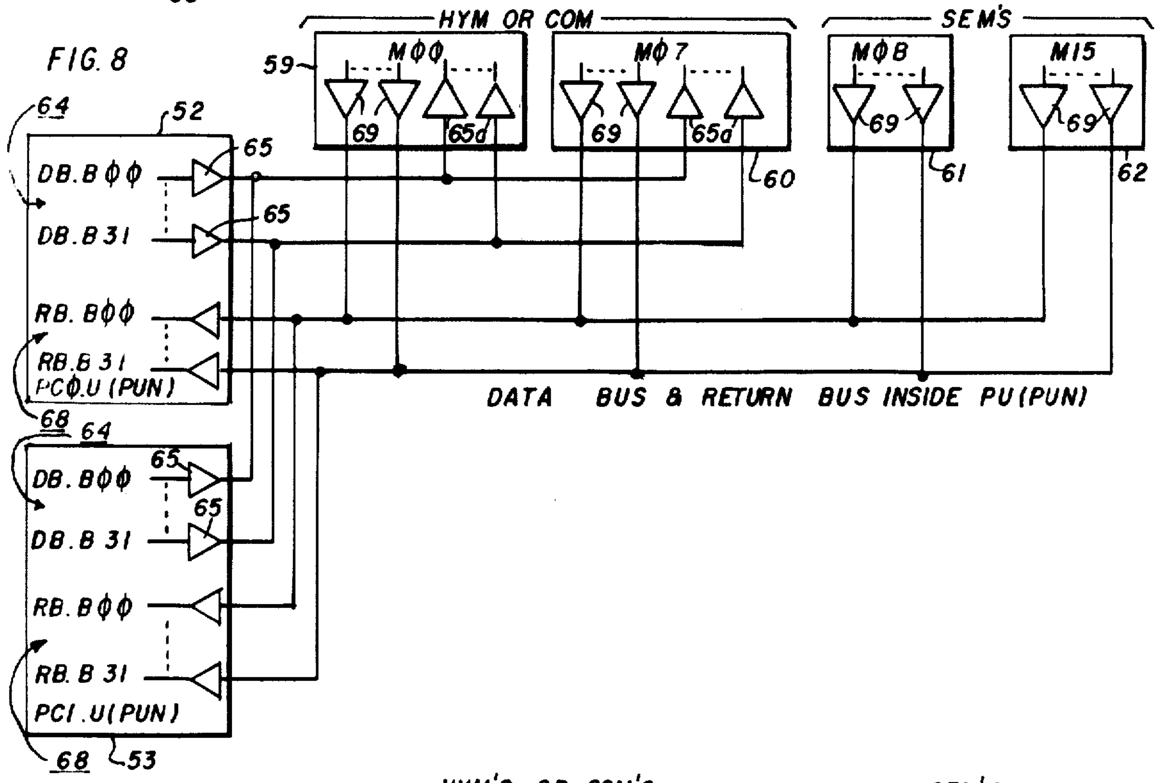
FIG. 8 is a logic diagram of the data bus and return bus within the Peripheral Unit.
Figure 9:
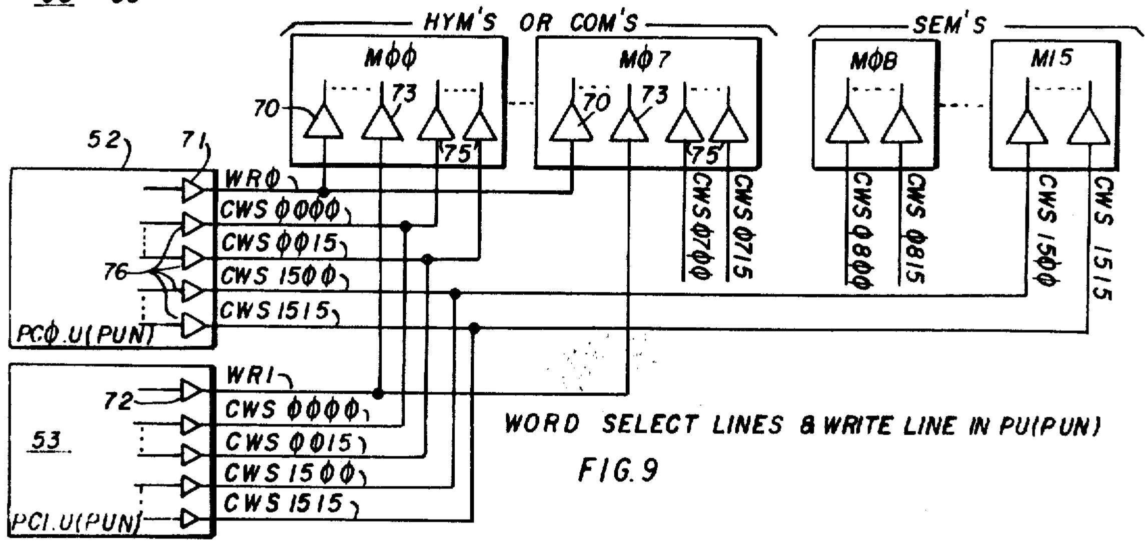
FIG. 9 is a logic diagram for the word select lines and write lines within the Peripheral Unit.

Turning now to FIGS. 8 and 9, it will be assumed that:

M00 designated 59 through M07 designated 60 are COM's or HYM's

M08 (61) through M15 (62) are SEM's

The communication facilities include:

a. Data Bus DB Designated 63 in FIG. 8

It includes positions DB.B00–31 generally designated 64 for transmitting data to the matrix elements. It is accessed by cable drivers 65 in both PC copies and leads to groups of cable receivers in each HYM and each COM in the PU. Corresponding cable receivers 65*a* are located in the HYM or COM matrices. Output levels of these receivers are designated DL00–31. The Data Bus carries data to be written into COM's or HYM's.

b. Return Bus RB Designated 66 in FIG. 8

It includes positions RB.B00–31 for each PU. It is accessed by groups of cable drivers 69 in each Matrix of a PU, regardless of type, and leads to cable receivers in each PC Copy. RB.B00–31 carries the data words (32 bits) that are read out of the Matrices.

c. Write Lines (see FIG. 9)

This facility is duplicated inside a PU. WR0 leads from a cable driver 71 in PC0 to a cable receiver 70 in each HYM and each COM; WR1 leads from a cable driver 72 in PC1 to another receiver 73 in each of these Matrices. It carries the "write" command to these Matrices.

d. Word Select Lines (see FIG. 9)

Each Matrix contains up to 16 words and has at least 16 Word Select cable receivers 75 by which a particular word in a Matrix is accessed. (Outputs of these receivers in a Matrix are designated as WSL00–15).

Each PC has 16 groups of 16 cable drivers 76 for selecting individual words in the PU. Outputs of the two corresponding drivers (one in each PC copy) are paralleled and feed one cable receiver 75 in a Matrix.

The Controller Word-Select lines CWS are designated:

CWS 0000–0015, word select lines for M 00, through

CWS 1500–1515, word select lines for M 15, as illustrated.

e. Matrix Response Lines (see FIG. 14)

Each Matrix M contains one cable driver 76 for its MRL output, which acknowledges every access of this matrix by PC*. Each PC contains a group of 16 cable receivers 77, MRL00–15, each of which receives the MRL signal from the correspondingly numbered matrix.

Figure 10:
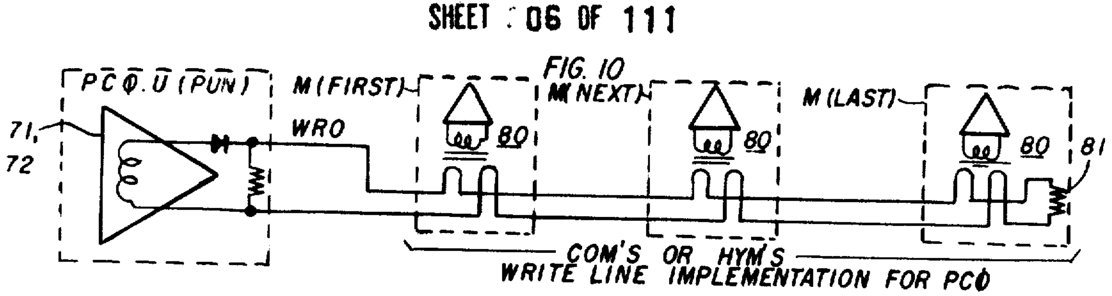
FIGS. 10–13 are circuit diagrams, partially in functional block form, showing the various cable drivers in the Peripheral Unit Complex.
Figure 11:
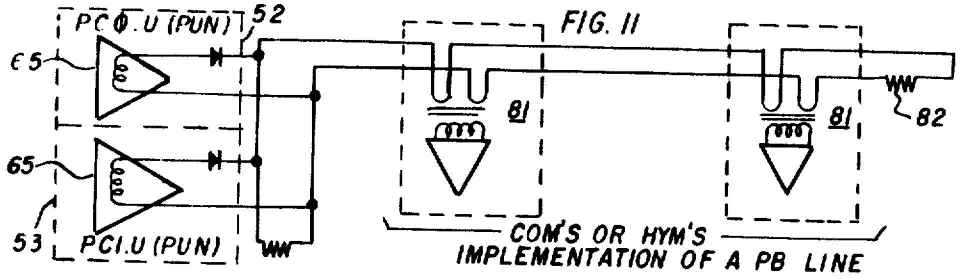
Figure 12:
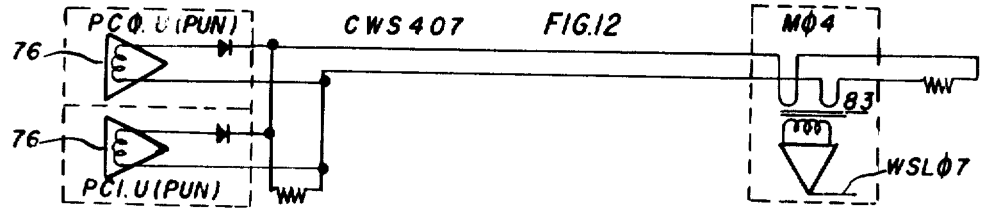
Figure 13:
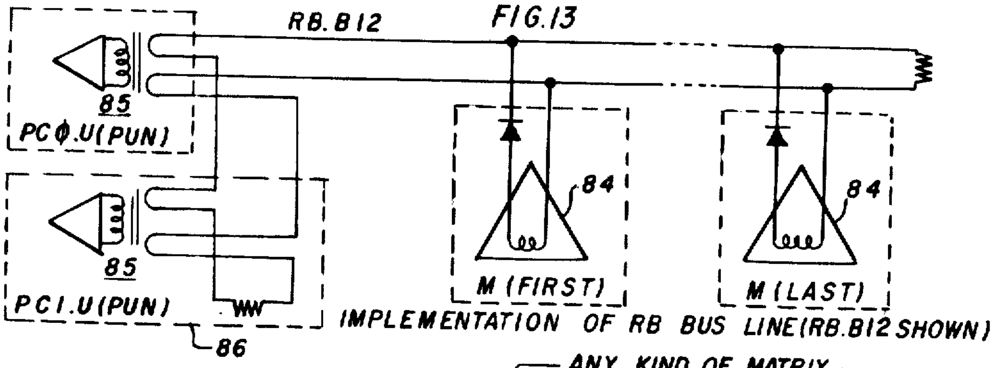
Figure 14:
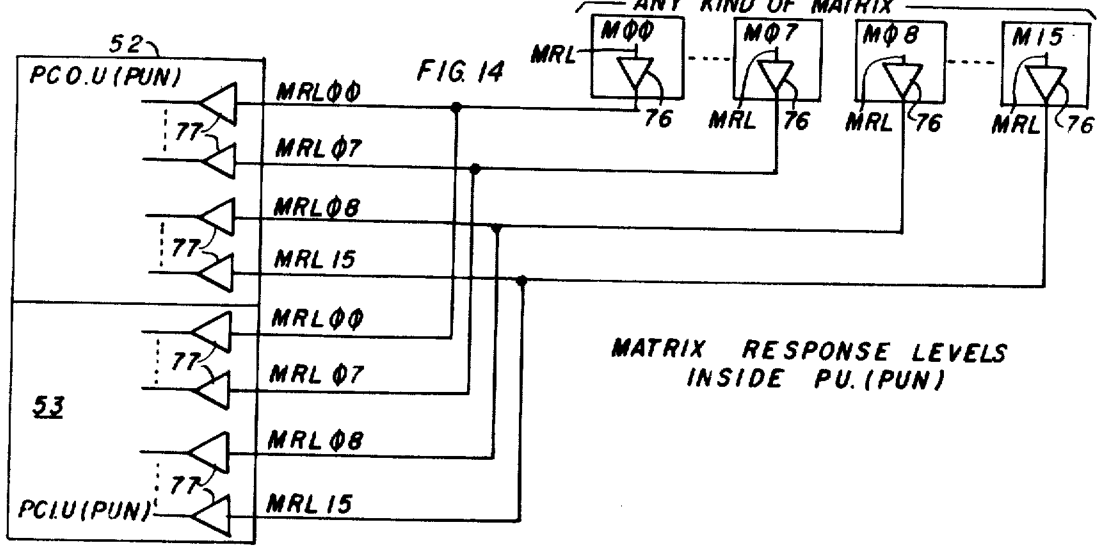
FIG. 14 is a logic diagram showing the matrix response levels in the Peripheral Unit.

Implementation Details a. A Write Line FIG. 9 is driven by one cable driver 71 or 72 as seen in FIG. 10. It passes through receiver transformers 80 on all implemented COM's and HYM's and is terminated at the last COM or HYM on the line by load 81.

b. A Data-Bus line as seen in FIG. 11 is driven by a cable driver 65 in each PC copy (parallel connection). It passes through a receiver transformer 81 in each implemented COM and HYM and is terminated at the last COM or HYM of the line by load 82.

c. Each Word Select Line is driven by a driver (76 in FIGS. 9, 12) in each PC copy (parallel connection). It leads to only one cable receiver 83 where it is terminated, as seen best in FIG. 12.

d. Return Bus Lines 68 are driven by cable-drivers 84 (FIG. 13) in all implemented Matrices in parallel. They pass through cable receiver transformers 85 of PC copies 0 and 1 and are terminated in either copy 0 or 1 by load 86.

e. The Matrix Response circuitry is illustrated in FIG. 14. There is a *separate* line from each Matrix in the PU, leading from drivers 76 (FIG. 14) to receivers 77 in PC0 and PC1. In other words each PC has a separate receiver 77 for MRL of each Matrix.

Commands and Responses Within a Peripheral Unit

Commands are sent by the Active PC copy to the SEM, COM or HYM involved. Responses from these Matrices are received by Both PC copies (provided that they are both operative).

An accessed matrix always generates a Matrix Response Signal on its MRL Line.

In addition, there are:

a. Read Commands (all Matrix types)

Active PC pulses appropriately selected CWS line. The Matrix containing the accessed word places word contents on RB.B00–31. Both PC's accept the return data in their Data Register Circuit (see block 100 in FIG. 27) for re-transmission to CP*.

b. Write Commands

Active PC pulses addressed CWS line, (FIG. 9) *and* pulses its Write Line (WR0 if PC0 is active), *and* outpulses a data word (received from CP*) on DB.B00–31 (FIG. 8). The PC's are not responsive to the data on the Return Bus.

The reaction of a Matrix to a write command depends on the matrix type:

b1. COM Contains Accessed Word

COM transfers the data into the flip-flops of the accessed word. It also places status of accessed word on RB.B00–31, which is ignored by the PC's.

b2. SEM Contains Accessed Word

Since a SEM does not have "Write Line" inputs, it interprets the command as a "read". This does no harm since PC's ignore data on the Return Bus.

b3. Accessed Word is in a HYM

HYM's contain a mixture of SMP, CMP and/or DAMP words. Write commands have an effect only on CMP and DAMP flip-flops points. Again, status of accessed word is returned on RB, but ignored by PC's.

Function of the Control Matrix

The Control Matrix (COM) is a word oriented memory of 16 words, numbered W00 through W15. Each word is 32 bits in length, numbered B00 through B31.

The individual bits of a COM word are called Control Matrix Points (CMP's). The output of a CMP into the controlled equipment is either an electronic logic level or a relay contact. This is an implementation option, provided on a word basis.

Via the PC's, a COM is controlled and supervised by the CP* on a word basis.

The two main functions a COM performs are:

a. The Write Function
All 32 CMP's in a word, addressed by the active PC Copy are set according to the data received on the Data Bus (DB).

b. The Read Function
The status of all 32 CMP's in a word, addressed by the active PC, is non-destructively read out and placed on the Return Bus (RB) feeding into both PC's.

Interface With the PC's

Inputs to the COM

There are sixteen Controller Word Select (CWS) leads from the PC copies, labeled CWS(MN)00 through CWS(MN)15, which terminate at the COM cable receivers. The designation MN is the Matrix Number. The output of the CWS cable receivers are Word Select Levels (WSL's), numbered WSL00 through WSL15 and are inputs to the respective COM words W00 through W15.

Two write leads, Write 0 (WR0) from PC0.U(UN) and Write 1 (WR1) from PC1.U(UN) terminate in the Write Control (WC) circuit. The WC circuit logically OR's the two WR functions and generates 16 Write Level (WRL) leads, numbered WRL00 through WRL15, which terminate in the respective COM words, W00 through W15.

A 32-bit Data Bus (DB) from both PC's terminates at the COM in cable receivers. These bits are labeled DB.B00 through DB.B31. The outputs of the DB cable receivers are inputs to the respective bits of all COM words, i.e. DL(BN) is multed to W00.B(BN) through W15.B(BN). (See also 6.6).

Inputs to the PC's

A 32-bit Return Bus (RB) from the COM to both PC's is the only data input to the PC's from the COM. The RB bits are labeled RB.B00 through RB.B31. Any one RB bit, i.e., RB.B(BN), is generated by a 4 input cable driver which responds to a zero logic level on any of its four inputs. Each cable driver input consists of the "wired or" of the same bit Output Level (OL) of four consecutive COM words.

A particular RB bit, RB.B(BN), is generated by writing OL00(BN) through OL03(BN) together, etc., to form the four inputs to the RB bit cable driver.

Logically, RB(BN) is the following function:

$$RB(BN) = OL00(BN) + OL01(BN) + \ldots OL(WN)(BN) + \ldots OL15(BN)$$

Matrix Response Level

As part of the PC hardware check that insures only one word of the 256 addressable words in a PU was accessed, a Matrix Response Level (MRL) is required as an input to the PC's from all Matrices in the PU.

In the COM the MRL signal is generated by "ORing" the 16 WSL signals and returning this signal via an AC cable driver to both PC's.

Logically, MRL is the following function:

$$MRL = WSL00 + WSL01 + \ldots\ldots\ldots WSL15$$

Therefore, any time any one of the 16 words of the COM is accessed MRL becomes true for the duration of the WSL signal.

All bits of the COM words consist of memory elements implemented with Nand gates cross coupled in a latch circuit configuration. Inputs to a given latch are:

a. Accept Level — AL(WN)
b. Accept Not Level — $\overline{AL}$(WN)
c. Data Level — DL(BN)

Their Boolean relations as functions of WRL(WN) and WSL(WN) are:

$$AL(WN) = WSL(WN).\overline{WRL}(WN)$$

$$\overline{AL}(WN) = \overline{WSL(WN).\overline{WRL}(WN)}$$

$\overline{WRL}$(WN) is an output of the WC circuit whose inputs are WR0 and WR1. The relation for WRL(WN) is:

$$WRL(WN) = WR0 + WR1$$

The equations governing this latch are:

$$Y_1 = X_1 . X_2 + \bar{y}_2$$

$$Y_2 = X_1 + \bar{y}_1$$

where
$Y_2$ = OF, the output to the controlled equipment
$Y_1$ = YF, the output to the RB
$X_1$ = AL
$X_2$ = DL The Read function of the COM for a particular RB.B(BN) is a combinational function of the WSL(WN) and YF levels as follows:

$$RB.B(BN) = [WSL00][W00.B(BN).YF] + [WSL01][W01.B(BN).YF] + \ldots . [WSL(WN)][W(WN).B(BN).YF] + \ldots\ldots\ldots [WSL(15)][W15.B(BN).YF]$$

In particular, when WSL09 = 1

$$RB.B(BN) = [WSL09][W09.B(BN).YF]$$

The Sense Matrix

Function of the Sense Matrix

The Sense Matrix (SEM) functions as an input interface between the electromechanical equipment in a TSPS office and the Central Processor (CP). Specifically, the SEM monitors the states of electromechanical equipment via metallic contacts supplied by the monitored equipment. And, acts as an interface between the slow speed, high power, electromechanical equipment and the fast speed, low power, logic circuitry of the CP.

A SEM is a word oriented matrix composed of 16 words of 32 bits per word. Giving a total matrix capability of 512 bits (16 × 32). Word numbering ranges from 00 to 15 and bit numbering from 00 to 31.

A bit in a SEM is called a Sense Matrix Point (SMP). Each SMP includes a coupling capacitor and diode in series interconnecting a Word Drive Line (WDL) to a column amplifier. At the junction between these two elements there is a resistor divider network having its base biased. A binary signal received at a sense point is coupled to the divider network to cause the diode to be forward or reverse biased depending on the level of the binary signal which, in turn, enables or inhibits the passage of the WDL signal. Each SMP is connected via a twisted pair of wires to a floating contact pair. The contact pair is a part of the supervised electromechanical equipment and grounds the voltage divider network when closed.

SMP's function as follows. If the contact pair connected to a SMP is open circuited, the SMP capacitor charges to a −48 volt potential. Then when a Sense Matrix Driver interrogates that SMP, the driver pulse can propagate through the SMP and activate the Column Amplifier. This is possible because the SMP diode has a −48 volt potential applied to both its anode and cathode. If the contact pair connected to a SMP is short circuited, the SMP capacitor charges to ground potential. In this case, the driver pulse is inhibited from propagating through the SMP to the Column Amplifier. This is caused by the −48 volt reverse bias present on the SMP diode. Thus we see how the contact pair controls the output of a SMP by changing the bias voltage on the SMP capacitor.

The interrogation of a SEM word by the CP is accomplished via a Peripheral Controller (PC). A PC decodes the binary address sent by the CP, which defines the matrix number and matrix word, and does the actual interrogating of the SEM word. The SEM word is interrogated by pulsing one out of 16 Word Select leads of a SEM. Each Word Select lead is associated with a word of the SEM. The data read from the SEM word spills out in parallel form and is placed in the PC's Data Register. The data contained in the PC's Data Register is then transmitted back to the CP.

When using data obtained from a SEM, note that a logical "ONE" level corresponds to an open relay contact state. Conversely a logical "ZERO" level corresponds to a closed contact state.

In addition to the electromechanical SMP described above, there exists an electronic SMP. This electronic SMP is used to supervise electronic equipment. The electronic SMP differs from the electromechanical SMP in that logic gates are used to implement the electronic SMP. In this case logic levels are supervised rather than metallic contacts.

The electronic SMP's are used in Hybrid Matrices (HYM's) as either a Traffic Office Access Matrix (TOM), an Input/Output Access Matrix (IOM), or a Network Access Matrix (NAM).

Interface with the PC's

Inputs to the SEM

There are 16 Controller Word Select (CWS) leads from the PC copies, labeled CWS(MN)00 through CWS(MN)15, which terminate at the SEM Word Drivers. The designation MN is Matrix Number. The output of the Word Drivers are Word Drive Levels (WDL's), numbered WDL00 through WDL15 and are inputs to the SEM words W00 through W15.

Outputs to the SEM

The SEM sends 32 bits of data via the Return Bus (RB) to the PC's. This bus has 32 bits labeled RB.B00 through RB.B31. The data bits are placed on the RB by Column Amplifiers (CA's). A CA accepts data from all 16 words for a particular bit position via a diode OR gate and drives the RB. The RB data lasts for the duration of the WDL signal (1 microsecond). The WDL signal pulse width is a function of the CWS pulse width.

Matrix Response Level

To insure that a SEM Word Driver was activated by a CWS signal and also to perform a PC hardware check that only one word of the 256 possible word address was addressed, a Matrix Response Level (MRL) is generated by the SEM.

The MRL signal is generated by ORing the outputs of Check Bits and driving Check Bit Amplifiers. The Check Bits (CB) are similar to SMP's except that their outputs only depend upon the presence of a WDL signal.

In order to minimize the effect of a failure of the MRL, four Word Drivers and their CB's are associated with one CB amplifier. The four CB Amplifiers, required for a 16-word SEM have their outputs diode ORed on the MRL AC bus return leads to the PC's. An MRL circuit failure can cause the loss of only 4 words (¼) of the SEM.

Logically, the MRL is an OR function of all the 16 WDL's. The MRL pulse duration is 1 microsecond and depends upon the duration of the CWS signals.

Communication with the CP*

Function

Communication between the CP* and the Peripheral Control Units serves four purposes which are:

a. To address one of the 8 Peripheral Units which is to be operated upon.
b. To relay data from one or both of the CP copies to the addressed PU (write function).
c. To relay data from the addressed PU to one or both CP copies (read function).
d. To control, via the address function, the activity and state of repair of all PC's.

Three duplicated AC buses are required to perform all the communication functions. These buses are the 23-bit Peripheral Control Address Bus (PC(CN).AB), the 32-bit Peripheral Control Data Bus (PC(CN).DB), and the 33-bit Peripheral Control Return Bus (PC(CN).RB). The group of these three buses is termed the Peripheral Control Bus System (PC(CN).BS).

Peripheral Control Configurations

Since the PC is duplicated per Peripheral Unit a means of identifying an active or standby copy and identifying a copy found faulty is required. Two of the Maintenance Flip-Flops, the Active Unit Flip-Flop (UAF) and the Trouble Flip-Flop (TBF) are implemented for this purpose in each PC and are discussed in more detail below.

The UAF

The purpose of the UAF is to identify the state of a PC, i.e., active or standby as follows:

a. UAF = 1 (set)
   PC is active and performs all of its functions completely.
b. UAF = 0 (Reset)

PC is in standby state and performs all of its normal functions with the exception that addressing of the Matrices is inhibited.

The TBF

The purpose of the TBF is to take a faulty PC out of service, by isolating it from its Matrices and PC(CN).RB.

a. TBF = 1 (Set)
   PC is faulty and out of service and does not execute Normal mode instructions, i.e. reading or writing of the Matrices. It does accept all addresses but does not return any information over the RB to the CP*.
b. TBF = 0 (Reset)
   PC is not faulty and performs all of its normal functions completely.

It should be noted that both a UAF and TBF are located in each copy of each PCU and all are independent of each other. Their states are under program control; therefore, all combinations are possible. One combination, the UAF in both copies being set, should be avoided because timing differences between Controllers could cause invalid matrix responses.

Other Maintenance Flip-Flops

The UAF and TBF are only two of a set of flip-flops defined as the Maintenance Flip-flops. The state of all maintenance flip-flops can be read out by the CP*. They also can be written into by the CP*. The particular flip-flops and their functions are defined in following sections.

PU Operations

Operation Types

The PU& can perform "sense" and "control" functions in three different modes, a total of six different operations.

The *normal mode* operations allow reading or writing of points in the COM's and HYM's and reading of points in the SEM's. The normal mode operations are the only PU* operations that can be used in the call processing programs.

The *control mode* and *special mode* operations are used only in diagnostic and recovery programs. These operations allow the reading or writing of points within the Peripheral Control Units and do not penetrate beyond the PC*.

Control mode operations allow access to points within the PC* designated by the address part of the operation.

Special mode operations permit access to one given group of points, the address decoder, of the PC* whose output state is determined by the address part of the operation.

It will be recalled that each PU instruction takes two machine cycles for execution. These cycles are referred to as the "Execution" and "Follow Through" cycles respectively. FIGS. 15–25A show the data format on PU buses for each cycle of these PU instructions.

Figures 15, 16, 17, 18, 19, 20:
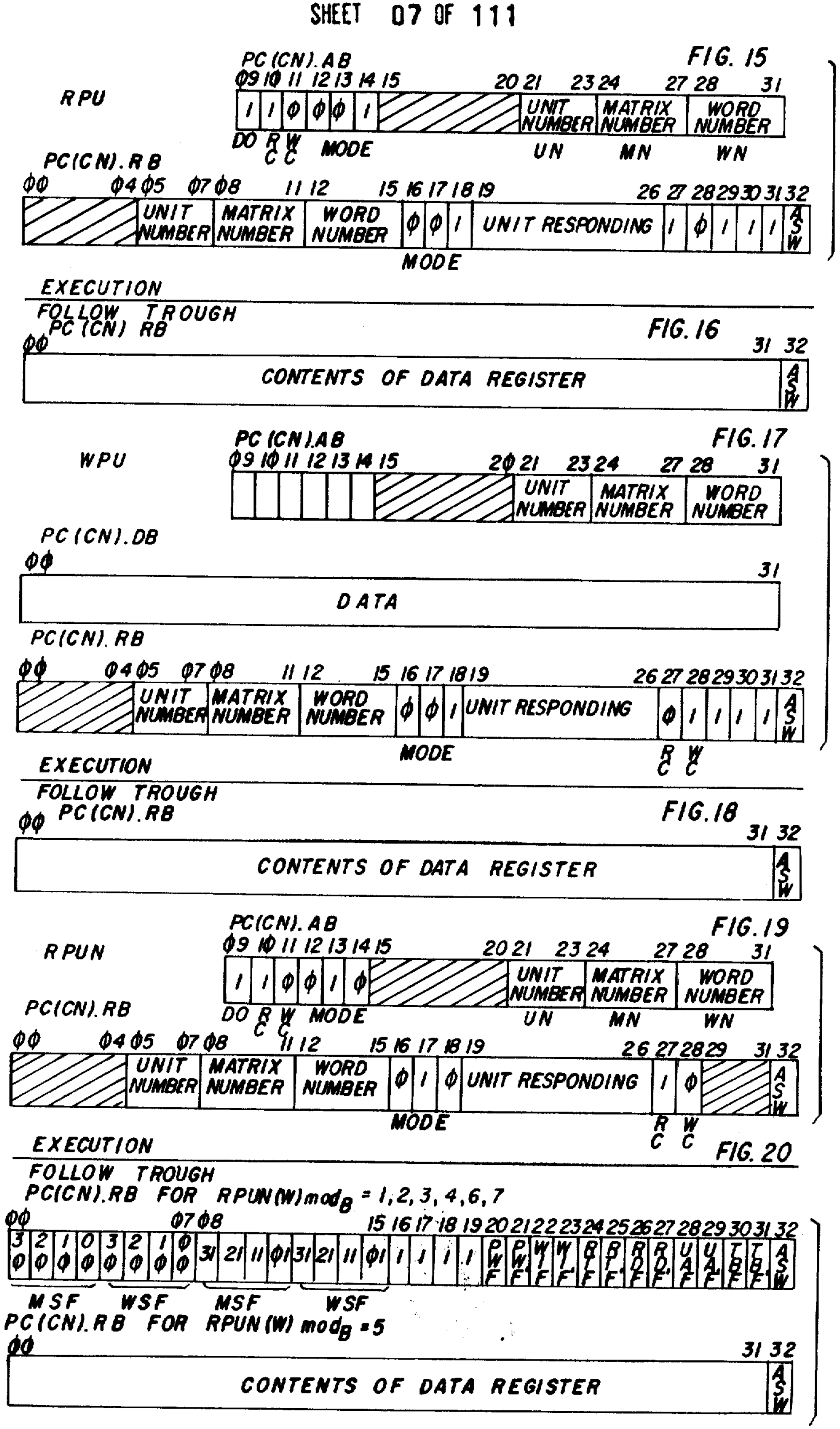
FIGS. 15–25 and 25A are diagrammatic illustrations of the word formats on the various data buses associated with the Peripheral Unit for each instruction word concerning the Peripheral Unit.

PC(CN).AB Format (See FIG. 15)

The Peripheral Control Address bus is shown in the upper part of FIG. 15. PC(CN).AB contains 23 bits numbered from PC(CN).AB.B09 through PC(CN).AB.B31. CN specifies which copy of PC is called for.

Bits 09 through 14 specify the operation to be performed:

B09 — "Do" signal, alerts all units on the bus that some operation is requested of one of them.
B10, B11 — Read Control (RC) and Write Control (WC), respectively. Information is in a 1 out of 2 code.
B12, B13, B14 — Mode control bits
  B12 — Special Mode (S)
  B13 — Control Mode (C)
  B14 — Normal Mode (N)
  Information is in a 1 out of 3 code.
B15 — Spare bit Bits 16 through 31 specify the address at which the operation is to be performed, i.e., the effective address (EA).

B16 through B20 — Spare bits
B21 through B23 — Unit Address Field is interpreted as the PU number UN. (UN = 0, 1, 2, ..., 7) The PC unit which recognizes its unit number, UN, executes the instruction.
B24 through B27 — Matrix Address specifies the matrix number MN. (MN = 00 - 15).
B28 through B31 — Word Address specifies one of the sixteen words of the selected matrix WN.(WN = 00 - 15).

PC(CN).RB Address Echo Format

Return Bus Data Format

On every operation, regardless of mode, the addressed PC returns the "echo" of the address back to the CP via the PC(CN).RB. The echo format is shown in FIG. 16 as follows:

PC(CN).RB.B00–15 — Physically transfers the Address Field of the PC(CN).AB.B16–31 respectively to the PC(CN).RB.B00–15.
PC(CN).RB.B16–18 — Mode bits as received from CP in one out of three code.
  PC(CN).RB16 — Special (S)
  PC(CN).RB17 — Control (C)
  PC(CN).RB18 — Normal (N)
PC(CN).RB.B19–26 — Responding Unit in one out of eight code.
  PC(CN).RB.B19 — Unit 0
  PC(CN).RB.B20 — Unit 1
  ,
  ,
  ,
  ,
  PC(CN).RB.B26 — Unit 7
PC(CN).RB.B27 — Read Command
PC(CN).RB.B28 — Write Command
PC(CN).RB.B29–31 — Spare bits set equal to 1

The All Seems Well (B32)

Each PC indicated that its internal checks on the execution of an instruction have passed by transmitting the All Seems Well signal on the PC(CN).RB.B32 at the same time that data is read out and the address echo is transmitted on PC(CN).RB.B00–31.

For all instructions ASW = 1 indicates:

a. Mode bits S, C, N were received in one out of three code.
b. Read-write bits RC, WC were received in one out of two code.

c. Appropriate internal PC(CN) checks have passed which are defined subsequently, for Normal Mode instructions only.

Failure of the ASW will be an indication to the CP* that a PC is faulty in one of the areas mentioned above.

PU* Instruction Set

Note: All instruction descriptions assume neither TBF is set.

Six distinct instructions make up the PU* instruction set. These six instructions are categorized in three mode groups, i.e., Normal, Control, and Special Modes. Each mode group consists of a Write and Read instruction.

An instruction takes two machine cycles to complete. The first cycle is called the execution cycle, and the second cycle is called the follow through cycle. In each case when a PC unit responds to an instruction an ASW signal is sent to the CP* along with the data on the PC(CN).RB.

Normal Mode Instructions

RPU — Read Peripheral Unit (See FIGS. 15, 16).

Command on PC(CN).AB — read "normal" at address UN.MN.WN (unit No., matrix No., and word No.).

Addressed PC a. the addressed PC's return address echo in execution cycle.

b. active addressed copy reads data at matrix word selected and addressed PC's load data into both PC Data Registers (DR).

c. addressed copies transmit contents of DR on the PC(CN).RB to the CP* in the follow through cycle.

WPU — Write Peripheral Unit (See FIGS. 17, 18)

Command on PC(CN).AB v write into UN.MN.WN (unit No., matrix No., and word No.).

Data on PC(CN).DB — 32-bit word from CP*.

Addressed PC a. addressed PC's accept 32 bit word into DR.

b. addressed PC's return address echo in execution cycle.

c. active PC writes contents of DR into addressed matrix word.

d. addressed PC's echo contents of DR to CP* in the follow through cycle.

Control Mode Instructions

These two instructions are used to test individual PC's. (Programmers should set CP*-PU* configuration to simplex before using these instructions, in order to make sure that only one PC in a pair is accessed).

RPUN — Read Peripheral Unit Non Matrix (See FIGS. 19, 20)

Command on PC(CN).AB — read contents of PC hardware given in address field of PC(CN).AB, (EA).

Addressed PC a. addressed PC returns address echo on PC(CN).RB in the execution cycle.

b. transmits the state of the addressed PC (active copy) hardware over the RB in the follow through cycle.

Of the 16 bits of the EA field, the last three bits B29, B30 and B31 will identify 3 PC addresses as follows:

mod 8 = 3: Not allocated.

mod 8 = 0, 1, 2, 4, 6, 7: Maintenance Flip-Flops.

mod 8 = 5: Contents of PC DR (bits 00–31).

Figure 21:
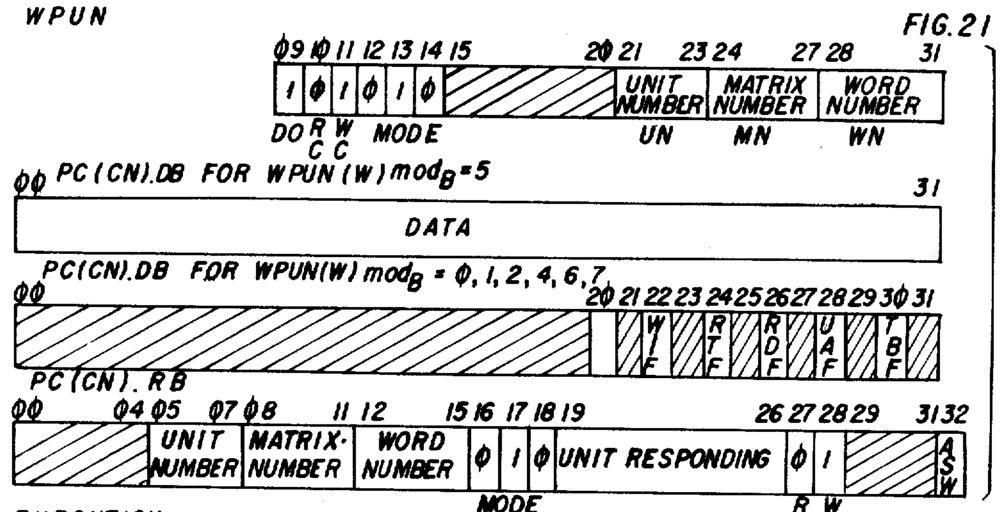
Figure 22:
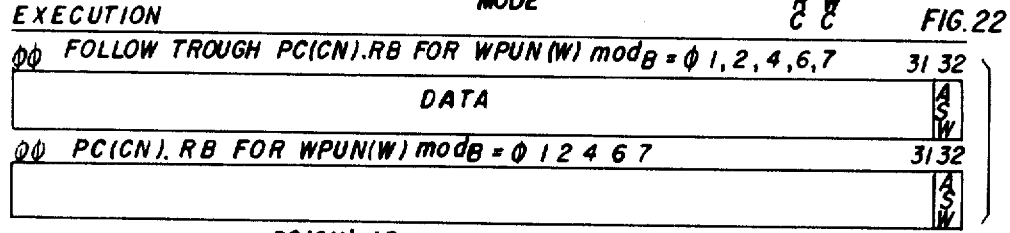

WPUN — Write Peripheral Unit Non Matrix (See FIGS. 21, 22).

Command on PC(CN).AB — write into PC hardware whose address is given in EA.

Addressed PC a. addressed PC places data on PC(CN).DB into hardware addressed in EA.

b. addressed PC returns address on PC(CN).RB in the execution cycle.

c. addressed PC returns ASW in follow through cycle.

As with the RPUN instruction PC addresses will be used as follows:

mod 8 = 3: Not allocated.

mod 8 = 0, 1, 2, 4, 6, 7: Changes the state of Maintenance Flip-Flops. The changes to be effected should be indicated by 1 or 0 in the corresponding bit positions on PC(CN).DB. (see FIG. 4)

mod 8 = 5: PC DR accepts 32-bit pattern from PC(CN).DB.

Special Mode Instructions

These two instructions are used to test individual PC copies. (Programmers should set CP*-PU* to simplex.)

Figure 23:
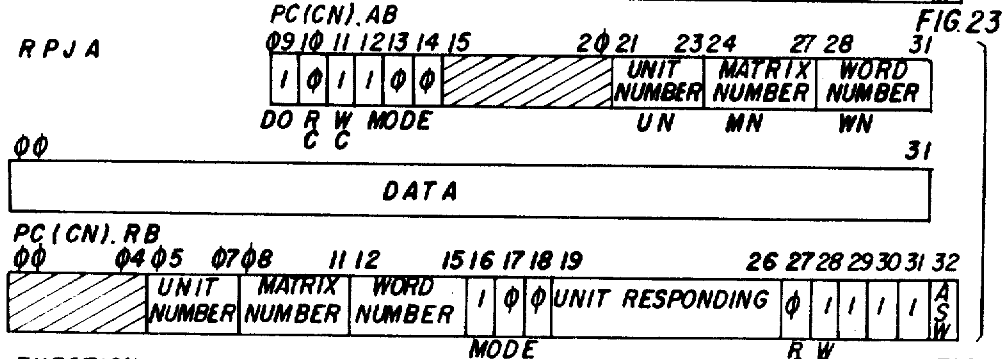
Figure 24:
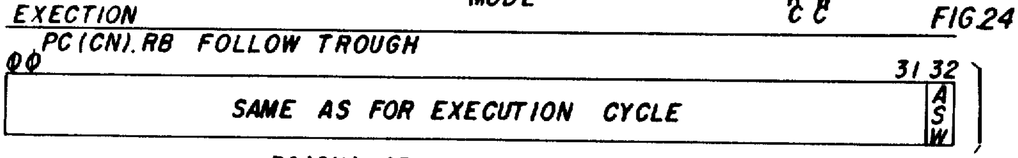

RPUA - Read Peripheral Unit Address (See FIGS. 23, 24).

Command on PC(CN).AB — write "special" at PC unit (UN) as specified in EA.

Data on PC(CN).DB — 32-bit word from CP.

Addressed PC a. data on PC(CN).DB is not loaded into DR, nor does any matrix action occur.

b. addressed PC returns address echo in the execution cycle on the PC(CN).RB.

c. addressed PC returns address echo on PC(CN).RB in the follow through cycle.

Figure 25:
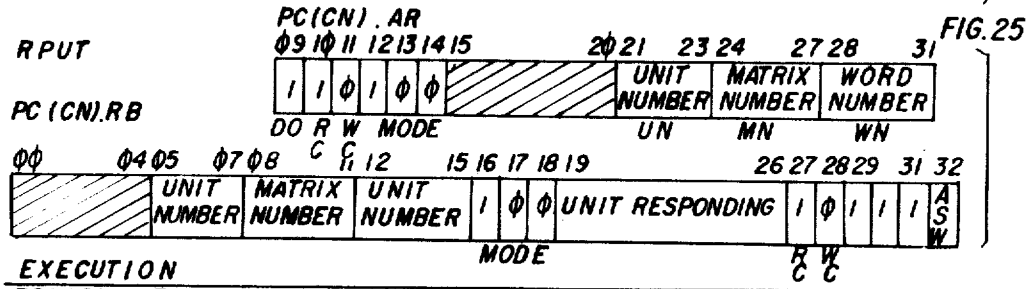
Figure 25A:
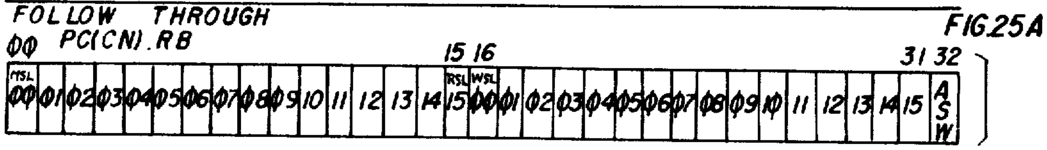

RPUT — Read Peripheral Unit Special Test (See FIGS. 25, 25A).

Command on PC(CN).AB — read special at PC unit (UN) as specified in EA.

Addressed PC a. addressed PC returns address echo in the execution cycle on PC(CN).RB.

b. addressed PC gates the output of its address decoder, whose state is determined by the MN.WN field of the EA, onto the PC(CN).RB in the follow through cycle. The exact format of this data on the RB is as shown in FIG. 25A.

Figure 26:
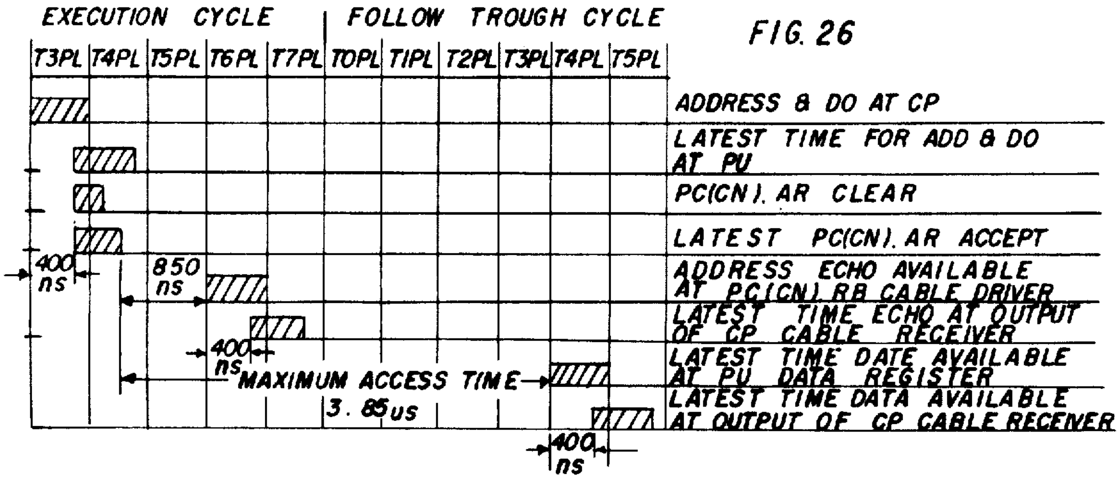
FIG. 26 is a timing diagram for the Peripheral Unit.

CP* Timing (See FIG. 26)

The CP* outpulses on PC(CN).AB during T3PL, and on write instructions outpulses on PC(CN).DB during T4PL.

Information sent from PC* to CP* during the execution cycle, i.e. address echo, must be at the output of the CP* cable receivers 100 ns. before the end of T6PL.

Information sent from the PC* to the CP* during the follow through cycle must be at the output of the CP* cable receivers no sooner than the beginning T1PL and no later than 100 ns. before the end of T4PL.

Access time is measured from the time that the PC(CN).AR (PC Address Register) is latched up to the time the data word from the Matrices reaches the inputs of the AC cable drivers on the PC(CN).RB.

The return address echo is always returned to the CP* on the PC(CN).RB during the execution cycle. From FIG. 26 it can be seen that the echo must be at the input of the PC(CN).RB cable drivers no later than 850 ns. after latching the address register in order to meet the worst case timing requirements.

All write instructions with the exception of a WPUN instruction require a data echo in the follow through cycle. As with data return for read instructions the echo must be at the output of the PC(CN).RB cable receivers in the CP* no later than T4PL of the follow through cycle.

As mentioned in connection with FIG. 7, there are two Peripheral Controllers (PC0 and PC1) denoted 52, 53 associated with each Peripheral Unit. Each PC communicates with the CP* via its own Peripheral Control Bus. PC0 communicates via PC0.BS and PC1 communicates via PC1.BS.

Within a Peripheral Unit, either Peripheral Controller is capable of the following functions:

a. Identify its own address.
b. Store the address and data sent over the PC(CN).BS.
c. Decode the address field of the instruction.
d. Decode the operation field of the instruction.
Return the address "echo" to the CP over its PC(CN).RB.
f. Access the Matrix specified in the address.
g. Access its own internal hardware.
h. Store data received from an accessed Matrix.
i. Send the stored data from an accessed Matrix back to the CP* over its PC(CN).RB.
j. Return the state of accessed PC hardware back to the CP* over its PC(CN).RB.
k. Write data stored in its data register into an accessed Control Matrix or Hybrid Matrix.
l. Write data into its internal hardware.
m. Return a data echo over its PC(CN).RB on write instructions.
n. Make checks on its own operations, and if passed, return an All Seems Well (ASW) Signal with address echo, data, or data echo.
o. Controls its ability of accessing its Matrices by monitoring the state of its Active Unit Flip-Flop (UAF).
p. Monitors its Trouble Flip-Flop (TBF), and, if set ceases all communication with the CP* and its Matrices under Normal mode instructions.

Independent of the state of its UAF, both PC's perform all of the previously mentioned functions, with the exception that only the copy whose UAF is set, i.e. UAF = 1 can access its Matrices to either write into Matrix or read out a word in a Matrix. The data read out will be loaded into both PC copies; therefore, the UAF in a PC determines only if that copy will address its Matrices and does not impair its internal functions.

Peripheral Control Circuits

Figure 27:
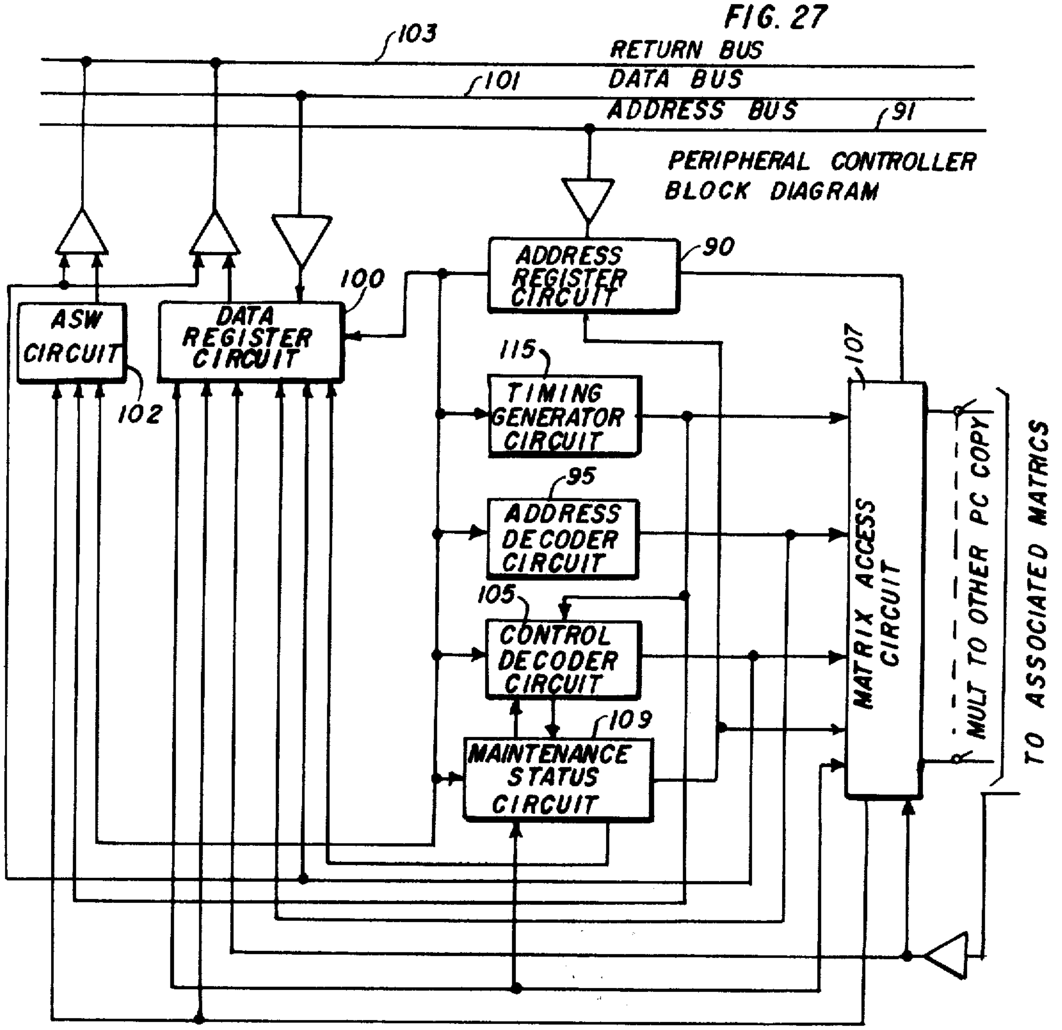
FIG. 27 is a functional block diagram of a Peripheral Controller for the Peripheral Unit.

In order to perform its equipped functions a PC consists of eight circuits interconnected as shown in FIG. 27. A functional description of each circuit's function is given below.

The Address Register Circuit (ARC)

The Address Register Circuit 90 loads every address that appears on PC(CN).AB denoted 91 regardless of the Peripheral Unit the CP* wishes to address. It is necessary that a PC load all addressed into its PC Address Register 90 (PC(CN).AR) because the interval of time that the address is present on the bus is too short to decode the unit number field before loading the Address Register.

The Address Decoder Circuit (ADC)

The Address Decoder Circuit 95 decodes the four Bits that identify the Matrix Number, PC(CN).AR.B-24–B27, and the four BITS that identify the Word Number, PC(CN).AR.B28–31. These bits are stored in the Address Register 90, and the ADC then generates one out of 16 Matrix Select Levels, (MSL00–MSL15), and one of 16 Word Select Levels, (WSL00-WSL15).

The Data Register Circuit (DR)

The Data Register Circuit 90 includes all the auxiliary circuitry which controls the time and the source of data that will be loaded in the Data Register (PC(CN).DR) which is also included as a part of the Data Register Circuit 100. The sources from which data originate to be loaded into the DR are:

a. CP* on Write instructions.
b. The Matrices on Read instructions.

The time at which the DR is loaded is dependent upon the source of data and is related to the time at which the address appeared on the PC(CN).AB, 90.

The Peripheral Control Data Register (PC(CN).DR) is a 32 bit register that accepts data from the Data Bus 101 and stores this data until another request from the CP* changes the contents of the Data Register. The Data Register always contains the data from the most recent instruction executed by the PC. The outputs of the DR are used to return information over the Return Bus 103, PC(CN).RB, or to change the state of a writable Matrix word.

The DRC also determines the time and the source of data which is to be placed on the PC(CN).RB. In addition, the All Seems Well (ASW) signal, PC(CN).RB.B32, is also placed upon the Return Bus 103 simultaneously.

The sources of the data to be placed on the Return Bus are:

a. The contents of the Data Register.
b. The contents of the Address Register.
c. The unit number decoder output of the Timing Generator Circuit.
d. The state of addressed PC hardware.

The second ASW signal is generated only if the wired circuit checks of the Matrix Access Circuit show a normal circuit operation.

The Control Decoder Circuit (CDC)

The Control Decoder Circuit 105 decodes the contents of the Address Register 90 operation field into distinct, timed control levels which are inputs to the DRC 100, Matrix Access Circuit 107 (MXC), and the Maintenance Status Circuit 109 (MSC). Each control level, in turn, activates a particular function in these circuits. Inputs used in conjunction with the contents of the AR 90 in generating these control levels are the state of the UAF and TBF and timing levels from the Timing Generator Circuit 115 (TGC) and a timing level from the ARC 100.

The Matrix Access Circuit (MXC)

When an instruction is received to read or write a word, the MXC 107 outpulses the required levels to the Matrix words. In addition, by monitoring its AC cable drivers, verifies that only one of 256 words was addressed. This verification is used to generate the ASW level placed on the PC(CN).RB 103 in the follow-through cycle, upon execution of Normal mode instructions.

The Maintenance Status Circuit (MSC)

The Maintenance Status Circuit 109 includes five Maintenance Flip-Flops which are required for diagnostic purposes, for determining the Active/Standby status, and for removing a faulty copy from service. In addition, the MSC contains the logic necessary for setting and resetting these flip-flops via the PC(CN).DB.

The Timing Generator Circuit (TGC)

The Timing Generator Circuit 115 provides the timing sequence for all operations within the PC and provides strobes for address and data to the CP* and between the Matrices and PC. The TGC generates nine sequential clock pulses levels (CP0L–CP8L) of varying durations with an overall period 5.5$\mu$s. The TGC is triggered when the unit member in the AR is that of the addressed unit and B10 and B11, and B12–B14 of the AR are in the correct one out of two and one out of three codes.

The Address Register Circuit (ARC)

The function of the ARC is to load every address appearing on the PC(CN).AB into its associated PC(CN).AR (Address Register). The appearance of a "one" in the PC(CN).AB.B09, indicates an address is present on the address bus; therefore, B09 becoming true activates the ARC which loads the address into its AR. Once an address is loaded it remains in the register until another address appears on the bus, and the cycle repeats.

The ARC is shown in more detail in FIG. 28; and it includes an address delay line diagrammatically illustrated by block 120 and of a type commonly known as PWB type 30, and a 22-bit S-R (i.e. Set, Reset) Flip-Flop register comprising the Address Register. The Flip-Flop associated with Address Bus, Bit 10 is denoted AB 10F, and so on.

The address delay line has two inputs A1 and A2 and seven outputs Z1 through Z7. The input to A1 is the DO signal, B09 of the address bus. A logic one at A1 starts a sequential generation of outputs on Z1 through Z7. Output Z1 is a zero going pulse of 112 ns (nom.) duration occurring 60 ns (nom.) after the appearance of A1. Z1 is used to reset all of the AR flip-flops. Z2 is the Address Register Window Level (ARWL) which is a logic one pulse immediately following Z1 with 212 ns (nom.) duration. Z2 is used as an address window to AB15F–AB20F and AB24F–AB31F of the AR to provide noise immunity from the address but by allowing these flip-flops to be set only during the 212 ns window interval. As a means of checking the operation of the window, i.e. Z2 is not always one input A2 is used to inhibit the output Z2. When A2 is at zero logic level, Z2 will always remain at zero also. An address loaded from the bus under this condition will contain all zeros in bits 15 through 20 and 24 through 31 of the AR, verifying that a stuck at one fault on output Z2 does not exist.

Outputs Z4 and Z5 are Reset Data Register Level (RDRL) and Data Register Window Level (DRWL), respectively. These outputs are used to reset and provide a window to the data register. Since data transmitted to the PC copy is delayed 500 ns. (nom.) from the address, outputs Z4 and Z5 are delayed 500 ns (nom.) from Z1 and Z2 respectively. Input A2 being zero also inhibits the data window, Z5 and Z6, as a means of checking the stuck at one fault of the data window.

The address register (AR) is a part of the Address Register Circuit comprising the 22 S-R Flip-Flops, AB10F-AB315. The outputs (both true and complement) are connected to associated wires in the Address Bus. Logic zero levels at the Reset (R) inputs reset the flip-flops. For bits 10–14 and 21–23 of the AR, a single logic one input sets the flip-flops. Bits 15–20 and 24–31 require that both inputs be one to set the flip-flops.

Both the true and complement outputs of the AR flip-flops are brought out to be used as inputs to the other circuits of the PC. These outputs are AB10F and AB10F through AB31F and AB31F.

The Address Decoder Circuit (ADC)

Referring to FIG. 29, function of the ADC is to decode Bits 24–27 of the Address Register into one out of 16 logic levels and to decode Bits 28–31 into one out of 16 logic levels. The 32 output levels are used in the Matrix Access Circuit 107 (MXC) to select one of 256 Matrix words or are relayed back to the CP* via the PC(CN).RB as a means of verification of the ADC's operation.

Circuit Description

Inputs to the ADC are both the true and complement outputs of the Address Register Circuit 90 (ARC). The ADC is a level circuit employing conventional combinational logic to perform its function. The 32 output levels are grouped into two groups of 16 each.

One group is named Matrix Select Levels (MSL) and are numbered MSL00, MSL01, ......, MSL15. The MSL leads are used to select which Matrix number will be accessed by the MXC.

The other group is termed Word Select Levels (WSL) and are numbered WSL00, WSL01, ......, WSL 15. These leads are used to select which word in a given Matrix will be accessed by the MXC.

The 1 out of 8 group of outputs are termed Matrix Levels and are numbered M00L, M01L, . . . . . . . . M07L.

The 1 out of 16 group of outputs are termed Word Levels and are numbered W00L, W01L, . . . . . . . . W15L.

The Data Register and All Seems Well Circuits (DRC)

The function of the Data Register Circuit 100 (DRC) is to act as a 32-bit input and output buffer register for data between CP* and Matrices and for data from the Matrices and the CP*. The DRC also acts as an output port from the AR 90, the ADC 95, MXC 107 and MSC 109 to the Return Bus 103 (PC(CN).RB).

The All Seems Well Circuit 102 generates two signals during the two BOT instruction cycle. The first All Seems Well signal (ASW) verifies that the receipt of the address was in the proper code. The second ASW verifies that the monitored circuits in the PC have functioned properly. The ASW always accompanies the data placed on the Return Bus by the DRC.

Circuit Description of DRC (See FIGS. 30 and 31 and Table A below)

Circuit Inputs

Circuit inputs to the DRC which is implemented by NANO gates in FIG. 30 are of two types:

a. Control levels which are multiplied to all 32 bit positions of the register.

b. Data levels which feed individual bit positions of the register.

Under normal conditions, i.e., the TBF being reset, the control levels are (See following sections for equations):

a. CDRL (Clear Data Register Level) — Normally 0; the register resets when CDRL = 1.

b. RRBL (Read Return Bus Level) — When RRBL = 1, the register accepts the return data from the Matrices (points B).

c. LDRL (Load Data Register Level) — When LDRL = 1, the register should accept data from the data bus (points A) subject to strobe by DRWL.

DATA REGISTER CIRCUIT INPUTS

| BN | A | B | C | D | E | F |
|---|---|---|---|---|---|---|
| 00 | PC.DB. B00 | PU.RB. B00 | AB16F | MSL00 | M30F | 0 |
| 01 | B01 | B01 | AB17F | MSL01 | M20F | 0 |
| 02 | B02 | B02 | AB18F | MSL02 | M10F | 0 |
| 03 | B03 | B03 | AB19F | MSL03 | M00F | 0 |
| 04 | B04 | B04 | AB20F | MSL04 | W30F | 0 |
| 05 | B05 | B05 | AB21F | MSL05 | W20F | 0 |
| 06 | B06 | B06 | AB22F | MSL06 | W10F | 0 |
| 07 | B07 | B07 | AB23F | MSL07 | W00F | 0 |
| 08 | B08 | B08 | AB24F | MSL08 | M31F | 0 |
| 09 | B09 | B09 | AB25F | MSL09 | M21F | 0 |
| 10 | B10 | B10 | AB26F | MSL10 | M11F | 0 |
| 11 | B11 | B11 | AB27F | MSL11 | M01F | 0 |
| 12 | B12 | B12 | AB28F | MSL12 | W31F | 0 |
| 13 | B13 | B13 | AB29F | MSL13 | W21F | 0 |
| 14 | B14 | B14 | AB30F | MSL14 | W11F | 0 |
| 15 | B15 | B15 | AB31F | MSL18 | W01F | 0 |
| 16 | B16 | B16 | AB12F | WSL00 | 1 | 0 |
| 17 | B17 | B17 | AB13F | WSL01 | 1 | 0 |
| 18 | B18 | B18 | AB14F | WSL02 | 1 | 0 |
| 19 | B19 | B19 | U0L | WSL03 | 1 | 0 |
| 20 | B20 | B20 | U1L | WSL04 | PWF | 0 |
| 21 | B21 | B21 | U2L | WSL05 | $\overline{\text{PWF}}$ | 0 |
| 22 | B22 | B22 | U3L | WSL06 | WIF | 0 |
| 23 | B23 | B23 | U4L | WSL07 | $\overline{\text{WIF}}$ | 0 |
| 24 | B24 | B24 | U5L | WSL08 | RTF | 0 |
| 25 | B25 | B25 | U6L | WSL09 | $\overline{\text{RFF}}$ | 0 |
| 26 | B26 | B26 | U7L | WSL10 | RDF | 0 |
| 27 | B27 | B27 | AB10F | WSL11 | $\overline{\text{RDF}}$ | 0 |
| 28 | B28 | B28 | AB11F | WSL12 | UAF | 0 |
| 29 | B29 | B29 | 1 | WSL13 | $\overline{\text{UAF}}$ | 0 |
| 30 | B30 | B30 | 1 | WSL14 | TBF | 0 |
| 31 | B31 | B31 | 1 | WSL15 | $\overline{\text{TBF}}$ | 0 |

d. DRWL (Data Register Window Level) — This pulse occurs in response to any DO signal on PC.AB (See Section 2.2).

ADRL (Address Data Register Level) — When ADRL = 1, the contents of the DR are gated out onto RL (inputs to cable drivers of return bus).

f. RAEL (Return Address Echo Level) — When RAEL = 1, the address "echo", which appears on points C, (See FIG. 5) is gated onto RL.

g. RADL (Read Address Decoder Level) — When RADL = 1, the contents of the address decoder, appearing on points D, (See FIG. 5 and Section 3.2) and gated onto RL.

h. RCAL (Read Control Address Level) — RCAL = 1 during Control mode Read instructions.

i. MFEL (Maintenance Flip-Flop Enable Level) — Normally = 0. Equals 1 when address field contains (W) mode = 3 or 5. When RCAL · MFEL = 1, the status of flip-flops in MSC, MXC, and TGC, appearing on points E, are gated onto RL.

The data level inputs to the DRC are the outputs of the PC(CN).DB cable receivers, DB.B00–DB.B31, the outputs of the return bus from the Matrices, see FIG. 46 termed Peripheral Unit Return Bus (PU.RB.B-00–B31), and internal PC hardware states.

The internal PC hardware states are data to be placed on the PC(CN).RB and consist of:

a. Contents of the AR of the ARC.

b. Unit Responding Level (Plug-in option per PC copy).

c. MSL00–MSL15 outputs of the ADC.

d. WSL00–WSL15 outputs of the ADC.

e. The check circuit flip-flop states of the MXC.

f. The state of the maintenance flip-flops of the MSC.

Circuit Outputs

The DRC outputs consist of data in two groups of 32 bits each. One set, the outputs of the flip-flops of the Dr, termed DB00F through DB31F, are the data to be written into a Matrix Word. These outputs feed the MXC exclusively.

The other set of outputs of the DRC are used as inputs to the PC(CN).RB cable drivers 125 as shown in FIG. 31. These drivers 126 are also enable gates or AND gates. Both data in the DR and the internal hardware states are loaded onto the PC(CN).RB via these 32 DRC outputs termed Return Levels (RL00–RL31). Note that the RB cable drivers are gated on twice during each instruction cycle: RBSL = CP1L + CP7L.

Boolean Relationships of DRC Outputs

The Boolean equations for any one bit of the 32-bit DR, DB(BN)F, where BN = Bit Number, are that of a S-R Flip-Flop:

$$Y_1 = \overline{X}_1 + \overline{X}_2 + \overline{Y}_2$$

$$Y_1 = X_3 + \overline{Y}_1$$

where:

$$X_1 = \overline{\text{LDRL . DRWL . A}}$$

$$X_2 = \overline{\text{RRBL . B}}$$

$$X_3 = \text{CDRL}$$

$$Y_2 = \overline{\text{DB(BN)F}}$$

Figure 5:
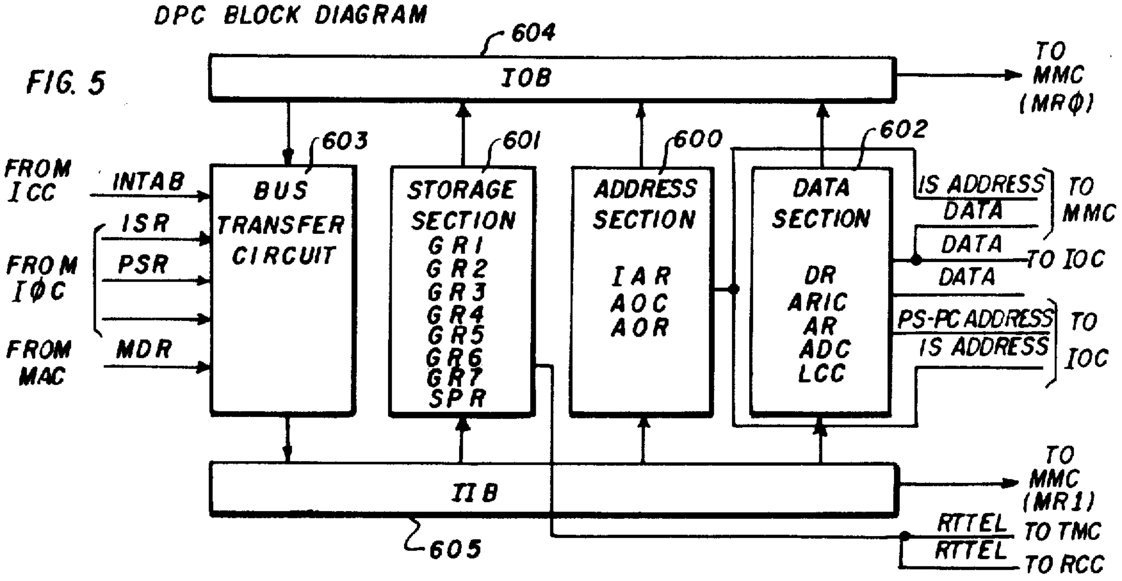
FIG. 5 is a functional block diagram of the Data Processing Circuit of the Central Processor.

From the equations it is apparent that any DR bit number (BN) can be set to the state determined by A or B given in FIG. 5. Also, the DR bit will be reset when CDRL equals logic zero. The Boolean relation for any one Return Level RL(BN) is a combinational function of its input variables as follows:

$$\text{RL(BN)} = (\text{ADRL}\cdot\text{DB(BN)F}) + (\text{RAEL}\cdot\text{C}) + (\text{RADL}\cdot\text{D}) + (\text{RCAL}\cdot\text{MFEL}\cdot\text{E})$$

From the above equations, data is loaded onto the PC(CN).RB from the following four sources:

a. The contents of the DR (Inputs A and B).

b. The contents of the AR (Input C).

c. The decoded address from the ADC (Input D).

d. The state of the maintenance flips of the MSC, the check circuit flip-flops of MXC and the PWF of the TGC (Input E).

Timing Sequence In The DRC

Both functions of the DRC, loading the DR and loading data onto the return bus, are timed operations, the source of the timing levels being the Timing Generator Circuit (TGC) and the Address Register Circuit (ARC).

The DR can be loaded during two different timing levels from two distinct sources. When data from the PC(CN).DB is to be loaded into the DR, the action occurs during the Data Register Window Level (DRWL) interval generated in the ARC. Data from the Matrices are loaded during the interval when RRBL is one, i.e. during the CP5L timing level output of the TGC. The DR is always reset during the RDRL interval generated in the ARC regardless of which source is to load the DR.

Information strobed out of PC onto the RB occurs during the CP1L and CP7L timing level outputs of the TGC. During CP1L the only data placed on the RB is the contents of the AR, which is the address echo sent back to the CP*. During CP7L any one of the four sets of data may be strobed onto the RB, i.e. the contents of the AR, the contents of the DR, the decoded address of the ADC, or the maintenance and check flip-flop's states.

Description Of The All Seems Well Circuit (See FIG. 31)

Circuit Description

The function of the All Seems Well circuit is to generate the All Seems Well signal (ASW), PC(CN).RB.B32, required by the CP*. It is included with the DRC because it always accompanies the data strobed out of the DRC.

Two ASW signals are required for checking purposes by the CP*. The first occurs during CP1L and accompanies the address echo to the CP*. The presence of this first signal indicates that specific fields of the address in the AR are in the correct code. The requirements of this predetermined code are:

a. Read/Write Control, bits 10 and 11, are in a one out of two code.
b. Mode control, bits 12–14, are in a one out of three code.
c. Unit Number, bits 21–23, equals the unit number of the PC (a wiring option in each PC).

The above requirements must also be met to start the Timing Generator; therefore, a TGC output, in particular CP0L, is used as the first ASW.

The second ASW occurs during CP7L and contains further information only when Matrices are involved, i.e. Normal mode instructions. Under these conditions, the ASW being one indicates that one and only one word out of 256 matrix words was accessed by the MXC. An output from the MXC, Select Error Level (SEL) being logically one, indicates a failure to select only one word. SEL being equal to 1 inhibits the second ASW.

Boolean Equation for ASW

The Boolean equation governing ASW is:

$$ASW = PC(CN).RB.B32 = RBSL(CP0L + \overline{UAF} + \overline{AB14F} + \overline{SEL})$$

From the equation, ASW always occurs during CP0L, for Special and Control Mode instructions ASW always occurs during CP7L, and for Normal mode instructions, when UAF = 1, occurs only when the 1 out of 256 checks of the MXC is passed.

The Control Decoder Circuit (CDC) (FIG. 32)

Function

The function of the CDC is to generate control levels which are used in the DRC, MXC, and MSC in the execution of an instruction. The six instructions of the PU Instruction Set are decoded by the CDC into one control level or a sequential series of control levels. These levels activate the required circuits in the PC that must function in order to execute the requested instruction.

The CDC also generates the strobe pulse, RBSL, for data from the DRC which is to be sent to the CP* via the PC(CN).RB. This strobe pulse is generated for all six instructions, regardless of the instruction type.

Circuit Description

Circuit Inputs

Inputs to the CDC are from the ARC, MSC, and TGC. The inputs from the ARC are the following levels of the ARC:

AB10F and AB11F — Read/Write bits
AB12F - AB14F — Mode bits
AB29F, $\overline{AB29F}$, AB30F
$\overline{AB30F}$, and AB31F — Word no. bits
RDRL — Reset Data Register Level Inputs from the MSC are the following maintenance flip-flop states:

$\overline{TBF}$ — The complement output of the Trouble Flip-flop.
UAF — The true output of the Active Unit Flip-flop.

Inputs to the CDC from the TGC are the following signals:

CP0L
CP1L
CP3L
CP4L
CP5L
CP6L
CP7L
CP8L
AUL — (Addressed Unit Level) indicates that the instruction is to be executed by this PCU number Circuit Outputs Thirteen output levels are inputs to three other PC circuits as follows:

a. Address Data Register Level (ADRL) — an input to the DRC which allows the contents of the DR to be gated out to the return bus. (RPU, WPU, WPUN, and RPUN (W) $mod_8 = 5$ instructions).
b. Load Data Register Level (LDRL) — an input to the DRC which allows data from the PC(CN).DB. to be loaded into the DR.(WPU and WPUN (W) $mod_8 = 5$ instructions).
c. Read Return Bus Level (RRBL) — an input to the DRC which allows data from matrix words to be loaded into the DR.(RPU instruction).

d. Clear Data Register Level (CDRL) — an input to the DRC which precedes LDRL and RRBL for the purpose of resetting the DR. (RPU, WPU, WPUN (W) $mod_8 = 5$ instructions).

e. Return Address Echo Level (RAEL) — an input to the DRC which allows the AR contents to be gated out to the return bus. (Appears during CP0L for all instructions and during CP6L for a RPUA instruction).

f. Read Address Decoder Level (RADL) — an input to the DRC which allows the decoded addresses of the ADC to be gated out to the return bus. (RPUT instruction).

g. Read Control Address Level (RCAL) and Maintenance Flip-Flop Enable Level (MFEL) — used in conjunction to read out the state of the maintenance flip-flops of the MSC, the check flip-flops of the MXC, and the PWF of the TGC, onto the return bus. (RPUN (W) $mode_8 = 0, 1, 2, 4, 6$, and 7 instructions).

h. Return Bus Strobe Level (RBSL) — an input to the PC(CN).RB cable drivers used to strobe out data to the CP* (all instructions).

i. Write Matrix Level (WML) — an input to the MXC which allows data in the DR to be strobed out on the PU.DB to the Matrices. (WPU Instruction).

j. Select Matrix Word Level (SMWL) — an input to the MXC which allows the output of the ADC to be gated to a Matrix word. (RPU and WPU instructions).

k. WRite Level (WRL) — an input tO the MXC which allows the WR(CN) level to be gated to all COM's and HYM's. (WPU and RPU instructions).

l. Maintenance Flip-Flop Set Level (MFSL) and Maintenance Flip-Flop Reset Level (MFRL) — used in conjunction with data present on the PC(CN).DB to either set or reset the maintenance flip-flops in the MSC. (WPUM (W) $mod_8 = 0, 1, 2, 4, 6$, or 7 instructions).

Boolean Equations of Circuit Outputs

The Boolean equations governing the operation of the CDC are as follows:

a. $ADRL = [AB13F \cdot AB29F \cdot \overline{AB30F} \cdot AB31F + AB14F]\ CP6L$ b. $LDRL = AUL \cdot AB11F(AB14F + AB13F \cdot AB29F \cdot \overline{AB30F} \cdot AB31F)$ c. $RRBL = AB10F \cdot AB14F \cdot CP5L$ d. $CDRL = RDRL \cdot AUL[AB11F \cdot AB13F \cdot AB29F \cdot \overline{AB30F} \cdot AB31F + AB14F]$ e. $RAEL = CP0L + AB11F \cdot AB12F \cdot CP6L$ f. $RADL = AB10F \cdot AB12F \cdot CP6L$ g. $RCAL = AB10F \cdot AB13F \cdot CP6L$ h. $\overline{MFEL} = [\overline{AB29F} \cdot \overline{AB30F} + AB29F \cdot AB30F] + \overline{AB31F}$ i. $RBSL = (CP1L + CP7L) \cdot \overline{TBF}$ j. $SMWL = AB14F \cdot UAF \cdot \overline{TBF} \cdot CP3L$ k. $WML = AB11F \cdot AB14F \cdot UAF \cdot \overline{TBF} \cdot CP4L$ l. $WRL = UAF \cdot \overline{TBF} \cdot AB14F(AB11F \cdot CP3L + CP8L)$ m. $MFSL = MFRL = AB11F \cdot AB13F \cdot AUL$ NOte that the RBSL always appears after, by 250 ns (nom.), all other CDC outputs. This masking insures that all data are placed on the PC(CN).RB simultaneously, by waiting an interval for a steady state to exist in the DRC.

The Matrix Access Circuit (MXC)

Function

The function of the MXC 107 is to act as the PC's output port to the Matrices. The MXC contains a set of 256 AC cable drivers for accessing the 256 Matrix words. In addition to these, called CWS (Control Word Select) cable drivers, there are 33 cable drivers for 32 bits of data and a Write, WR(CN), signal per PC in order for the PC to write into a COM or HYM word.

An auxiliary function of the MXC is to verify, that when the circuit is accessed, one and only one word of the 256 Matrix words was addressed. This function is achieved by the use of current sensor circuits and logic functions. The output of this check circuit is used to create the ASW signal used in the follow through cycle.

The Cable Driver Circuit

The MXC cable driver circuit (shown in FIGS. 33–35) is duplicated per PC, each circuit driving the same bus, (PU.BS — Peripheral Unit Bus System), in parallel. The combination of AC driver, in he PC copy, and AC receiver in the Matrix performs the logic "and" function of three driver inputs.

Figures 33, 34, 35:
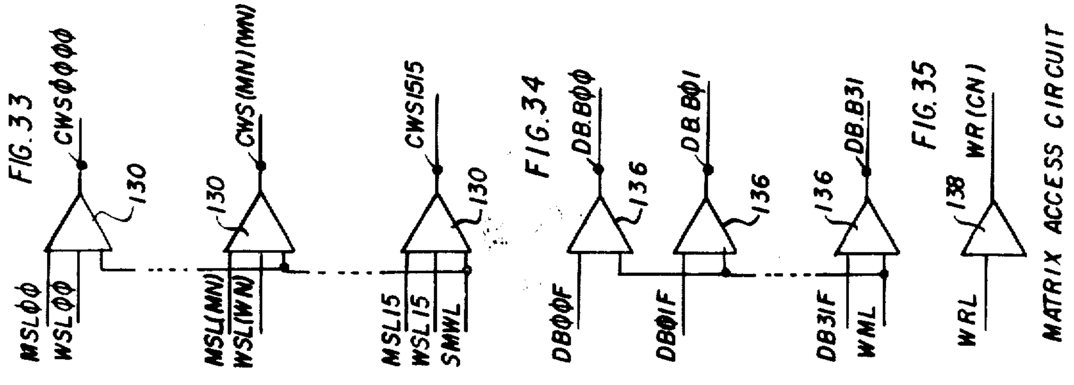
Figure 40:
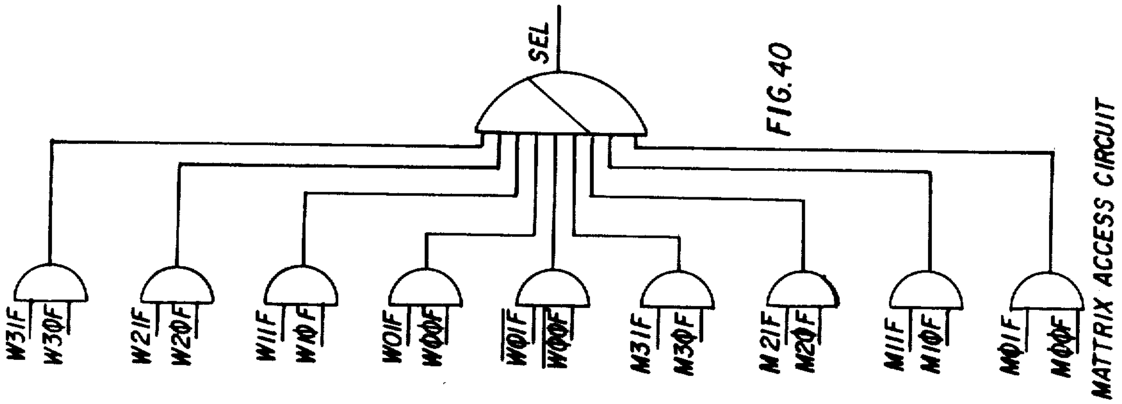
Figure 39:
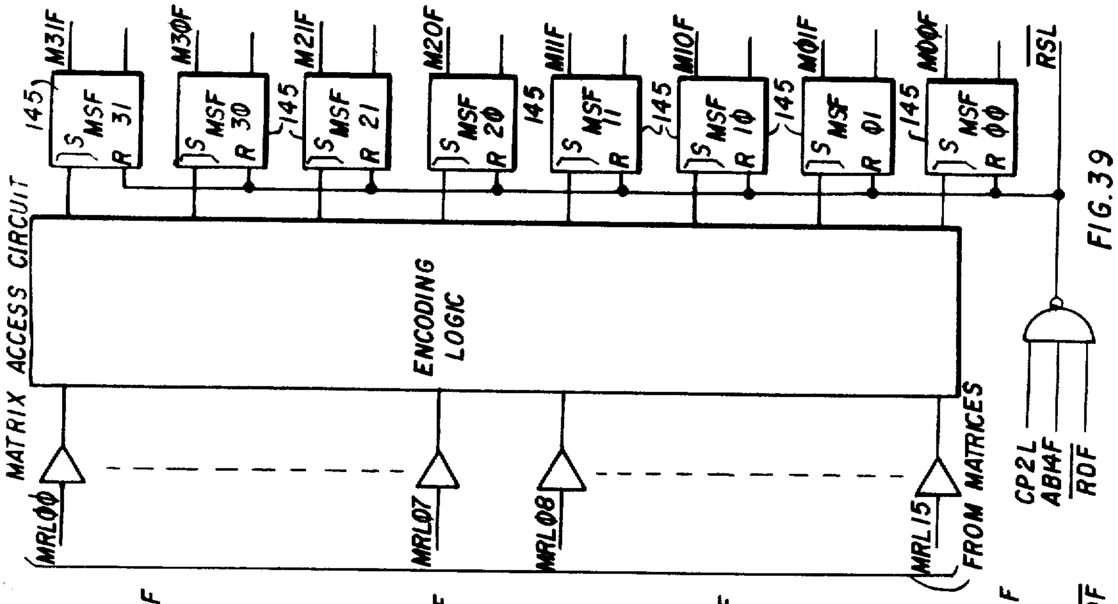

The outputs of the 289 Cable Drivers in the MXC are divided into two groups. One group seen in FIG. 33 is the 256 cable drivers 130 which drive the Matrix words and is termed Controller Word Select (CWS) level group and are numbered as follows:

CWS0000, CWS0001, ...., CWS(MN) (WN), ...., CWS1515 where:

MN = Matrix Number (0–15)

WN = Word Number (0–15)

The other group of 33 cable drivers denoted 136 in FIG. 34 consist of 32 data bits termed Peripheral Unit Data Bus Bits, numbered (PU.DB.B00–PU.DB.B31). In addition there is the single WRite signal cable driver 138 in FIG. 35 bearing its PC copy number (CN), termed WR(CN), which feeds all COM's and HYM's.

The Boolean equation for any CWS(MN) (WN) is:

$$CWS(MN)\ (WN) = MSL(MN).WSL(WN).SMWL$$

where MSL and WSL are outputs of the ADC and SMWL is the strobed output of the CDC.

The Boolean equation for any PU.DB.B.(BN), where BN = Bit Number (00–31), is:

$$PU.DB.B(BN) = DB(BN)F.WML$$

where DB(BN)F is output of the Data Register flip-flop and WML is the strobed output of the CDC.

From equations *j*, *k*, and *l* given previously, a timing skew is apparent. Data is strobed out during CP4L, whereas the CWS level and WR level appear during CP3L. This delay of 750 ns (nom.) between the data and CWS level is required by the COM hardware. A second WR level is generated during CP8L in order to satisfy a maintenance requirement of the COM.

The CDC outputs, SMWL, WML, and WRL determine which, if any, of the MXC cable drivers are to be selected, i.e., Read or Write a Matrix word.

The Cable Receiver Circuit (See FIG. 46)

Since matrices may be situated physically on both sides of a PC copy and due to the restriction that an AC bus can feed a receiver from one direction, the return bus is split into two components. PU.RB.B00R–B31R will be associated with all matrices located to the right of the PC copy. PU.RB. B00L–B31L will be associated with all matrices located to the left of the PC copy.

The logic equation for any bit number (BN) of a return bus cable receiver pair output, Return Bit (BN) (RB(BN)) is:

$$RB(BN) = RB.B(BN)R + RB.B(BN)L.$$

If matrices are not located on both sides of a particular PC copy, then only one set of cable receivers need be implemented.

The 1 Out of 256 Check Circuit (in MXC 107)

The verification that only one of the 256 Matrix words is accessed when a WPU or RPU instruction is executed is achieved by combining the results of two separate tests. The first test verifies that only one out of 16 words was accessed, and the second test verifies that only one of the sixteen Matrices was accessed by this one word. Logically "Anding" these two results verifies that only one word in one matrix was accessed by the PC. The construction of these tests is done by dividing the 256 outputs of the MXC into 16 groups of 16 each, each group representing a given word of all Matrices. The first test is to logically check a one out of 16 select of the cable driver boards in the PC copy. The second test is a one out of 16 logic check on response signals from the sixteen matrices.

The 1 Out of 16 Word Number Check

Figure 36:
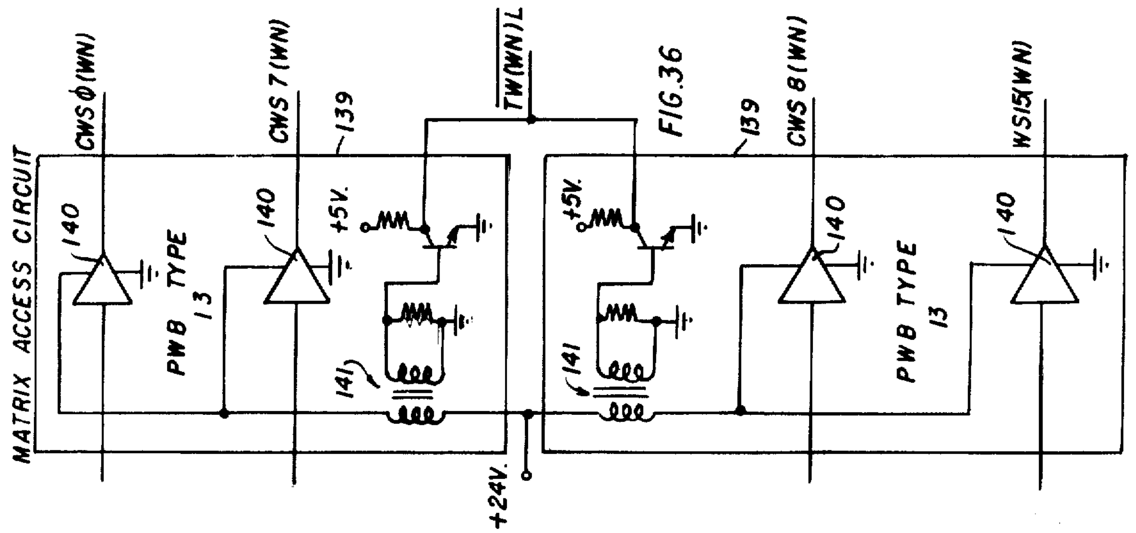

The cable driver boards schematically shown with blocks 139 in FIG. 36 used in the MXC of the PC contain eight cable drivers 140 and one current sensor circuit 141. The inputs to the cable drivers are wired to the ADC outputs such that a cable driver board contains a particular word number (WN) for the first eight Matrices and another cable driver board contains the same WN output for the remaining eight Matrices. These two cable driver boards have their current sensor outputs tied together constituting an output termed Test Word (WN) Level (TW(WN)L). There are 16 groups of two cable driver boards, one for each word number; hence, there are sixteen TW(WN)L outputs numbered TW00l–TW15L.

A zero logic level on a $\overline{TW(WN)L}$ indicates that at least one of the 16 associated cable drivers has produced a logic one output. A normal response from the 16 $\overline{TWL}$ outputs is only one zero level should appear when a WPU or RPU instruction is executed.

Figure 37:
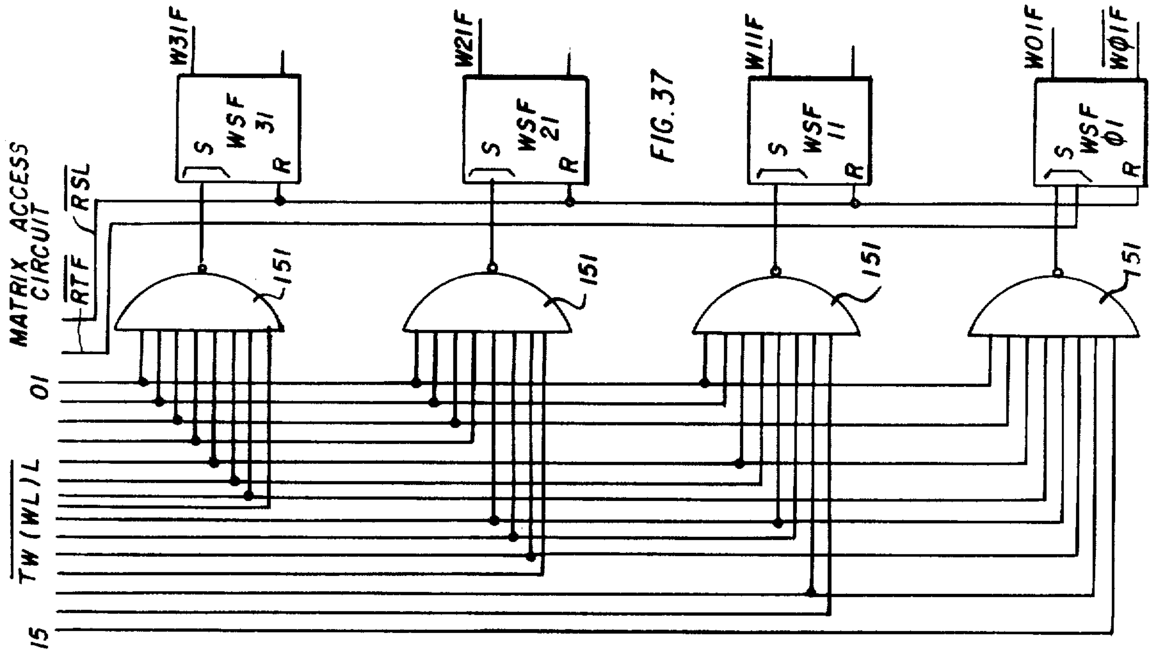
Figure 38:
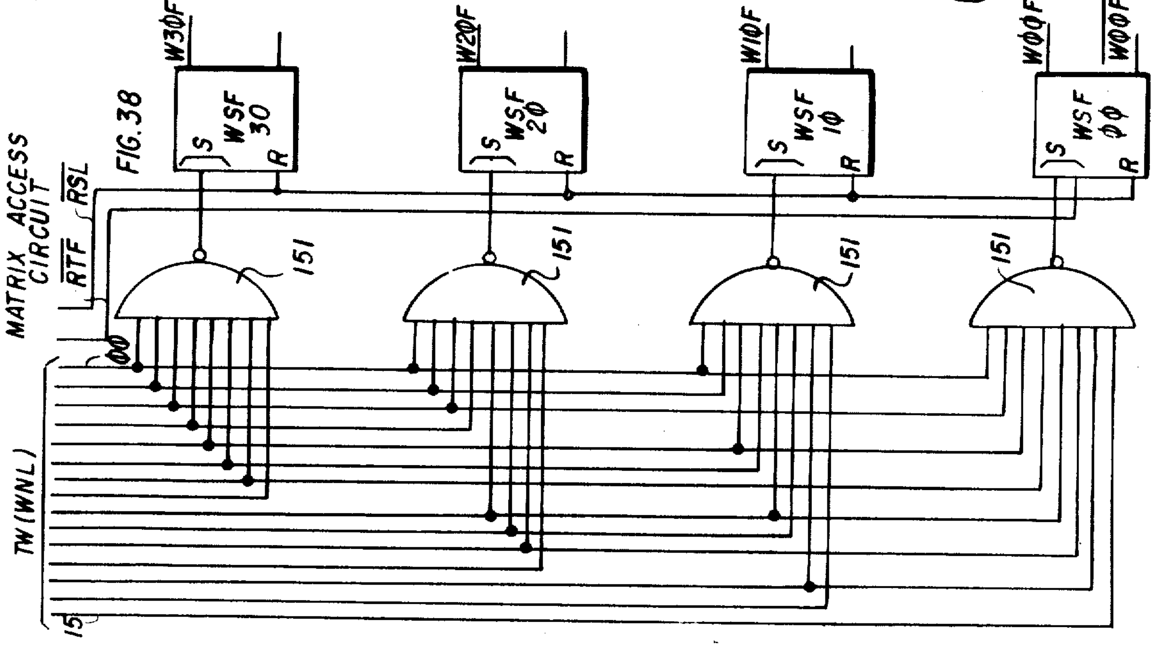

A logic check is made on the 16 TWL signals to verify that only one zero level appeared. The logic used to make this test is shown in FIGS. 37 and 38. The circuitry includes two sets of four Word Select Flip-Flops (WSF). One set numbered WSF01–WSF31 (FIG. 37) is used to store the binary encoded TWL number (0–15). The other set numbered WSF00–WSF30 (FIG. 38) is used to store the one's complement of the binary encoded TWL number (0–15). The two sets of four, eight input Nand gates 151 perform the encoding function, whose outputs set the associated WSF's. The flip-flops are reset by the Reset Level (RSL) input prior to the execution of a WPU or RPU instruction.

The true outputs of the WSF00 and WSF01 through WSF30 and WSF31 are logically compared. These pairs of outputs should always be complementary. Any two both being one indicates that more than one TWL occurred, and the Select Error Level (SEL) will indicate a failure by becoming true, see FIG. 40.

The complement outputs of WSF00 and WSF01 are likewise compared and should normally be inverse. If no TWL occurs, this will cause WSF00 and WSF01 to remain one, making SEL become true.

By comparing the binary encoded TWL number and its ones complement, a SEL is generated when either no TWL signal or more than TWL signal occurs in executing a WPU or RPU instruction.

The 1 Out of 16 Matrix Check

Each Matrix associated with a PC contains a cable driver and private bus back to both PC copies. These buses from the Matrices are termed the Matrix Response Levels (MRL), numbered MRL00–MRL15 in FIG. 49. Under normal operation only one of 16 Matrices should be accessed. The matrix which is accessed by the PC copy will generate a logic one signal on its MRL (MN) in both copies of the PC. Normal responses require that only one MRL be true during an instruction execution. An identical method to logically checking the TWL signals is implemented to verify the correct code on the MRL signals. Two banks of flip-flops 145, Matrix Select Flip-flops (MSF), numbered 01–31 and 00–30, store the binary encoded MRL number and its ones complement, respectively.

Since a failure in a Matrix should not influence the ASW sent to the CP*, the case where no MRL is a logic one can be ignored. If the SEL shows a normal condition, and no MRL goes to one, the error must be due to a matrix fault. The Select Error Level (SEL) becomes true if two or more MRL signals become a logic one, indicating two or more matrices have responded to an instruction. The SEL is used in generating the follow through cycle ASW.

Resetting the MSF and WSF

These two banks of eight flip-flops are reset by a common signal termed ReSet Level (RSL). These flip-flops are reset by RSL prior to the accessing of a matrix word, provided the maintenance flip-flop RDF is reset, i.e., RDF = 0. The Boolean equation for RSL is:

$$RSL = CP2L \cdot \overline{RDF} \cdot AB14F$$

These flip-flops are set by the output of the encoding logic gates (see FIGS. 37, 38), provided that the maintenance flip-flop RTF is reset, i.e. RTF = 0.

Routining the Check Circuit

Two maintenance flip-flops in the MSC 109 (see FIG. 41) namely the Reset Disable Flip-flops (RDF) and the Routine Test Flip-flop (RTF), are used to routine the check circuit by forcing failures to occur in the circuit and observing the results in the ASW. This software routine maintenance must be periodically performed in order to locate failures in the check circuit which otherwise could not be detected.

The two flip-flops, RDF and RTF, are normally in the reset state. They can be set and reset by a WPUN(W) $mod_R$ = 0, 1, 2, 4, 6, or 7 instruction. By setting RDF, the MSF and WSF reset signal is inhibited, (see FIG. 39). If two normal read instructions of different word addresses follow, the result simulates a response on two TWL leads which should cause an ASW failure. Setting the RTF inhibits the set inputs to WSF00 & WSF01 which followed by a normal read simulates no response on the TWL leads, which should also cause a failure of the ASW. By using several combinations of matrix and word numbers in normal read instructions with the above tests, a fault in the check circuit can be identified and localized.

As an aid in localizing faults, the MSF's and WSF's can be read by the CP* with a RPUN(W) $mod_8 = 0, 1, 2, 4, 6,$ or 7 instruction. Faults in the flip-flops or in the encoding logic can be quickly identified by reading the state of these flip-flops.

The Maintenance Status CIrcuit (MSC)

Function

The Maintenance Status Circuit is a five bit buffer which can be written into by the CP* via the PC(CN).DB. The state of the five flip-flops may also be relayed on the CP* via the PC(CN).RB. The five maintenance flip-flops are:

a. Active Unit F/F (UAF)
b. Trouble F/F (TBF)
c. Window Inhibit F/F (WIF)
d. Routine Test F/F (RTF)
e. Reset Disable F/F (RDF)

The UAF and TBF are used to define an active PC and faulty PC, respectively. The WIF, RTF, and RDF are used to aid in routining the ARC, MXC, and TGC as described in Section 2, Section 6, and Section 8.

Circuit Description (See FIG. 41)

Logic Implementation

The data input to the MSC are bits 22, 24, 26, 28, and 30 of the PC(CN).DB direct from the cable receivers. The control level inputs are Reset Data Register Level (RDRL) and Data Register Window Level (DRWL) from the ARC and Maintenance Flip-Flop Set Level (MFSL), Maintenance Flip-Flop Reset Level (MFRL), and Maintenance Flip-Flop Enable Level ($\overline{MFEL}$) from The CDC.

All five flip-flops can be set or reset via the CP* A one in the respective data bit sets the flip-flop, while a zero resets the flip during a WPUN(W) $mod_8 = 0, 1, 2, 4, 6,$ or 7 instruction. MFSL and MFRL are redundant signals which become true for any WPUN instruction. $\overline{MFEL}$ becomes true whenever (W) $mod_8 = 0, 1, 2, 4, 6,$ and 7. The redundancy of MFSL and MFRL is necessary to always be able to take a bad copy out of service under fault conditions, i.e. either set TBF and set UAF or vice-versa. $\overline{MFEL}$ was chosen to become true for all values of W other than 3 and 5 so that no single AB bit failure would make the Maintenance flip-flops inaccessible.

The UAF and TBF must be jammed reset and set, respectively, when power is turned on. The Power On Level (POL) accomplishes this requirement. The +24 Volt power appears 30–40 milliseconds after the +5 Volt power. This delay is used to generate a zero going logic pulse, POL, which resets the UAF and sets the TBF.

Circuit Outputs

The outputs of the MSC are the true and complement outputs of the five maintenance flip-flops. Both outputs of the TBF, UAF, WIF, RTF, and RDF go to the DRC for strobing onto the PC(CN).RB. The UAF and $\overline{TBF}$ levels are used in the CDC to inhibit the access to the Matrices and the CP*. The $\overline{WIF}$ level is used in the ARC to inhibit the ARWL and DRWL signals in the routining of the ARC. The $\overline{RTF}$ and $\overline{RDF}$ levels are used for the routining of the check circuits of the MXC and TGC.

The Timing Generator Circuit (TGC)

Function

The Timing Generator Circuit has three functions which it performs. First, upon receipt of an address in the AR, the TGC decodes the unit number field and checks the pre-determined codes of other fields of the address. If the unit number equals that of the particular PC and the other fields of the address are in the proper code, the TGC generates a Timing Generator Initiate Level (TGIL). Secondly, this level is used to trigger a delay line circuit that generates a series of nine sequential pulse outputs termed Clock Pulse Levels (CPL) and numbered CP0L through CP8L. The third function of the TGC is to monitor the CPL outputs and detect faults in the TGC which would either invert or change the widths of the CPL outputs.

Circuit Description

Figure 42:
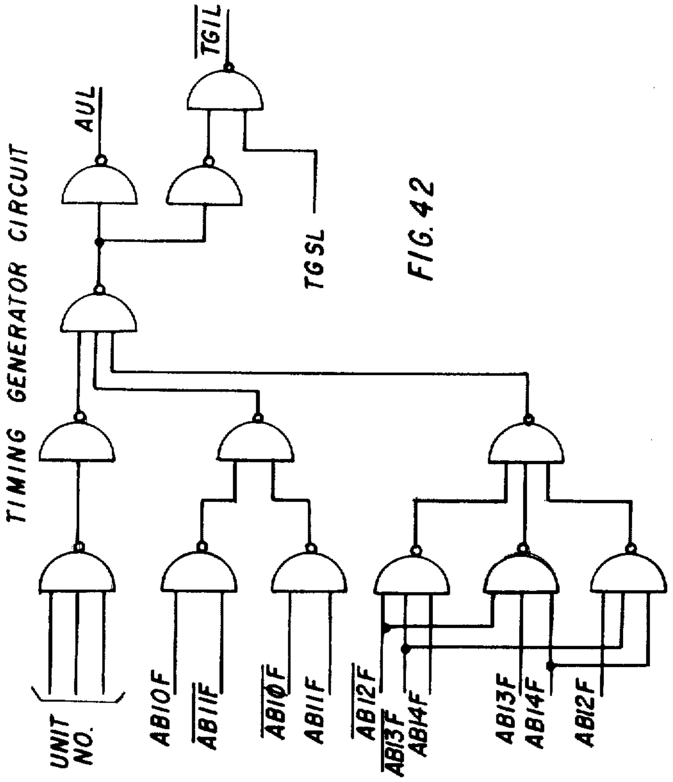

The TGC Start Circuit (See FIG. 42)

The Timing Generator Circuit should not generate any outputs unless the instruction in the AR contains the unit number of the associated PC and the predetermined codes in certain bit fields are correct as defined in Section 4.3.1. The start circuit makes these checks and generates the TGIL which starts the CPL generation.

The Boolean equation for TGIL is:

$$\overline{TGIL} = U(N)L.TGSL.(AB10F.\overline{AB11F} + \overline{AB10F}.AB11F).(\overline{AB12F}.\overline{AB13F}.AB14F + \overline{AB12F}.AB13F.\overline{AB14F} + AB12F.\overline{AB13F}.\overline{AB14F})$$

U(N)L is derived from the three bit unit number field of the instruction, i.e. AB21F–AB23F and is obtained by a plug-in option in each PC to yield U(N)L = 1 when its unit number appears in the AR. U(N)L is also used as an input to the DRC to be included in the unit responding field of the address echo.

The TGSL Timing Generator Strobe Level, output of the ARC is used as a strobe for TGIL. TGSL appears 400 ns (nom.) after the DO signal and has a 2.75 microsecond duration.

One other output, termed Addressed Unit Level (AUL) is brought out to the CDC. AUL is logically equal to TGIL without the TGSL strobe. This signal is required by all CDC outputs which are not strobed by CPL's.

The Timing Generator Delay Line Circuit

Figure 44:
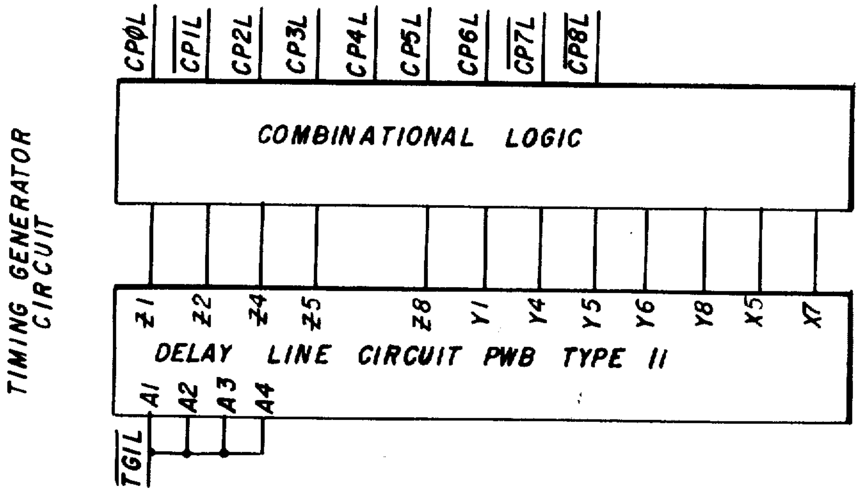

FIG. 44 illustrates the delay line circuit. A zero going pulse on TGIL of 2.75 μs (nom.) width propagates down a delay line with a total delay of 5.5 μs (nom.). The delay line is tapped at 250 ns (nom.) intervals. Twelve taps from the delay line are inputs to a combinational logic circuit which convert these 2.75 μs pulses into the sequential chain of Clock Pulse Levels (CPL) shown in FIG. 45).

The nine CPL outputs are used to control the timing of all circuits in the PC copy. Briefly, the CPL outputs and their primary functions are:

CP0L — Gate the contents of the AR into the DRC to construct the address echo.
CP1L — Strobe address echo onto PC(CN).RB.
CP2L — Reset WSF's and MSF's in MXC.
CP3L — Read or Write a Matrix word.
CP4L — Strobe contents of DR out to a Control or Hybrid Matrix.
CP5L — Data window for data from a Matrix word to be loaded into DR.
CP6L — Activates data source to be sent to CP*.
CP7L — Strobe data onto PC(CN).RB.
CP8L — Send a second WR(CN) signal to all COM's and HYM's.

Figure 43:
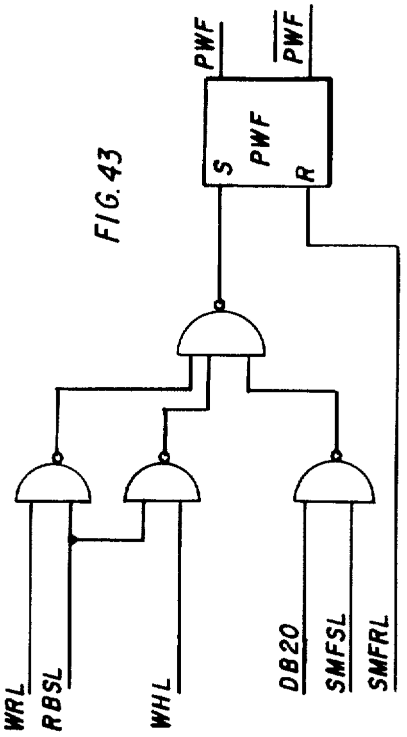

The Pulse Width Flip-Flop (PWF) (See FIG. 43)

Certain faults within the combinational logic of FIG. 16 could change the width or invert the CPL signals. Under these fault conditions the PC would still logically be operative; however, the increased width of $\overline{CP1L}$, CP3L, CP4L, $\overline{CP7L}$, and $\overline{CP8L}$ could damage the AC cable drivers by exceeding their rated duty cycle.

The PWF circuit detects these dynamic CPL faults and if one occurs during a Normal mode instruction the PWF is set. The PWF is reset by $\overline{RSL}$ only during Normal mode instructions. The state of this flip-flop can be read out by a RPUN instruction and must be read out on a routine basis to insure that the CPL outputs are not in error. Hard faults, i.e. CPL's stuck at 0 or 1 can be detected by normal circuit routining.

III. The Central Processor

III. A. Introduction

Figure 1:
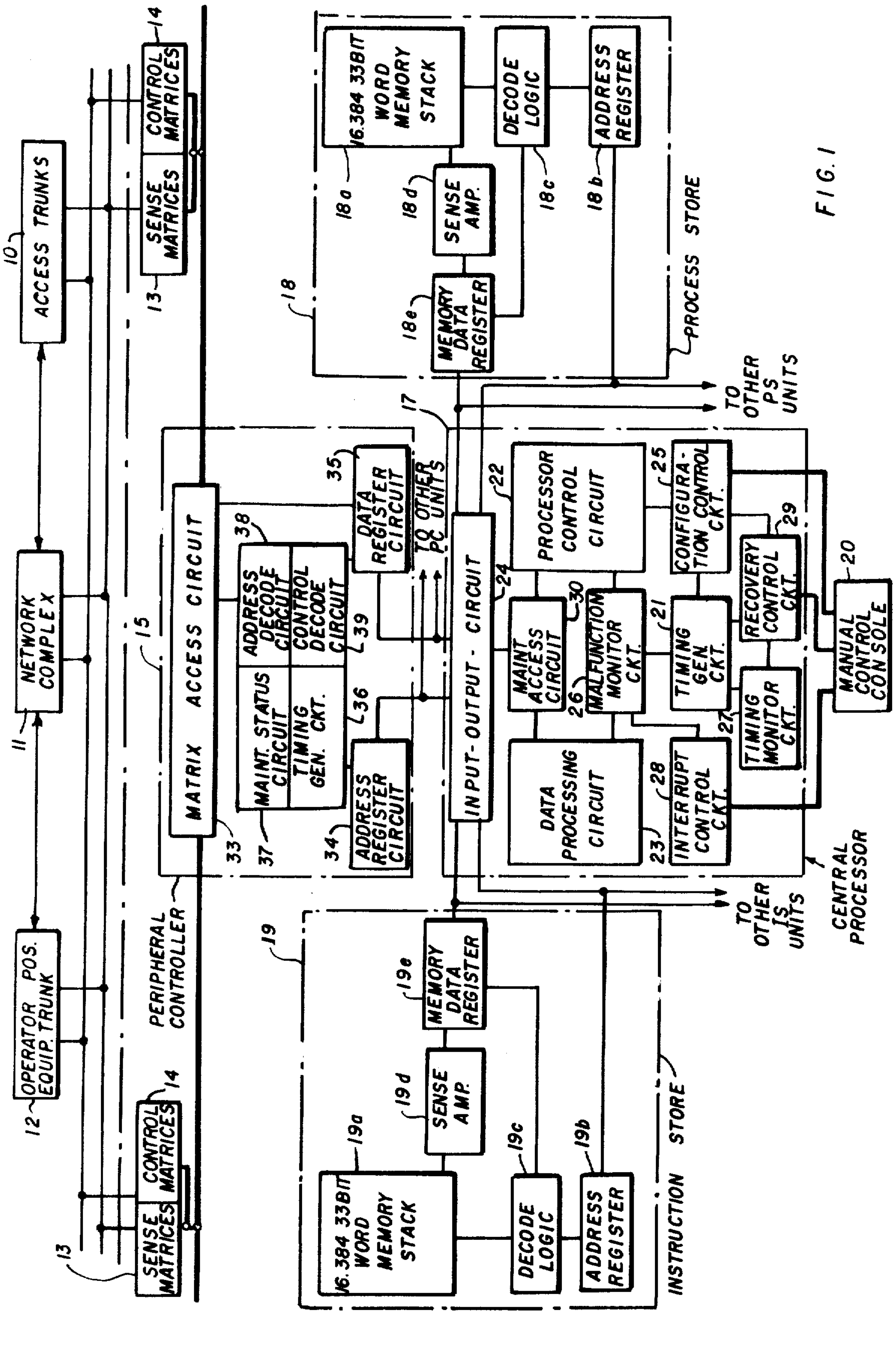
FIG. 1 is a functional block diagram of the TSPS System and the Control and Maintenance Complex.
Figure 2:
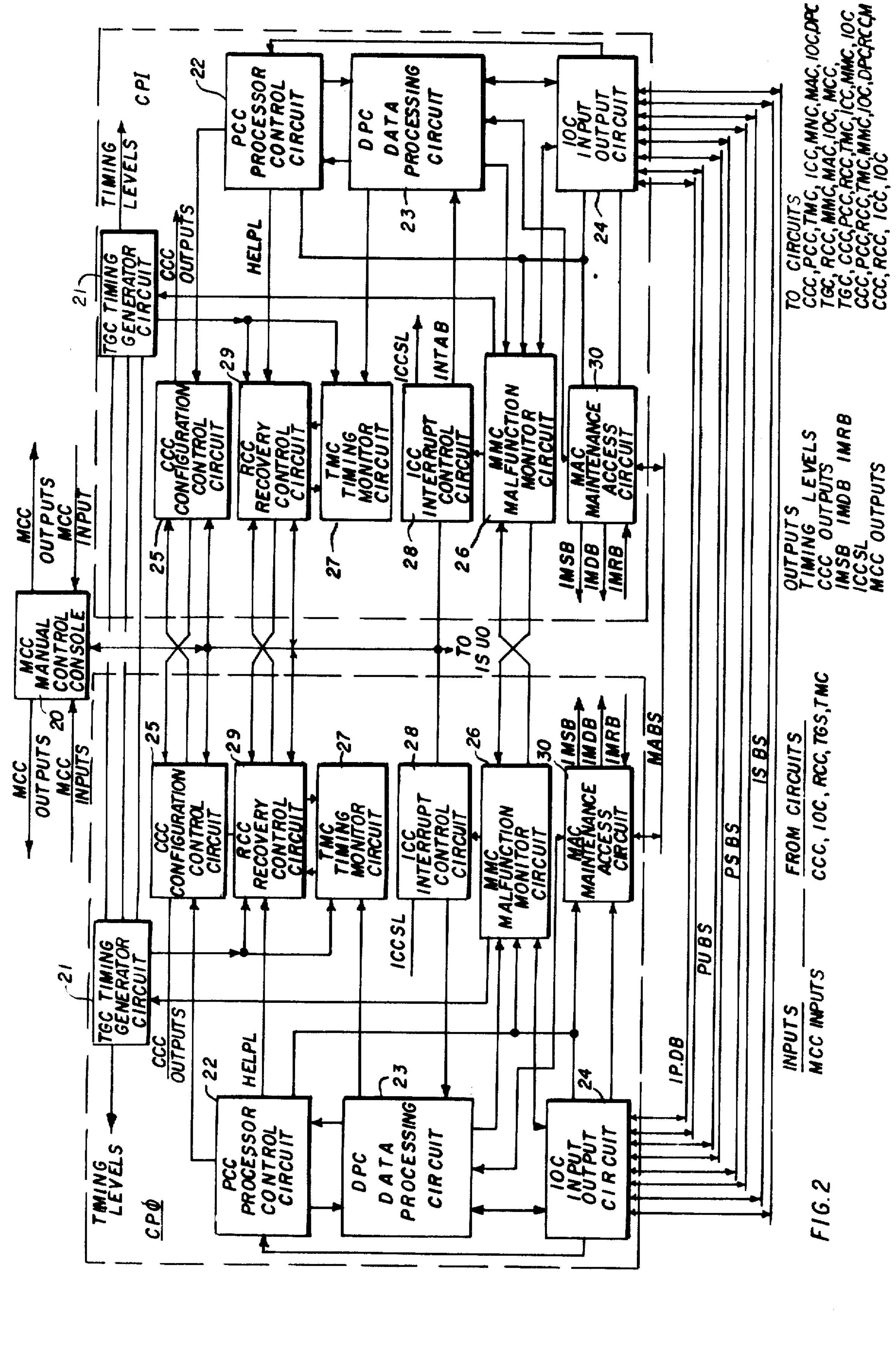
FIG. 2 is a functional block diagram showing redundant copies of the Central Processor and their associated bus systems.

Before giving a detailed explanation of each of the circuits involved in the actual processing of data, as distinguished from the performance of maintenance functions, it is thought that the detailed explanation would be better understood if a brief description of each circuit in the CP as shown in FIG. 1 were given first.

III. A. 1 Processing Circuits

Timing Generator Circuit (TGC)

Figure 3:
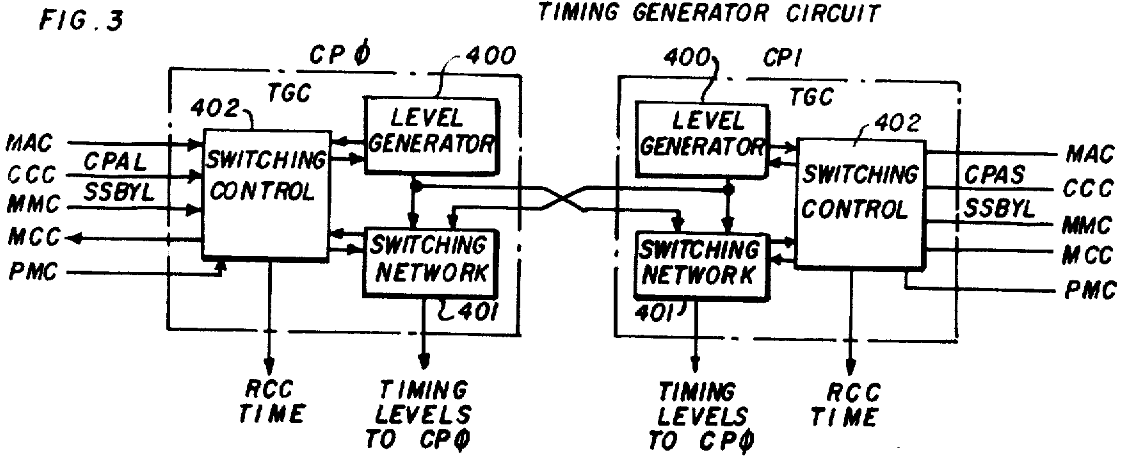
FIG. 3 is a functional block diagram of the Timing Generator Circuit of the Central Processor.

The Timing Generator Circuit 21 (TGC) creates the timing intervals for the Central Processor. A more detailed functional block diagram is shown in FIG. 3.

The TGC creates eight timing intervals every 4 μseconds. For each timing interval, TGC produces a 500 nsecond timing interval place level (PL) and a 400 nsecond timing interval accept level (AL). Each sequence of eight timing intervals is called a cycle. Nearly all sequential control in the CP is provided by the timing interval place and accept levels.

Generally, the timing interval place levels are used to gate information out of flip-flop storage while timing interval accept levels are used to accept information into flip-flop storage.

The TGC in each CP generate timing levels. To assure synchronism between CP's, timing levels generated in the active CP control both CP's. A switching network in each TGC transmits or receives the timing levels from the active TGC and supplies them to the CP circuits. The standby CP may be stopped by directing the TGC in the standby CP to inhibit reception of timing levels. The TGC also notifies the Recovery COntrol Circuit 29 (RCC) and Timing Monitor Circuit 27 (TMC) for maintenance purposes whenever the CP's active/standby status changes.

Processor Control Circuit (PCC)

The PCC 22 (see FIG. 4 for a more detailed functional block diagram) decodes each instruction and generates the control signals required to execute the instruction and to read the next instruction from IS.

The instructions are performed in the DPC 23 by a sequence of data transfers—one in each of the eight timing intervals. Each data transfer is controlled by three simultaneous command from the PCC to the DPC:

1. A register place command which places a DPC register or circuit on the Interval Output Bus of the PCC.
2. A Bus Transfer Command which transfers the information on the Internal Output Bus to the Internal Input Bus, and
3. A Register Accept Command which gates the information on the Internal Input Bus to a DPC register.

The PCC also provides auxiliary commands to the DPC such as the selection of the function to be provided by the Logic Comparator Circuit (LCC).

The memory and peripheral control section of the PCC provides the control signals to the IOC including the mode bits to be transmitted to these complexes.

The instruction fetch logic controls the Instruction Address Register IAR, Add One Register AOR, and the instruction store read for the next instruction. The next instruction is read from the instruction store simultaneously with the execution of its predecessor.

The PCC also decodes the HELP instruction which is an input to the RCC that initiates a system recovery program interrupt. RMSG, WMSG, and WMCP are decoded by the PCC but are executed by the Maintenance Access Circuit 30 (MAC). The Malfunction Monitor Circuit 26 (MMC) requires decoded instructions levels from the PCC in order to sample malfunction detection circuits.

Data Processing Circuit (DPC)

The DPC 23 (see also FIG. 5) contains the registers of the CP and the circuits required to perform arithmetic, logical, decision, and data transfer operations on the information in these registers. The General Registers (GR1, ..., GR7), the Special Purpose Register (SPR), and the Instruction Address Register (IAR) are the program accessible registers. These registers and the operations which are performed on these registers by individual instructions are described more fully below.

The remaining registers [Data Register (DR), Arithmetic Register (AR), Selection Register (SR), and Add One Register (AOR)] and circuits (Logic Comparator Circuit (LCC), Add Circuit (ADC) the Add One circuit (AOC), and the Bus Transfer Circuit (BTC)) provide the data facilities required to implement the instruction operations on the program accessible registers.

A 32-bit Internal Input Bus (IIB) is the information source for all DPC registers. In general, the DPC registers and circuits as well as other CP circuit place information on the 32-bit Internal Output Bus (IOB). The Bus Transfer Circuit (BTC) transmits information from the IOB to the IIB. The information can be transferred in six ways which include complementing or not complementing the information, exchanging 16 bit halves (with or without complementing), or shifting the information left or right one bit.

The logic and compare circuit (LCC) provides a 32-bit logical AND, NOR, or EQUIVALENCE of the AR and DR and also matches the AR and DR. The ADD Circuit (ADC) provides the sum of the left half of the AR and the right half of the AR. The ADC is used for addition and subtraction and to generate pS and PU addresses. The 17-bit Instruction Address Register (IAR) is used to address the Instruction Store. The Add-One-Circuit (AOC) increments the right most 16 bits of the IAR by one. The AOC is used to compute the next instruction address (one plus the current address) which will be used if a Program Transfer does not occur.

Input Output Circuit (IOC)

The primary function of the IOC 24 (see also FIG. 6) is to provide the interface through which the Central Processor complex (CP*) gains access to the non-CP complexes (IS*, PS*, and PC*) via the external bus system. The IOC sends data and addresses *from* the CP to the non-CP complexes and also receives and buffers data transmitted *to* the CP from non-CP complexes. The external bus system, used to transmit information between CP* and the non-CP complexes, comprises the Instruction Store Address Bus (IS*.AB), Process Store Address Bus (PS*.AB), Peripheral Control Address Bus (PC*.AB), Instruction Store-Process Store Data Bus (IP*.DB), Peripheral Control Data Bus (PC*DB), Instruction Store Return Bus (IS*.RB), Process Store Return Bus (PS*.RB), and Peripheral Control Return Bus (PC*.RB).

Each bus consists of two copies which are associated with corresponding copies of IS*, PS*, and PC*. At the processing level, the IOC may be considered to use both copies of the bus without distinction between the copies. To provide the reconfiguration capability (maintenance level), the IOC transmits on or receives from copy 0, copy 1, or both copies of a particular bus. The choice of bus copies is determined by the Configuration Control CIrcuit 25.

III. A. 3 Maintenance Circuits

The CP maintenance circuits include the following:

1. System configuration control (CCC 28),
2. Malfunction detection (MMC 26, TMC 27, DPC 23),
3. Recovery program initiation (ICC 28),
4. Recovery program monitoring (RCC 29, TMC 27),
5. Maintenance program access to CP circuits (MAC 30, MMC 26), and
6. Manual system control (MCC 20).

The CMC detects malfunctions as follows:

1. By matching, between CP copies, all data transfers in the CP Data Processing Circuit (MMC),
2. By parity checking of all memory read operations (MMC),
3. By monitoring internal checks by the IS*, PS*, and PC* (all-seems-well checks),
4. Address echo matching of addresses sent to IS*, PS*, and PC* with the echo address returned by the complex (DPC),
5. Timing level generation checking (TMC), and
6. Excess program time checking (DPC).

When a malfunction is detected by MMC, the Interrupt Control Circuit ICC may initiate a maintenance interrupt to a recovery program. The recovery program attempts to locate the faulty unit, remove it from service, and reconfigure the complexes to a working system. The execution of the recovery programs are monitored by the TMC and the RCC. The system recovery program is initiated (re-initiated) by the TMC and the RCC when higher level recovery is required. The Timing Monitor Circuit monitors recovery programs through the Recovery Program Timer (RPT). If a recovery program fails to remain in synchronism with this timer, the TMC initiates (or reinitiates) the system recovery program through the Recovery Control Circuit. The execution of a HELP instruction may also initiate (re-initiate) the system recovery program directly through the RCC.

Malfunction Monitor Circuit (MMC)

The MMC 26 provides the following maintenance functions:

1. Detection of malfunctions during the execution of programs.
2. Classification of malfunctions into CP*, IS*, PS*, and PC* caused malfunctions,
3. Indication of a CP, IS, PS, or PC malfunction occurrence to ICC in each CP,
4. Storage of malfunction indications on error flip-flops,
5. Storage of the address of the instruction being executed when a maintenance interrupt occurs,
6. Special facilities for use by recovery programs,
7. Access to standby CP for extraction of diagnostic data through the match facilities,
8. Facility to monitor standby CP executing off line maintenance programs (Parallel Mode), and
9. Facilities for routining the MMC itself.

The Malfunction Monitor Circuit 26 is divided into the following three sub-circuits which are not shown because the present invention may be practiced without necessarily including them.

1. MAtch Network (MAN),
2. PArity Network (PAN), and
3. Malfunction Analysis Circuit (MFAC).

MAN

The MAtch Network (MAN) provides all inter-Central Processor matching facilities. In addition to malfunction detection, the match network can be used for extracting diagnostic data from the standby CP for routining the match network itself. The control logic within the MAN controls the match network according to match modes selected by the maintenance programs.

PAN

The PArity Network (PAN) contains all the Parity Circuits used in checking the transmission and storage of information in the Instruction Store (IS*) and Process Store (PS*).

MFAC

The Malfunction Analysis Circuit monitors malfunction detection signals from

1. MAN (inter CP matching),
2. PAN (parity checks),
3. DPC (address echo match), and
4. IOC (all-seems-well signals).

The malfunction detection signals are sampled according to the timing intervals and instructions being executed. When a malfunction is detected an error flip-flop associated with the detection circuit is set to be used by maintenance program to isolate the source of the malfunction.

The malfunction analysis classifies the malfunction according to its most likely cause (CP*, IS*, PS*, or PC*) and a corresponding error level (CPEL, ISEL, PSEL, or PUEL) is sent to the Interrupt Control Circuit (ICC) in both CP's.

Timing Monitor Circuit (TMC)

The TMC 27 provides three timing malfunction detection circuits:

1. Circuitry which checks the timing levels generated by TGC,
2. A Real Time Timer Error FF (RTEIF) which monitors the state of the overflow of the Real Time Timer RTT in DPC, and
3. A Recovery Program Timer (RPT) which monitors recovery program execution.

Most failures of the active Timing Generator Circuit (TGC) do not cause inter-CP mismatches. These failures are detected by the TGC checking circuitry of the active TMC. The output of this circuit is monitored by the active Recovery Control CIrcuit (RCC).

Failures of the standby TGC will cause inter-CP mismatches and are detected by the Malfunction Monitor Circuit. The standby RCC ignores error outputs of the standby TMC.

RTT, which is located in the DPC, has both an operational and a maintenance function. It provides real time synchronization for the operational programs and a sanity check on the execution. The RTT is a 14-bit counter which is incremented by one every CP cycle (4 microseconds). The program may read or modify RTT through the Special Purpose Register (SPR). In this manner, RTT can provide time intervals of up to 65 milliseconds for the operational programs. The programs, however, must re-initialize RTT often enough to prevent the overflow from occurring. The active RCC monitors the RTT overflow. If the overflow occurs, RTEIF is set and the RCC initiates the system recovery operation.

RPT checks the execution of the Recovery programs. RPT is a seven bit counter which, when enables, is incremented by one every CP cycle. RPT is enables whenever a maintenance interrupt occurs and is disabled by the recovery program through MAC when recovery is completed.

The active RCC monitors the RPT of the active TMC and initiates further system recovery operations if the recovery programs fail to reset the RPT in the correct interval. The RPT has two checking modes. When first enabled by a maintenance interrupt, the recovery program must check into the RPT through the SPR *exactly* every 128th cycle. The recovery program may change the checking mode to permit check-in before the 128th cycle. In the second mode, check-in's may not be more than 128 CP cycles apart. The recovery program changes the checking mode or disables the RPT through MAC and must do it at exactly the 128th cycle.

Interrupt Control Circuit (ICC)

The ICC 28 controls the execution of maintenance interrupts. A maintenance interrupt is a one cycle wired transfer instruction which causes the CMC to begin execution of a recovery program. The malfunction detection circuits in the CP initiate maintenance interrupt whose execution takes precedence over the execution of any other CP instructions.

The ICC provides five maintenance interrupts:

1. System Recovery,
2. CP recovery,
3. IS recovery,
4. PS recovery, and
5. PU recovery.

When an interrupt occurs, the ICC produces an ICC interrupt Sequence Level (ICCSL) which controls the execution of the interrupt in the other CP circuits. The recovery program address corresponding to the interrupt is also placed on the INTerrupt Address Bus (INTAB) to the Data Processing Circuit, from which it is sent to the IS.U0 as the address of the next instruction to be executed.

The Malfunction Monitor Circuit initiates the CP, IS, PS, and PU recovery interrupts. The Recovery Control Circuit or the Manual Control Console initiates the system recovery interrupt. An interrupt may be initiated by either circuit during the execution of an operational program when a malfunction occurs. During the execution of a recovery program additional interrupts may occur as a part of the recovery process.

To handle simultaneous interrupts and interrupts during execution of a recovery program, the ICC produces maintenance interrupts according to a priority structure. The system recovery interrupt has highest priority and cannot be inhibited. The CP, IS, PS, and PU interrupts follow respectively in descending order of priority. A CP, IS, PS, or PU interrupt can occur if the interrupt itself or a higher priority interrupt has not already occurred. CP, IS, PS, and PU interrupts may be individually inhibited by the maintenance programs.

Recovery Control Circuit (RCC)

The RCC 29 monitors the malfunction detection circuits which cause system recovery program interrupts. The detection inputs to the RCC (RCC triggers) are produced by the timing generation check circuit in the TMC, error level from the DPC, the Recovery Program Timer in the TMC, a HELP instruction executed by the PCC, CP active unit change detected by the TGC, and a manual request from the MCC.

Only the active RCC accepts triggers and initiates system recovery action. The RCC in the Standby CP is kept in synchronism with the active RCC but cannot affect the operation of the CMC.

When a trigger to the active RCC occurs, the RCC executes a wired logic reconfiguration program and then requests the ICC to execute a system recovery program interrupt. If the system recovery program cannot be completed (i.e., the configuration is not operable), another trigger occurs. Each consecutive trigger causes the RCC to force one of the four combinations of CP* and IS*.U0 configurations CP0–IS0.U0, CP1–IS0.U0, CP1–IS1.U0, and CP0–IS1.U0). When an operating CP*–IS*.U0 configuration is selected, the system recovery program completes the recovery and reconfiguration process without further intervention by the RCC.

Configuration Control Circuit (CCC)

The CCC 25 defines the system configuration by controlling:

1. CP* status, and
2. The CP*-IS*, CP*-PS*, and CP*-PC* configurations.

The CP status is specified by:

1. The active CP indication,
2. The standby CP trouble status, and
3. The CP-CP error signal status (separated CP's or coupled CP's).

Each of IS*, PS*, and PU*, has a bus system (address bus, data bus—the PS and IS share a data bus, and return bus). Each copy within IS*, PS*, and PU* is permanently associated with an individual bus copy. The CCC defines the CP*-IS*, CP*-PS*, and CP*-PC* configurations by specifying the bus copy on which each CP copy sends and receives.

The CCC first defines a primary bus copy for each of the IS, PS, and PC bus systems. The active CP always sends and receives on the primary bus. The standby CP sends and receives according to the specific bus configuration. For each primary bus copy selection, four bus configurations can be defined:

1. DUPLEX specifying that the standby CP sends on and receives from the non-primary bus copy,
1. SIMPLEX specifying that the standby CP receives from the primary bus copy while the non-primary bus copy is not used,
3. MERGED specifying that the active CP sends on both bus copies and both the standby and active CP's receive from both bus copies (i.e., the return buses are merged), and
4. SIMPLEX-UPDATE specifying that the active CP sends on both bus copies to update the secondary memory copies but the standby CP receives from the primary bus copy only.

The duplex bus configuration is used when both CP's and all units on both buses are in-service. The simplex configuration is used when a unit on the secondary bus is out of service. The merged configuration is used when units on both the primary and secondary buses are out-of-service. The update configuration is used while updating an in-service unit on the secondary bus.

A diagnostic bus configuration is also available for IS* which is used in the diagnosis and recovery of IS*.

Maintenance Access Circuit (MAC)

The MAC 30 provides maintenance program access to the CP circuits. The Read Maintenance Sense Group (RMSG) instruction allows a group of 32 sense points from either the active or the standby CP to be read into a general register. The Write Maintenance Control Group (WMCG) and Write Maintenance Control Point (WMCP) instruction allow the program to write either a group of 32 maintenance control points or single control point in either the active CP, the standby CP, or both CP's. Each maintenance control point sets or resets one or more flip-flops.

Although the instructions are decoded and controlled by the PCC, MAC selects the control groups, transmits write data from the DPC to the maintenance control groups, and reads maintenance sense groups returning the data to the DPC.

Maintenance sense and control groups in either the active or standby CP are always selected by the active MAC. Write data for maintenance control groups is also always taken from the active CP.

Power Monitor Circuit (PMC)

The Power Monitor and Control Circuit (PMC) controls the actions necessary to turn power on or off from a CP or controls the actions necessary to remove power from a CP in which there is a defective power supply.

In case of a trouble in a power supply of a CP copy, the PMC will remove all remaining power supplies from that copy.

When power is turned back onto the CP, the PMC will guarantee that the power can be turned on only to the standby CP while keeping the other CP active.

III. B. Timing Generator circuit (TGC)

Referring to FIGS. 3 on 47–49, there are two Timing Generator Circuits 21, one in each copy of Central Processor. Since they are the same in structure and operation only one need be disclosed in detail. The Timing Generator Circuit i the active Central Processor (CP) supplies the timing levels for both the active CP and the standby CP. The TGC in the standby does not transmit levels to either CP complex. The timing levels received by the standby CP from the active, can be inhibited by the active CP upon hardware or software request. Inhibiting the timing levels in effect turns off the standby CP. When the inhibit is removed, both the active and the standby CP will be operating in the same timing interval. In addition, each timing level in the standby CP can be controlled individually for diagnostic purposes.

The two Timing Generator Circuit clocks are not running in synchronization, therefore, when the CP status is reversed, (active becomes standby, standby becomes active) special action must be taken in order to avoid problems in the system due to the switch of the source of the timing levels. The TGC in the newly active CP will not start transmission of timing levels to either machine for at least 2 microseconds after the switch, allowing the communications buses to settle down. The first level to be transmitted to both CP's will be the start of a new machine cycle. During the switching operation, the TGC in the newly activated CP notifies its RCC that a reversal of CP status has occurred, which requests a System Recovery Program to be run in order to determine the sanity of the new active CP. The TGC also notifies the Timing Monitor Circuit (TMC) that the Timing Level Check CIrcuit in the TMC should be initialized in order to check the correct sequences of the timing levels generated by the TGC in the active CP.

Each TGC is composed of the following major sections: the Level Generator 400 (FIGS. 3 and 47) (source of timing levels), the Switching Network 401 (where timing levels from both TGC's are gated) and the Diagnostic or Switching Control 402. FIG. 47 also shows an activity control circuit 403 and a Diagnostic Control 404. These sections are the same for each copy of TGC.

Level Generator

Each Basic Order Time (BOT) or machine cycle (4 μsec.) is divided into eight, 500-nanosecond time slots. Each time slot contains a Place Level and Accept Level used to gate and control the internal sequences of the CP. The Place Levels are 500 nanoseconds long while the Accept Levels are 400 nanoseconds in length. The Level Generator 400 includes a clock source 405 which may be of conventional design. Each output is fed through an enable gate 406. The Level Generator of the active TGC produces all 16 of the timing levels that will be sent to both CP's. The Place Levels produced by the Source in the Level Generator are designated ST0PL through ST7PL (FIG. 48), where the prefix S designates the level produced by the Source. The Place Levels are passed through Enable (or AND) gates 407. The Accept Levels are designated ST0AL through ST7AL. Note that the Accept Levels start in coincidence with the Place Levels. The 16 levels are controlled by the Activity Control which will, under non-fault conditions, only permit the active Level Generator's levels to be passed. The gated signals are designated AT0PL through AT7PL and AT0PL through AT7AL.

Switching Network

The Switching Network 401 of each TGC receives two sets of the 16 timing levels, one set from its own Level Generator, the other set from the other CP's Level Generator, as shown. Under non-fault conditions, only one set of timing levels will actually be pulsing; the set received from the active CP. The timing level set received from the other CP is controlled by the Stop Standby Control section of the TGC including a Stop Standby Control Flip-flop 408 which controls a first set of Enable Gates 415 (FIG. 47) which selectively inhibit the levels generated by the other TGC. The timing levels from its own Source are fed through DC drivers or recliners 416 to NANO gates 417. The NANO 417 receive corresponding timing level signals from the respective ones of gates 415, 416 together with the Set output of a Diagnostic ConTrol Flip-flop 418 to generate the 16 separate, sequential Accept and Place timing levels. The inputs to the flip-flops 418 are as illustrated in the drawing; and the two copies of the TGC are interconnected via Terminal Blocks 419, as illustrated. The outputs of the switching Network are designated as T0PL through T7PL (Place Levels) and T0AL through T7AL (Accept Levels).

Activity Control

The purpose of the Activity Control 403 is to handle the transmission of the timing levels produced in the Level Generator to both CP's after a reversal of CP status occurs. The functions of the Activity Control are:

a. Inhibit all timing levels in the newly standby CP.

b. Inhibit all timing levels from the newly active CP for at least 2.0 μsec. in order to allow all communications buses and memory units to complete previous given commands.

c. Generate a level indicating a CP status change to the newly active CP's Recovery Control Circuit (RCC), thereby requesting the System Recovery Program to be run on the new active CP and Instruction Store bus combination in order to determine their sanity.

d. After Delay *b*, start gating the active levels with ST0PL and ST0AL.

e. Initialize the Timing Level Check Circuit in the new active CP's Timing Monitor Circuit (TMC).

The control status necessary for controlling the above functions are as follows:

S0: This is the standby state for the TGC. All timing levels from the Level Generator in this TGC are inhibited.

S1: This is a temporary transition state between S0 and S2. All timing levels from the Level Generator in this TGC are inhibited. During the S1 state, the CP Activity Change Level (CPACL) is sent to RCC and TMC.

S2: This is the active state for the TGC. All timing levels are gated through the Switching Network of this TGC to the CP and to the external (standby) TGC.

In the active CP, the Activity Control will normally be in state S2, while the standby CP will be in state S0. When the CP Activity Level (CPAL) becomes false in the active CP (becomes true in standby CP), The Activity Control in the active CP moves from state S2 to S0, thereby inhibiting all AT0PL through AT7AL levels. The Activity Control in the previously standby CP remains in S0 until its Level Generator has produced an ST3AL level, thereupon moving from S0 to S1. The Activity Control will move to S2 when its Level Generator generates ST0AL. The CP status reversal has been completed.

Stop Standby Control

Another function of the TGC is to stop the standby CP by inhibiting the reception of timing levels from the active CP. If the standby CP is to be stopped, the Standby Stop Flip-Flop (SBYSF) 408 must be set. This flip-flop may be set by:

a. Program control through the use of the Maintenance Access Circuit in the active CP.

b. The active CP's Malfunction Monitor Circuit (MMC) due to either a maintenance interrupt or the execution of a sample match.

c. The Power Monitor Circuit (PMC) when Power is turned on to the standby CP.

The setting of the SBYSF requires the Stop Standby Control in the standby CP to perform the following operations:

a. Complete present machine cycle through T7PL so that the instruction in the standby may be complete before the timing levels are inhibited.

b. order the termination of the machine cycle, all timing levels (T0PL) through T7AL) in the standby TGC are inhibited. standby In prder to start the standby, the SBYSF must be reset. This can only be performed under program control. When the SBYSF is reset, the Stop Standby Control in the Standby CP performs the following functions:

a. Start transmission of timing levels to the standby CP at the beginning of a machine cycle (T0PL and T0AL) without pulse splitting.

b. Continue transmitting timing levels to the standby CP as long as SBYSF is reset.

c. Generate a level to initialize the Timing LEvel Check Circuit in the standby CP's Timing Monitor Circuit (TMC).

The control states necessary for stopping the standby are as follows:

U0: This is the normal operation state for the standby TGC. In this state timing levels generated in the external TGC are sent through the standby TGC and to the standby CP.

U1: This is a transition state between U0 and U2. In this state T7PL and T7AL are sent to the standby CP. This state is necessary to allow the TGC to finish sending a complete cycle of timing levels (T0AL and T0PL through T7AL and T7PL) to the CP, before stopping the standby timing levels, and to prevent any part of the next cycle from reaching the CP. Note that for instructions which require two cycles, this control may allow the first cycle to be completed but not the second.

U2: When the standby TGC is in this state, no timing levels reach the standby CP. (This is also the state in which the active TGC rests but this does not affect the distribution of the timing levels.)

U3: This is a transition state between U2 and U0. In this state, T0AL and T0PL are sent to the standby CP. This state is necessary to allow the standby CP to begin receiving timing levels at the *beginning* of a cycle when the SBYSF is reset.

If the SBYSF is set by the MMC or MAC, the standby TGC will move from U0 to U1 when AT7PL.X becomes true. T7AL and T7PL are sent to the standby CP during the transition from U0 to U1, and while the TGC is in U1. However, T0AL and T0PL are not gated to the system in U1, so that as soon as AT7PL.X becomes false, no timing levels reach the standby CP and the TGC goes to U2, where all timing levels are inhibited. The reason for the temporary state U1 is to prevent any part of T0PL or T0AL from reaching the CP while the TGC is moving to the stop standby state (U2).

When the SBYSF is reset by program control (the only way it can be reset), the TGC moves from U2 to U3 as soon as AT7PL.X comes true. When AT7PL.X becomes false, T0AL and T0PL are sent to the standby CP and the TGC moves to U0. U3 is used to prevent any part of T0AL and T0PL being clipped when the standby TGC begins sending timing levels.

Note that the Stop Standby Control in the active CP always resides in state U2 which inhibits the gating of the AT0PL.X through AT7AL.X from the standby unit. This is a safeguard that if, due to a fault, the standby CP's Level Generator fails to inihibit the transmission of its timing levels, these levels will not be logically ORed with the levels produced by the active CP's Level Generator in the active CP's Switching Network. Another reason for the active CP to be in state U2 is to prevent any timing levels from reaching the new standby CP during a CP switch. Since the TGC is in U2 and the SBYSF becomes set during the CP switch the TGC remains in U2 and no timing levels reach the standby CP.

Diagnostic Control

In the standby CP each timing level can be controlled by MAC through the Diagnostic Control in the TGC. The Diagnostic Control consists of 16 flip-flops designated 418: 8 for the Accept levels (Timing Interval 0 Accept Level Diagnostic Flip-flop (T0ADF)) and 8 for the Place Levels (Timing Interval 0 Place Level Diagnostic Flip-flop (T0PDF), ..., Timing Interval 7 Place Level Diagnostic Flip-flop (T7PDF)). These flip-flops when set in the standby CP cause the timing interval associated with that flip-flop to be true. Each set lead on the flip-flop is controlled individually by MAC and there is a common reset (by MAC) for the 8 Place Flip-flops and a common reset for the 8 Accept Flip-flops. In the active CP all 16 flip-flops are always reset. Each of these 16 points can also be sensed via MAC.

logic Implementation

The logic implementation for the TGC is shown in FIG. 49. Note that the difference between the two implementations is the timing level sent from the Stop Standby Control 408. The level on the left side of the drawing (Y2F) allows T0AL, ..., T3AL, T0PL, ..., T3PL to be gated to the CP when the Stop Standby Control is in U0 or U3 and the level on the right side (Y1F) allows T4AL ..., T7AL, T4PL, ..., T7PL to be gated to the CP when the control is in U0 or U1.

The MMC's Stop Standby Level (SSBYL) is cross-coupled via the Stop Standby Bus (SSBYB) and is used to set the SBYSF in both the active and the standby CP. The set and reset controls from MAC are cross-coupled in the MAC itself.

In other words, in FIG. 49, the source 405 generates all 16 timing levels. Each level is fed along a separate line **405*a* to a driver 410 which may be inhibited by Y3F from the Activity Control 403.** These levels are sent to the standby CP which derives its timing from the active copy. Hence, determination of which copy is active is simply attained by a single signal which inhibits or enables the timing source.

The levels from the standby CP are received on separate lines into gates (one shown at 411) which is enabled by Y2F from the Stop Standby Control Flip-flop 408. Gate 410 feeds a gate 412 which, in turn, feeds a NANO gate 413 which also receives an input from Diagnostic Control Flip-flops 415, these latter having to do with maintenance and, therefore, not of primary importance here. However, it will be appreciated that this does provide independent control of each timing level which is useful in static testing.

Hardware — Software Interface

If the programmer wants to stop the standby CP from receiving timing levels (i.e., set the SBYSF), he must use the Write Maintenance Control Group (WMGC) instruction or Write Maintenance Control Point (WMCP) instruction and give bit 0 at the address MCG4 value 1. To restart the standby CP (i.e., reset the SBYSF) the WMCG or WMCP instruction is used and bit 1 at address MCG4 is given value 1. To read the SBYSF the Read Maintenance Sense Group (RMSG) instruction is used with the result appearing at bit 0 of address MSG4.

It is important to note that the SBYSF can be reset only by program control and so, when this flip-flop is set (whether by program control or by MAC) the programmer must always reset it.

The control of the diagnostic flip-flop is provided with MSG7. To set or reset a flip-flop a WMCG or WMCP instruction is used. To read the flip-flops a RMSG instruction is used.

Maintenance Considerations a. If a failure should occur in the standby TGC, so that timing levels are sent from the standby TGC to the active TGC these levels will not reach the active CP because the active TGC will be in state U2 and this will inhibit these standby timing levels.

However, these timing levels will reach the standby CP causing conflicting timing levels.

b. If the CP's both become active due to a fault or due to both trouble flip-flops being set, timing levels will be sent to each CP from only its own Level Generator and these timing levels will be asynchronous.

| SOURCE | MNEMONIC | Inputs to TGC DESCRIPTION |
|---|---|---|
| CCC | CPAL | Central Processor Activity Level (If true, the CP is active; if false, the CP is standby.) |
| MAC | SMG4L | Select Maintenance Group 4 Level |
| | SMG7L | Select Maintenance Group 7 Level |
| | IMDB.B00 .B01 .B14– .B31 | Internal Maintenance Data Bus Bits 0, 1 and 14 through 31 — controls TGC points during MAC write. |
| MMC | SSBYL | Stop Standby Level (Sets SBYSF). |
| TGC.X | AT0AL.X | Active Timing Interval 0 Accept Level (external) |
| | AT7AL.X | Active timing Interval 7 Accept Level (external) |
| | AT0PL.X | Active Timing Interval 0 Place Level (external) |
| | AT7PL.X | Active Timing Interval 7 Place Level (external) |
| SSBYB | SSBYB.B00 (SSBYL) | Stop Standby Bus Bit 0 (provides Cross-coupling for SSBYL). |
| PMC | SBYSL.ST | Standby Stopped Level-Signal. This level forces the SBYSF to be set in the CP. |
| | SBYSL.GT | Standby Stopped Level-Ground. This is the ground wire for the twisted pair. |

| SINK | MNEMONIC | Outputs from TGC DESCRIPTION |
|---|---|---|
| RCC | CPACL | Central Processor Activity Change Level (Notifies RCC that the CP's have switched.) |
| TMC | CPACL | Central Processor Activity Change Level (Initializes Timing Level Check Circuit in TMC of active CP.) |
| | ITCCL | Initialize Timing Check Circuit Level (Initializes Timing Level Check Circuit in TMC of standby CP.) |
| TMC MMC PCC | T0AL | Timing Interval 0 Accept Level |
| | . | . |
| | T7AL | Timing Interval 7 Accept Level |
| | T0PL | Timing Interval 0 Place Level |
| | . | . |
| | T7PL | Timing Interval 7 Place Level |
| CCC | T0AL | Timing Interval 0 Accept Level |
| | T3AL | Timing Interval 3 Accept Level |
| IOC | T0AL | Timing Interval 0 Accept Level |
| | T3AL | Timing Interval 3 Accept Level |
| | T5AL | Timing Interval 5 Accept Level |
| | T7AL | Timing Interval 7 Accept Level |
| IOC | T3PL | Timing Interval 3 Place Level |
| | T4PL | Timing Interval 4 Place Level |
| | T5PL | Timing Interval 5 Place Level |
| ICC | T0AL | Timing Interval 0 Accept Level |
| | T1AL | Timing Interval 1 Accept Level |
| | T7AL | Timing Interval 7 Accept Level |
| MAC | IMRB.B00 .B16– .B31 | Internal Maintenance Return Bus Bit 0, Bit 16 through 31 — when TGC points are sensed they are gated onto this bus. |
| | T2PL | Timing Interval 2 Place Level |
| | T3P | Timing Interval 3 Place Level |
| TGC.X | AT0AL | Active Timing Interval 0 Accept Level |
| | . | . |
| | AT7AL | Active Timing Interval 7 Accept Level |
| | AT0PL | Active Timing Interval 0 Place Level |
| | . | . |
| | AT7PL | Active Timing Interval 7 Place Level |
| SSBYB.B00 Stop Standby Bus Bit 0 | (SSBYL) | (Provides cross-coupling for SSBYL). |
| DPC | T1AL | Timing Interval 1 Accept Level |
| | T3AL | Timing Interval 3 Accept Level |
| | T7AL | Timing Interval 7 Accept Level |

III. C. Processor Control Circuit (PPC)

Introduction

The Processor Control Circuit (PCC), denoted 22 in FIG. 1, decodes all the instructions in the TSPS order set and generates the signal or timing levels which control the remaining circuits in the Central Processor (CP) that execute the instructions.

Figure 4:
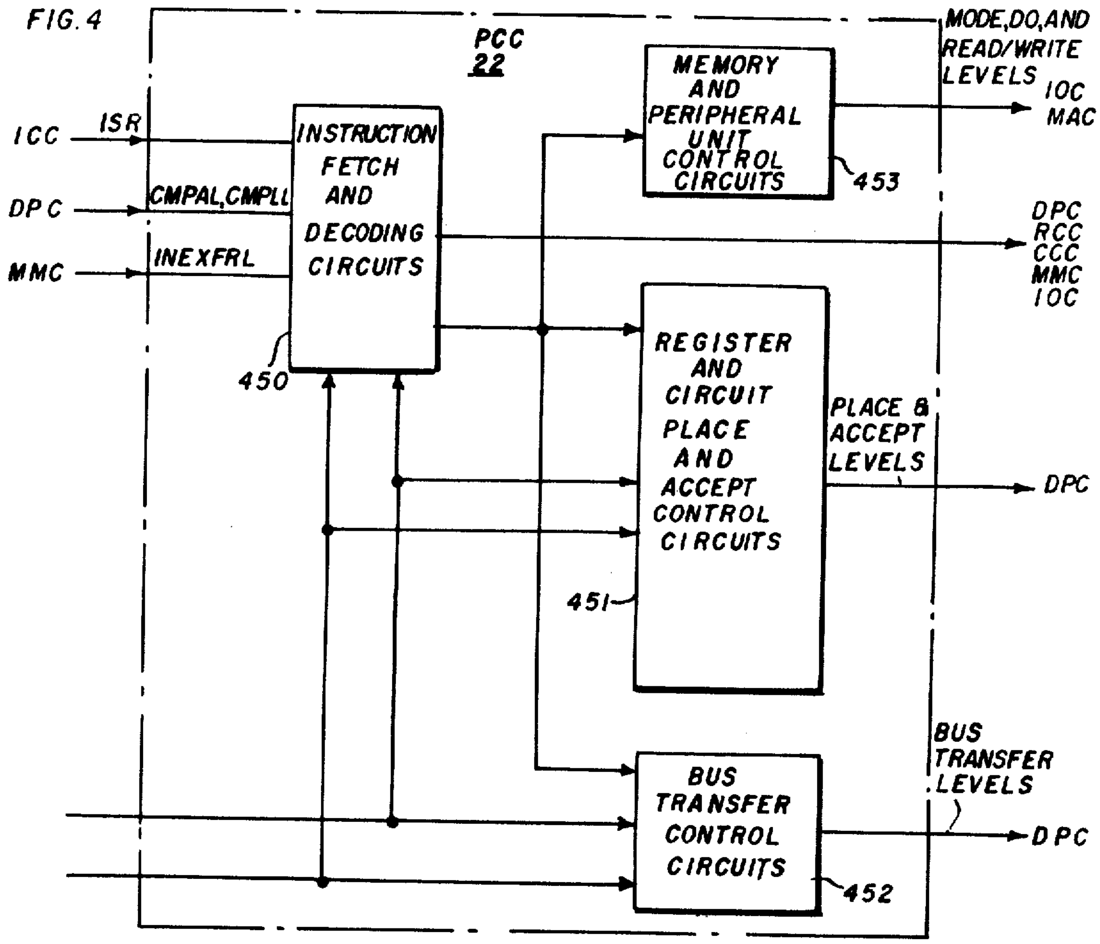
FIG. 4 is a functional block diagram of the Processor Control Circuit of the Central Processor.

On a broad functional level, PCC interfaces with the circuits in the CP as shown in FIGS. 1 and 2 and generates control signals as shown in FIG. 4.

Control Partitioning

Referring now to FIG. 4, PCC is made up of four major elements or subsystems:

a. Instruction Fetch and Decoding Circuits 450, b. Register and Circuit Place and Accept Control Circuits 451, c. Bus Transfer Control Circuits 452, and d. Memory and Peripheral Unit Control Circuits 453.

Instruction Fetch and Decoding Circuits

A more detailed listing of the input and output signals of the Instruction Fetch and Decoding Circuits 450 is shown in FIG. 52; and combined FIGS. 50 and 50A comprise a functional block diagram of the circuitry. Lines broken between these two sheets of drawing have identical reference numerals 435–443. The primary function of this section is to identify and decode instructions, and the circuit implementation is a straightforward use of know digital logic circuit principles.

In particular, the function of the Instruction Fetch and Decoding Circuits 450 of the PCC is five-fold; they must:

a. Control the generation of Instruction Word address, b. Control the loading of the returned Instruction words from the Instruction Store buffer Register (ISR) into the Instruction Contents Register 455 (ICR of FIG. 50), c. Decode the contents of the ICR 50 into signals used by other circuits in the PCC to control the processor actions, as best indicated in FIG. 52, d. Store the address of the General Register (described in more detail in connection with the Data Processing Circuit 23 in Section III. D.) to be used for data retention in extended cycle instructions, and e. Control the actions of the processor for dual and extended cycle instructions.

This circuitry includes:

a. ICR 455 (the Instruction Contents Register), b. XSR (456A in FIG. 60. It is the X Shadow Register which is a register circuit that may be considered part of the Control Signal Decoder 456), c. Decoding Circuits 457, d. A group of flip-flops (see FIG. 61) labelled:

DCCAF, 457 (Dual Cycle Control A Flip-flop),

DCCBF, 458 (Dual Cycle Control B Flip-flop),

MCF, 459 (Multi-Cycle Flip-flop),

RPF, discussed later (Read Peripheral Unit Flip-flop), and

SXECF, 460 (Standby Execute Flip-flop).

These are sometimes referred to as the dual cycle flip-flops (DCCAF and DCCBF in particular) and the extended cycle flip-flops. A dual cycle instruction requires two machine cycles for execution, and an extended cycle instruction requires more or an indefinite number of such cycles.

The execution of all processor actions and the fetching of a new instruction word in any machine cycle is dependent on the contents of the ICR 455, XSR 456A, and state of the dual and extended cycle flip-flops (FIG. 61) at the start of a machine cycle.

Acceptance Timing Levels for IAR and AOR

Addresses are sent to the IS from the Instruction Store Address Register (IAR) located in the DPC 23 (FIG. 5) and discussed in that Section. The IAR received these addresses from either:

a. Add One Register (AOR) also in the DPC, for sequential address, or b. Internal Input Bus (IIB) in the DPC for non-sequential and interrupt addresses.

The PCC generates five acceptance levels to control the AOR and IAR.

a. BIARAL: Bus IAR Accept Level

Accepts the contents of IIB.R (that is, IIB Right half or bits B16–B31) into IAR.R.

b. CIARAL: Counter IAR Accept Level

Accepts the contents of AOR.R into IAR.R.

c. IIARAL: ICR IAR Accept Level

Accepts the contents of ICR.B15 into IAR.L.

d. AIARAL: AOR IAR Accept Level

Accepts the contents of AOR.L into IAR.L.

e. AORAL: AOR Accept Level

Accepts the contents of Add One Circuit (AOC) into AOR.R (AOC - IAR.R + 1) and accept the contents of IAR.L into AOR.L.

ICR

The ICR 455 (FIG. 50) is a 16-bit register used to store the operational code fields of the instruction word while the processor actions specified by this word are being executed. The inputs are gated into the ICR, but such gating is conventional and always occurs at T0AL, as illustrated diagrammatically.

Figure 6:
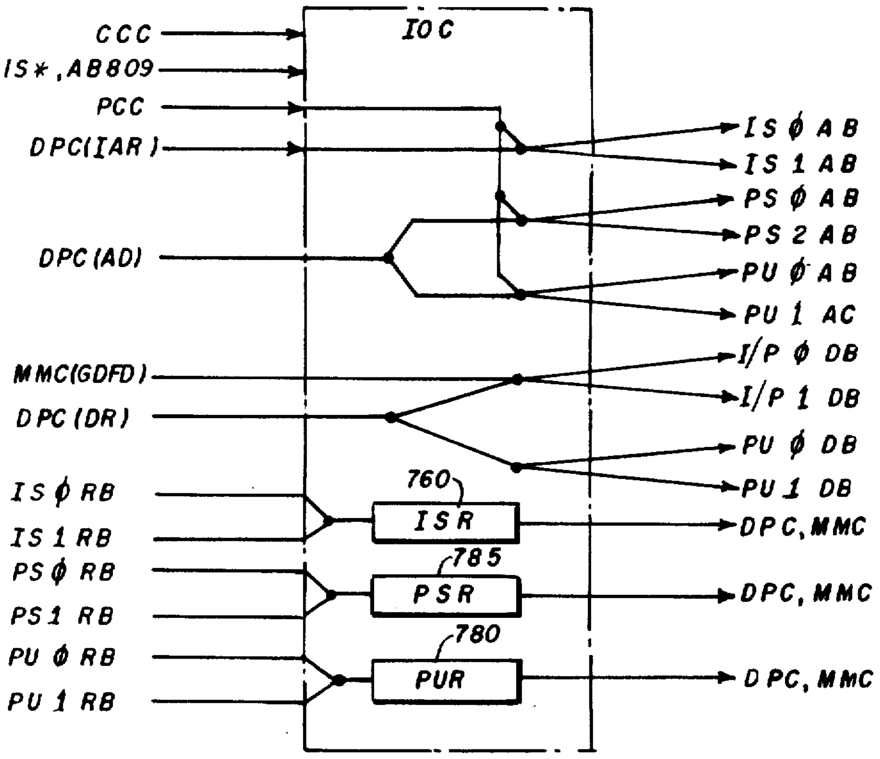
FIG. 6 is a functional diagram of the Input/Output Circuit of the Central Processor.

ICR is normally loaded via a direct wired bus from the Instruction Store Register (ISR) in the Input-Output Circuit (See FIG. 6 and Section III. E) during T0AL of every instruction. If the instruction is RIS, RISN, RIST, RISA, WIS, WISN, or WISD the ICR load is inhibited during the second cycle of the instruction unless the SXECF Flip-Flop 460 (FIG. 61) is set.

PCC generates one acceptance level for ICR.

ICRAL: ICR Accept Level

This signal causes the ICR to accept the contents of ISR.B02 through B15 into ICR.B02 through B15; and ISR.B3031 into ICR.B00–B01 by means of a directly wired bus. The transfer is diagrammatically illustrated in FIG. 51, which shows the formats respectively for the two registers ISR and ICR.

ICR Code Fields

Still referring to FIG. 51, the 16 bits of the ICR are broken up into five fields, which when decoded specify the processor actions.

| ICR Bit Numbers | Field Mnemonic | Description |
|---|---|---|
| 00, 01 | SC | Shift Count specifies the number of positions to be shifted for SHL, SHR, CSL, CSR, CRR, CRL. SC is derived from the Z field of the $ISR_{mod}$ 4. (see FIG. 57). |
| 02, 03, 04 | RTC | Relative Type Code segregates the instructions into 8 types (see FIG. 58). Bits 02–04 of the ICR 455 (FIG. 50) are fed directly to the Relative Type Decoder 463. |
| 05, 06, 07 | ROC | Relative Operation Code separates each RTC into eight basic types of instructions based on the subsystem involved, as indicated in FIG. 59. Bits 05–07 of the IRC 455 are fed through a Bit Buffer Circuit 464 into a Relative Operation Code Decoder circuit 465. To repeat, all decoding is done with conventional combinational logic decoding circuitry. |
| 08, 09, 10 | X | X specifies one out of seven General Registers (GR) or the Special Register SPR of the DPC; X also specifies whether XEC (X=0) or XECN (X=1) is to be executed. |

In the X field, if Bits 08–B10 are all 0's, the XCR is specified. The same is true for the Y field (B11–B13). If the Boolean count is 1, GRI is specified, and so on. XEC is called for when all bits in these registers (except XCR) are 0, and XECN when the least significant bit is a 1. The X and Y fields of the ICR correspond to B0-0–B02 of the XCR.

ICR bits 11, 12, 13, 14 and 15 form a composite field whose meaning varies according to the instruction being executed. There are two basic forms of the composite field.

| ICR Bit Numbers | Field Mnemonic | Description |
|---|---|---|
| 11, 12, 13 14 & N5 | N | N specifies which bit in a 32 bit register is to be tested or operated on in the following instructions: TBZ, TBN, WMCP Note that the actual decoding is done from the Selection Register SR in the DPC. |
| 11, 12, 13 | Y | Y field specifies one out of seven GR or the SPR, as mentioned. |
| 14, 15 | S | Suffix field has four formats, as specified respectively in FIGS. 53–56. |

Suffix field formats are as follows:

| ICR Bit Numbers | Field Mnemonic | Description |
|---|---|---|
| 14, 15 | S | The S field extends the operation codes to allow four instructions to be specified for (RTCL0) (ROCL3) and (RTCL1) ROCL3) and two instructions for (RTCL0) (ROCL5) and (RTCL1) ROCL2) (FIG. 53). |
| | H, G | H and G select which half of a 32 bit GR is to be used in the instruction (FIG. 54). H is associated with the Y field. G is associated with the X field. |
| | H, P | H selects one half of the GR specified by Y field (FIG. 55). P selects which of two pages in memory are to be used. Note the format appears only in instructions dealing with memory IS or PS. |
| | H, D | H selects one half of a GR specified by the Y field (FIG. 56). D specifies if the register is to be decremented or not. |

ICR Decoders

Shift Count Decoder (SCD)

The SCD is included in the Miscellaneous Decoder 466 (FIG. 50), and it consists of a 1 out of 4 decoder that provides the four outputs SCL0 through SCL3 to the Bus transfer controller where they control the number of shifts initiated by the Right and Left shift levels, as will be more fully explained in connection with the DPC.

In this circuitry:

$SCL0 = (\overline{ICR.B00})\ (\overline{ICR.B01}) = 4$ shifts $SCL1 = (\overline{ICR.B00})\ (ICR.BO1) = 1$ shift $SCL2 = (ICR.B00)\ (\overline{ICR.B01}) = 2$ shifts $SCL3 = (ICR.B00)\ (ICR.B01) = 3$ shifts Relative Type Code Decoder The RTC decoder 463 provides two sets of outputs to the rest of the PCC.

a. 1 out of 8 decode of ICR.B02-03-04.

b. 1 out of 4 decode of ICR.B02-03.

1 out of 8: 24 load drive $RTCL0 = (\overline{ICR.B02})\ (\overline{ICR.B03})\ (\overline{ICR.B04})$ $RTCL1 = (\overline{ICR.B02})\ (\overline{ICR.B03})\ (ICR.B04)$ $RTCL2 = (\overline{ICR.B02})\ (ICR.B03)\ (\overline{ICR.B04})$ $RTCL3 = (\overline{ICR.B02})\ (ICR.B03)\ (ICR.B04)$ $RTCL4 = (ICR.B02)\ (\overline{ICR.B03})\ (\overline{ICR.B04})$ $RTCL5 = (ICR.B02)\ (\overline{ICR.B03})\ (ICR.B04)$ $RTCL6 = (ICR.B02)\ (ICR.B03)\ (\overline{ICR.B04})$ $RTCL7 = (ICR.B02)\ (ICR.B03)\ (ICR.B04)$ 1 out of 4 decode: 22 load drive $RTCL8 = (\overline{ICR.B02})\ (\overline{ICR.B03})$ $RTCL9 = (\overline{ICR.B02})\ (ICR.B03)$ $RTCL10 = (ICR.B02)\ (\overline{ICR.B03})$ $RTCL11 = (ICR.B02)\ (ICR.B03)$ Relative Operation Code Decoder The ROC decoder 465 provides three sets of outputs to the rest of the PCC circuits.

a. 1 out of 8 decode of ICR.B05-06-07.

b. 1 out of 4 decode of ICR.B04-06.

c. Buffered transmission of ICR.B05-06-07 via bit buffer circuit 464.

1 out of 8 decode: 24 load drive $ROCL0 = (\overline{ICR.B05})\ (\overline{ICR.B06})\ (\overline{ICR.B07})$ $ROCL1 = (\overline{ICR.B05})\ (\overline{ICR.B06})\ (ICR.B07)$ $ROCL2 = (\overline{ICR.B05})\ (ICR.B06)\ (\overline{ICR.B07})$ $ROCL3 = (ICR.B05)\ (ICR.B06)\ (ICR.B07)$ $ROCL4 = (ICR.B05)\ (\overline{ICR.B06})\ (\overline{ICR.B07})$ $ROCL5 = (ICR.B05)\ (\overline{ICR.B06})\ (ICR.B07)$ $ROCL6 = (ICR.B05)\ (ICR.B06)\ (\overline{ICR.B07})$ $ROCL7 = (ICR.B05)\ (ICR.B06)\ (ICR.B07)$ 1 out of 4 decode $ROCL8 = (\overline{ICR.B05})\ (\overline{ICR.B06})$ $ROCL9 = (\overline{ICR.B05})\ (ICR.B06)$ $ROCL10 = (ICR.B05)\ (\overline{ICR.B06})$ $ROCL11 = (ICR.B05)\ (ICR.B06)$ Buffered Transmission: 24 load drive

ICR.B05

ICR.B06

ICR.B07

Suffix Decoder

The SD also is included in the Miscellaneous Decoder 466 and consists of a 1 out of 4 decoder to provide the S codes S0 through S3 for the extended operations and a set of buffers for the 14th and 15th bit individually for all other usages.

1 out of 4: 24 load drive $SL0 = (\overline{ICR.B14})\ (\overline{ICR.B15})$ $SL1 = (\overline{ICR.B14})\ (ICR.B15)$ $SL2 = (ICR.B14)\ (\overline{ICR.B15})$ $SL3 = (ICR.B14)\ (ICR.B15)$ Buffered: 24 load drive

ICR.B14[A]

ICR.B15[A]

X Field, Y Field

Decoding is accomplished in circuits 467 and 468 respectively in FIG. 60, and usage of these fields may be found in the description relating to General Register Controls in the DPC.

Shadow Register (XSR)

The XSR 456A of FIG. 60 is a 5-bit register that stores the true and false outputs of the X field of the ICR for the followthrough cycle of PU instructions and the second cycle of IS instructions.

The XSR contents are used to specify which returned data from IS or PU in the second or follow-through cycle will be stored in.

PCC generates a level that loads XSR in T6AL of every machine cycle.

XSRAL: XSR Accept Level

Accept the ICR.B08–10 into XSR.B00–02.

Dual and Extended Cycle Control

The PCC has two groups of circuits shown diagrammatically in FIG. 50A by the block 470 which control the processor actions for instructions that require more than one machine cycle to complete.

a. Dual Cycle Control (DCC) (see FIG. 61 for logic diagram) which controls the operations for RIS, RISA, RIST, XEC, XECN, RISN, WIS WISN and WISD.

b. Extended Cycle Control (ECC) which handles the follow-through cycle of RPU, RPUT, PRUN and RPUA.

Dual Cycle Controller

Referring now to FIG. 61, the DCC inhibits the AOR → IAR, AOC → AOR, ISR → ICR, and other selected processor functions depending on the instruction requirements.

Four flip-flops are used in DCC, DCCAF (457), DCCBF (458), SXECF (460), and MCF (459).

DCCAF is the Dual Cycle Control A Flip-Flop (457).

DCCAF = 1 inhibits the AOR to IAR transfer.

Set Conditions

1. Always set by T2AL in the first cycle of any dual cycle instructions.
2. Set by T2AL in the second cycle of any XEC or XECN instruction by any dual cycle instruction.

Set DCCAF = T2AL [XEC v XECN v $\overline{DCCBF}$ (RIS v RIST v RISN v RISA v WIS v WISN v WISD)]

Reset Conditions

1. Always reset by T1AL.
2. Can be reset by INEXFRL.
   Instruction Extension Flip-Flop Reset Level
   This level is the output of MCG4.B22 located in the MMC (26 in FIG. 1) circuit and accessed by MAC 30 with a WMCP or WMCG instruction.
3. Automatically reset for any interrupt condition in ICC 28 by ICCSL.

Reset DCCAF = T1AL v INEXFRL v ICCSL

DCCBF is the Dual Cycle Control B Flip-Flop (458).

DCCBF = 1 inhibits the ISR to ICR transfer.

Set Conditions

1. Set by T7AL in the first cycle of all dual cycle instructions except XEC and XECN if DCCAF is set, and SXECF is not set.

Set DCCBF = T7AL (DCCAF) [RIS v RISN v RIST v RISA v WIS v WISN v WISD] ($\overline{SXECF}$)

Reset Conditions

1. Always reset by T6AL.
2 & 3. Same as DCCAF reset conditions 2 & 3 above.

Reset DCCBF = T6AL v INEXFRL v ICCSL

SXECF: Standby Execute FlipFFlop

SXECF = 1 inhibits the set of the DCCBF Flip-Flop.

Set Conditions

SXECF may be set by MAC using bit 24 of Maintenance Control Group Four. SXECF is a tool that allows the maintenance programmer to read bit patterns from the IS* using the sample match mode. The combination of SXECF and sample match loads the ICR of the standby and then causes it to stop. SXECF can only be set in the standby CP.

Set SXECF = (IMDB.B24) (MSCG4) ($\overline{CPAL}$)

Reset Conditions

1. Reset by MAC via Bit 25 of Maintenance Control Group Four.
2. Automatically reset by CPAL if the CP's switch.

Reset SXECF = (IMDB.B25) (MSCG4) v CPAL

MCF is the Multi Cycle Flip-Flop 459.

MCF = 1 inhibits the AOC to AOR transfer.

Set Conditions

1. Always set by T7AL of the first cycle of any dual cycle instruction.
2. Set T7AL in the second cycle of an XEC or XECN if the instruction executed is any dual cycle instruction.

Set MCF = T7AL [DCCAF]

Reset Conditions

1. Always reset in T6AL.
2 & 3. See DCCAF reset conditions 2 & 3.

TABLE I

| TIME | CONTROL | ACTION | REMARKS |
|---|---|---|---|
| Cycle One | | | |
| T2AL | INS1 | 1 → DCCAF | Set DCCAF |
| T3AL | DCCAF | Inhibit AOR → IAR | DCCA = 1 |
| | | Load Z → IAR | Fetch Address |
| T4AL | | ISDO | Fetch Z |
| T7AL | INS1 | 1 → DCCBF | Set DCCBF |
| | DCCA | 1 → MCF | Set MCF |
| Cycle Two | | | |
| T0AL | (DCCB) | Inhibit ISR → ICR | DCCB = 1 |
| T1AL | | 0 → DCCAF | Reset DCCAF |
| T2AL | (MCF) | Inhibit AOC → AOR | MCF = 1 |
| T3AL | | Load AOR → IAR | DCCA = 0 |
| T4AL | | ISDO | Fetch (INS1 + 1) |
| T6AL | | 0 → MCF | Reset MCF |
| | | 0 → DCCBF | Reset DCCBF |

DCC Action for Instruction Store Type 1 Instruction

TABLE II

| TIME | CONTROL | ACTION | REMARKS |
|---|---|---|---|
| Cycle One | | | |
| Common Cycle for INS2* (see F.10) | | | |
| Cycle Two | | | |
| T0AL | (DCCBF) | Load ISR → ICR | DCCBF = 0 |
| T1AL | | 0 → DCCAF | Reset DCCAF |
| T2AL | INS2 | 1 → DCCAF | Set DCCAF |
| | (MCF) | inhibit AOC → AOR | MCF = 1 |
| T3AL | (DCCAF) | Inhibit AOR → IAR | DCCAF = 1 |
| | | Load Z → IAR | Fetch Address |
| T4AL | | ISDO | Fetch Z |
| T6AL | | 0 → MCF | Reset MCF |
| T7AL | (DCCAF) | 1 → MCF | Set MCF |
| Cycle Two will continue to repeat as long as each successive INS2 fetches another INS2 | | | |
| Cycle (N) | | | |
| T0AL | (DCCBF) | Load ISR → ICR | DCCBF = 0 |
| T1AL | | 0 → DCCAF | Reset DCCAF |
| T2AL | (MCF) | Inhibit AOC → AOR | MCF = 1 |
| T3AL | | Load AOR → IAR | |
| T4AL | | ISDO | Fetch (INS2* + 1) |
| T6AL | | 0 → MCF | Reset MCF |

DCC Action for INS2 that fetches (N) other INS2 Instructions

TABLE III

| | TIME | CONTROL | ACTION | REMARKS |
|---|---|---|---|---|
| | Cycle One | | | |
| Common Cycle * | T2AL | INS2* | 1 → DCCAF | Set DCCAF |
| | T3AL | DCCAF | Inhibit AOR → IAR | DCCAF = 1 |
| | | | Load Z → IAR | Fetch Address |
| | T4AL | | ISDO | Fetch Z |
| | T7AL | DCCAF | 1 → MCF | Set MCF |
| | Cycle Two | | | |
| | T0AL | ($\overline{DCCBF}$) | Load ISR → ICR | DCCBF = 0 |
| | T1AL | | 0 → DCCAF | Reset DCCAF |
| | T2AL | INS1 | 1 → DCCAF | Set DCCAF |
| | | (MCF) | Inhibit AOC → AOR | MCF = 1 |
| | T3AL | (DCCAF) | Inhibit AOR → IAR | DCCAF = 1 |
| | | | Load Z → IAR | Fetch Address |
| | T4AL | | ISDO | Fetch Z |
| | T6AL | | 0 → MCF | Reset MCF |
| | T7AL | INS1(DCCA) | 1 → DCCBF | set DCCBF |
| | | DCCA | 1 → MCF | Set MCF |
| | Cycle Three | | | |
| | T0AL | (DCCBF) | Inhibit ISR → ICR | DCCBF = 1 |
| | T1AL | | 0 → DCCAF | |
| | T2AL | (MCF) | Inhibit AOC → AOR | MCF = 1 |
| | T3AL | (DCCAF) | Load AOR → IAR | DCCAF = 0 |
| | T4AL | | ISDO | Fetch (INS2 + 1) |
| | T6AL | | 0 → DCCBF | |
| | | | 0 → MCF | |

DCC Action for INS2 that fetches INS1

TABLE IV

| TIME | CONTROL | ACTION | REMARKS |
|---|---|---|---|
| Cycle One | | | |
| Common Cycle for INS2* (see F.10) | | | |
| Cycle Two | | | |
| T0AL | ($\overline{DCCBF}$) | Load ISR → ICR | DCCBF = 0 |
| T1AL | | 0 → DCCAF | Reset DCCAF |
| T2AL | (MCF) | Inhibit AOC → AOR | MCF = 1 |
| T3AL | ($\overline{DCCAF}$) | Load AOR → IAR | DCCAF = 0 |
| T4AL | | ISDO | Fetch (INS2 + 1) |
| T6AL | | 0 → MCF | |

DCC Action for INS2 Instruction followed by any non Transfer Instruction

TABLE V

| TIME | CONTROL | ACTION | REMARKS |
|---|---|---|---|
| Cycle One | | | |
| Common Cycle for INS2* (see F.10) | | | |
| Cycle Two | | | |
| T0AL | ($\overline{DCCBF}$) | Load ISR → ICR | DCCBF = 0 |
| T1AL | | 0 → DCCAF | Reset DCCAF |
| T2AL | (MCF) | Inhibit AOC → AOR | MCF = 1 |
| T3AL | * | Inhibit AOR → IAR | *IFC causes this for |
| | | Load Z → IAR | transfer true Z = Xfr address |
| T4AL | | ISDO | Fetch Z |
| T6AL | | 0 → MCF | Reset MCF |
| | | | Note that (INS2 + 1) has been lost and next instruction is fetched from Z + 1 |

DCC Action for INS2 Instructions followed by a Transfer Instruction

Operation of the DCC is illustrated in Tables I through V for the following five cases. XEC and XECN (INS2) fetch an address in memory in the 1st cycle, whose contents is the instruction executed in the 2nd cycle.

a. INS1 only (Table I)
where INS1 = RIS v RISA v RIST v RISN v WIS v WISN v WISD.
b. INS2 fetched instruction INS1 (Table II).
c. INS2 fetched instruction INS2 (Table III).
d. INS2 fetched instruction is any *non* transfer single cycle instruction (Table IV)
e. INS2 fetched instruction is any transfer instruction (Table V).

Extended Cycle Controller

ECC relates to the cycle following a RPU, RPUN, RPUT, RPUA instruction. The fact that data is expected to return to the processor and should be loaded into the register designated by the contents of XSR.

RPF: Read Peripheral Unit Flip-Flop

RPF controls acceptance of the PUR into the GR(n).

If RPF = 1 the acceptance is allowed.

Set Conditions

1. Set by T7AL of the execution cycle of the Read PU instructions.

Set RPF = T7AL [RPU v RPUN v RPUT]

Reset Conditions

1. Always reset in T6AL.
2. & 3. Same as DCCAF reset conditions 2 & 3, as above.

Reset RPF = T6AL v INEXFRL v ICCSL.

Operation

The operation of place and accept levels for the Fetch and Decoding circuits 450 is defined in terms of timing levels and instructions. These levels are generated in terms of the various decoder outputs and timing levels. Reference is also made to the Instruction Timing Diagrams, FIGS. 69–129.

IAR-AOR Acceptance Levels

Bus IAR Accept Level (BIARAL)

Contents of the Internal Input Bus (IIB) of the DPC which specify a transfer address will be loaded into IAR for the following cases during T3AL. This places a transfer address, as distinguished from the next sequential address, onto the Internal Output Bus in the DPC.

a. First cycle of IS data access instruction (RIS, WIS, RISN, WISN, RIST, RISA and WISD).
b. First cycle of an XEC or XECN instruction.
c. Unconditional transfer instruction (TRA, TSX).
d. Conditional transfer instructions where condition is satisfied.
   (TEQ, TEH, TNX, TBZ, TXZ, TZD) (MATCH)
   (TUQ, TUH, TIX, TBN, TXN, TND) (NO MATCH)
e. Interrupt action in progress (ICCSL).
   Note: All bits of IAR will be 0 except the 5 specified by INTAB.

The logic expression for BIARAL is:

BIARAL = T3AL [BXL]

where:

BXL = UCTL v ICCSL v DCCAF v CTNML ($\overline{\text{CMPRL}}$ v $\overline{\text{CMPRR}}$) v CTML (CMPRL) (CMPRR).

BXL = Bus Accept Level.

DCCAF = Set on First Cycle of IS Data Access Instruction and XEC, XECN Instructions.

UCTL = Unconditional Transfer Level.
= (TRA v TSX).

ICCSL = Interrupt Action in progress.

CTNML = Conditional Transfer on no match level.
= TUQ v TUH v TIX v TBN v TXN v TND.

CTML = Conditional Transfer on match level.
= TEQ v TEH v TNX v TBZ v TZD v TXZ.

$$\text{CMPRL} = \prod_{N=16}^{31} \text{AR}_N \odot \text{DR}_N\text{:} \quad \text{Compare Right Level (DPC).}$$

$$\text{CMPLL} = \prod_{N=0}^{15} \text{AR}_N \odot \text{DR}_N\text{:} \quad \text{Compare Left Level (DPC).}$$

The $\odot$ symbol represents a bit-by-bit Exclusive OR logical function; and the $\pi$ symbol means that everything in the resultant must be identical. These level signals are generated in the DPC to indicate the required function has been performed.

Counter IAR Accept Level (CIARAL)

AOR contents which equal the present address + 1 are accepted into IAR every cycle with the exception of those cycles where information is accepted from Bus (see BIARAL). The logic expression for CIARAL is:

CIARAL = T3AL · BXL where:

BXL = UCTL v ICCSL v DCCAF v CTNML ($\overline{\text{CMPRL}}$ v $\overline{\text{CMPLL}}$) v (CTML) (CMPRL) (CMPLL).

ICR to IAR Accept Level (IIARAL)

The logic expression (ICR.B15) · $\overline{\text{ICCSL}}$ (page-bit) will be loaded into IAR.B15 for the following cases during T3AL.

a. First Cycle of IS data access instructions (RIS, WIS, RISN, WISN, RIST, RISA, WISD).
b. An XEC or XECN instruction.
c. A transfer always instruction (TRA).
d. Interrupt Action in Progress (ICCSL).
   Note: In this case page 0 of IS is always specified ($\overline{\text{ICCSL}}$ = 0).

The logic expression for IIARAL is:

IIARAL = T3AL (IXL).

where:

IXL = DCCAF v TRA v ICCSL.

AOR to IAR Accept Level (AIARAL)

The contents of AOR.B15 is loaded into IAR.B15 on every T3AL with the exception listed in IIARAL. The logic expression for AIARAL is:

AIARAL = T3AL $\overline{\text{IXL}}$.

AOR Accept Level (AORAL)

The AOR is to be loaded every cycle with the following exceptions.

a. Do not load if ICCSL = 1.
b. Do not load if second cycle of a IS data access operation (RIS, WIS, RISN, WISN, RISA, RIST, WISD).
c. XEC or XECN instruction.

The logic expression for AORAL is:

AORAL = T2AL [$\overline{\text{ICCSL}}$·$\overline{\text{MCF}}$]

where:

MCF = Multi-Cycle Flip-FLop set on all IS data accesses and XEC, XECN instructions.

Transfer Timing

To allow single cycle decision transfers the control acts in the following fashion.

a. Transfer address (Z) placed on IIB.R in T3L.
b. CIARAL = 1 and AOR.R → IAR.R.
c. CMPRL & CMPRL propagate from comparison circuit in DPC and set BIARAL → 1; CIARAL → 0 if proper condition exists.
d. Contents of IIB.R → IAR.R overwriting AOR.R.

e. T3AL ends and IAR contains (Z).

ICR Acceptance Level

The contents of the ISR are loaded into ICR in T0AL if DCCBF is not true ($\overline{DCCBF} = 1$).

The logic expression for ICRAL is:

$$ICRAL = T0AL\ (\overline{DCCBF})$$

where:

DCCBF is one of the dual cycle flip-flops true in the second cycle of all dual cycle instructions except XEC and XECN, and if SXECF = 1.

XSR Acceptance Level

The contents of the X field of ICR are loaded into XSR during T6AL of every instruction.

$$XSRAL = T6AL$$

Miscellaneous Decoding

PCC provides several miscellaneous decoded functions to other circuits in the CP.

HELPL: This level is used as a signal to the Recovery Control Circuit (RCC) that a program generated system Recovery operation is required.

HELPL = (RTCL0) (ROCL2)

ICR.B15[A]: This level is the page bit for those instructions that require B15 and is sent to IOC for incorporation into PS* addresses.

Register and Circuit Place and Accept Control Function

The function of the Register and Circuit Place and Accept Control Circuits 451 of FIG. 4 of the PCC is to generate the necessary control signals that gate the contents of registers and circuits onto the DPC internal output bus (IOB) or to accept the information from the internal bus (IIB) and load it into the designated registers. Registers and Circuits are divided as follows:

Processing Registers and Circuits (in the Data Processor Circuit, Section III, C.)

a. Arithmetic Register (AR).
b. Data Register (DR).
c. Logic Comparator Circuit (LCC).
d. Add One Register (AOR).
e. Add Circuit (ADC).
f. Selection Register (SR).

Interface Registers a. Instruction Store Register (ISR) of the IOC.
b. Process Store Register (PSR) of the IOC.
c. Peripheral Unit Register (PUR) of the PUC.
d. Maintenance Access Circuit Data Register (MDR) of MAC.
e. Interrupt Address Bus (INTAB).

Storage Registers a. General Registers (GR)
   NOTE: There are seven GR in the DPC
b. Special Purpose Register (SPR). This also in the DPC.

Processing Registers and Circuits

These registers and circuits cannot be directly selected by the programmer. They are used in common among all instructions for manipulation and temporary storage during execution of the instruction.

Interface Registers

Interface registers buffer the clocked internal actions of the CP from the asynchronous actions of the external units. PCC does not control acceptance into these registers and only places them at predetermined times on IOB as follows:

ISR always placed for all instructions.

PUR placed for all instructions except WPS, WPSN, WPSD, RPSA, and the execution cycle of all PU instructions.

PSR placed for all PS instructions.

MDR placed for WMCG, WMCP and RMSG.

INTAB is automatically placed by ICC for an interrupt condition while all normal placing is inhibited.

Storage Registers

General Register

A general Register may be directly selected by the program through the use of two instruction fields (X and Y field) and indirectly by the X Shadow Register (XSR). The XSR is used to select a particular full length GR which was specified in the previous machine cycle. In particular, the second execution cycle of the following instructions.

a. All Read Instruction Store Operations in which data returned from the store is accepted into a GR RIS, RISN, RIST, RISA.
b. All Read Peripheral Control operations in which data returned from the selected PC unit is accepted into a GR, RPU, RPUN, RPUT.

Special Purpose Register

SPR may be selected by the program by specifying that the (X or Y) field of the Instruction word be zero for the following cases:

a. X = 0 specifies SPR for CPY, SBZ, SBN, SNC, ANH, ORH, EOH, ISH, TXZ, TXN, TND, TZD, TBN, TBZ.
b. Y = 0 specifies SPR for CPY provided that S = 2.

No conflict should arise in usage of the X field equal to zero specifying the SPR register for *a* since X always specifies a sink register and normally a place into a non-existent register is not desired.

The S field must be used in addition to the specification of Y field equal to zero in *b* to avoid problems. Normal program usage requires that a register be cleared to all zero on occasions since this requirement places two different operational cases on the usage of Y. The S field is used to differentiate between them.

If Y = 0 and S = 2
SPR will be placed
If Y = 0 and S = 0, 1, 3
0 will be placed.

Note that a specification of CPY 0, X with S = 1 results in 1's being placed in X.

Processing Register & Circuit Control Operation

AR Controls

Five control levels are generated by PCC for AR.

ARPL.L: AR Place Level Left
Place the contents of AR.L onto IOB.L.

ARPL.R: AR Place Level Right
Place the contents of AR.R onto IOB.R.

ARBSL: AR Bit Selection Level
Enables the bit selection circuitry in DPC that selects one out of 32 bits to be set to zero.

ARAL.L: AR Accept Level Left
Accept the contents of the IIB.L into the AR.L.

ARAL.R
Accept the contents of the IIB.R into the AR.R.

AR Place Levels

Logically the place levels for the left and right half are identical, two levels are generated because of buffering requirements.

$ARPL.L\&R = T3PL\ [CSL \vee CSR \vee CRL \vee CRR \vee SHL \vee SHR] \cdot \overline{ICCSL} \vee$
$T5PL\ [RIST \vee RIS \vee RISN \vee RISA \vee WIS \vee WISN \vee WISD] \cdot DCCBF$
$T7PL\ [CPY \vee SBZ \vee CSL \vee CSR \vee CRL \vee CRR \vee SHL$ v SHR v SBN v CPC]

AR Bit Selection Levels

Note should be made that the acceptance level for AR must be generated concurrently with the bit selection level since bit alternation is done external to AR and the result must be accepted from the bit selection circuitry into AR.

ARBSL = T2PL [TND v TZD v TXZ v TXN v TBZ v TBN v WMCP] v
T4PL [SNB v SBC v SBZ]

AR Accept Levels

\# Mnemonic means redundant term.

ARAL.L = T1AL [ALL INSTRUCTIONS] v
T2AL [TXZ v TZD v TBZ v TBN v TXN v TND v SMCP v WMCG] v
T4AL [ADD v SUB v CSR v CSL v CRR v CRL v SHL v SHR v ISH v ANH v ORH v EOH v SBN v SBC v SBZ v TXZ v TZD v TXN v TND] v
T7AL [ # RPS v RPSA v # RPST v # RPSN v WPS v WPSN v WPSD v RPU v RPUA v RPUT v RPUN v WPU v WPUN]

ARAL.R = T0AL [ALL INSTRUCTIONS] v
T1AL [AND v ORR v ISP v EOR v CSL v CSR v CRR v CRL v SHL v SHR v CPY v CPC v TEQ v TUQ] v
T2AL [TXZ v TZD v TBZ v TBN v TXN v TND v WMCP v WMCG] v
T4AL [ADD v SUB v CSR v CSL v CRR v CRL v SHL v SHR v ISH v ANH v ORH v EOH v SBN v SBZ v SBC v TXZ v TZD v TXN v TND v TNX v TEH v TIX v TUH] v

DR Controls

Four Control levels are generated by PCC for DR.

DRPL.L DR Place Level Left

Place the contents of DR.L onto IOB.L.

DRPL.R DR Place Level Right

Place the contents of DR.R onto IOB.R

DRAL.L DR Accept Level Left

T7AL [RIS v RIST v RISN v RISA v WIS v WISN v WISD]

DRAL.R = T0AL [ALL INSTRUCTIONS]
T2AL [ALL INSTRUCTIONS except HELP v SHL v SHR v CSL v CSR v CRR v CRL v CPY v CPH v TRA v CPC v TSX v XEC v XECN v TNX v TIX v TEH v TUH v WMCP v WMCg v RMSG] ($\overline{DCCBF}$) v
T3AL [SHL v SHR v CSL v CSR v CRR v CRL v ADD v SUB v EOH v ISH v ANH v ORH] v
T6AL [TSX] v
T7AL [RIS v RIST v RISN v RISA v WIS v WISN v WISD]

Logic Comparator Circuit (LCC) Controls

The PCC generates four control levels for the LCC.

LCCPL.L: LCC Place Level Left

Place the output of LCCL onto the IOB.L.

LCCPL.R: LCC Place Level Right

Place the output of LCCR onto the IOB.R.

LCCACL: LCC AND Control Level

LCCNCL: LCC NOR Control Level

LCC logic output per bit LCC.B(n) equals the following as functions of LCCACL and/or LCCNCL.

LCC.B(n) = AR.B(n) · DR.B(n) LCCACL v
$\overline{AR.B(n)}$ v $\overline{DR.B(n)}$ LCCNCL v
AR.B(n) ⊙ DR.B(n) (LCCACL)(LCCNCL)

Therefore:

When
LCCACL = 1 LCCNCL = 0
the LCC performs the AND function
LCCACL = 0 LCCNCL = 1
the LCC performs the NOR function
LCCACL = 1 LCCNCL = 1
the LCC performs the "Equivalence Function"

In addition LCCACL and LCCNCL should be set to 1 in all cases where usage of CMPRL and CMPLL is desired. See below.

$$CMPRL = \prod_{n=16}^{n=31} [AR.B(n) \odot DR.B(n)][LCCNCL][LCCACL]$$

$$CMPLL = \prod_{n=\phi\phi}^{n=15} [AR.B(n) \odot DR.B(n)][LCCNCL][LCCACL]$$

Accept the contents of the IIB.L into the DR.L.

DRAL.R DR Accept Level Right

Accept the contents of the IIB.R into the DR.R.

DR Place Levels

Logically the place levels for the left and right halfs are identical. They are generated separately because of buffering requirements.

DRPL.L&R = PI.PDRPL v T4PL [ALL INSTRUCTIONS except TXZ v TXN v TZD v TND] v
T7PL [TSX]

DR Accept Levels

DRAL.L = T2AL [ALL INSTRUCTIONS except HELP v SHL v SHR v CSL v CSR v CRR v CRL v CPY v CPH v TRA v CPC v TSX v XEC v XECN v WMCP v WMCG v RMSG] ($\overline{DCCBF}$) v
T3AL [SHL v SHR v CSL v CSR v CRR v CRL] v
T5AL [WPS v WPSN v WPSD v RPSA v RPU v RPUT v RPUN v RPUA v WPU v WPUN] v LCC Place Levels Logically the control signals for the left and right place functions are identical. Two levels are generated because of buffering requirements.

LCCPL.L&R = T7PL [AND v ORR v EOR v ISP v ANH v ORH v ISH v EOH v SBC]

LCC Function Control Levels

The two LCC functions control levels are generated from a common enable signal for comparisons and individual enables for the logic instructions.

LCCACL = AND v ISP v ISH v ANH v EOR v EOH v SBC v CMCL

LCCNCL = ORR v ORH v EOR v EOH v SBC v CMCL

Where:

CMCL = T0PL v ($\overline{RTCL0 \text{ v } RTCL1}$)

T0PL enables the comparison gates for all instructions. This enable allows the address echos returned from PS & PU in T7 of these cycles to be compared in T0 of any instruction that should follow them.

$\overline{RTCL0}$ v $\overline{RTCL1}$ enables the comparison gates for all instructions except data processing ones. The enable allows usage of the comparator as an imput to the decision transfer control and for 2nd cycle echo comparisons of IS instructions.

AOR Controls

Place and accept control generates two place levels for the AOR; accept is generated in instruction fetch control.

AORPL.L: AOR Place Level Left

Place AOR.L onto IOB.L.

Note the left helf of the AOR contains only one bit.

AORPL.R: AOR Place Level Right

Place AOR.R onto IOB.R.

AOR Place Levels

AORPL.L&R = T6PL for all instructions.

ADC Controls

PCC only generates a place signal for ADC. No accept signal is required; ADC continually adds the contents of AR.R to AR.L.

ADCPL.R: ADC Place Level Right

Place ADC onto the IOB.R.

ADC Place Level

ADCPL.R =

T3PL [ADD v SUB v SBC v SBN v SBZ v ANH v ORH v EOH v ISH v TSX v RIS v RISA v RIST v RISN v WIS v WISN v WISD v XEC v XECN v RPSN v RPS v RPST v WPSN v WPSD v WPS v RPSA v RPU v RPUN v RPUT v WPU v WPUN v RPUA v WMCG v WMCP v RMSG]

T5PL [WPS v WPSD v WPSN v RPSA v RPU v RPUT v RPUN v RPUA v WPU v WPUN] v

T7PL [ADD v SUB v CPH v TNX v TIX v TZD v TND v RIS v RISN v RIST v RISA v WIS v WISN v WISD]

SR Controls

PCC only generates an accept signal for SR. No place gateing is required since SR is directly ties to the bit selection circuits.

SRAL: SR Accept Level

Accepts the contents of IIB.L into the SR.

SR Accept Level

SRAL = T0AL [ALL INSTRUCTIONS] v

T1AL [TXZ v TND v TXN v TZD] v

T3AL [SBC v SBN v SBZ]

Interface Register Control Operation

ISR, PSR, PUR, MDR Controls

PCC generates two place levels each for the ISR, PSR, PUR and MDR. Each of the sets of place levels are pulsed in unison from a common decoder; two levels are generated per set for buffering requirements.

ISRPL.L: ISR Place Level Left

ISRPL.R: ISR Place Level Right

Place the contents of ISR.R and ISR.L onto IOB.R and IOB.L;

PSRPL.L: PSR Place Level Left

PSRPL.R: PSR Place Level Right

Place the contents of PSR.R and PSR.L onto IOB.R and IOB.L;

PURPL.L: PUR Place Level Left

PURPL.R: PUR Place Level Right

Place the contents of PUR.R and PUR.L onto IIB.R and IIB.L;

Note that MDR & PUR are placed directly on the IIB and do not pass through Bus Transfer Circuit.

MDRPL.L: MDR Place Level Left

MDRPL.R: MDR Place Level Right

Place the contents of MDR.R and MDR.L onto IIB.R and IIB.L.

ISR Place Levels

ISRPL.L&R =

T0PL [ALL INSTRUCTIONS] v

T1PL [DCCBF]v

T3PL [All transfer instructions except TSX] $\overline{ICCSL}$

Note: DCCBF causes a place in the second cycle of RIS v RISN v RIST v RISA v WISN v WIS v WISD.

PSR Place Levels

PSRPL.L&R = T7PL [RPS v RPSN v RPST v WPS v WPSN v WPSD v RPSA]

PUR Place Levels

PURPL.L&R = T5PL [RPU v v RPUT v RPUN v RPUA v WPU v WPUN v WPS v WPSN v WPSD v RPSA] ($\overline{DCCBF}$)

PURPL.L&R = T7PL [RPU v RPUT v RPUN v RPUA v WPN v WPUN]

Note: DCCBF inhibits the place of PUR during the 2nd cycle of all Dual Cycle instructions except XEC and XECN.

MDR Place Levels

MDRPL.L&R = T7PL [RMSG]

INTAB Control

PCC generates one level for INTAB. This level will preempt all other place levels that amy be generated by PCC when an interrupt condition occurs.

INTAPL: INTAB Place Level

Place the interrupt address generated by ICC on the IOB.R.

INTAB Place Level

INTAPL = T3PL [ICCSL].

Storage Register Control Operation

General Register Control

PCC generates 28 control levels for the GR.

GR (N) PL.L: GR (N) Place Level Left $1 \leq N \leq 7$.

GR (N) PL.R: GR (N) Place Level Right $1 \leq N \leq 7$.

GR (N) AL.L: GR (N) Accept Level Left $1 \leq N \leq 7$.

GR (N) AL.R: GR (N) Accept Level Right $1 \leq N \leq 7$.

Seven sets of logic (one for each General Register) as shown in FIG. 64 are provided to generate these levels. Note that the place levels for the left and right halfs are identical, two levels are generated because of buffering requirements. In this drawing, the gates represented by the symbol as for gate 480 are AND gates; the gates represented by the symbol for gate 481 are OR gates; and the gates represented by the symbol 482 are inverters. The letter designations illustrate the signal on an associated line.

The GR (N) place and accept levels are enabled from two sources, as diagrammatically illustrated in FIG. 60.

1. An X Y Selection Matrix generally designated 487 that specifies which GR, and 2. A common control logic circuit 488 that specifies place or accept and defines the timing in terms of the timing levels already discussed.

Selection Matrix

Which GR is to be used may be specified by the X or Y filed of the ICR (refer to FIG. 51), or the XSR in the timing intervals as follows:

T1PL: Y Field specifies a GR to be placed onto the IOB for all instructions.

Note: X = O specifies that no GR is to be placed.

T2PL: X Field specifies a GR to be placed onto IOB for all instructions.

T4PL: Y Field specifies a GR to be placed onto IOB for the following instructions:

TZD X, YH, X
TND Z, YH, X

Note: Y = 0 specifies that no GR is to be placed on bus.

T5PL: XSR specifies a GR to accept data from IIB for the following instructions (during the second cycle of their execution).

RIS, RISN, RIST, RISA
RPU, RPUN, RPUT

The second cycle of the IS instructions is indicated by the DCCBF flip-flop.

The second cycle of the PU instructions is indicated by the RPF flip-flop.

T7PL:

a. Y Field and the H Field specifies a GR half to accept data from IIB for the following instructions:
TIX, TNX, TND, TZD b. X Field and G Field specifies a GR half to accept data from IIB for the following instructions:
ADD, CPH, SUB, SHL, SHR,
ANH, ISH, ORH, EOH, TSX c. X Field specifies a GR to accept data from IIB for the following instructions:
AND, ORR, EOR, ISP, CSL,
CSR, CRL, CRR, SBN, SBZ,
SBC, CPY, CPC, RPS, RPST,
RPSN, RPSA, RPUA, RMSG GR selection is done using a strobed X, Y selection matrix as shown in FIG. 60. Since selection by the three different sources are mutually exclusive events in time, it is possible to strobe the selection decoders and then OR these outputs to drive the selection matrix. This is what is done.

The two least significant bits of the X field, Y field and XSR register are decoded in a one out of four code to provide the X selection. The most significant bit of the X field, Y field, and XSR; and its inverse provide the Y selection.

Selection Levels

GRXSL1 = [$\overline{\text{ICR.B09}}$·$\overline{\text{ICR.B10}}$·XFSL] v [$\overline{\text{ICR.B12}}$·$\overline{\text{ICR.B13}}$·YFSL] v [$\overline{\text{XSR.B01}}$·XSR.B02·XSRL]

GRXSL2 = [$\overline{\text{ICR.B09}}$·ICR.B10·XFSL] v [$\overline{\text{ICR.B12}}$·ICR.B13·YFSL] v [$\overline{\text{XSR.B01}}$·XSR.B02·XSRL]

GRXSL3 = [ICR.B09·$\overline{\text{ICR.B10}}$·XFSL] v [ICR.B12·$\overline{\text{ICR.B13}}$·YFSL] v [XSR.B01·$\overline{\text{XSR.B02}}$·XSRL]

GRXSL4 = [ICR.B09·ICR.B10·XFSL] v [ICR.B12·ICR.B13·YFSL] v [XSR.B01·XSR.B02·XSRL]

GRYSL = [ICR.B08·XFSL] v [ICR.B11·YFSL] v [XSR.B00·XSRL]

Three strobes are developed in the common control circuit to specify which field and when, it to be used.

YFSL: Y Field Select Level

YFSL = 1 the Y field of ICR selects the GR.

XFSL: X Field Select Level

XFSL = 1 the X field of ICR selects the GR.

XSRL: XSR Select Level

XSRL = 1 the XSR selects the GR.

Selection Strobe Levels

YFSL = T1PL v T4PL [TZD v TND] v T7PL [TIX v TNX v TZD v TND]

XFSL = T2PL v T7PL [$\overline{\text{TIX v TNX v TZD v TND}}$]

XSRL = T5PL

Common Controls

Still referring to FIG. 60, three signals are generated to enable the place and accept levels. These are:

GRPL: GR Place Level
GRAL.R: GR Accept Level for the Right half.
ORAL.L: GR Accept Level for the Left half.

Common Levels

GRPL = [T1PL v T2PL v T4PL (TZD v TND)] $\overline{\text{DCCBF}}$

GRAL.R = T5AL [DCCBF·(RIS v RIST v RISA v RISN) v RPF] v ($\overline{\text{YFSL}}$) ($\overline{\text{ICCSL}}$)
= T7AL (ADD v SUB v CPH v SHL v SHR v ANH v ISH v ORH v EOH v TSX) (G) $\overline{\text{ICCSL}}$ v
T7AL (TNX v TIX v TZD v TND) (H) $\overline{\text{ICCSL}}$ v
T7AL (AND v ORR v EOR v ISP v CSL v CSR v CRL v CRR v SBN v SBZ v SBC v CPY v CPC v RPST v RPS v RPSN v RPSA v RPUA v RMSG) $\overline{\text{ICCSL}}$ v GRAL.L = T5AL [DCCBF (RIS v RIST v RISA v RISN) v RPF] v ($\overline{\text{YFSL}}$) ($\overline{\text{ICCSL}}$)
= T7AL (ADD v SUB v CPH v SHL v SHR v ANH v ISH v ORH V EOH v TSX) ($\overline{\text{G}}$) $\overline{\text{ICCSL}}$ v
T7AL (TNX v TIX v TZD v TND (H) $\overline{\text{ICCSL}}$ v
T7AL (AND v ORR v EOR v ISP v CSL v CSR v CRL v CRR v SBN v SBZ v SBC v CPY v CPC v RPST v RPS v RPSN v RPSA v RPUA v RMSG) $\overline{\text{ICCSL}}$ GR Place Levels

GR(N)PL.L&R = [GRXSL(N)][GRYSL][GRPL][DCCBF]

GR Accept Levels

GR(N)AL.L = [GR(N)SL][GRAL.L]
GR(N)AL.R = [GR(N)SL][GRAL.R]

SPR Controls

PCC generates four levels for SPR.

SPRPL.L: SPR Place Level Left
Place the contents of SPR.L onto IOB.L.

SPRPL.R: SPR Place Level Right
Place the contents of SPR.R onto IOB.R.

SPRAL.L: SPR Accept Level Left
Accept the contents of IIB.L onto SPR.L.

SPRAL.R: SPR Accept Level Right
Accept the contents of IIB.R into SPR.R.

SPR Place Levels

Logically the place levels for the left and right are identical, two levels are generated for buffering reasons.

SPRPL.L&R = T1PL (CPY) (SL2)
T2PL (CPY v SBZ v SBN v SNC v ANH v ORH v EOH v ISH v TXZ v TXN v TND v TZD v TBN v TBZ) SPRSL

Where SPRSL is the decoded output of the X and Y fields when X = 0 or Y = 0, as discussed above.

SPR Accept Levels

SPRAL.L = T7AL (SPRSL) [(CPY)(SL3) v SBN v SBZ v SBC v (ANH v ORH v ISH v EOH) G]$\overline{\text{ICCSL}}$ SPRAL.R = T7AL (SPRSL) [(CPY)(SL3) v SBN v SBC v SBZ v (ANH v ORH v EOH v ISH) G]$\overline{\text{ICCSL}}$ Note that bit 0 of SPR is not accessed by IIB and cannot be changed directly by any instruction that allows access to the SPR.

Bus Transfer Circuit (BTC) Control Function

This section of the PCC generates signals that control Bus Transfer Circuit (BTC) and its auxilliary circuits in the DPC. Reference is made to FIG. 62.

Bus Transfer Circuits interconnect the IOB and the IIB in the DPC as discussed more fully in Section III, D. The CP executes instructions by moving data from the IOB to the IIB through the BTC.

Auxilliary circuits interconnect the BT circuits to provide the shifting options.

Bus Transfer Control

PCC generates 12 levels for the BT circuits.

BTL.L: Bus Transfer Level Left

Move the contents of IOB.L to IIB.L

IOB.L → IIB.L

BTL.R: Bus Transfer Level Right

Move the contents of IOB.R to IIB.R.

IOB.L → IIB.R

XBTL.L: Cross Bus Transfer Level Left

XBTL.R: Cross Bus Transfer Level Right $\overline{\text{IOB.L}}$ → IIB.R
$\overline{\text{IOB.R}}$ → IIB.R CBTL.L: Complement Bus Transfer Level Left CBTL.R: Complement Bus Transfer Level Right $\overline{\text{IOB.L}}$ → IIB.L
$\overline{\text{IOB.R}}$ → IIB.R XCBTL.L: Complement & Cross Bus Transfer Level Left XCBTL.R: Complement & Cross Bus Transfer Level Right $\overline{\text{IOB.L}}$ → IIB.L
$\overline{\text{IOB.R}}$ → IIB.R RSL.L: Right Shift Level Left RSL.R: Right Shift Level Right IOB.B (n) → IIB.B (n +1)

$n = 0 \rightarrow 31$ $n + 1 = 1 \leq (n+1) \leq 15$ and $17 \leq (n+1) \leq 31$ $(n+1) = 0$ only if circular shift allowed $(n+1) = 16$ only if full word shift allowed LSL.L: Left Shift Level Left LSL.R: Left Shift Level Right IOB.B (n) → IIB.B ($n$−1)

$n = 0 \rightarrow 31$ $n-1 = 0 \leq (n-1) \leq 14$ and $16 \leq (n-1) \leq 30$ (n−1) = 31 only if circular shift allowed (n−1) = 15 only if full work shift allowed Additional Functions a. Load all zero's onto IIB.L&R.

Accomplished by a BTL with no register or circuit placed on IOB.L&R.

b. Load all one's onto IIB.L&R.

Accomplished by no BTC action during a register accept from IIB.L or R.

Note that a specific level is not generated for the additional functions they are incorporated in the place and BTC control levels.

Bus Transfer Control Operation

The control levels generated for the BTC are primarily functions of Timing Levels, RTCL's, and ROCL's. In come of the Timing levels secondary control is exercised by the Suffix and Shift Count Field and ICCSL.

BTC control levels are affected by these secondary controls in the timing levels as follows:

T1PL: The H, S and SC field have secondary control in this interval.

H which specifies the half of the GR called for by the Y Field determines whether a BTL (H = 0) or XBTL (H = 1) is generated for those instructions that load a GR into the AR.L.

S which specifies an extended operation code determines whether a BTL (SL0 v SL2 v SL3) or a CBTL (SL1) is generated for AND ORR EOR ISP. S also determines whether right or left shifts or rotations will occur for SHL v SHR v CSL v CSR v CRR v CRL.

SL0: LSL Shift

SL1: LSL Rotate

SL2: RSL Shift

SL3: RSL Rotate

SC which specifies the number of bit positions to whift determines whether a BTL or right or left shift level will occur.

Shift level for SCL0 v SCL1 v SCL2 v SCL3.

T2PL: The G field has secondary control in this interval.

G which specifies the half of the GR called for by the X Field determines whether BTL, XBTL, CBTL, XCBTL is generated as follows:

for ADD v ANH v ORH v ISH v EOH v TEH v TUH

BTL for (G = 0): XBTL for (G = 1)

for SUB

CBTL for (G = 0): XCBTL for (G = 1)

T3PL: The S and SC fields and ICCSL have secondary control in this interval.

S field see T1PL, S field for shift instructions.

SC field see T1PL, SC field with BTL for SCL1.

Shift level for SCL0 v SCL2 v SCL3.

ICCSL will inhibit all normal level generation and force CBTL.L&R.

T4PL: The H, S and SC field have secondary control in this interval.

H field controls which half of the BTC will be allowed to transfer.

If H = 0 then BTL.L = 1, BTL.R = 0
H = 1 BTL.L = 0, BTL.R = 1

This leads all ones in half of AR and the GR specified by YH in the other half for a decrement by 1 operation in TZD v TND.

S field see T1PL, S field for shift instructions.

SC field see T1PL, SC fields with BTL for SCL1 v SCL2.

T7PL: The H, G, S and SC fields have secondary control in this interval.

H which specifies the half of the GR called for by the Y field determines whether a BTL for (H=1) or XBTL for (H=0) is generated for TNX v TIX v TZD v TND.

G which specifies the half of the GR called for by the Y field determines whether BTL, XBTL, CBTL, or XCBTL is generated as follows:

for ADD v CPH v TSX

BTL for G = 1

XBTL for G = 0 for SUB

CBTL for G = 1

XCBTL for G = 0
S field see T1PL, S field
a. for AND ORR EOR ISP
BTL for SL0 v SL1
CBTL for SL2 v SL3
b. for shift instructions
c. for the CPY instruction
CTL for SL0 v SL2 v SL3
CBTL for SL1 (CPC)
SC field see T1PL, SC field with BTL for SCL1 v SCL2 v SCL3
Shift level for SCL0

Bus Transfer Levels
BTL.L = TPL [All INSTRUCTIONS]v
T1PL [[ALL INSTRUCTIONS except CPY v ISP v SHL v SHR v CSL v CSR v CRR v CRL](H) v CPY v DCCBF v AND v ORR v EOR]v
T2PL [ALL INSTRUCTIONS except [SUB v RMSG v WMPG v WMCP v (ADDv ANH v ORH v ISH v EOH v TEH v TUH) G]]v
T3PL [ALL INSTRUCTIONS except SBC v SBN v SBZ v ISH v CPY v (SHL v SHR v CSL v CSR v CRR v CRL) ($\overline{SCL1}$)]$\overline{ICCSL}$
T4PL [SBZ v (SHL v SHR v CSL v CSR v CRR v CRL) (SCL1 v SCL2) v (TZD v TND) (H)]v
T5PL [DCCBF]v
T6PL [TSX]v
T7PL [(ADDv v CPH v TSX)G v (CPY) ($\overline{SL1}$) v AND v ISP v ANH v ISH v SBC v SBZ v (SHL v SHR v CSL v CSR v CRR v CRL) ($\overline{SCL0}$) v (TNX v TIX v TZD v TND) H v RPS v RPST v RPSN v RPSA v WPS v WPSN v WPSD]

BTL.L is equal to BTL.R except for T4PL which is shown below.
BTL.R (T4PL) = T4PL [SBZ v (SHL v SHR v CSL v CSR v CRR v CRL) (SCL1 v SCL2) v (TZD v TND) (H)]
XBTL.L&R = [ALL INSTRUCTIONS except [CPY v ISP v AND v ORR v EOR v SHL v SHR v CSL v CSR v CRR v CRL](H) $\overline{DCCBF}$ v
T2PL [AND v ANH v ORH v ISH v EOH v TEH v TUH]G v
T3PL [SBN v SBZ v SBC v # CPY v # CPC]$\overline{ICCSL}$*
T4PL [ADD v SUB v ANH v ORH v EOH v ISH]v
T5PL [WPS v WPSD v WPSN v RPSA v RPU v RPUN v RPUT v WPU v WPUN v RPUA]v
T7PL [(ADD v CPH v TSX) $\overline{G}$ v (TNX v TIX v TZD v TND)$\overline{H}$ v WIS v WISN v WISD v RISA v # RIS v # RISN v # RIST]*

Note that XBTL.L = XBTL.R and the two levels are generated only to meet buffering requirements.
CBTL.L&R = T1PL [ISP] v
T2PL [(SUB) ($\overline{G}$) v WMCG v SMCP v #RMSG]v
T3PL [ISH v ICCSL] v
T4PL [SBN v # CPY v # CPC]*
T7PL [CPC v SBN v EOH v ORH v ORR v EOR v SUB (G)]

Note that CBTL.L = CBTL.R and the two levels are generated only to meet buffering requirements.
XCBTL.0&1 = T2PL [SUB (G)] v
T4PL [TEH v TUH] v
T7PL [SUB ($\overline{G}$)]

Note that XCBTL.L = XCBTL.R and two levels are generated only to meet buffering requirements.

RSL.L&R = (SHR v CSR v CRR) [T1PL v T3PL (SCL1) ICCSL v T4PL (SCL0 v SCL3) v T7PL (SCL0)]
Note that RSL.L = RSL.R and two levels are generated only for buffering requirements.
LSL.L&R = (SHL v CSL v CRL) [T1PL v T3PL (SCL1) ICCSL v T4PL (SCL0 v SCL3) v T7PL (SCL0)]
Note that LSL.L = LSL.R and two levels are generated only for buffering requirements.

Auxiliary Circuit Operation

Three types of shifting are allowed in the TSPS order set: full work shifts, half word shifts, and full word circular shifts. To implement these shift options two bidirectional auxilliary circuits called the Center Shift Circuit (CSC) generally designated 490 in FIG. 68 and the End Shift Circuit (ESC) 491 are connected between the bus transfer circuits as shown therein.

The data word to be shifted is considered as two 16-bit half words each residing on its own half of the internal bus structure. Both halves are then shifted right or left by the right and left shift levels generated in the bus transfer control, with the appropriate bidirectional gate enabled as shown below.

Each output bit place is received from a respective NAND gate 496 which, in turn, is fed by a first NAND gate 497 and a second NAND gate 498. The gates 497 are enabled by a Left Shift Level and couple the bit of a higher order position from the Place Gates 500 which transmit the data from the IOB of the DPC. Similarly, each gate 498 is enabled by a Right Shift Level and couples the bit of a lower order position, except in the case of the End Shift or Rotate, which receives B31.

| | CSC | ESC |
|---|---|---|
| Half Word Shifts | Disabled | Disabled |
| Full Word Shifts | Enabled | Disabled |
| Full Word Circular Shifts | Enabled | Enabled |

Two levels are generated by PCC for the Auxilliary circuits.
CSCL: Center Shift Circuit Level enables AND gates 492 and 493 in the CSC in DPC.
ESCL: End Shift Circuit Level enables the AND gates 494 and 495 in the ESC in DPC.

Auxilliary levels
CSCL = CSL v CSR v CRL v CRR
ESCL = CRL v CRR
Note timing and direction is supplied by RSL.L&R and LSL.L&R.

Memory and Peripheral Unit Control Function

PCC generates the "Do" bit, mode control, and read or write levels for the memories, peripheral units, and maintenance access circuit as seen in FIG. 63. Again, conventional combinational logic design is employed.

Instruction Store Control

PCC generates three mode levels in a one out of three code, and two read/write levels, in a one of two code for IS. DO levels are not required. IOC also strobes mode and read/write levels at the correct interval.

Levels
ISNMAL — IS Normal Mode Level

ISCML — IS Control Mode Level
ISSML — IS Special Mode Level
ISRL — IS Read Level
ISWL — IS Write Level Note that for all instructions except RISN, RIST, WISN, RISA and XECN the mode is always normal (see FIG. 66). The read level is always true except for WIS, WISN, WISD and RISA (see FIG. 65). The various modes are defined in FIG. 67.

Process Store and Peripheral Unit Control

PCC generates three mode and two read/write levels in common for PS & PU and a separate DO level for each. Coding and function of these levels is identical to their counterparts for the IS.

Levels

ICR.B07 [A]is used as the Normal Mode Level for PS & PU, FIG. 66.

CML — Control Mode Level
SML — Special Mode Level
RL — Read Level
WL — Write Level Since the mode levels are used in common they must be decoded from the ROC field and as a consequency will be identical for both PU & PS instruction. Two further levels are generated to specify when the mode levels are to be used for PU or PS.

PSDOL: Process Store DO Level

When true specifies the Process Store as the one to use the Mode and Read/Write Levels.

Timing

IOC will outpulse these signals during the appropriate interval.

MAC Control

PCC generates a read or write level for the MAC control circuits. MAC has no modes other than a normal mode and as such requires no controls.

| Levels | | |
|---|---|---|
| MARL | MAC Read Level | Timing is provided by MAC |
| MAWL | MAC Write Level | |

Operation

IS

PCC generates IS mode and read/write levels as shown in FIGS. 66 and 65 respectively.

Note in addition to the instructions shown in FIG. 66, the IS operates in the normal mode for all other instructions.

ISNML = $\overline{\text{DCCAF}}$ v RIS v XEC v WIS v WISD
ISCML = (DCCAF) (RISN v XECN v WISN)
ISSML = (DCCAF) (RIST v RISA)

DCCAF controls the requirement that IS operate in the normal mode for the second cycle of Dual cycle IS instructions to fetch the next instruction to be executed.

ISRL = RIST v RIS v RISN v XEC v XECN v $\overline{\text{DCCAF}}$
ISWL = (WIS v WISN v WISD v RISA) (DCCAF)

PS & PU

PCC generates the PS & PU mode, read/write levels and DO commands as also shown in FIGS. 66 and 65.

ICR.B07[A] = RPS v WPS v WPSD v RPU v WPU; if RTCL5 or RTCL6 = 1
CML = RPSN v RPUN v WPSN v WPUN
SML = RPST v RPSA v RPUA v RPUT
RL = RPST v RPS v RPSN v RPUT v RPU v RPUN
WL = RPSA v WPS v WPSN v WPSD v RPUA v WPU v WPUN
PSDOL = RPST v WPSN v RPS v RPSA v WPS v WPSN v WPSD
PUDOL = RPUT v RPUN v RPU v RPUA v WPU v WPUN

MAC

PCC generates MAC read/write levels as shown below.

MARL = RMSG
MAWL = WNCG v WMCP

INSTRUCTION TIMING DIAGRAMS

FIGS. 69–129 and 129A–129I are timing diagrams for the various instruction words in the Central Processor. These diagrams are particularly useful in tracing the transfer of information from a particular register or circuit in the Data Processor Circuit onto the Internal Output Bus, through the Bus Transfer Control Circuit, onto the Internal Input Bus of the Data Processor Circuit and thence into a selected register or circuit. All of this transfer information is specifically related to timing levels, both Place Levels and Accept Levels.

For example, FIG. 69 illustrates the timing of data transfers for an ADD command. The contents of the Instruction Store Register are denoted in the upper portion of the diagram. Reference is made here to FIG. 51 for interpretation of the various fields in the instruction format for the Instruction Store Register. It will be observed that B14 specifies which half of the register identified in B08–B10 (the X register which is one of the General Registers or the Special Register) is specified. B15 is similarly associated with the Y register.

The particular instruction, then, adds the contents of the Z field to the specified half of the Y register and this sum is added to the specified half of the X register, and the resultant is stored in the register.

Interpreting the vertical timing levels, then, the first column indicates that at T0, the contents of ISR are transferred by means of a BTL signal as follows: the left half of the ISR goes to the Special Register, and the right half is transferred to the Address Register and to the Data Register. At the same time, the contents of the ISR are transferred to the Instructions Content Register. The lower lines of the diagram indicate the various matches which take place between the duplicated copies of the circuitry. For example, at the even timing levels, MR0 match is made and at the odd timing levels, MR1 match is made. Thus, the contents of the duplicate copies of the ISR are matched at timing level T0. In the remaining timing levels, it will be observed that the arithmetic function is carried out for effecting the required instruction. The cross hatch areas signify that the associated transfer specified in the left-hand column takes place at the timing level indicated in the vertical column.

Summary of PCC Input/Output

| SOURCE | MNEMONIC | Input DESCRIPTION |
|---|---|---|
| IOC | ISR.B02<br>.<br>.<br>.<br>ISR.B15 | Instruction word operational code fields define processor action to be executed. |

Summary of PCC Input/Output-Continued

| SOURCE | MNEMONIC | Input DESCRIPTION |
|---|---|---|
| | ISR.B30 | |
| | ISR.B31 | |
| TGC | T0AL | Timing levels (AL acceptance) (PL place) which sequence CP internal actions. |
| | . | |
| | . | |
| | . | |
| | T7AL | |
| | T0PL | |
| | . | |
| | . | |
| | . | |
| | T7PL | |
| ICC | ICCSL | Interrupt Circuit Sequence Level. When true preempts all processor actions and forces transfer to predetermined address. |
| MMC | INEXFRL | Instruction extension flip-flop reset level generated in MMC to allow reset of all dual and extended cycle flip-flop. MAC controls this via a WMCG or WMCP instruction. |
| MAC | IMDB24 | Sets SXECF flip-flop |
| | IMDB25 | Resets SXECF flip-flop |
| | MSCG.4 | MAC address of word containing SXECF. |
| MAC | MSCG.5 | MAC address of output level sense points. |
| | MSCG.10 | |
| DPC | CMPRL | Compare level left and right, used by PCC in decision transfer circuitry to determine if transfer conditions are true. |
| | CMPLL | |
| PRC | PI.PGR1PL | Program Console place levels which cause the indicated registers to be placed on the internal output bus. |
| | PI.PGR2PL | |
| | PI.PGR3PL | |
| | PI.PGR4PL | |
| | PI.PGR5PL | |
| | PI.PGR6PL | |
| | PI.PGR7PL | |
| | | Program Console Place Levels for |
| | PI.PARPL | Arithmetic Register |
| | PI.PDRPL | Data Register |
| | PI.PADCPL | Add Circuit |
| | PI.PLCCPL | Logic Circuit |
| | PI.PAORPL | Add One Register |
| | PI.PPSRPL | Process Store Register |
| | PI.PPURPL | Peripheral Unit Register |
| | PI.PISRPL | Instruction Store Register |
| | PI.PSPRPL | Special Purpose Register |
| | PI.PMDRPL | Maintenance Data Register |
| | PI.PBTL | Program Console Bus Transfer Level |

| DESTINATION | MNEMONIC | Output DESCRIPTION |
|---|---|---|
| DPC | ADCPL.R | Add Circuit Place Level Right |
| | AIARA.L | IAR-AOR Accept Level (P bit) |
| | AORAL.L | AOR Accept Level Left |
| | AORAL.R | AOR Accept Level Right |
| | AORPL.L | AOR Place Level Left |
| DPC | AORPL.R | AOR Place Level Right |
| | ARAL.L | Arithmetic Register Accept Level Left |
| | ARAL.R | Arithmetic Register Accept Level Right |
| DPC | ARPL.L | Arithmetic Register Place Level Left |
| | ARPL.R | Arithmetic Register Place Level Right |
| | ARBSL | Arithmetic Register Bit Selection Level |
| DPC | BIARAL | IIB-IAR Accept Level |
| | BTL.L | Bus Transfer Level Left |
| | BTL.R | Bus Transfer Level Right |
| | CIARAL | AOR→IAR Accept Level |
| | CBTL.L | Complement Bus Transfer Level Left |
| | CBTL.R | Complement Bus Transfer Level Right |

-Continued

| DESTINATION | MNEMONIC | Output DESCRIPTION |
|---|---|---|
| IOC | CML | Specifies Control Mode for PS & PU |
| DPC | CSCL | Center Shift Circuit Enable Level |
| PRC | –CTTL1 | Conditional Transfer on No Match Level |
| | –CTTL2 | Conditional Transfer on Match Level |
| CCC | ±DCCAF | Dual CYcle Control set T2AL/1st reset T1AL/2nd |
| MMC | ±DCCBF | Dual Cycle Control set T7AL/1st reset T6AL/2nd |
| DPC | DRAL.L | Data Register Accept Level Left |
| | DRAL.R | Data Register Accept Level Right |
| | DRPL.L | Data Register Place Level Left |
| DPC | DRPL.R | Data Register Place Level Right |
| | ESCL | End Shift Circuit Enable Level |
| DPC | GR1AL.L | General Register 1 Accept Level Left |
| | GR2AL.L | General Register 2 Accept Level Left |
| | GR3AL.L | General Register 3 Accept Level Left |
| | GR4AL.L | General Register 4 Accept Level Left |
| | GR5AL.L | General Register 5 Accept Level Left |
| | GR6AL.L | General Register 6 Accept Level Left |
| | GR7AL.L | General Register 7 Accept Level Left |
| | GR1AL.R | General Register 1 Accept Level Right |
| | GR2AL.R | General Register 2 Accept Level Right |
| | GR3AL.R | General Register 3 Accept Level Right |
| | GR4AL.R | General Register 4 Accept Level Right |
| | GR5AL.R | General Register 5 Accept Level Right |
| | GR6AL.R | General Register 6 Accept Level Right |
| | GR7AL.R | General Register 7 Accept Level Right |
| DPC | GR1PL.L | General Register 1 Place Level Left |
| | GR2PL.L | General Register 2 Place Level Left |
| | GR3PL.L | General Register 3 Place Level Left |
| | GR4PL.L | General Register 4 Place Level Left |
| | GR5PL.L | General Register 5 Place Level Left |
| | GR6PL.L | General Register 6 Place Level Left |
| | GR7PL.L | General Register 7 Place Level Left |
| | GR1PL.R | General Register 1 Place Level Right |
| | GR2PL.R | General Register 2 Place Level Right |
| | GR3PL.R | General Register 3 Place Level Right |
| | GR4PL.R | General Register 4 Place Level Right |
| | GR5PL.R | General Register 5 Place Level Right |
| | GR6PL.R | General Register 6 Place Level Right |
| | GR7PL.R | General Register 7 Place Level Right |
| RCC | HELPL | Trigger Level To RCC |
| PRC | ICCSL | Buffered ICCSL Level |
| MMC/IOC | ICR.B05[A] | Relative Operation Code and Write Level |
| IOC | –ICR.B05[A] | Write Level |
| | ICR.B07[A] | Field Bits from ICR |
| IOC | ICR.B15[A] | Supplies the Page Bit for PS Memory Address |
| MAC | IMRB.B00 | Output Level Sense |

-Continued

| DESTINATION | Output MNEMONIC | DESCRIPTION |
|---|---|---|
| | thru B31 | Groups |
| | ISNML | Specifies Normal Mode for IS |
| | ISCML | Specifies Control Mode for IS |
| | ISSML | Specifies Special Mode for IS |
| | ISRL | Specifies IS Read Operation |
| | ISWL | Specifies IS Write Operation |
| DPC | IIARAL | ICR IAR Accept Level (P bit) |
| | INTAPL | Interrupt Address Place Level |
| | ISRPL.L | IS Register Place Level Left |
| | ISRPL.R | IS Register Place Level Right |
| DPC | LCCPL.L | Logic Circuit Place Level Left |
| DPC | LCCPL.R | Logic Circuit Place Level Right |
| | LCCACL | Logic Circuit AND Control Level |
| | LCCNCL | Logic Circuit NOR Control Level |
| | LSL.L | Bus Transfer Circuit Left Shift Level Left |
| | LSL.R | Bus Transfer Circuit Left Shift Level Right |
| MMC | ±MCF | Multicycle Flip-flop |
| | MDRPL.L | MAC Data Register Place Level Left |
| | MDRPL.R | MAC Data Register Place Level Right |
| MAC | MAWL | MAC Write Level |
| | MARL | MAC Read Level |
| IOC | ICR.B07 | Specifies Normal Mode for PS & PU |
| | PSDOL | Specifies PS is to Execute |
| | PUDOL | Specifies PU is to Execute |
| DPC | PSRPL.L | PS Register Place Level Left |
| | PSRPL.R | PS Register Place Level Right |
| | PURPL.L | PU Register Place Level Left |
| DPC | PURPL.R | PU Register Place Level Right |
| MMC | ROCL7 | Decoded Operation Code Level |
| | RTCL4 | Specifies IS Instruction |
| MMC/IOC | RTCL5 | Specifies PS Instruction |
| MMC/IOC | RTCL6 | Specifies PU Instruction |
| DPC | RSL.L | BTC Left — Right Shift Level |
| | RSL.R | BTC Right — Right Shift Level |
| | SRAL | Select Register Accept Level |
| | SPRAL.L | SPR Accept Level Left |
| | SPRAL.R | SPR Accept Level Right |
| | SPRPL.L | SPR Place Level Left |
| | SPRPL.R | SPR Place Level Left |
| IOC | SML | Special Mode Level to PU & PS |
| DPC | XBTL.L | Cross Bus Transfer Level Left |
| PRC | TRAL | Transfer Always Level |
| | TSXL | Transfer and Save Index Level |
| DPC | XBTL.R | Cross Bus Transfer Level Right |
| | XCBTL.L | Complement Cross BTL Left |
| | XCBTL.R | Complement Cross BTL Right |

III. D. Data Processor Circuit (DPC)

The Data Processing Circuit, denoted 23 in FIG. 1, (DPC) includes four logical sections necessary for the execution of any instruction in the TSPS order set. These sections are set forth below. An internal Bus System connects these sections permitting data transfer within the DPC for manipulation of data. Reference is now made to FIG. 5 which is a rather broad functional diagram.

Address Section

The Address Section 600 generates or accepts the address of the next instruction to be sent to IS* 19 via IOC 24. Also, it accepts the Data Address of IS* to be sent to IS via IOC 24. It includes an Instruction Address Register (IAR) Add One Circuit (AOC), and Add One Register (AOR).

Storage Section

The Storage Section 601 contains seven General Registers of 32 bits each. These are general purpose storage registers comprised of flip-flop circuits and identified respectively as GR1–GR7. Separate acceptance controls on each register half (16-bit) have been provided. This section also includes a Special Purpose Register (SPR) of 32 bits used to store indicators and program timing.

Data Section

The Data Section 602 manipulates data according to instruction requirements. It also generates addresses to be sent to PS* and PC* via IOC. It stores data to be sent to IS*, PS*, PC* via IOC, and to CP* via MAC. It includes a Data Register Circuit (DR), Arithmetic Register Input Circuit (ARIC), Address Register Circuit (AR), Add Circuit (AC), and a Logic Comparator Circuit (LCC).

Internal Bus System and Bus Transfer Circuit

The Bus Transfer Circuit (BTC) 603 is shown as block 603, and it controls the transfer of data and instructions and other signals which are placed on an Internal Output Bus (IOB) 604 from one of the above sections of the DPC to the Internal Input Bus (IIB) 605 which also communicates with the inputs of the above sections of the DPC. The IOB 604 and IIB605 comprise the Internal Bus System of the Data Processor Circuit.

All the control levels necessary for the DPC operations are provided by Process Control Circuit (PCC), discussed in the previous Section, III. C. The above circuits and their associated interconnections are shown in more detail in FIG. 130, which is a more detailed functional block diagram than FIG. 6.

Address Section

Turning now to FIG. 132, three circuits are required to provide an Instruction Address as follows:

a. Instruction Address Register (IAR) 610 in FIG. 130 which contains the instruction address and consists of:

IAR.R (B16–B31), denoted 611 in FIG. 132, and

IAR.L (B15), denoted 612.

The IAR receives inputs from IIB, which also is divided into a right half (IIB.R) denoted 605A and a left half (IIB.L) denoted 605B.

b. Add-One Circuit (AOC) 613 which increments the contents of IAR.R every instruction cycle and consists of:

AOC (B16–B31)

c. Add-One Register (AOR) 614 which stores the output of AOC and IAR.L and consists of:

AOR.R (B16-B31) 615 stores output of AOC

AOR.L (B15) 616 contains the "Page" bit.

Instruction Address Register (IAR)

Figure 133:
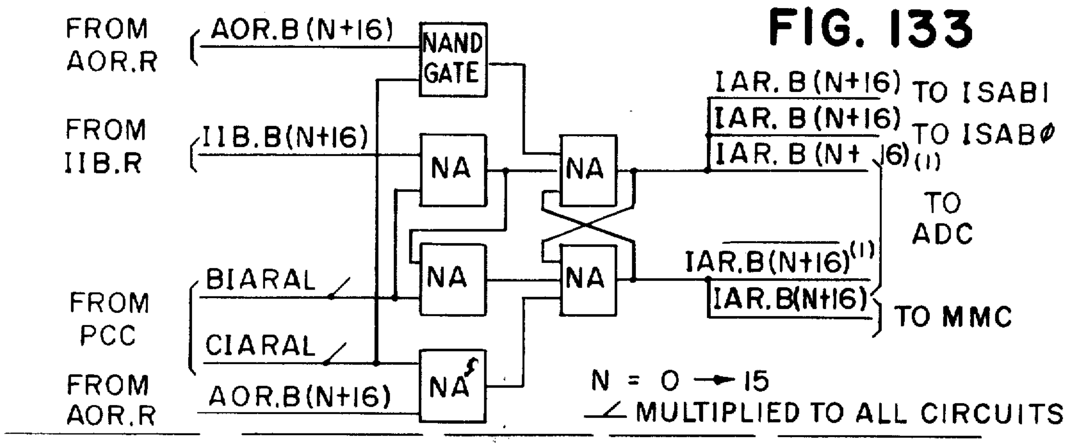
Figure 134:
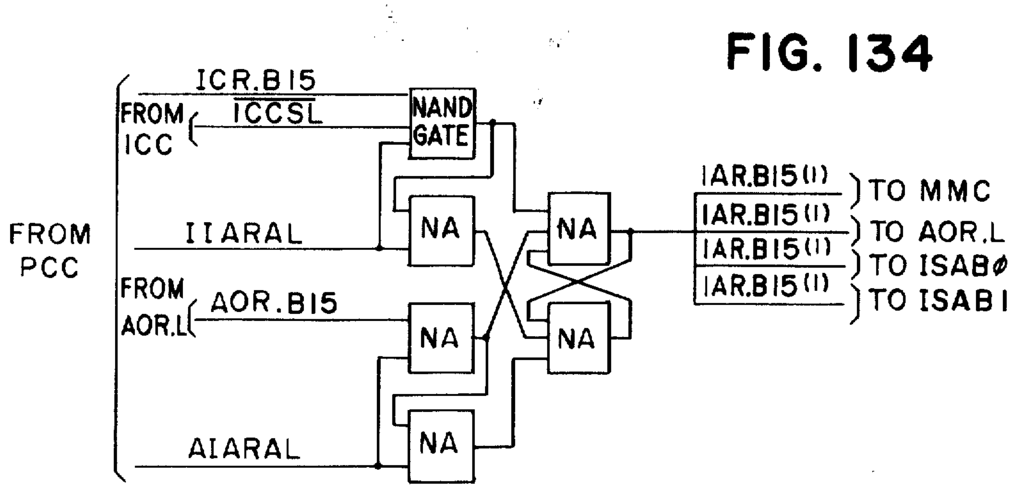
Figures 135, 136, 137, 138:
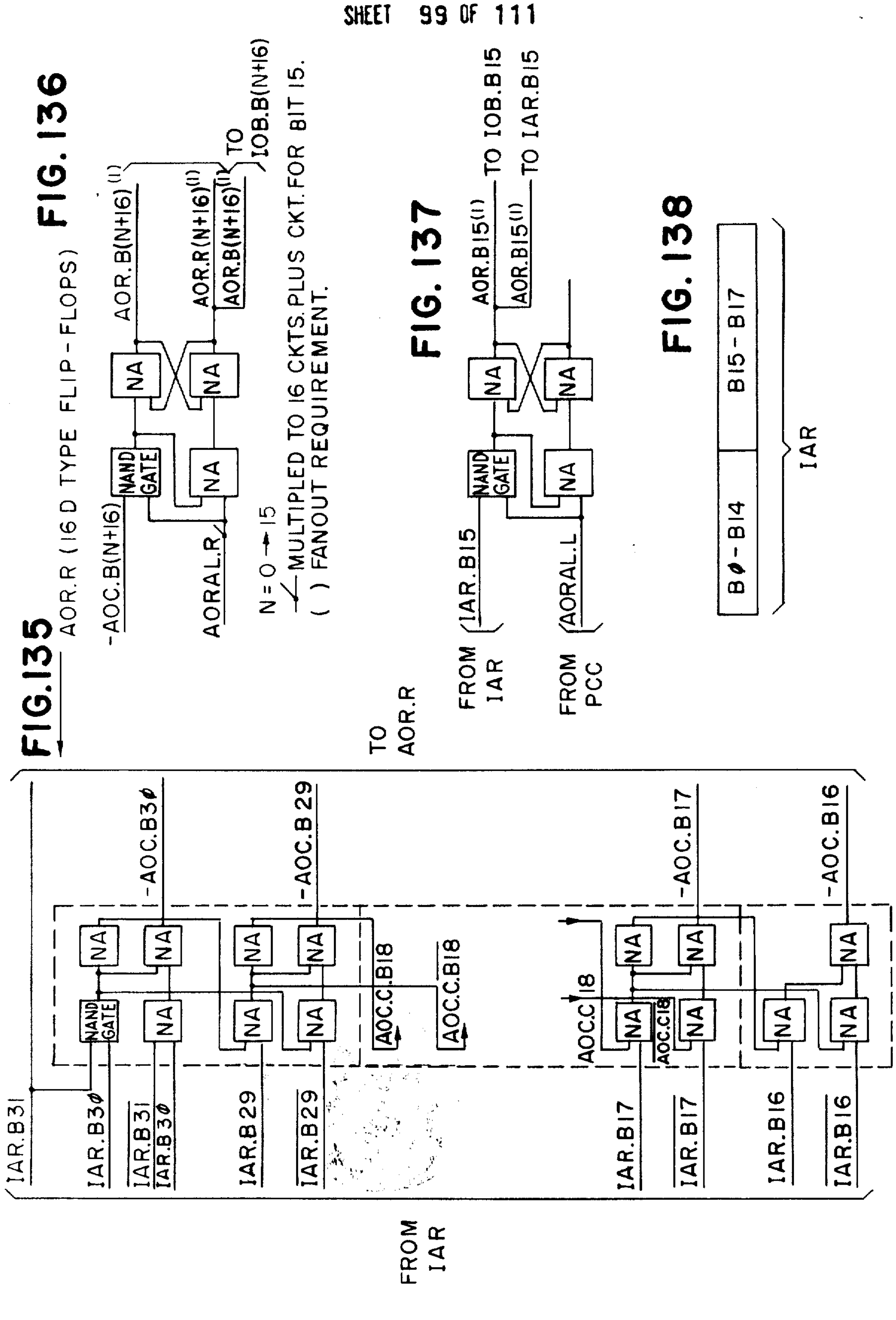

The IAR is shown in FIGS. 133 and 134 and 138, and it consists of 17 D-SR type Flip-flops and is divided into IAR.R (16 bits) FIG. 133, and IAR.L (1 bit) FIG. 134. There FIGS. show a NAND gate implementation of what is referred to as a D-SR flip-flop which means that it can both accept data by means of a strobe and is capable of being independently set and reset by means of a level signal. The D-type gating is used to accept data from IIB.R, and the SR gating is used to accept data from AOR.R.

The IAR.L accepts data either from ICR.B15 (of PCC) or from AOR.B15 depending on the instruction to be retrieved next. The IAR.L (B15) goes to 0 when ICCSL = 1. The IAR.R accepts data either from IIB.R, (a transfer address or an interrupt address), or from AOR.R the next sequential instruction.

The accept levels for both IAR.L and IAR.R are provided by PCC during T3AL. The output of IAR(L & R) also feeds IOC 604 (see FIG. 130).

Accept Levels Only:

BIARAL: Accept (from IIB.R) Level
CIARAL: Accept (from AOR.R) Level
IIARAL: Accept (from ICR.B15) Level
AIARAL: Accept (from AOR.L) Level Add-One Circuit (AOC) (FIG. 135)

The AOC 613 is a 16-bit ripple carry chain Add-One Circuit. The output of IAR.R feeds AOC. And the AOC output feeds AOR.R which accepts during T2AL. The logic equation of AOC per stage is as shown below:

$N = 0 = 15$
$AOC.B(N+16) = C.B(N+16+1) \oplus IAR.B(N+16)$
$C.B(N+16) = C.B(N+16+1) \cdot IAR \cdot B(N+16)$
$C_{32} = 1$ (carry into B31 is always 1)

Add-One Register (AOR) (FIGS. 136, 137)

The AOR consists of 17 D-type flip-flops and is divided into AOR.L and AOR.R. The AOR.L accepts data from IAR.L during T2AL. The AOR.R accepts data from AOC during T2AL. For 2-cycle instruction AOR accepts only during 2nd cycle of the instruction. The AOR(L & R) output is fed to both IAR and IOB. The AOR is placed onto IOB during T6PL at all times.

Accept Levels:

AORAL.R: Accept (from AOC.B16–B31) Level
AORAL.L: Accept (from IAR.L) Level

Place Levels:

AORPL.L: Place (onto IOB.L) Level
AORPL.R: Place (onto IOB.R) Level

Storage Section

The Storage Section (601 of FIG. 5) consists of seven General Registers (GR1–GR7) and Special Purpose Register (SPR) (see FIG. 130) and its associated circuits RAOC and RAOR (discussed in connection with FIG. 140A).

General Registers (GR1 – GR7)

Each GR (see FIG. 139) consists of 32 D-type Flip-flops, divided into two 16-bit halves (for example, GR1.L is (B00–B15) and GR1.R is (B16–B31)). Each half-register has separate accept and place levels. This way, each FR can operate as one full (32-bit) register or as two independent (16-bit) half registers.

The Place levels (used to place signals onto IOB) are a function of T1PL, T2PL, and T4PL. The Accept levels (used to transfer signals from IIB) are a function of T5AL and T7AL.

Accept Levels and Place Levels

| Registers | Accept Controls Left Half | Accept Controls Right Half | Place Controls Left Half | Place Controls Right Half |
|---|---|---|---|---|
| GR1 | GR1AL.L | GR1AL.R | GR1PL.L | GR1PL.R |
| GR2 | GR2AL.L | GR2AL.R | GR2PL.L | GR2PL.R |
| GR3 | GR3AL.L | GR3AL.R | GR3PL.L | GR3PL.R |
| GR4 | GR4AL.L | GR4AL.R | GR4PL.L | GR4PL.R |
| GR5 | GR5AL.L | GR5AL.R | GR5PL.L | GR5PL.R |
| GR6 | GR6AL.L | GR6AL.R | GR6PL.L | GR6PL.R |
| GR7 | GR7AL.L | GR7AL.R | GR7PL.L | GR7PL.R |

Special Purpose Registers (SPR)

The SPR (FIGS. 140-142) consists of one D-type Flip-flop (B00) as seen in FIG. 141, 15 D-SR type Flip-flops (B01-B15) for SPR.L (see FIG. 142) and 16 D-type Flip-flops for SPR.R. The output of SPR can be placed onto IOB (FIGS. 140 and 140A) except SPR.B01. The functions of SPR.L are:

a. SPR.B00 is used as an indicator of carry (C.B16) of ADC.
b. SPR.B01 is used to control PUNCH operation of Recovery Program Timer of Timing Monitor Circuit.
c. SPR.B02–B15 is used as a hardware counter to serve as an indicator for real time consumption by program. This indicator requires RAOC 620 in FIG. 140A and RAOR 621 to increment the hardware counter (SPR.B02–B15) every machine cycle. A detailed description follows.

Carry Indicator (SPR.B00)

The Carry Indicator, as seen in FIG. 141, SPR.B00, consists of one D-type Flip-flop which accepts carry from ADC.B16 circuit during T7AL at all times. The output of SPR.B00 can be placed onto IOB.

PUNCH Control of RPT (Recovery Program Timer) (SPR.B01)

The PUNCH control consists of one D-SR type Flip-flop denoted 625 in FIG. 142 which accepts from IIB.B01 under program control. This Flip-flop is always reset during T3AL. The output of the Flip-flop is fed to control the PUNCH operation of RPT in Timing Monitor Circuit. (Recovery programs "punch in" at specifiec times by setting this bit to 1.)

Indication for Real Time Consumption by Programs (SPR.B02–B15)

The Real Time Indicator consists of 14 D-SR type Flip-flops (SPR.B02–B15) one of which is generally designated 626 in FIG. 142, the 14-bit Real Time Add-One Circuit (RAOC) 620 in FIG. 140A, and the 14-bit Real Time Add-One Register (RAOR) 621, to increment the Indicator (SPR.B02–B15) every machine cycle.

The indicator (SPR.B02–B15) (FIG. 142) accepts data both from IIB.B02–B15 under program control or from the RAOR output during T3AL. The output of the Indicator feeds both IOB and RAOC (620 of FIG. 140A).

The RAOC consists of a 14-bit ripple carry chain Add-One circuit, similar to the one already described. It accepts and increments the Indicator output. The RAOC output feeds RAOR 621. The RTTEL (Carry from RAOC.B02) is a signal level which feeds both the Real Time Error Indicator Flip-flop (RTEIF) in TMC and Recovery Control Circuit (RCC) to call for a System Recovery Program, but neither of these concern the present invention.

The RAOR 621 consists of 14 D-type Flip-flops which accept always the RAOC output during T1AL. Its output feeds the Indicator.

Accept Levels:

SPRAL.L: Accept (from IIB.B01–B15) Level
SPRAL.R: Accept (from IIB.R) Level
T7AL: Accept C.B16 from ADC.B16 circuit into SPR.B00.
T3AL: Accept from RAOR into SPR.B02–B15 Reset SPR.B01

Place Levels:

SPRPL.L: Place (onto IOB.L) Level
SPRPL.R: Place (onto IOB.R) Level

Data Section

The Data Section (see block 602 of FIG. 5) includes the following circuits which are described in more detail in subsequent sections:

a. Data Register (DR)
The DR is a flip-flop register circuit which is the source of data to be transmitted to external complexes (IS*, PS* and PC*) via IOC. Its output also feeds LCC to perform logic and/or comparator functions, and feeds MMC which generates parity over the outgoing data word. The DR consists of:
DR.L (DR.B00–B15)
DR.R (DR.B16–B31)

b. Arithmetic Register Input Circuit (ARIC)
The ARIC is an interface circuit between IIB and AR to permit the gating of data on IIB to AR or to permit the gating of data on IIB except the one selected bit when the Arithmetic Register Bit Selection Level (ARBSL) is "true". The ARIC consists of three parts; Selection Register (SR), Bit Selection Control Circuits, and Gating Circuit.

c. Arithmetic Register (AR)
The AR is the source of two 16-bit data fed to Add Circuit for arithmetic operations, the AR is one of the two sources of data fed to LCC for Logic and/or comparator functions, and the AR is the source of data for writing into MAC. The AR consists of:
AR.L (AR.B00–B15)
AR.R (AR.B16–B31)

d. Add Circuit (ADC)
The ADC generates the 16-bit sum of the contents of AR.L and that of AR.R. The ADC output can be placed on IOB.R and the ADC output is fed to IOC which addresses PS* or PC* depending on the instruction. The carry [C.B(N+16)] of the ADC feeds SPR.B00 ($N = 0 \rightarrow 16$).

e. Logic Comparator Circuit (LCC)
The LCC receives data from AR and DR. The LCC performs logic functions on these data. The result of the logic function can be placed on IOB. The LCC also performs comparator functions on these data. The result of the comparator function is fed to MMC and PCC. The LCC consists of:
LCC.L (LCC.B00–B15)
LCC.R (LCC.B16–B31)

Data Register (DR)

The DR as seen in FIG. 145 consists of 32 D-type Flip-flops divided into two 16-bit halves of DR.L and DR.R. Each half of DR may accept data from IIB independent of the other half or both halves may accept data from IIB simultaneously. The DR output can be placed onto IOB. In addition, the DR output are wired to:

a. LCC to perform logic function and comparator functions.
b. MMC which generates the odd parity for the data contained in DR.
c. IOC which transmits the data to IS*, PS*, and PC*, for write operations.

The DR acts as transitory storage for data in such a way that all operations necessary to execute instructions are accomplished.

Accept Levels:

DRAL.L: Accept (from IIB.L) Level
DRAL.R: Accept (from IIB.R) Level

Place Levels:

DRPL.L: Place (onto IOB.L) Level
DRPL.R: Place (onto IOB.R) Level

Arithmetic Register Input Circuit (ARIC) (FIG. 148)

The ARIC consists of three parts: Selection Register (SR) 630, Bit Selection Control Circuit (BSCC) 631, and Gating Circuit (GC) 632. The ARIC operates in one of two modes, controlled by level ARBSL. When ARBSL=0, all ARIC outputs (ARIC.B00–B31) are the inverse of the corresponding positions of IIB 605:

$$ARIC.B(M) = \overline{IIB.B(M)} \quad M = 0 \rightarrow 31$$

When ARBSL=1, the one selected output bit is forced to 1, all other outputs are again the inverse of the corresponding positions of IIB. The selected bit is determined by the contents of 5-bit Selection Register (SR), which is considered as a binary number Z ( = → 31):

$$ARIC.B(M) = \overline{IIB.B(M)} \text{ for } M \neq Z$$
$$ARIC.B(Z) = 1$$

The ARIC outputs feed Arithmetic Register (AR). The ability to mask off one selected bit is used in all instructions that manipulate individual bits.

Selection Register (SR) (see FIG. 149)

The SR 630 of FIG. 148 includes five D-type Flip-flops 635-639, of the type seen in FIG. 149 which shows a NAND gate implementation. The SR accepts 5-bit data from IIB.B11-B15. Its output is buffered through the Selection Register Buffer Circuit (FIG. 150) which includes NAND gates 633 for generating the complements of the outputs of SR. Both true and complement signals are then fed to the X-Y decoding matrix 640, FIG. 151.

Accept Level:

SRAL: Accept (from IIB.B11–B15) Level

Bit Selection Control Circuit (BSCC) (FIGS. 151, 154 and 155)

The BSCC consists of three parts, as seen in FIG. 148: an X-Y decoding matrix 640 (see FIG. 151 for details), one 16-bit decoding circuit for the left half (B00–B15) 642, and one 16-bit decoding circuit for the right half (B16–B31) 643. These latter two circuits are seen in FIGS. 154 and 155, respectively. The X-Y decoding matrix decodes SR.B12–B15 and selects one out of 16 bits of either the left half or the right half. The output of the X-Y decoding matrix is fed to both 16-bit decoding circuits 642, 643. These decoding circuits each include 16 NAND gates (the individual gates of each set being designated 642A and 643A in FIGS. 154 and 155 respectively). The SR.B11–1, the selected bit is in the right half (B16–B31). When SR.B11=0, the selected bit is in the left half (B00–B15). When ARBSL=0, no bit selection is made and the output (B00–B31) of the decoding circuits feeding the Gating Circuit 632 consists of all 1's. When ARBSL=1, bit selection is made and the output (B00–B31) of the decoding circuits feeding the Gating Circuit 632 consists of all 1's except the one selected bit which is set to 0.

Required Control Level:

ARBSL: Arithmetic Register Bit Selection Level

Gating Circuit (GC) (FIGS. 154, 155)

The GC (632 of FIG. 148) interfaces IIB 605 and the Arithmetic Register (AR), and consists of 32 two-input NAND gates 646 corresponding to each bit of AR, as seen in FIGS. 154, 155. Each gate 646 is fed by the corresponding bit position of IIB and BSCC. When ARBSL=0, the output of BSCC=1 for bits 0 → 31, and consequently the GC output feeding AR are $\overline{\text{IIB}}$ for each (0 → 31). When ARBSL=1, the output of BSCC=1 for bits 0 → 31 except the one selected bit is 0 and therefore the GC output feeding AR are $\overline{\text{IIB}}$ for each bit (0 – 31) except the one selected bit is 1 at input of AR.

Arithmetic Register (AR) (FIGS. 152 and 153)

The AR consists of 32 D-type Flip-flops divided into two 16-bit halves: AR.L (AR.B00–B15) and AR.R (AR.B16–B31) FIG. 152 shows the NAND gate implementation for each bit of the left half of the AR; and FIG. 153 shows the corresponding circuitry for the bits of the right half. Each half may accept data from the corresponding half of ARIC independent of the other half, or both halves may accept data from ARIC simultaneously. Note the way in which the 1 and 0 outputs of AR are defined in FIGS. 152, 153 — that is the outputs are inverted. This is done to compensate for the inversion caused by ARIC. As a consequence, when ARBSL=0, AR can accept the 32-bit data on IIB in their correct sense. When ARBSL=1, the selected bit sets to 0 and the remaining 31 bits are latched up in their correct sense.

The AR output feeds:

a. Add Circuit (ADC) which performs add operations on AR.L and AR.R.

b. Logic Comparator Circuit (LCC) which performs logic operations and comparator functions.

c. Maintenance Access Circuit for MAC write instructions.

The AR acts as a transitory storage in such a way that all operations necessary to execute instructions are accomplished.

Accept Levels:

*ARAL.L Accept ($\overline{\text{IIB.L·ARIC.L}}$) Level
*ARAL.R Accept ($\overline{\text{IIB.R·ARIC.R}}$) Level
* If ARBSL = 0, AR accepts IIB.

Place Levels:

ARPL.L: Place (onto IOB.L) Level
ARPL.R: Place (onto IOB.R) Level

Add Circuit (ADC) (FIG. 156)

The ADC is a 16-bit binary adder consisting of two parts Sum stage (upper portion of FIG. 156) and Carry stage (lower portion of FIG. 156). In these drawings, the blocks labeled NA are NAND gates, the blocks labeled A are AND gates, the blocks labeled EOR are Exclusive OR gates, and the blocks labeled NOR are NOR gates.

AR.L and AR.R. The result (ADC output) can be placed on IOB.R (IOB.B16–B31). The ADC stages are therefore numbered from 16 through 31. The ADC output also feeds IOC for addressing PS* and PC*.

The carry stages of ADC generate C.B(N+16), where N = 0 – 15, for all odd bit stages and generate $\overline{\text{C.B(N+16)}}$ for all even bit stages. Note that the odd carry stages use the inverted incoming carry and generate outgoing carry. The even carry stages use incoming carry and generate the inverted outgoing carry. Therefore, one gate delay is required for carry propagation per stage. The total carry propagation is 16 stage delays. The logic expressions for the sum stages and the carry stages are as follows:

Sum Stages (N = 0 – 15)

$\text{ADC.B (N+16)} = \text{AR.B(N)} \oplus \text{AR.B(N+16)} \oplus \text{C.B(N+16+1)}$ for "odd" bit $\text{ADC.B(N+16)} = \text{AR.B(N)} \oplus \overline{\text{AR.B(N+16)}} \oplus \overline{\text{C.B(N+16+1)}}$ for "even" bit stages Carry Stages $\text{C.B(N+16)} = \text{AR.B(N)·AR.B(N+16)} \vee \text{C.B(N+16+1)·[AR.B(N)} \vee \text{AR.B(N+16)]}$ $\overline{\text{C.B(N+16)}} = \overline{\text{AR.B(N)}}\cdot\overline{\text{AR.B(N+16)}} \vee \overline{\text{C.B(N+16+1)}}\cdot[\overline{\text{AR.B(N)}} \vee \overline{\text{AR.B(N+16)}}]$ $C_{32} = 0$ Place Levels:

ADCPL: Place (onto IOB.R) Level

Logic Comparator Circuit (LCC) (FIGS. 157, 158)

The LCC consists of 32 separate circuits divided into two halves: LCC.L (LCC.B00–B15) and LCC.R (LCC.B16–B31). The first 16 circuits are as shown in FIG. 157, and the second 16 are as shown in FIG. 158. The input to each circuit of LCC is fed by corresponding bits of AR and $\overline{\text{DR}}$. There are two control levels fed by PCC: LCCACL and LCCNCL, each driving all 32 circuits.

There are two types of output: LCC.B00–B31 which can be placed on IOB, and two comparator levels which are CMPLL (Comparator Left Level) and CMPRL (Comparator Right Level).

The control levels are:

LCCACL AND Control Level

LCCNCL NOR Control Level

LCCPL.L Place (LCC.B00–B15) onto IOB.L Level

LCCPL.R Place (LCC.B16–B31) onto IOB.R Level

Logic Functions

With the aid of control levels LCCACL and LCCNCL from PCC, the LCC outputs produce AND, NOR, or EQU functions between data in AR and DR. EQU is the logical Identity function. Note that LCC output for each bit is:

N = 0 – 15

LCC.B(N) = AR.B(N)·DR.B(N)·LCCACL v AR.B(N)·DR.B(N)·LCCNCL

LCC.B(N+16) = AR.B(N+16)·DR.B(N+16)·LCCACL v AR.B(N+16)·DR.B(N+16)·LCCNCL

Therefore:

a. when LCCACL = 1
   LCCNCL = 0
   LCC.B(N) = AR.B(N)·DR.B(N)
   LCC.B(N+16) = AR.B(N+16)·DR.B(N+16)
   The LCC performs AND function between AR and DR.

b. when LCCACL = 0
   LCCNCL = 1
   $LCC.B(N) = \overline{AR.B(N)}\cdot\overline{DR.B(N)} = \overline{AR.B(N) \vee DR.B(N)}$
   $LCC.B(N+16) = \overline{AR.B(N+16)}\cdot\overline{DR.B(N+16)} = \overline{AR.B(N+16)} \vee \overline{DR.B(N+16)}$
   The LCC performs NOR function.

c. when LCCACL = 1
   LCCNCL = 1
   $LCC.B(N) = AR.B(N)\cdot DR.B(N) \vee \overline{AR.B(N)}\cdot\overline{DR.B(N)}$
   $LCC.B(N+16) = AR.B(N+16)\cdot DR.B(N+16) \vee \overline{AR.B(N+16)}\cdot\overline{DR.B(N+16)}$ The LCC performs EQU (equivalence) function. Note that other logic functions in the instruction set are implemented by LCC in conjunction with BTC operations.

Comparator Functions

The control levels and the logic expression are:

LCCACL = 1

LCCNCL = 1

$$CMPLL = \pi_{N=0}^{N=15} LCC.B(N) = \pi_{N=0}^{N=15} [AR.B(N) \odot DR.B(N)]$$

$$CMPRL = \pi_{N=0}^{N=15} LCC.B(N+16) = \pi_{N=0}^{N=15} [AR.B(N+16) \odot DR.B(N+16)]$$

It follows that CMPLL=1 on match of data between AR.L and DR.L and that CMPRL=1 on match of data between AR.R and DR.R. The outputs CMPLL and CMPRL are fed to PCC and are used to implement the comparison function in the conditional transfer instructions. In addition, the output $\overline{CMPLL}$ is fed to MMC to verify match on address echo.

Internal Bus System and Bus Transfer Circuit (see FIGS. 130, 131, 143, 144, 146 and 147)

Referring to FIGS. 130, 131, the Internal Bus System is a highway through which the data contained in one register can be transferred to another via Bus Transfer Circuit (BTC) 603. It includes the Internal Input Bus 604 (IIB) from which registers in DPC accept data, and Internal Output Bus 603 (IOB) onto which registers in DPC and IOC place data. MDR (MAC Date Register) and PUR (Peripheral Unit Register in IOC 24) also place data onto IIB. All gating controls are provided by PCC.

Both IIB and IOB consist of 32 wires permitting parallel transfers of data up to 32 bits. Both IIB and IOB are split into two 16-bit halves of IIB.1, IIB.R, IOB.L and IOB.R. Bits 00 through 15 are associated with IIB.L and IOB.L. The remaining bits 16 through 31 are associated with IIB.R and IOB.R This split bus system permits data manipulation on both 16-bit half words and 32-bit full words.

From a hardware standpoint, notice that IOB and all gates that place data on this bus are physically a part of BTC (see dashed lines 640, 641 of FIG. 131). For this reason, all the "place" gates and "place" controls that were mentioned in previous sections did not show up on the corresponding circuit drawings. There are shown in BTC drawings (FIGS. 143, 144).

Input/Output of Internal Bus System (FIG. 131)

All the circuits which communicate with Internal Bus System are shown in FIG. 131 and listed as follows:

| | Accept Data From IIB | Register (Circuits) Date (bits) | Place Date Onto IOB |
|---|---|---|---|
| Registers or Circuits in DPC | Yes | General Register 1 (B00–B31) | Yes |
| | Yes | General Register 2 (B00–B31) | Yes |
| | Yes | General Register 3 (B00–B31) | Yes |
| | Yes | General Register 4 (B00–B31) | Yes |
| | Yes | General Register 5 (B00–B31) | Yes |
| | Yes | General Register 6 (B00–B31) | Yes |
| | Yes | General Register 7 (B00–B31) | Yes |
| | Yes | Instruction Address Register (B15–B31) | No |
| | No | Add-One Circuit | No |
| | No | Add-One Register (B15–B31) | Yes |
| | Yes | Data Register (B00–B31) | Yes |
| | No | Arithmetic Register (B00–B31) | Yes |
| | No | Logic Comparator Circuit (B00–B31) | Yes |
| | No | Add Circuit (B16–B31) | Yes |
| | Yes | Selection Register (B11–B15) | No |
| | Yes | Arithmetic Register Input Circuit | No |
| | Yes | *Special Purpose Register (B00–B31) | Yes |

–Continued

| | Accept Data From IIB | Register (Circuits) Date (bits) | Place Date Onto IOB |
|---|---|---|---|
| External Registers or Circuits | From ICC | INTAB (B17, B25–B31) | Yes |
| | From MAC | MDR (B00–B31) | Places data onto IIB |
| | From IOC | ISR (B00– B31) | Yes |
| | | PSR (B00–B31) | Yes |
| | | PUR (B00–B31) | Places data onto IIB |

* SPR accepts from IIB B01–B31. SPR.B00 accepts C B16 from ADC. SPR.B01 is not placed on IOB.B01.

Bus Transfer Circuit (BTC) (FIGS. 143, 144, 146 and 147)

The data originating from an external circuit to be brought into DPC and the data originating from a register to effect a transfer to another register within DPC, all require a set of corresponding Place levels and Bus Transfer control levels except MDR (of MAC) and PUR (of IOC) require only Place levels.

The left and right halves of the BTC are shown respectively in FIGS. 143 and 144, and they are similar so that only the left half need be explained for an understanding of the invention. A set of 16 NAND gates, represented by the block 650, receive respectively the outputs of the left half of General Register GR.1 — these are GR.1B00–B15. All of these gates are enabled by GR.1PL.L, as shown. Similarly the outputs of the left half of the remaining General Registers GR2–GR7 and the outputs of the left half of SPR are similarly fed to a set of 16 inverters 651 followed by a second set of 16 inverters 652 and a set of two-input NAND gates 653. The outputs of the AOR, DR, LCC, AR, ISR and PSR are similarly coupled to gate 653. The outputs of this set of gates then fan out as shown for performing the various required functions, as discussed presently. Certain of these functions are performed by direct wiring, such as shifting right (NAND gates 655), shifting left (656), cross bus transfer (657), complementary dross bus transfer (658), and so on, as will become clear from the disclosure which follows. The outputs of NAND gates 653 are fed through NAND gates 670 which require a BTL level for transferring to the IOB, as shown.

Depending on the states of control levels BTL, XBTL, CBTL, XCBTL, LSL, and RSL, the BTC interconnects IOB and IIB in seven different ways which may be grouped into three types as follows:

Type I

Data transfer from IOB to IIB without displacing the bit positions of data.

a. Bus Transfer gates data on IOB to IIB.

N = 0 – 15

IOB.B(N) – IIB.B(N)

IOB.B(N+16) – IIB.B(N+16)

This takes place when BTL = 1, all other control levels = 0.

b. Complement Bus Transfer gates the 1's complement of data on IOB to IIB.

$\overline{\text{IOB.B(N)}}$ — IIB.B(N)

$\overline{\text{IOB.B(N+16)}}$ — IIB.B(N+16)  } N = 0 – 15

This happens when CBTL = 1, all other control levels = 0.

Type II

The 16-bit data interchange between the left-half and the right-half of the Internal Bus System.

a. Cross Bus Transfer gates data on IOB.B(N) of the left half to IIB.B(N+16) of the right half. Similarly, data on IOB.B(N+16) of the right half is gated to IIB.B(N) of the left half.

IOB.B(N) → IIB.B(N+16)  
IOB.B(N+16) → IIB.B(N)  N = 0 → 15

This happens when XBTL = 1, all other control levels = 0.

b. Cross Complement Bus Transfer - - same as Cross Bus Transfer except 1's complement of data on each IOB is gated to IIB's.

$\overline{\text{IOB.B(N)}}$ → IIB.B(N+16)  
$\overline{\text{IOB.B(N+16)}}$ → IIB.B(N)  N = 0 → 15

This happens when XCBTL = 1, all other control levels = 0.

Type III

Shifting of data on IOB one bit position at a time, either to the left or to the right, and gate the data to IIB. The maximum of 4 bit positions can be shifted in one instruction cycle. There are three shift and rotate options.

a. Shift Operations For a Full 32-bit Word

A 32-bit word is shifted one bit at a time in either direction. The bit(s) vacated as a result of the shift operation is replaced by a zero. The bit overflowed is lost.

Left Shift Operations (LSL = 1, CSCL = 1) all other control levels = 0.

N = 0 – 15

IOB.B(N) – IIB.B(N–1)

IOB.B(00) is lost and not used.

IOB.B(N+16) – IIB.B(N+16–1)

0 - IIB.B(31)

Right Shift Operations (RSL = 1, CSCL = 1) all other control levels = 0.

N = 0 – 15

IOB.B(N) – IIB.B(N+1)

0 – IIB.B(00)

IOB.B(N+16) – IIB.B(N+16+1)

IOB.B(31) is lost and not used.

b. Rotate Operations For a Full 32-bit Word

The rotate operations is identical to shift operation given in *a* above, except for each shift operation the bit overflowed replaces the bit vacated by the shift operation.

Rotate Left Operation (LSL = 1, CSCL = 1, ESCL = 1)
all other control levels = 0 (See FIGS. 146 and 147 for circuit details for each Bit.)
N = 0 → 15
IOB.B(N) → IIB.B(N−1)
when N = 0
IOB.B(00) → IIB.B(31)
IOB.B(N+16) → IIB.B(N+16−1)

Rotate Right Operation (RSL = 1, CSCL = 1, ESCL = 1)
all other control levels = 0
N = 0 → 15
IOB.B(N) → IIB.B(N+1)
IOB.B(N+16) → IIB.B(N·16+1)
when N+16 = 31, IOB.B(31) → IIB.B(00)

c. Shift Operations For Two Half (16-bit) Words

To shift a half (16-bit) word, the full 32-bit word of which the half word is a part is shifted. In each half, the bit(s) vacated is placed by a zero and the bit(s) overflowed, as a result of the shift operation, is lost and not used.

Shift Left Operation (LSL = 1)
all other control levels = 0
N = 0 → 15
IOB.B(N) → IIB.B(N−1)
O → IIB.B(15)
when N = 0, IOB.B(00) is lost and not used.
IOB.B(N+16) → IIB.B(N+16−1)
O → IIB.B(31)
when N+16 = 16, IOB.B(16) is lost and not used.

Shift Right Operation (RSL = 1)
all other control levels = 0.
N = 0 – 15
O – IIB.B(00)
IOB.B(N) – IIB.B(N+1)
when N = 15, IOB.B(15) is lost and not used.
O – IIB.B(16)
IOB.B(N+16) – IIB.B(N+16+1)
when N+16 = 31, IOB.B(31) is lost and not used.

Additional BTC Operations a. To place all 1's onto IIB
With no bus control activated including MDRPL = 0 and PURPL = 0 at BTC, the IIB normally rests at logic 1 state.

b. To place all 0's onto IIB
With no information gated to BTC and BTL = 1, all 0's are available on IIB.

Summary of BTC Control Levels

| Left Half | Right Half | |
|---|---|---|
| BTL.L | BTL.R | Bus Transfer Level |
| CBTL.L | CBTL.R | Complement Bus Transfer Level |
| XBTL.L | XBTL.R | Cross Bus Transfer Level |
| XCBTL.L | XCBTL.R | Cross Complement Bus Transfer Level |
| RSL.L | RSL.R | Right Shift Level |
| LSL.L | LSL.R | Left Shift Level |

In connection with Shift and Rotate operation, the following additional control levels are required.

CSCL Center Shift Circuit Level
When CSCL = 1, it is possible to transfer IOB.B15 – IIB.B16 and IOB.B16 – IIB.B15.

ESCL End Shift Circuit Level
When ESCL = 1, it is possible to transfer IOB.B00 – IIB.B31 and IOB.B31 – IIB.B00.

Internal Bus System and Match Registers (MR) of MMC

The MR0 accepts data on IOB during the "even" timing intervals, and the MR1 accepts data on IIB during the "odd" timing intervals. The data so accepted by MR0 and MR1 are used for inter-CP Match.

Inputs to and Outputs from DPC

Control Commands from PCC

| LEFT HALF | RIGHT HALF | CONTROL | DESCRIPTION |
|---|---|---|---|
| GR1PL.L | GR1PL.R | | General Register 1 Place Level |
| GR2PL.L | GR2PL.R | | General Register 2 Place Level |
| GR3PL.L | GR3PL.R | | General Register 3 Place Level |
| GR4PL.L | GR4PL.R | | General Register 4 Place Level |
| GR5PL.L | GR5PL.R | | General Register 5 Place Level |
| GR6PL.L | GR6PL.R | | General Register 6 Place Level |
| GR7PL.L | GR7PL.R | | General Register 7 Place Level |
| DRPL.L | DRPL.R | | Data Register Place Level |
| ARPL.L | ARPL.R | | Arithmetic Register Place Level |
| | | ARBSL | Arithmetic Register Bit Selection Level |
| | ADOPL.R | | Add Circuit Place Level |
| AORPL.L | AORPL.R | | Add-One Register Place Level |
| SPRPL.L | SPRPL.R | | Special Purpose Register Place Level |
| LCCPL.L | LCCPL.R | | Logic Comparator Circuit Place Level |
| | INTAPL.R | | Interrupt Address Place Level |
| ISRPL.L | ISRPL.R | | IS Buffer Register Place Level |
| PSRPL.L | PSRPL.R | | PS Buffer Register Place Level |
| PURPL.L | PURPL.R | | PU Buffer Register Place Level |
| MDRPL.L | MDRPL.R | | MAC Data Register Place Level |
| BTL.L | BTL.R | | Bus Transfer Level |
| CBTL.L | CBTL.R | | Complement Bus Transfer Level |
| XBTL.L | XBTL.R | | Cross Bus Transfer Level |
| XCBTL.L | XCBTL.R | | Cross Complement Bus Transfer Level |
| RSL.L | RSL.R | | Right Shift Level |
| LSL.L | LSL.R | | Left Shift Level |
| | | ESCL | End Shift Circuit Level |
| | | CSCL | Center Shift Circuit Level |

Inputs to and Outputs from DPC – Continued

Control Commands from PCC

| LEFT HALF | RIGHT HALF | CONTROL | DESCRIPTION |
|---|---|---|---|
| –GR1AL.L | –GR1AL.R | | General Register 1 Accept Level |
| –GR2AL.L | –GR2AL.R | | General Register 2 Accept Level |
| –GR3AL.L | –GR3AL.R | | General Register 3 Accept Level |
| –GR4AL.L | –GR4AL.R | | General Register 4 Accept Level |
| –GR5AL.L | –GR5AL.R | | General Register 5 Accept Level |
| –GR6AL.L | –GR6AL.R | | General Register 6 Accept Level |
| –GR7AL.L | –GR7AL.R | | General Register 7 Accept Level |
| –DRAL.L | –DRAL.R | | Data Register Accept Level |
| –ARAL.L | –ARAL.R | | Arithmetic Register Accept Level |
| AORAL.L | –AORAL.R | | Add-One Register Accept Level |
| | –BIARAL | | IAR Accept (from IIB) Level (16 Bits) |
| | –CIARAL | | IAR Accept (from AOR) Level (16 Bits) |
| IIARAL | | | IAR Accept (from ICR) Level (B15 only) |
| AIARAL | | | IAR Accept (from AOR) Level (B15 only) |
| –SPRAL.L | –SPRAL.R | | Special Purpose Register Accept Level |
| –SRAL | | | Selection Register (B11-B15) Accept Level |
| | | –LCCACL | LCC AND Control |
| | | –LCCNCL | LCC NOR Control |

Date and Timing Level Input to DPC

| SOURCE | MNEMONIC | NUMBER OF WIRES | LOAD REQUIRE-MENT | DESCRIPTION |
|---|---|---|---|---|
| MAC | –MDR.B00–B31 | (32) | 2 Ea. | MAC sensing |
| IOC (IFC) | ISR.B00–B31 | (32) | 1 Ea. | Instruction or Data from Instruction store |
| | PSR.B00–B31 | (32) | 1 Ea. | Data from Process Store. |
| | –PUR.B00–B31 | (32) | 1 Ea. | Data from Peripheral Control. |
| ICC | –OPTL1 | ( 1) | 1 | Option Selection 1. |
| | –OPTL2 | ( 1) | 1 | Option Selection 2. |
| | –OPTL3 | ( 1) | 1 | Option Selection 3. |
| | INTF1 | ( 1) | 1 | Interrupt FF1 (lev. 1 int.) |
| | –LVL2 | ( 1) | 1 | Interrupt Level 2. |
| | –LVL3 | ( 1) | 1 | Interrupt Level 3. |
| | –LVL4 | ( 1) | 1 | Interrupt Level 4. |
| | –LVL5 | ( 1) | 1 | Interrupt Level 5. |
| | –ICCSL | ( 1) | 1 | Interrupt Sequence Level. |
| PCC | RTCL5 | ( 1) | 1 | Relative Code 5 Level. |
| | RTCL6 | ( 1) | 1 | Relative Code 6 Level. |
| | –ICR.B05[A] | ( 1) | 1 | |
| | ICR.B05[A] | ( 1) | 1 | |
| | SML | ( 1) | 1 | Special Mode Level } PU & PS |
| | CML | ( 1) | 1 | Control Mode Level } PU & PS |
| | NML | ( 1) | 1 | Normal Mode Level } PU & PS |
| | ISRL | ( 1) | 1 | IS Read Level. |
| | ISWL | ( 1) | 1 | IS Write. |
| | ISSML | ( 1) | 1 | IS Special Mode Level. |
| | ISCML | ( 1) | 1 | IS Control Mode Level. |
| | ISNML | ( 1) | 1 | IS Normal Mode Level. |
| | DCCAF | ( 1) | 1 | Dual Cycle Control A FF. |
| TLG | –T1AL | ( 1) | 4 | Accept Control for RAOR. |
| | –T3AL | ( 1) | 8 | Set Control for RTT Hardware Counter. |
| | T7AL | ( 1) | 2 | Accept Control for ADC Carry Overflow. |

Total Number of Wires: 253

DPC Output

| USER | MNEMONIC | NUMBER OF WIRES | LOAD REQUIRE-MENT | DESCRIPTION |
|---|---|---|---|---|
| IOC (IFC) | IAR.B15–B31 | (17) | 2 Ea. | Address Bus for IS0 and IS1. |
| | ADC.B16–B31 | (16) | 4 Ea. | Address Bus for PS0, PS1, PC0, PC1. |
| | DR.B00–B31 | (32) | 4 Ea. | Data Bus for IP0, IP1, PC0, PC1. |
| MAC (IFC) | –AR.B00–B31 | (32) | 1 Ea. | Data for writing into MAC. |

DPC Output—Continued

| USER | MNEMONIC | NUMBER OF WIRES | LOAD REQUIRE-MENT | DESCRIPTION |
|---|---|---|---|---|
| $\overline{\text{MMC}}$ | $\overline{\text{IOB.B00–B31}}$ | (32) | 1 Ea. | Data for $\overline{\text{MR0}}$ (Match Register 0). |
| | $\overline{\text{IIB.B00–B31}}$ | (32) | 1 Ea. | Data for MR1 (Match Register 1). |
| | $\overline{\text{IAR.B15}}$ | ( 1) | 2 | IS Address Parity Generation |
| | –IAR.B16–B31 | (16) | 2 &4 | B16–B23 (2 loads); B27–B31 (4 loads). |
| | –DR.B00–B31 | (32) | 2 Ea. | Data Parity Generation |
| | –CMPLL | ( 1) | 3 | "Echo" check. |
| PCC | CMPRL | ( 1) | 2 | Logic Comparator Right Level. |
| | CMPLL | ( 1) | 2 | Logic Comparator Left Level. |
| TMC | SPR.B01 | ( 1) | 2 | PUNCH-IN Operation |
| | –SPR.B01 | ( 1) | 1 | |
| | RTTEL | ( 1) | 1 | Input to RTEIF from RAOC. |
| RCC | –RTTEL | ( 1) | 1 | Input to RCC from RAOC. |

Total Number of Wires: 217

Examples

Examples illustrate how the DPC hardware is used to perform some typical operations necessary to execute instructions. The example will illustrate:

a. Effective Address (mod($2^{16}$) or mod ($2^{17}$))
b. Arithmetic operations — add, subtract, and decrement.
c. Logic operations — AND, ORR, EOR, and ISP.
d. Comparator functions — Address Echo.
e. Single bit data manipulation — set, reset, and complement.
f. Shift or Rotate operations.

Effective Address (EA)

ISR.R = Z
(Z + GRY.H)mod($2^{16}$) = EA
Z → AR.R }
GRY.H → AR.L } →ADC = EA

Arithmetic Operations a. Add Operation — (ADD Z, YH, XG) =(Z+YH)+XG→XG
Z → AR.R }
GRY.H → AR.L } →ADC = EA} mod($2^{16}$)
GRX.G → DR.L
ADC → DR.R
DR = → AR →ADC = EA + XG
ADC → GRX.G b. Subtract Operation (SUB Z, YH, XG)=XG−(Z+YH)→XG
Z = ISR.R
Z → AR.R }
$\overline{\text{GRY.H}}$ → AR.L } → ADC = EA} mod($2^{16}$)
$\overline{\text{GRX.G}}$ → DR.L
ADC → DR.R
DR.L → AR.R }
DR.R → AR.L } → ADC = $\overline{\text{XG} - \text{EA}}$
$\overline{\text{ADC}}$ → GRX.G c. Decrement Operation (To decrement GRY.H)
ALL 1's → AR.R }
GRY.H → AR.L } →ADC = GRY.H − 1
ADC → GRY.H Logic Operations a. AND Operation (AND, Y, X) = (GRY)·(GRX) → (GRX)
GRY → AR }
GRX → DR } → LCC = (GRY)·(GRX)
(LCCACL=1)
LCC →GRX (BTL=1)

b. ORR Operation (ORR, Y, X) = (GRY)v(GRX) → (GRX)
GRY → AR }
$\overline{\text{GRX}}$ → DR } → LCC = $\overline{\text{(GRY)v(GRX)}}$
(LCCNCL = 1)
$\overline{\text{LCC}}$ → GRX (CBTL=1)

c. EOR Operation (EOR, Y, X) = (GRY) (GRX) → (GRX)
GRY → AR }
GRX → DR } → LCC = $\overline{\text{(GRY)}\oplus\text{(GRX)}}$
(LCCACL = 1)
(LCCNCL = 1)
$\overline{\text{LCC}}$ → GRX (CBTL=1)

d. ISP Operation (ISP, Y, X) = $\overline{\text{(GRY)}}$·(GRX) → (GRX)
$\overline{\text{GRY}}$ → AR }
GRX → DR } → LCC = $\overline{\text{(GRY)}}$·(GRX)
(LCCACL = 1)
LCC → GRX Comparator Operations a. Compare (GRY) and (GRX) bit by bit (TEQ Z, Y, X)
If (GRY) = (GRX) transfer to Z.
If (GRY) ≠ (GRX) go to* + 1. (*Present Address)
GRY → AR }
GRX → DR } →LCC
(LCCACL = 1)
(LCCNCL = 1)
If { GRY.R = GRX.R, CMPRL = 1 ; GRY.L = GRX.L, CMPLL = 1 } to PCC b. Address Echo for Write Instructions
1. The Lower order of 16-bit EA transmitted to external complexes (IS*, PS*, & PC*) is stored in DR.L.
2. Lower order 16-bit address returned from external complexes are accepted in AR.L
3. Two 16-bit data are compared in LCC.L
4. If AR.L = DR.L, CMPLL = 1 which is fed to both PCC and MMC.

Single Bit Data Operations a. To reset a single bit (SBC Z, YH, X)

```
Z + YH = EA.        EA] mod 32 specifies the bit in
                    GRX to be reset to 0.
Z      →   AR.R  }
                 }  ADC = EA] mod 32
GRY.H  →   AR.L  }
ADC    →   SR (with ARBSL = 1)
GRX    →   AR      (the selected bit = 0 in AR with the
                    remaining bits unaltered when
                    ARBSL = 1).
AR     →   GRX
```

b. To set a single bit (SBN Z, YH, X)

```
Z + YH = EA         EA] mod 32 specifies the bit in
                    GRX to be set to 1.
Z      →   AR.R  }
                 }→ ADC = EA] mod 32
GRY.H  →   AR.L  }
ADC    →   SR (with ARBSL = 1)
GRX    →   AR      (the selected bit = 0 in AR with the
                    remaining bits unaltered when
                    ARBSL = 1).
AR     →   GRX
```

c. To complement a single bit (SBC Z, YH, X)

```
X + YH = EA         EA] mod 32 specifies the bit in
                    GRX to be complemented.
Z      →   AR.R  }
                 }→ ADC = EA mod 32
GRY.H  →   AR.L  }
ADC    →   SR (with ARBSL = 1)
All 1's → AR                                  }
(All 1's except the selected bit              }     LCC=(AR)
                                              }→ ⊙DR
= 0 is accepted into AR)                      }   (LCCACL=1)
GRX → DR                                      }   (LCCNCL=1)
LCC → GRX
```

Shift or Rotate Operation

The operation requires GRY to be shifted (or rotated) $Z_{mod\ 4}$ (1 → 4) positions and place into GRX.

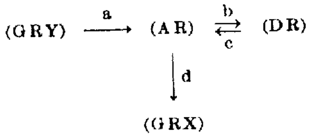

The example using left shift control is given as follows:

| Control No. of Shifts Required | Bus Data For a | b | c | d |
|---|---|---|---|---|
| 1 | LSL=1 | BTL=1 | BTL=1 | BTL=1 |
| 2 | LSL=1 | LSL=1 | BTL=1 | BTL=1 |
| 3 | LSL=1 | LSL=1 | LSL=1 | BTL=1 |
| 4 | LSL=1 | LSL=1 | LSL=1 | LSL=1 |

For Full 32-bit Word Shift: CSCL = 1; ESCL = 0

Full 32-bit Word Rotate: CSCL = 1; ESCL = 1

For Half 16-bit Word Shift: CSCL = 0; ESCL = 0

(must specify which half of GRX.G is to accept the shifted data).

III. E. INPUT/OUTPUT CIRCUIT (IOC)

The Control and Maintenance Complex of the TSPS machine contains four major complexes; Central Processor (CP*), Instruction Store (IS*), Process Store (PS*), and Peripheral Unit (PU*). The CP* requires access to the other complexes; IS* and PS* for instructions and data storage and PU* to control the many functions required to process calls. To accomplish this access the CP* is connected to the IS*, PS*, and PU* via a duplicated system of AC cable drivers, receivers, and buses.

Function of the IOC

The primary function of the Input/Output Circuit (see 24 of FIG. 1) (IOC) is to provide the interface in the CP* through which the CP* gains access to the external bus system and complexes.

The basic functions of the interface are: 1. To identify the complex to use as input or source; 2. To identify the complex to which the source is to transmit; and 3. To determine the timing for transmission. This timing for transmission from source is defined and controlled by the CP*, and the timing for reception is specified by the CP but controlled by the transmitting complex. The functions to be performed are identified by the IOC from the control signal inputs it receives.

Since the sending complex controls the data reception in the IOC, which is due to the IS*, PS* and PU* complexes being asynchronous with respect to the CP*, the secondary function of the IOC is to provide a buffer register for return data from each complex. The inputs and outputs of the IOC are shown in FIG. 6 which also schematically shows the routing of data and the buffer registers: Instruction Store Buffer Register 760, the Process Store Buffer Register 785, and the Peripheral Unit Buffer Register 780, also respectively denoted ISR, PSR and PUR. More is said of these registers within.

Communication channels and subsystems are identified using the following nomenclature and format. The format consists of up to eight alpha numeric characters in the format below and with the following information:

(XXX.XX.XXX)

The three character prefix (first three characters) defines the complex and the copies with the exception of the PU*. Characters one and two identify the subsystem CP, IS, PS, PU, IP (signifies Instruction Store and Process Store subsystems), or the Peripheral Control (PC) of the PU complex.

- * — Complex, the collection of all units defined by the subsystem or PC identifier.
- 1 — Copy 1 of the complex.
- 0 — Copy 0 of the complex.

The component characters (characters four and five) specify the bus:

- BS — The Bus System.
- AB — The Address Bus.
- DB — The Data Bus.
- RB — The Return Bus.

The last three suffix bits refer to one of *n* bits on a bus. The notation is of the following form:

.BXX — The bit specified, where XX could range from 00 to 33.

PU* Communications

The PU complex consists of eight units numbered PU0, PU1, ..., PU7. Associated with each PU unit is a duplicated Peripheral Control, Copy 0 (PC0) and Copy 1 (PC1). CP*-PU* bus communications are performed via the PC* and therefore, the corresponding PU* bus system is identified with respect to the PC*.

Example: PC*.BS — Peripheral Control Copy 0 and/or 1), Bus System.

Organization of the IOC (see FIGS. 159 and 160 which are functional block diagrams)

In general, the IOC 24 is organized into three sections. They are: CP*-IS* communications; CP*-PS* communications; CP*-PU* communications. Each section contains: AC cable drivers and receivers required for bus system communications; buffer register, composed of set-reset flip-flops, for retaining data received from the bus system; and combinatorial logic circuitry for channeling the address and data words onto, or the data word from the appropriate bus(es) of the system.

FIG. 159 shows all the various inputs to the left of block 24, the Input 1 Output Circuit, and the outputs are on the right. The bus systems, FIG. 160, includes: (1) the IS* bus system which includes the IS* Address Bus 750, IS* Return Bus 751 and the IP* Data Bus 752 which is shared with the PS*; (2) the PS* Bus system which includes the IP* Data Bus 752, just mentioned, the PS* Address Bus 753, and the PS* Return Bus; and (3) the PC* Bus system which includes the PC* Address Bus 755, the PC* Return Bus 756 and the PC* Data Bus 757. It will be observed that whereas the PC* has a separate Data Bus, the IS* and PS* share one.

CP*-IS* Communications (see FIGS. 169–171 for word formats on the communication buses)

This section executes the channeling of:

a. The 23-bit IS address word onto one or both of the IS (0 or 1) Address Bus(es), bits 9 through 31 (IS*-.AB.B09–B31).
b. The 33-bit IS data word onto one or both of the IS & PS (0 or 1) Data Bus(es), bits 0 through 32 (IP*.DB.B00–B32).
c. The 34-bit IS data word from one or both of the IS (0 or 1) Return Bus(es), bits 0 through 33 (IS*.RB.B00–B33) into the Instruction Store Register (ISR).

Figure 161:
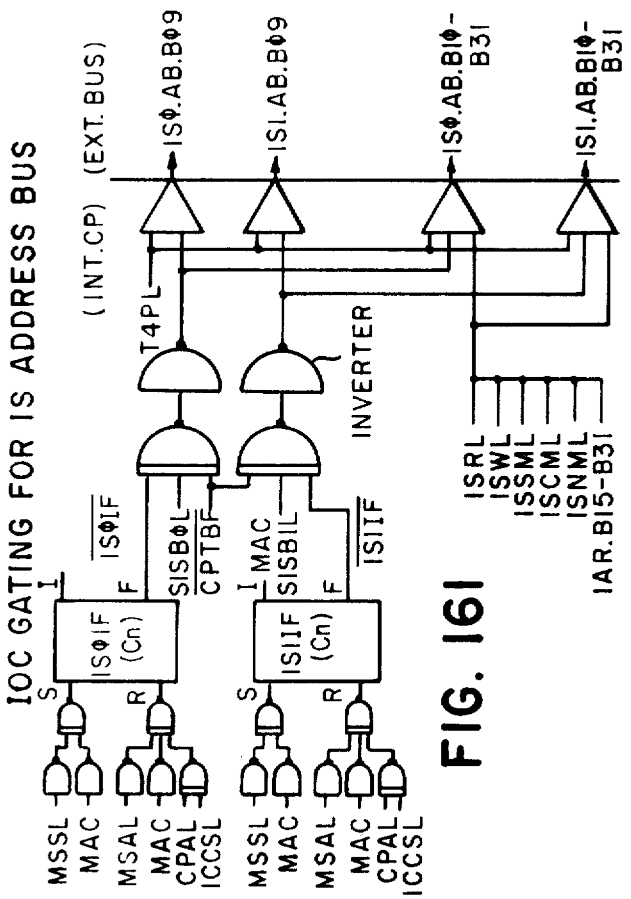

IS0IF and IS1IF Operation (see FIG. 161)

The Instruction Store 0 Inhibit Flip-Flop (IS0IF) and Instruction Store 1 Inhibit Flip-Flop (IS1IF) when set, provide individually controllable inhibits of IS0.AB and LS1.AB for diagnostics. These flip-flops can be sensed via MAC and can also be set or reset as follows:

| | |
|---|---|
| Active CP | |
| Set: | via MAC only. |
| Reset: | hardware interrupt occurrence. |
| : | after manual switch of CP's. |
| : | via MAC. |
| Standby CP | |
| Set: | via MAC. |
| : | after manual switch of CP's. |
| Reset: | via MAC only. |

Instruction Store Register (ISR) Operation

Figures 166, 167, 168:
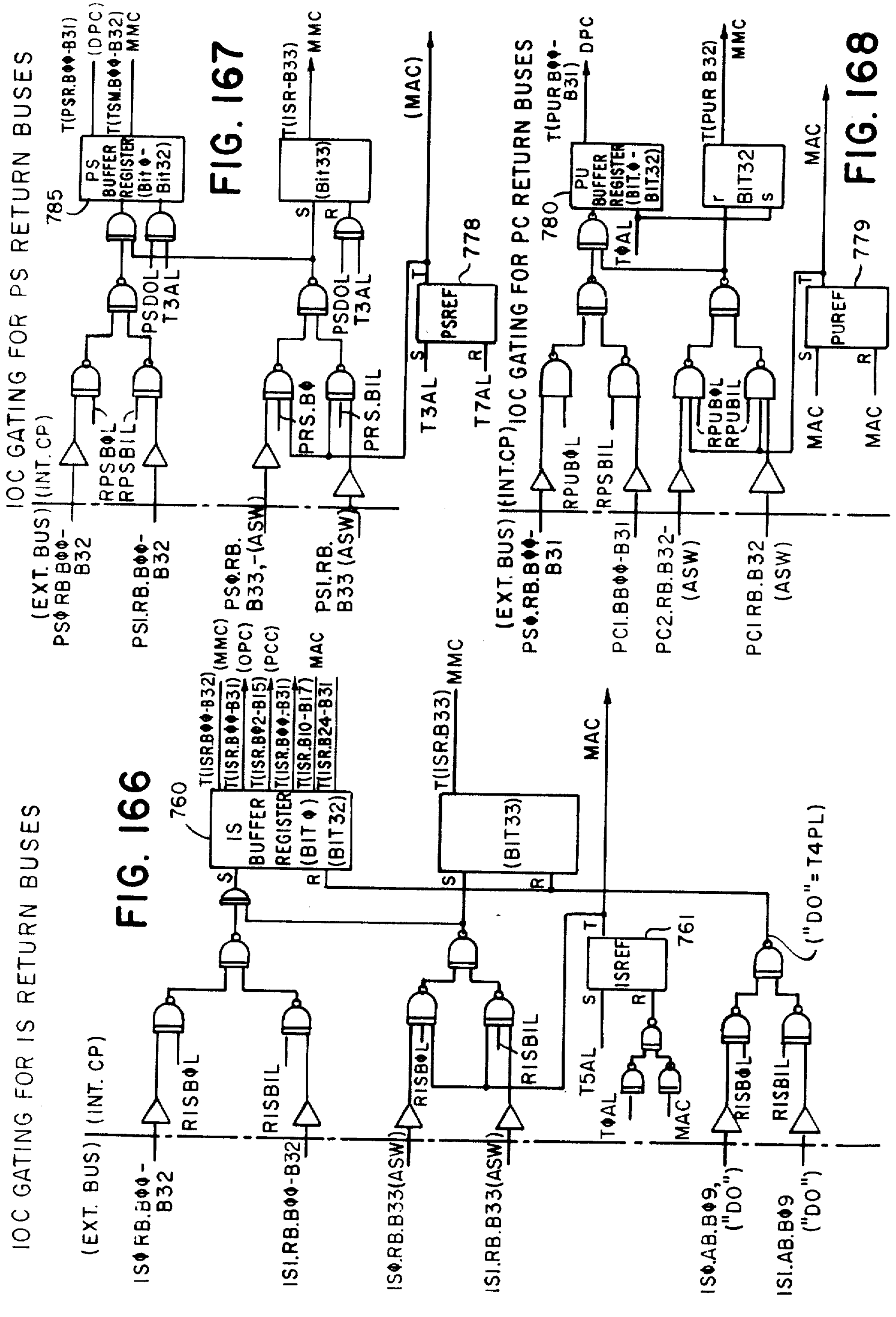

As shown in FIG. 166, the ISR 760 loads a received IS* unit word upon the All Seems Well level (IS*.RB.-B33) becoming true *and* provided the Instruction Store Register Enable Flip-Flop 761 (ISREF) is set. ISREF isolates the ISR from the IS*.RB between the start of T0AL and the start of T5AL.

The ISR must be reset prior to receiving an IS* unit word. The DO command generated by the active CP* is coupled from the IS*.AB.B09 and used for ISR reset in both CP's. This insures the ISR of the stopped standby CP* will never contain more than one IS* unit word so that when the standby CP* is started in sync with the active CP*, correct match operation or instruction execution can be expected.

ISREF Operation

The ISREF flip-flop 761 is primarily an ISR enable flip-flop which when set (by T5AL, the timing interval immediately following the transmission of the IS address word) permits the return data word from an IS* unit to be accepted into the ISR upon recognizing the "all seems well" level becoming true (all-seems-well must be received 100 ns before the end of T7PL). The in T0AL the ISREF is reset which inhibits the ISR from accepting erroneous IS*.RB information. (Noise occurring on the IS*.RB between T7PL and T5PL could have possibly altered the ISR contents).

The ISREF can be sensed and reset via MAC for diagnostic purposes, as shown.

CP*-PS* Communications (see FIG. 170 for word formats)

Figure 162:
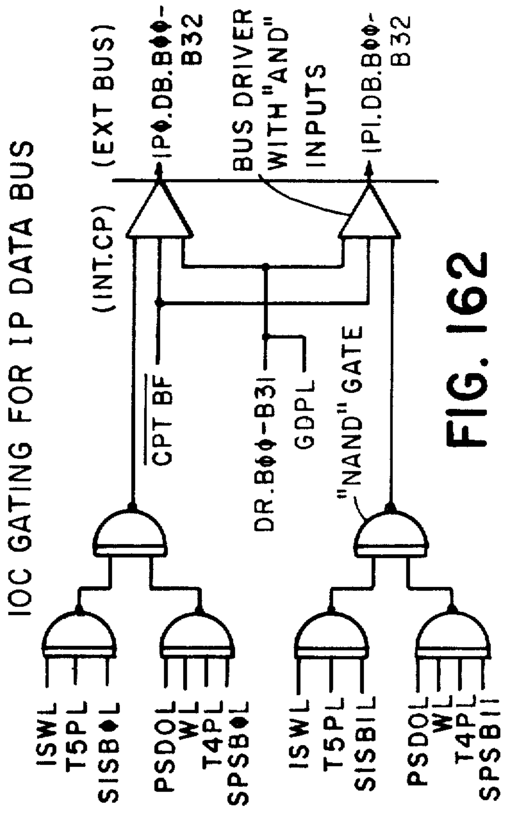
Figures 163, 164, 165:
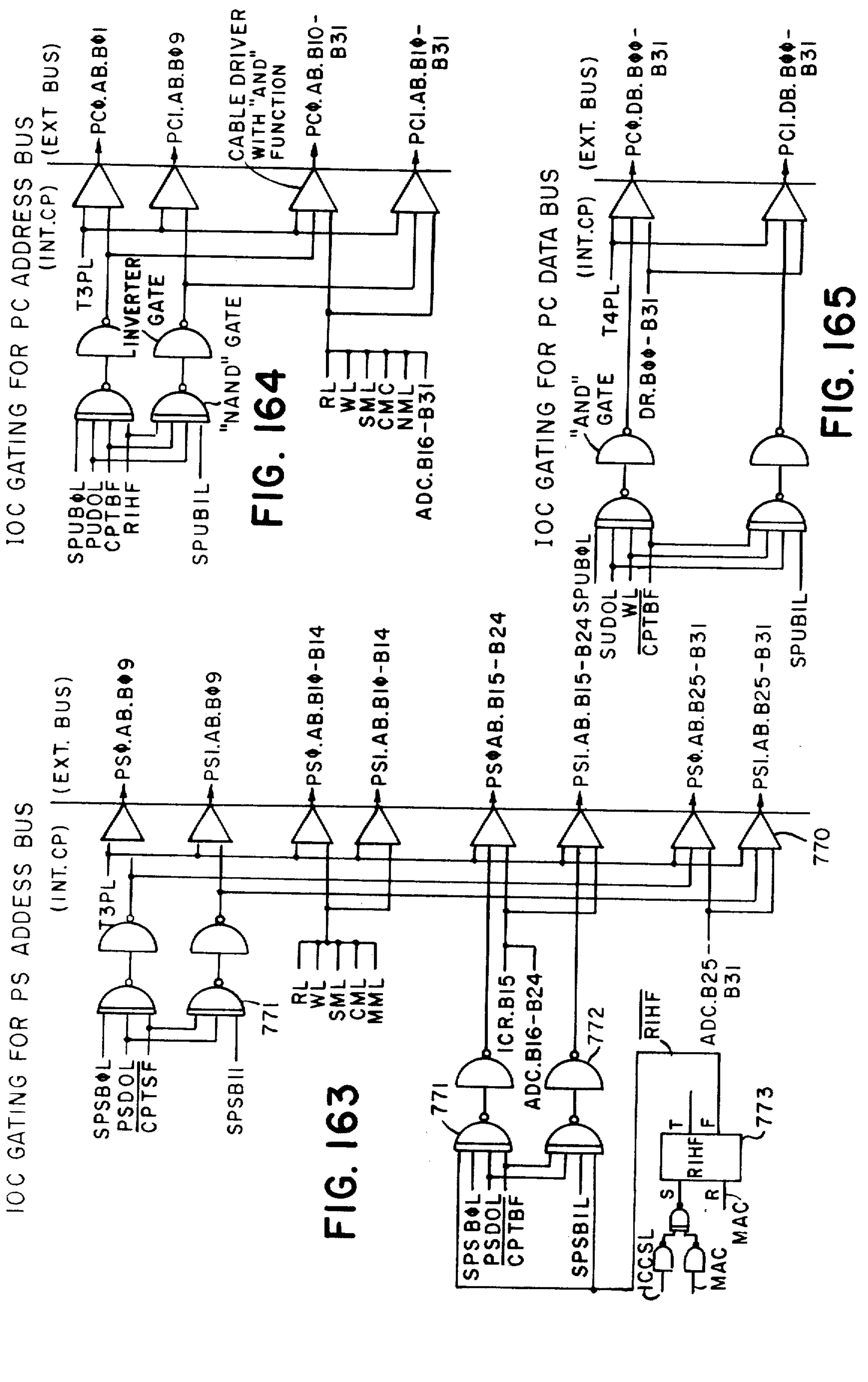

This section executes the channeling of:

a. The 23-bit PS* address word onto one or both of the PS (0 or 1) Address Bus(es), bits 9 through 31 (PS*.AB.B09–B31). FIG. 163 shows a logic element diagram for IOC gating for the PS* Address Bus where the blocks 770 are cable drivers, the symbols 771 and NAND gates, and the symbols 772 are inverters.
b. The 33-bit PS data word onto one or both of the IS & PS (0 or 1) Data Bus(es), bits 0 through 32 (IP*.DB.B00–B32). FIG. 162 shows the logic circuitry for this section.
c. The 34-bit PS* data word from one or both of the PS (0 or 1) Return Bus(es), bits 0 through 33 (PS*.RB.B00–B33) into the Process Store Register (PSR). FIG. 167 shows the logic circuitry for this section.

RIHF Operation (see FIG. 163)

The Recovery Inhibit Flip-Flop 773 (RIHF) when set by ICCSL (which indicates a hardware interrupt has occured and a fault recovery program is to be entered), inhibits PS operations beyond decimal address 127 and also inhibits all PC*.AB usage. This prevents the permutation of PS data before the recovery programs establish a sane system and also prevents erroneous commands from being sent to the PU*. The 128 locations which are not inhibited by RIHF are required for recovery program scratch pad operations.

The RIHF may also be set, reset and sensed via MAC for diagnostic purposes, as shown.

PSR Operation

The PSR (the Process Store Buffer Register 785 in FIG. 167) loads a received PS* unit word upon All Seems Well level (PS*.RB.B33) becoming true and provided the Process Store Register Enable Flip-Flop 778 (PSREF) is set. (PSREF isolates the PSR from the PS*.RB between the start of T7AL and the start of T3AL).

The PSR must be reset prior to receiving a PS* unit word. The coincidence of PSDOL and T3AL being true within each CP* causes PSR reset within respective CP's.

PSREF Operation

The PSREF flip-flop 778 in FIG. 167 performs the identical function the ISREF does except it is set in T3AL which enabled the PSR acceptance and is reset in T7AL which terminates acceptance from the PS*.RB. (all-seems-well must be received 100 ns before the end of T6PL).

The PSREF can only be sensed via MAC for diagnostic purposes.

CP*-PU* Communications (see FIG. 171 for word formats)

This section executes the channeling of:

a. The 23-bit PU* address word onto one or both of the PC (0 or 1) Address Bus(es), bits 9 through 31 (PC*.AB.B09–B31). FIG. 164 shows the logic circuitry.

b. The 32-bit PU* data word onto one or both of the PC (0 or 1) Data Bus(es), bits 0 through 31 (PC*.DB.B00–B31). FIG. 165 shows the logic circuitry.

c. The 33 bit PU* data word from one or both of the PC (0 or 1) Return Bus(es), bits 0 through 32 (PC*.RB.B00–B32) into the Peripheral Unit Register (PUR). FIG. 168 shows the logic circuitry.

PUR Operation

The Peripheral Unit Buffer Register 780 in FIG. 168 PUR loads a received PU* unit word upon the All Seems Well (ASW) level (PC*.RB.B32) becoming true and provided the Peripheral Unit Register Flip-Flop (PUREF) 779 in FIG. 168 is set.

The PUR must be reset prior to receiving each of the two return words which occur due to a PU* unit read or write instruction. The words received from the PU* are:

a. "Address echo" word received between timing intervals 3 and 7 of the PU* instruction. ("ASE" must be received 100 ns before the end of T6PL in this case.)

b. Data word received between timing intervals 0 and 5 of the instruction immediately following the PU* instruction. ("ASW" must be received 100 ns before the end of T4PL in this case.)

Timing Interval 0 Accept Level (T0AL) is used for PUR reset within respective CP's.

PUREF Operation

The PUREF 779 in FIG. 168 is set, reset and sensed via MAC. It's primary function is to facilitate diagnostics of the PUR data acceptance control. (ASW input received from PU*).

The PUREF will normally (during call processing) be in the set (enable) state. Reset (via MAC) of the PUREF would only be required for diagnostic purposes.

Maintenance Access Circuit Interface

Upon recognition of the Internal Maintenance Select Bus (IMSB) bits 25 and 31 (obtained from the instruction "Z" field which specify the IOC Maintenance Sense Group 8 — MSG8) being true due to a RMSG instruction, the corresponding IOC flip-flop output levels will exist on the Internal Maintenance Return Bus (IMRB.BXX where XX may range from )& through 12).

Resetting an IOC flip-flop with a WMCP or WMCG instruction is accomplished with the coincidence of the following levels:

| Level | Description |
|---|---|
| IMSB.B25<br>.B31 | Internal Maintenance Select Bus. Bits 25 and 31 (obtained from IOC Maintenance Control Group 8 - MCG8, instructional address). |
| IMDB.B04–B12 | Internal Maintenance Data Bus. Bits 04 through 12<br>Note: The bit when true, denotes set or reset depending on the bit number. (see FIG. 12 for MCG8 word format). |

Diagnosis of the IOC

Diagnostic or maintenance programs will pertain to the IOC in the standby CP whereas IOC routing programs will apply to active and standby CP's.

The diagnostic program approach for the IOC could consist of executing data word comparisons with known data word patterns. In the case of checking standby IOC sending functions the active CP would initiate the data word comparison but for the IOC receiving functions, the standby CP would initiate the date word comparison.

Match circuit usage would be required in establishing the known data word pattenrs before comparisons could occur.

Inputs to IOC (see FIG. 159)

| SIGNAL SOURCE | MNEMONIC | DESCRIPTION & USAGE |
|---|---|---|
| PCC | ISRL | Instruction Store Read Level — specifies that an IS* read operation is required and is part of the IS* address word sent by the IOC on the IS*.AB. |
| | ISWL | Instruction Store Write Level — specifies that an IS write operation is required and is part of the IS* address word sent by the IOC on the IS*.AB. |
| | ISNML | Instruction Store Normal Mode Level — specifies RIS, WIS, XEC, or WISD (instructions) memory mode of operation required and is part of the IS* address word sent by the IOC on the IS*.AB. |
| | ISCML | Instruction Store Control Mode Level — specifies RISN, WISN, or XECN (instructions) memory mode of operation required and is part of IS* address word sent by the IOC on the IS*.AB. |
| | ISSML | Instruction Store Special Mode Level — specifies RISA or RIST (instructions) memory mode of operation required and is part of IS* address word sent by the IOC on the IS*.AB. |

-Continued

Inputs to IOC (see FIG. 159)

| SIGNAL SOURCE | MNEMONIC | DESCRIPTION & USAGE |
|---|---|---|
| | PSDOL | Process Store DO Level — specifies a PS* unit operational cycle is required in executing the present instruction and partially enables the IOC bus selection gates of the PS*.AB and IP*.DB. It also forms part of the PSP. reset command. |
| | RL | Read Level — specifies that a PS* or PU* read operation is required and is part of the PS* or PU* address word sent by the IOC on the PS*.AB or PC*.AB. |
| | WL | Write Level — specifies that a PS* or PU* write operation is required and is part of the PS* or PU* address word sent by the IOC on the PS*.AB or PC*.AB. It also partially enables the IOC bus selection gates of the IP*.DB and PC*.DB. |
| | NML | Normal Mode Level — specifies RPS, WPS, WPSD, RPU or WPU (instructions) memory mode of operation required and is part of the PS* or PU* address word sent by the IOC on the PS*.AB or PC*.AB. |
| | CML | Control Mode Level — specifies RPSN, WPSN, RPUN or WPUN (instructions) memory mode of operation required and is part of PS* or PU* address word sent by the IOC on the PS*.AB or PC*.AB. |
| | SML | Special Mode Level — specifies RPSA, RPST, RPUA or RPUT (instructions) memory mode of operation required and is part of PS* or PU* address word sent by the IOC on the PS*.AB or PC*.AB. |
| IS*.BS | IS1.AB.B09 | Instruction Store 1, Address Bus, Bit 09 — same usage as IS0.AB.B09 input level. |
| | IS0.RB.B00–B33 | Instruction Store 0, Return Bus, Bit 00 through Bit 33 — the return word from an IS copy 0 unit which is gated into the ISR. |
| | IS1.RB.B00–B33 | Instruction Store 1, Return Bus, Bit 00 through Bit 33 — the return word from an IS copy 1 unit which is gated into the ISR. |
| | Note: IS*.RB.B33 (all seems well) partially controls the ISR data acceptance. | |
| PS*.BS | PS0.RB.B00–B33 | Process Store 0, Return Bus, Bit 00 through Bit 33 — the return word from a PS copy 0 unit which is gated into the PSR. |
| | PS1.RB.B00–B33 | Process Store 1, Return Bus, Bit 00 through Bit 33 — the return word from a PS copy 1 unit which is gated into the PSR. |
| | Note: PS*.RB.B33 (all seems well) partially controls the PSR data acceptance. | |
| PC*.BS | PC0.RB.B00–B32 | Peripheral Control 0, Return Bus, Bit 00 through Bit 32 — the return word from a PC copy 0 unit which is gated into the PUR. |
| | PC1.RB.B00–B32 | Peripheral Control 1, Return Bus, Bit 00 through Bit 32 — the return word from a PC copy 1 unit which is gated into the PUR. |
| | Note: PC*.RB.B32 (all seems well) partially controls the PUR data acceptance. | |
| DPC | DR.B00–B31 | Data Register, Bit 00 through Bit 31 — data information which IOC sends on IP*.DB or PC*.DB when required. |

-Continued

Inputs to IOC (see FIG. 159)

| SIGNAL SOURCE | MNEMONIC | DESCRIPTION & USAGE |
|---|---|---|
| | ADC.B16–B31 | Add Circuit, Bit 16 through Bit 31 — address bits sent by the IOC on the PS*.AB or PC*.AB. |
| | IAR.B15–B31 | Instruction Address Register, Bit 15 through Bit 31 — address bits sent by the IOC on the IS*.AB. |
| CCC | CPTBF | Central Processor Trouble Flip-Flop — when true, inhibits IOC from sending on IS*.BS, PS*.BS, PC*.BS and IP*.BS buses. |
| | CPAL | CP Activity Level — used in conjunction with ICCSL as a reset command for IS0IF and IS1IF. |
| | SISB0L | Send Instruction Store Bus 0 Level — when true, specifies IOC may send on IS0.BS. |
| | SISB1L | Send Instruction Store Bus 1 Level — when true, specifies IOC may send on IS1.BS. |
| | RISB0L | Receive Instruction Store Bus 0 Level — when true, specifies IOC may receive from IS0.BS. |
| | RISB1L | Receive Instruction Store Bus 1 Level — when true, specifies IOC may receive from IS1.BS. |
| | SPSB0L | Send Process Store Bus 0 Level — when true, specifies IOC may send on PS0.BS. |
| | SPSB1L | Send Process Store Bus 1 Level — when true, specifies IOC may send on PS1.BS. |
| | RPSB0L | Receive Process Store Bus 0 Level — when true, specifies IOC may receive from PS0.BS. |
| | RPSB1L | Receive Process Store Bus 1 Level — when true specifies IOC may receive from PS1.BS. |
| | SPUB0L | Send Peripheral Unit Bus 0 Level — when true, specifies IOC may send on PC0.BS. |
| | SPUB1L | Send Peripheral Unit Bus 1 Level — when true, specifies IOC may send on PC1.BS. |
| | RPUB0L | Receive Peripheral Unit Bus 0 Level — when true, specifies IOC may receive from PC0.BS. |
| | RPUB1L | Receive Peripheral Unit Bus 1 Level — when true, specifies IOC may receive from PC1.BS. |
| MAC | IMSB.B25–.B31 | Internal Maintenance Select Bus, Bits 25 and 31 — selects IOC flip-flops for status read-out (RMSG instruction) or status control (WMCG or WMCP instructions). |
| | IMDB.B04–.B12 | Internal Maintenance Data Bus, Bits 04 through 12 — provides the control bits that specify set or reset of IOC flip-flops during the execution of a WMCG or WMCP instruction. (See F.12 for bit assignment). |
| ICC | ICCSL | Interrupt Control Circuit Sequence Level — indicates the occurrence of a hardware interrupt when true and is used in conjunction with CPAL as a reset command for IS0IF and IS1IF, and is also used as a set command for RIHF. |

-Continued

Inputs to IOC (see FIG. 159)

| SIGNAL SOURCE | MNEMONIC | DESCRIPTION & USAGE |
|---|---|---|
| MCC.SP | MSAL | MCC Set Active Level — reset command for IS0IF and IS1IF which is true when respective CP copy is being forced active. |
| | MSSL | MCC Set Standby Level — set command for IS0IF and IS1IF which is true when opposite CP copy is being forced active. |

Outputs from IOC (see FIG. 159)

| USER | MNEMONIC | DESCRIPTION & USAGE |
|---|---|---|
| DPC | ISR.B00–B31 | Instruction Store Register, Bit 00 through Bit 31 — output bits of the ISR which, when placed onto the CP internal bus by the BIS Transfer Circuit (BTC) of the DPC, represent return data from an IS* unit. |
| | PSR.B00–B31 | Process Store Register, Bit 00 through Bit 31 — output bits of the PSR which represent return data from a PS* unit and are placed onto the CP internal bus by the BTC of the DPC when required. |
| | PUR.B00–B31 | Peripheral Unit Register, Bit 00 through Bit 31 — output bits of the PUR which represent return data from a PU* unit and are placed onto the CP internal bus by the BTC of the DPC when required. |
| MMC | ISR.B00–B33 | Instruction Store Register, Bit 00 through Bit 33 — output bits of the ISR. When the ISR contents represent the next instruction to be executed (the contents actually received from an IS* unit) the MMC uses bits 00 and 01 (pre-assigned address parity bits of the instruction word "T" field) in performing an address parity comparison check. When the ISR contents is either an instruction word or data word the MMC interrogates: bit 32 ("parity" bit relative to the MMC parity result performed on bits 00 through 31; bit 33 ("all seems well" bit) for proper IS* unit response. |
| | PSR.B00–B33 | Process Store Register, Bit 00 through Bit 33 — output bits of the PSR which are received from a PS* unit. The MMC interrogates: bit 32 ("parity" bit) relative to the MMC parity result performed on bits 00 through 31; bit 33 ("all seems well" bit) for proper PS* unit response. |
| | PUR.B32 | Peripheral Unit Register, Bit 32 — output bit of the PUR which is the "all seems well" bit received from a PU* unit and is interrogated by the MMC for error condition. |
| IS*.BS | IS0.AB.B09–B31 | Instruction Store 0, Address Bus, Bit 09 through Bit 31 — the total address word sent to an IS0 unit. |
| | IS1.AB.B09–B31 | Instruction Store 1, Address Bus, Bit 09 through Bit 31 — the total address word sent to an IS1 unit. |
| IP*.BS | IP0.DB.B00–B32 | Instruction Store and Process Store 0, Data Bus, Bit 00 through Bit 32 — the total data word sent to an IS0 or PS0 unit. |

-Continued

Outputs from IOC (see FIG. 159)

| USER | MNEMONIC | DESCRIPTION & USAGE |
|---|---|---|
| | IP1.DB.B00–B32 | Instruction Store and Process Store 1, Data Bus, Bit 00 through Bit 32 — the total data word sent to an IS1 or PS1 unit. |
| PS*.BS | PS0.AB.B09–B31 | Process Store 0, Address Bus, Bit 09 through Bit 31 — the total address word sent to a PS0 unit. |
| | PS1.AB.B09–B31 | Process Store 1, Adderss Bus, Bit 09 through Bit 31 — the total address word sent to a PS1 unit. |
| PC*.BS | PC0.AB.B09–B31 | Peripheral Control 0, Address Bus, Bit 09 through Bit 31 — the total address word sent to a PU0 unit. |
| | PC1.AB.B09 B31 | Peripheral Control 1, Address Bus, Bit 09 through Bit 31 — the total address word sent to a PU1 unit. |
| | PC0.DB.B00–B31 | Peripheral Control 0, Data Bus, Bit 00 through Bit 31 — the total data word sent to a PU0 unit. |
| | PC1.DB.B00 B31 | Peripheral Control 1, Data Bus, Bit 00 through Bit 31 — the total data word sent to a PU1 unit. |
| MAC | IMRB.B07–B12 | Internal Maintenance Return Bus Bit 07 through Bit 12 — the IOC sense group, flip-flop outputs selected by the IMSB levels are gated onto this bus during the execution of a RMSG instruction. (See F.12 for bit assignment). |
| | ISR.B16–B17, B24–B31 | Instruction Store Register, Bits 16, 17 and 24 through 31 — for RMSG, WMCG and WMCP instructions, each bit specifies to the MAC: Bit 16 — true denotes active CP* unit operation. Bit 17 — true denotes standby CP* unit operation. Bits 24 through 31 specifies 1 of 16 Maintenance Sense Groups or Maintenance Control Groups. |
| PCC | ISR.B02–B15, B30–B31 | Instruction Store Register, Bits 2 through 15, 30 and 31 — represent next instruction to be loaded into the ICR of the PCC for the execution. |

We claim:

1. In combination with a telephone system, control apparatus comprising:

a peripheral control bus system comprising an address bus, a data bus, and a return bus;

peripheral unit complex means comprising a plurality of peripheral units, each peripheral unit including a plurality of sense elements each associated with a different element in said telephone system for sensing the status thereof and for generating a corresponding signal representative of a state of the associated element and a plurality of control elements each associated with an element in said telephone system desired to be controlled, said sense elements and control elements being organized in a plurality of matrices, each matrix comprising a plurality of word stores each word store comprising a plurality of sense elements or control elements;

peripheral controller circuit means associated with said sense elements and control elements and including matrix access circuit means communicating with each of said sense and control elements in the matrices of its peripheral unit;

address circuit means receiving data from said address bus representative of a particular peripheral unit and a particular word store desired to be addressed and for controlling said matrix access circuit to communicate with the addressed word store;

peripheral unit timing means and means to actuate it responsive to an address received in the address circuit means designating that peripheral unit to generate a sequence of timing signals to control the sequence of operations in selecting a matrix word store and gating data between that word store via the matrix access circuit and the peripheral control bus system;

data register circuit means communicating with said matrix access circuit means and said address register circuit means for selectively placing data onto said return bus and for selectively accepting data from said data bus;

programmable central processor circuit means including timing generator circuit means for generating sequential timing level signals, a predetermined number of said timing level signals comprising a machine cycle time, processor control circuit means responsive to said timing level signals for generating control level signals, data processing circuit means responsive to said timing level signals of said timing generator circuit means and the control signals of said processor control circuit means for performing predetermined data processing functions on signals, and input/output circuit means controllably communicating the separate circuit means of said central processor circuit means with said address bus, data bus and return bus;

storage means for storing process data signals and instruction word signals and communicating with said input/output circuit of said central processor circuit means;

said central processor circuit means controlling data in said system to generate data signals, and address signals representative of particular ones of said sense and control elements in said peripheral unit complex means and for transferring said address data signals over said address bus to said address circuit means of said peripheral controller, said peripheral controller circuit means communicating with the addressed element by means of said matrix access circuit means and communicating at least a portion of the address information back to said central processor circuit means on said return bus in a first machine cycle time, and thence returning retrieved data signals from the addressed element and returning said data signals by means of said return bus to the input/output circuit means of said central processor circuit means on a subsequent machine cycle.

2. The system of claim 1 wherein said data processor circuit of said central processor circuit comprises a plurality of register circuits, arithmetic register circuit means and logical processing circuit means, and wherein said timing generator circuit generates a plurality of sequential timing accept levels for each machine cycle time and a plurality of timing place levels for each machine cycle time, said timing accept levels controlling the generation of control levels in said processor control circuit and further controlling the accepting of data in preselected registers in said data processor circuit, said timing place levels controlling the generation of further control levels in said processor control circuit and further controlling the selective placing of data from said registers, arithmetic register circuit means, and logical processing circuit means in said data processing circuit.

3. The apparatus of claim 1 further comprising a second copy of said central processor circuit means and wherein each of said timing generator circuit further comprises level generator means for generating said sequential timing pulses, a switching control circuit responsive to external maintenance signals, and a switching network responsive to said switching control circuit to selectively switch said timing levels from either of said copies of said timing generator circuit to provide timing for both central processor circuit means.

4. The apparatus of claim 1 wherein said data processor circuit includes:

an internal output bus, an internal input bus;

a data section including a data register for temporary storage of data signals, an arithmetic register input circuit, an arithmetic register, and an add circuit cooperating to perform preselected arithmetic functions on selected data as determined by said arithmetic register input circuit, and a logic comparator circuit for performing logical comparison functions on input data, all of said register circuits of said data section having their outputs connected to said internal output bus by means of output data section switches and a plurality of said register circuits and said add circuit having their inputs communicating with said internal input bus by means of input data section switches;

a storage section comprising a plurality of general register circuits for providing temporary storage of data and having their outputs communicating with said internal output bus by means of storage register output gate circuits and their inputs communicating with said internal input bus by means of storage section input gating circuits;

an address section including an instruction address register for storing data representative of the next instruction to be retrieved from instruction storage;

an add one circuit and an add one register cooperating to incrementally increase the contents of said instruction address register each machine cycle time unless otherwise controlled, said address section further including transfer circuitry for loading a transfer address selectively to said instruction address register in response to command signals;

a bus transfer circuit having an input section communicating with said internal output bus and an output communicating with said internal input bus and being responsive to control and timing signals for selectively communicating preselected circuits of said storage section and data section in a first timing level with said internal output bus and for selectively communicating said internal output bus with said internal input bus in a subsequent timing level whereby the signals on said internal output bus are selectively transferred to said internal input bus, said bus transfer circuit further controlling the gating of the input gating circuits of said storage section, and the transfer of data from said internal input bus to said address section and said data section.

5. The system of claim 4 wherein said storage section of said data processing circuit further comprises a special purpose register circuit comprising a first plurality of flip-flop circuits including a predetermined number having their outputs in communication with the internal output bus and a punch operation flip-flop not in communication with the internal output bus, said plurality of flip-flops serving as an indicator for real time consumption by a program and including real time add circuitry to increment said first plurality of flip-flops each machine cycle time, said punch operation flip-flop accepting information from the internal input bus under program control and being resettable during a predetermined timing levels of each machine cycle, the output of said punch control flip-flop generating a signal for use in recovery programs.

6. In control apparatus for a telephone system, the combination comprising:

instruction storage means for storing signals representative of instruction words signals; and central processor circuit means including:

timing generator circuit means for generating sequential place and accept signal levels, a predetermined number of said signal levels comprising a machine cycle time;

processor control circuit means receiving said instruction word signals from said instruction storage means and responsive to said timing generator circuit means for generating sequential data transfer signals in each of said timing signals, each data transfer signal including register place command signals, bus transfer command signals, and register accept command signals;

data processing circuit means including a plurality of storage register circuit means, arithmetic register circuit means, logical comparator circuit means, instruction address register circuit means, an internal output bus, an internal input bus, and a bus transfer circuit means;

said data processing circuit means being responsive to said register place command signals, said bus transfer command signals and said register accept command signals simultaneously for respectively gating the signal contents of one of said register circuit means onto said internal output bus, transferring the signal contents of the internal output bus to said internal input bus, and gating the signal contents on said internal input bus to a preselected register circuit means in said data processor circuit means;

further comprising a data register circuit and gating circuitry for gating the outputs of said arithmetic register circuit means and said data register circuit to said logical comparator circuit means in half sections, said logic comparator circuit means including AND gate circuits for each corresponding bit in said arithmetic register circuit means and said data register circuit means, and NOR gate circuits for each corresponding bit in said arithmetic register circuit means and said data register circuit means, said processor control circuit means generating control and timing level signals for selectively performing either a logical AND function on the signal contents of said arithmetic register circuit means and said data register circuit means or a logical NOR function on the signal contents of said arithmetic register circuit means and said data register circuit means.

7. The apparatus of claim 6 further comprising ADD circuit means receiving simultaneously the left and right half signal contents of said arithmetic register for adding said signal contents and for selectively placing the resultant signals on said internal output bus in response to said register place command signals.

8. In a control apparatus for a telephone system, the combination comprising:

peripheral unit complex circuit means comprising a plurality of peripheral units, each peripheral unit including a plurality of sense elements each associated with a different element in said telephone system for sensing the status thereof and for generating a corresponding signal representative of a state of the associated element, and a plurality of control elements each associated with an element in said telephone system desired to be controlled, said sense elements and control elements being organized in a plurality of matrices, each matrix comprising a plurality of word stores each word store comprising a plurality of sense elements or control elements;

peripheral controller circuit means associated with said sense elements and control elements and including a data register circuit for selectively addressing a preselected one of said word stores and for transferring data between said sense and control elements and said data register circuit means;

instruction store means for storing signals representative of instruction words; and a programmable central processor including processor control circuit means including an instruction contents register circuit, and instruction fetch and decoding circuit means for generating the address of an instruction word in said instruction store means, for receiving an instruction word from said instruction store means and loading it into said instruction contents register, and for decoding the signal contents of said instruction contents register circuit for generating processor control circuit control signals;

timing generator circuit means for generating timing level signals, a predetermined number of said timing level signals comprising a machine cycle time;

data processor circuit means responsive to said timing level signals of said timing generator circuit means and said control signals of said processor control circuit and including a plurality of storage register circuits including an instruction address register circuit and an ADD circuit, said data processor circuit means being responsive to said timing level signals and said control signals of said processor control circuit means for generating address signals for said instruction store means in said instruction address register and for generating signals representative of an address in said peripheral unit complex in said ADD circuit; and address bus circuit means communicating said instruction address register of said central processor with said instruction store and further including a bus for communicating the contents of said add circuit means to address said peripheral unit complex.

9. The apparatus of claim 8 wherein said processor control circuit means further includes multiple cycle control circuit means responsive to said processor control circuit for generating signals representative of instructions requiring at least two machine cycles to execute and for inhibiting communication between said instruction address register circuit and said instruction store means for multiple cycle instructions following the first machine cycle time, while permitting data to be transferred from said peripheral unit complex to said central processor in multiple cycle instructions following the first machine cycle time.

10. The system of claim 8 further comprising ADD one circuit means for incrementing said instruction address register each machine cycle, said data processor circuit further comprising means for transferring a new instruction word address into said instruction address register upon command.

11. The system of claim 8 further comprising data bus means communicating said data processor circuit means with said instruction store, and second data bus means communicating said data processor circuit means with said peripheral unit complex for transferring data thereto.

* * * * *